US012037531B2

(12) United States Patent
Horiguchi et al.

(10) Patent No.: US 12,037,531 B2
(45) Date of Patent: Jul. 16, 2024

(54) PHOTORESPONSIVE HIGH-MOLECULAR WEIGHT MATERIAL, ADHESIVE, TONER, AND IMAGE FORMING METHOD

(71) Applicant: KONICA MINOLTA, INC., Tokyo (JP)

(72) Inventors: Haruo Horiguchi, Koganei (JP); Yukiko Kusano, Toyohashi (JP); Kouji Sugama, Musashino (JP); Seijiro Takahashi, Kokubunji (JP); Toyoko Shibata, Tokyo (JP); Tomohiro Oshiyama, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 631 days.

(21) Appl. No.: 16/788,535

(22) Filed: Feb. 12, 2020

(65) Prior Publication Data
US 2020/0263088 A1 Aug. 20, 2020

(30) Foreign Application Priority Data

Feb. 14, 2019 (JP) .................. 2019-024902
Apr. 23, 2019 (JP) .................. 2019-082203
Dec. 6, 2019 (JP) .................. 2019-221681

(51) Int. Cl.
C09K 19/24 (2006.01)
C08F 120/38 (2006.01)
C08F 212/08 (2006.01)
C08F 220/18 (2006.01)
C08F 220/38 (2006.01)
C08F 257/02 (2006.01)
C08K 5/04 (2006.01)
C09D 125/08 (2006.01)
C09D 133/14 (2006.01)
C09K 19/34 (2006.01)
C09K 19/54 (2006.01)
G03F 7/004 (2006.01)

(52) U.S. Cl.
CPC ............ C09K 19/24 (2013.01); C09K 19/348 (2013.01); C09K 19/542 (2013.01)

(58) Field of Classification Search
CPC .... C09K 19/24; C09K 19/348; C09K 19/542; C08K 220/38; C08K 220/1806; C08K 220/1804; C08K 220/387; C08K 220/18; C08K 257/02; C08K 120/38; C08K 212/08; C08K 5/04; C09D 133/14; C09D 125/08; G03F 7/004; G03G 9/0922
See application file for complete search history.

(56) References Cited

U.S. PATENT DOCUMENTS

2003/0137633 A1 7/2003 Ito et al.
2013/0066068 A1 3/2013 Norikane et al.
2015/0159058 A1 6/2015 Akiyama et al.

FOREIGN PATENT DOCUMENTS

| CN | 106928406 A | 6/2019 |
| JP | H07-98413 A | 4/1995 |
| JP | 2002107539 A | 4/2002 |
| JP | 2002194030 A | 7/2002 |
| JP | 2011-256155 A | 12/2011 |
| JP | 2011-256291 A | 12/2011 |
| WO | 2014/157331 A1 | 10/2014 |

OTHER PUBLICATIONS

Martinez-Miranda et al., 2017, caplus an 2017:603920.*
EPO, Extended European Search Report for the corresponding European Patent application No. 20156980.3, dated Jun. 18, 2020.
Bagheri M et al., "Synthesis of polymers containing donor-acceptor Schiff base in side chain for nonlinear optics," European Polymer Journal, pp. 317-326, vol. 38, No. 2, Feb. 1, 2002, Pergamon Press Ltd. Oxford, GB.
Shotaro Ito et al., "Light-Induced Reworkable Adhesives Based on ABA-type Triblock Copolymers with Azopolymer Termini," ACS Applied Materials & Interfaces, pp. 32649-32658, vol. 10, No. 38, Aug. 28, 2018.
Stephane Dufresne et al., "Optoelectronic property tailoring of conjugated heterocyclic azomethines—the effect of pyrrole, thiophene and furans: Heterocyclic Effect on Azomethine Optoelectronic Properties," Journal of Physical Organic Chemistry, pp. 211-221, vol. 25, No. 3, Jul. 19, 2011.
Coelho Paulo J et al., "Reversible trans-cisphotoisomerization of new pyrrolidene heterocyclic im," Journal of Photochemistry and Photobiology, pp. 59-65, vol. 259, Mar. 16, 2013, Elsevier Sequoi, Lausanne, Switzerland.
Office Action dated Nov. 2, 2022 for the corresponding Chinese Patent application No. 202010090097.5, together with English translation.
EPO, Office Action for the corresponding European Patent application No. 20156980.3, dated Feb. 11, 2022.
CNIPA, Office Action for the corresponding Chinese Patent application No. 202010090097.5, dated May 7, 2022, English translation.
EPO, Office Action dated Jul. 5, 2023 for the corresponding European Patent application No. 20156980.3, 5 pages.
CNIPA, Office Action for the corresponding Chinese Patent application No. 202010090097.5, dated Sep. 24, 2021, with English translation.
Office Action for the corresponding Japanese Patent application No. 2019-024902, dated Sep. 27, 2022, together with English translation.
EPO, Office Action for the corresponding European Patent application No. 20156980.3, dated Jun. 25, 2021.
Polymer Properties Database: "Properties of Polyacrylates Polymer Properties Database," Dec. 31, 2015, https://polymerdatabase.com/polymer%20classes/Polyacrylate%20type.html.

(Continued)

Primary Examiner — Sun Jae Yoo
(74) Attorney, Agent, or Firm — Lucas & Mercanti, LLP

(57) ABSTRACT

Provided is a polymer that includes a predetermined structural unit derived from an azomethine derivative having a polymerizable group and is reversibly fluidized and non-fluidized by being irradiated with light.

21 Claims, 2 Drawing Sheets

(56) References Cited

OTHER PUBLICATIONS

Japan Patent Office, Notice of Reasons for Refusual mailed Apr. 2, 2024, which was isseud for releated Japanese Patent application No. 2020-135372, with English translation, 12 pages.

* cited by examiner

PHOTORESPONSIVE HIGH-MOLECULAR WEIGHT MATERIAL, ADHESIVE, TONER, AND IMAGE FORMING METHOD

CROSS-REFERENCE TO RELATED APPLICATION

Japanese Patent Application No. 2019-024902 filed on Feb. 14, 2019, Japanese Patent Application No. 2019-082203 filed on Apr. 23, 2019, and Japanese Patent Application No. 2019-221681 filed on Dec. 6, 2019, including description, claims, drawings, and abstract the entire disclosure is incorporated herein by reference in its entirety.

BACKGROUND

1. Technical Field

The present invention relates to a polymer that includes a structural unit derived from an azomethine derivative having a polymerizable group and is reversibly fluidized and non-fluidized by being irradiated with light, the polymer being a photoresponsive high-molecular weight material; an adhesive and a toner that use the polymer; and an image forming method using the toner.

Furthermore, the present invention relates to a photoresponsive high-molecular weight compound. More particularly, the present invention relates to a photoresponsive high-molecular weight compound that can be applied to a toner, an image forming method using the toner, and a photosensitive adhesive, the photoresponsive high-molecular weight compound being a high-molecular weight compound that is reversibly fluidized and non-fluidized by being irradiated with light.

Furthermore, the present invention relates to a photoresponsive polymer that is fluidized when irradiated with light and is reversibly non-fluidized; an adhesive and a toner that use the polymer; and an image forming method using the toner.

2. Description of Related Arts

As materials whose fluidity changes as a result of light irradiation, photoresponsive liquid crystal materials are known. For example, in Japanese Patent Application Laid-Open No. 2011-256155 (corresponding to US Patent Application Publication No. 2013/066068) and Japanese Patent Application Laid-Open No. 2011-256291, polymeric liquid crystal materials using azobenzene derivatives are suggested. These respond to light and cause a cis-trans isomerization reaction of an azobenzene part. It is considered that a change in the molecular structure caused thereby induces phase transition from a solid state to a fluid state. Furthermore, when the polymeric liquid crystal materials are irradiated with light again after changing the wavelength, heated, or left to stand at room temperature in the dark, a reverse reaction occurs, and the materials are solidified again.

SUMMARY

However, the azobenzene derivatives described in Japanese Patent Application Laid-Open No. 2011-256155 (corresponding to US Patent Application Publication No. 2013/066068) and Japanese Patent Application Laid-Open No. 2011-256291 are all colored in yellow to orange, and there is a problem that desired colors cannot be reproduced when the azobenzene derivatives are applied to industrial products such as toners and adhesives. Furthermore, according to the investigation of the present inventors, it was also found that in regard to coloration in yellow to orange, although the color can be slightly adjusted by changing the substituents of the azobenzene derivatives, it is basically impossible to make the azobenzene derivatives colorless or to bring the compounds to a state close to colorlessness. Furthermore, since the azobenzene derivatives described in Japanese Patent Application Laid-Open No. 2011-256155 (corresponding to US Patent Application Publication No. 2013/066068) and Japanese Patent Application Laid-Open No. 2011-256291 have relatively low molecular weights, there has been a problem that toughness of the materials is low.

Thus, it is an object of the present invention to provide a polymer that is reversibly fluidized and non-fluidized when irradiated with light and does not undergo noticeable coloration.

Furthermore, it is an object of the present invention to provide a high-molecular weight compound (polymer) that has high toughness, is reversibly fluidized and non-fluidized when irradiated with light, and does not undergo noticeable coloration.

It is another object of the present invention to provide an industrial product such as a toner or an adhesive, which uses the above-described polymer.

It is still another object of the present invention to provide an image forming method using the above-described toner.

The present inventors repeatedly conducted a thorough investigation in view of the problems described above. As a result, it was found that by using a compound having an azomethine part, a photoresponsive high-molecular weight material that is reversibly fluidized and non-fluidized and does not undergo noticeable coloration to the extent that does not affect the reproduction of a desired color when the material is applied to a toner or an adhesive, is realized, and thereby the problems described above are solved. Thus, the present invention was finally completed.

Furthermore, it was found that the problems described above are solved by a predetermined block copolymer including a polymer block including a structural unit derived from an azomethine derivative and a polymer block that does not include the structure derived from an azomethine derivative, and thus the present invention was finally completed.

Furthermore, it was found that the problems described above are solved by using a polymer which includes a structural unit containing a group having an azomethine structure, and in which an activation energy of isomerization from a cis-form to a trans-form of a compound having a hydrogen atom bonded to the group having an azomethine structure is in a predetermined range, and thus the present invention was finally completed.

In order to realize at least one of the above-described objects, a polymer, an adhesive, a toner, and an image forming method reflecting one aspect of the present invention, that is, a first embodiment of the present invention is achieved by a polymer, an adhesive, a toner, and an image forming method disclosed in the following items 1 to 20.

1. A polymer including a structural unit derived from an azomethine derivative having a polymerizable group represented by the following Chemical Formula (1), the polymer being reversibly fluidized and non-fluidized by being irradiated with light:

[Chemical Formula 1]

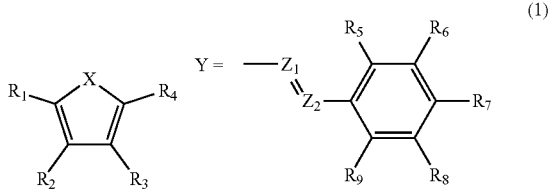

wherein in the Chemical Formula (1),

X represents $NR_{10}$, O, or S;

$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

either $R_3$ or $R_4$ represents a group represented by Y, while the other one represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_{10}$ represents a group having a polymerizable group, a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$Z_1$ and $Z_2$ each represent N or CH, while $Z_1 \neq Z_2$;

$R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

wherein at least one of $R_1$, $R_2$, $R_5$ to $R_7$, $R_{10}$, and the one that has not been selected as a group represented by Y among $R_3$ and $R_4$, represents a group having a polymerizable group;

in a case in which at least one of $R_1$, $R_2$, $R_{10}$, and the one that has not been selected as a group represented by Y among $R_3$ and $R_4$, represents a group having a polymerizable group, those other than the group having a polymerizable group and the group represented by Y among $R_1$, $R_2$, $R_{10}$, and $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms; and in a case in which at least one of $R_5$ to $R_7$ is a group having a polymerizable group, those other than the group having a polymerizable group among $R_5$ to $R_7$, as well as $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms.

2. The polymer as described in the above item 1, wherein the group having a polymerizable group includes a group represented by any one of the following Formulae (i) to (iv):

[Chemical Formula 2]

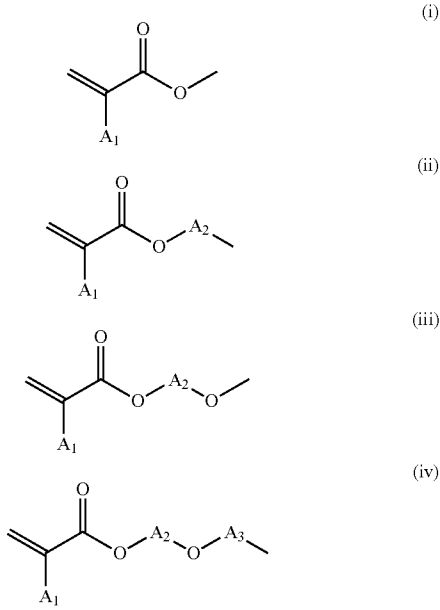

wherein in the Formulae (i) to (iv), $A_1$ represents a hydrogen atom or a methyl group; $A_2$ represents an alkylene group having 1 to 18 carbon atoms; and $A_3$ represents an alkylene group having 1 to 6 carbon atoms.

3. The polymer as described in the above item 1 or 2, wherein the azomethine derivative has the group having a polymerizable group at $R_7$, $R_{10}$, or any one of $R_1$ to $R_4$, which is not adjacent to the group represented by Y, in the Chemical Formula (1).

4. The polymer as described in the above item 3, wherein the azomethine derivative is represented by the following Chemical Formula (2):

[Chemical Formula 3]

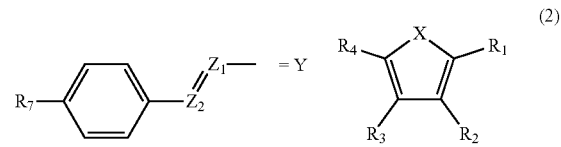

wherein in Chemical Formula (2),

X represents $NR_{10}$, O, or S;

$R_1$ and $R_2$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

either $R_3$ or $R_4$ represents a group represented by Y, while the other one represents a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_{10}$ represents a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$Z_1$ and $Z_2$ each represent N or CH, while $Z_1 \neq Z_2$; and $R_7$ represents a group having a polymerizable group.

5. The polymer as described in the above item 4, wherein in the azomethine derivative represented by the Chemical Formula (2), $R_1$, $R_2$, $R_{10}$, and one that has not been selected as the group represented by Y among $R_3$ and $R_4$, all represent a hydrogen atom; or among $R_1$, $R_2$, $R_{10}$, and the one that has not been selected as the group represented by Y among $R_3$ and $R_4$, any one of $R_1$ to $R_4$, which is not adjacent to Y, represents a cyano group, a nitro group, a hydroxy group, a carboxy group, an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, the others each independently represent a hydrogen atom, a cyano group, a nitro group, a hydroxy group, a carboxy group, an alkyl group having 1 to 4 carbon atoms, or an alkoxy group having 1 to 4 carbon atoms, while $R_{10}$ represents a hydrogen atom, an alkyl group having 1 to 4 carbon atoms, or an alkoxy group having 1 to 4 carbon atoms; or $R_{10}$ represents an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, while $R_1$, $R_2$, and the one that has not been selected as the group represented by Y among $R_3$ and $R_4$ each independently represent a hydrogen atom, a cyano group, a nitro group, a hydroxy group, a carboxy group, an alkyl group having 1 to 4 carbon atoms, or an alkoxy group having 1 to 4 carbon atoms.

6. The polymer as described in the above item 5, wherein the azomethine derivative is represented by the following Chemical Formula (3):

[Chemical Formula 4]

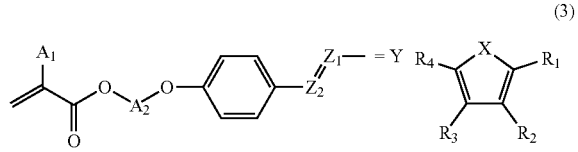

(3)

wherein in the Chemical Formula (3),

X represents $NR_{10}$, O, or S;

either $R_3$ or $R_4$ represents a group represented by Y;

$Z_1$ and $Z_2$ each represent N or CH, while $Z_1 \neq Z_2$;

$A_1$ represents a hydrogen atom or a methyl group;

$A_2$ represents an alkylene group having 1 to 18 carbon atoms; and $R_1$, $R_2$, $R_{10}$, and the one that has not been selected as a group represented by Y among $R_3$ and $R_4$, all represent a hydrogen atom; or among $R_1$, $R_2$, $R_{10}$, and the one that has not been selected as the group represented by Y among $R_3$ and $R_4$, any one of $R_1$ to $R_4$, which is not adjacent to Y, represents a cyano group, a nitro group, a hydroxy group, a carboxy group, an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, the others each independently represent a hydrogen atom, a cyano group, a nitro group, a hydroxy group, a carboxy group, an alkyl group having 1 to 4 carbon atoms, or an alkoxy group having 1 to 4 carbon atoms, while $R_{10}$ represents a hydrogen atom, an alkyl group having 1 to 4 carbon atoms, or an alkoxy group having 1 to 4 carbon atoms; or $R_{10}$ represents an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, while $R_1$, $R_2$, and the one that has not been selected as the group represented by Y among $R_3$ and $R_4$ each independently represent a hydrogen atom, a cyano group, a nitro group, a hydroxy group, a carboxy group, an alkyl group having 1 to 4 carbon atoms, or an alkoxy group having 1 to 4 carbon atoms.

7. The polymer as described in any one of the above items 1 to 6, wherein the number average molecular weight Mn is 3,500 or more.

8. The polymer as described in any one of the above items 1 to 7, wherein the polymer further includes other structural unit having a vinyl-based polymerizable group.

9. The polymer as described in the above item 8, wherein the polymer includes, as the other structural unit, a structural unit derived from a styrene derivative, a (meth)acrylic acid derivative, or an olefin derivative.

10. The polymer as described in any one of the above items 1 to 9, wherein a wavelength of the light to be irradiated is from 280 nm to 480 nm.

11. A toner containing the polymer as described in any one of the above items 1 to 10.

12. The toner as described in the above item 11, further containing a binder resin.

13. The toner as described in the above item 12, wherein the binder resin includes at least one selected from the group consisting of a styrene-acrylic resin and a polyester resin.

14. The toner as described in any one of the above items 11 to 13, further containing a colorant.

15. The toner as described in any one of the above items 11 to 14, further containing a release agent.

16. An image forming method, including a step of forming a toner image formed from the toner as described in any one of the above items 11 to 15 on a recording medium; and a step of irradiating the toner image with light and thereby softening the toner image.

17. The image forming method as described in the above item 16, wherein a wavelength of the light is from 280 nm to 480 nm.

18. The image forming method as described in the above item 16 or 17, further including a step of pressing the softened toner image.

19. The image forming method as described in the above item 18, wherein in the step of pressing, the softened toner image is further heated.

20. A photosensitive adhesive containing the polymer as described in any one of the above items 1 to 10.

A second embodiment of the present invention is achieved by a high-molecular weight compound, an adhesive, a toner, and an image forming method disclosed in the following items 21 to 36.

21. A high-molecular weight compound represented by the following General Formula (1), the compound being reversibly fluidized and non-fluidized by being irradiated with light:

[Chemical Formula 5]

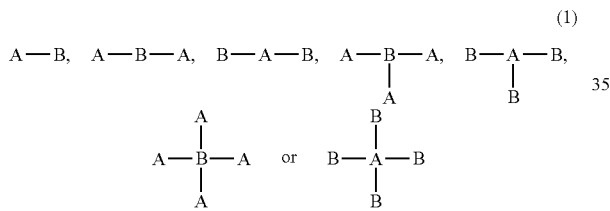

(1)

wherein in the General Formula (1), A represents a polymer block including a structural unit derived from an azomethine derivative having a polymerizable group represented by Chemical Formula (2); and B represents a polymer block that does not include the structure derived from an azomethine derivative represented by the Chemical Formula (2):

[Chemical Formula 6]

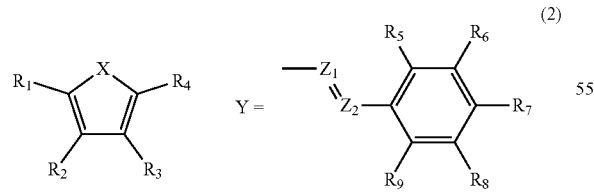

(2)

wherein in the Chemical Formula (2),
X represents $NR_{10}$, O, or S;
$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

either $R_3$ or $R_4$ represents a group represented by Y, while the other one represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_{10}$ represents a group having a polymerizable group, a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$Z_1$ and $Z_2$ each represent N or CH, while $Z_1 \neq Z_2$;

$R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

wherein at least one of $R_1$, $R_2$, $R_5$ to $R_7$, $R_{10}$, and the one that has not been selected as a group represented by Y among $R_3$ and $R_4$, represents a group having a polymerizable group;

in a case in which at least one of $R_1$, $R_2$, $R_{10}$, and the one that has not been selected as a group represented by Y among $R_3$ and $R_4$, represents a group having a polymerizable group, those other than the group having a polymerizable group and the group represented by Y among $R_1$, $R_2$, $R_{10}$, and $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms; and in a case in which at least one of $R_5$ to $R_7$ represents a group having a polymerizable group, those other than the group having a polymerizable group among $R_5$ to $R_7$, as well as $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms.

22. The high-molecular weight compound as described in the above item 21, wherein the group having a polymerizable group includes a group represented by any one of the following Formulae (i) to (iv):

[Chemical Formula 7]

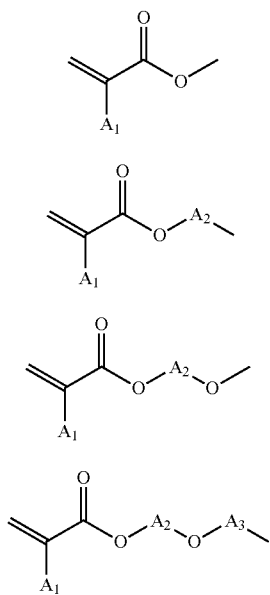

wherein in the Formulae (i) to (iv), $A_1$ represents a hydrogen atom or a methyl group; $A_2$ represents an alkylene group having 1 to 18 carbon atoms; and $A_3$ represents an alkylene group having 1 to 6 carbon atoms.

23. The high-molecular weight compound as described in the above item 21 or 22, wherein the azomethine derivative has the group having a polymerizable group at $R_7$, $R_{10}$, or any one of $R_1$ to $R_4$, which is not adjacent to the group represented by Y, in the Chemical Formula (2).

24. The high-molecular weight compound as described in the above item 23, wherein the azomethine derivative is represented by the following Chemical Formula (3):

[Chemical Formula 8]

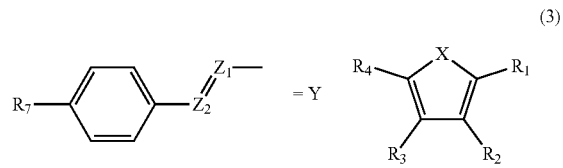

wherein in the Chemical Formula (3),
X represents $NR_{10}$, O, or S;
$R_1$ and $R_2$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;
either $R_3$ or $R_4$ represents a group represented by Y, while the other one represents a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;
$R_{10}$ represents a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;
$Z_1$ and $Z_2$ each represent N or CH, while $Z_1 \neq Z_2$; and
$R_7$ represents a group having a polymerizable group.

25. The high-molecular weight compound as described in the above item 24, wherein the azomethine derivative is represented by the following Chemical Formula (4):

[Chemical Formula 9]

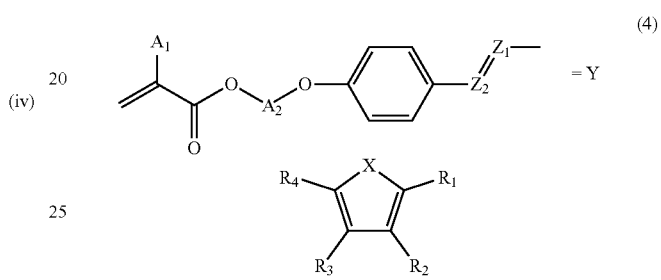

wherein in the Chemical Formula (4),
X represents $NR_{10}$, O, or S;
either $R_3$ or $R_4$ represents a group represented by Y;
$Z_1$ and $Z_2$ each represent N or CH, while $Z_1 \neq Z_2$;
$A_1$ represents a hydrogen atom or a methyl group;
$A_2$ represents an alkylene group having 1 to 18 carbon atoms; and
$R_1$, $R_2$, $R_{10}$, and the one that has not been selected as a group represented by Y among $R_3$ and $R_4$, all represent a hydrogen atom; or
among $R_1$, $R_2$, $R_{10}$, and the one that has not been selected as a group represented by Y among $R_3$ and $R_4$, any one of $R_1$ to $R_4$, which is not adjacent to Y, represents a cyano group, a nitro group, a hydroxy group, a carboxy group, an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, the others each independently represent a hydrogen atom, a cyano group, a nitro group, a hydroxy group, a carboxy group, an alkyl group having 1 to 4 carbon atoms, or an alkoxy group having 1 to 4 carbon atoms, while $R_{10}$ represents a hydrogen atom, an alkyl group having 1 to 4 carbon atoms, or an alkoxy group having 1 to 4 carbon atoms;
or
$R_{10}$ represents an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, while $R_1$, $R_2$, and the one that has not been selected as a group represented by Y among $R_3$ and $R_4$ each independently represent a hydrogen atom, a cyano group, a nitro group, a hydroxy group, a carboxy group, an alkyl group having 1 to 4 carbon atoms, or an alkoxy group having 1 to 4 carbon atoms.

26. The high-molecular weight compound as described in any one of the above items 21 to 25, wherein the number average molecular weight of the sum of polymer blocks A included in the high-molecular weight compound represented by the General Formula (1) is 1,000 or more, the number average molecular weight of the sum of polymer blocks B is 1,000 or more, and the total number average molecular weight of the high-molecular weight compound represented by the General Formula (1) is 3,500 or more.

27. The high-molecular weight compound as described in any one of the above items 21 to 26, wherein the polymer block B is a polymer block including at least one of structural units derived from a styrene derivative, a (meth) acrylic acid derivative, and an olefin derivative.

28. The high-molecular weight compound as described in any one of the above items 21 to 27, wherein a wavelength of the light to be irradiated is from 280 nm to 480 nm.

29. A toner including the high-molecular weight compound as described in any one of the above items 21 to 28.

30. The toner as described in the above item 29, further including a binder resin.

31. The toner as described in the above item 30, wherein the binder resin includes at least one selected from the group consisting of a styrene-acrylic resin and a polyester resin.

32. An image forming method including a step of forming a toner image formed from the toner as described in any one of the above items 29 to 31 on a recording medium; and a step of irradiating the toner image with light and thereby softening the toner image.

33. The image forming method as described in the above item 32, wherein a wavelength of the light is from 280 nm to 480 nm.

34. The image forming method as described in the above item 32 or 33, further including a step of pressing the softened toner image.

35. The image forming method as described in the above item 34, wherein in the step of pressing, the softened toner image is further heated.

36. A photoresponsive adhesive containing the high-molecular weight compound as described in any one of the above items 21 to 28.

A third embodiment of the present invention is achieved by a photoresponsive polymer, an adhesive, a toner, and an image forming method disclosed in the following items 37 to 58.

37. A photoresponsive polymer including a structural unit represented by the following General Formula (1), the photoresponsive polymer being fluidized by being irradiated with light and reversibly non-fluidized:

[Chemical Formula 10]

General Formula (1)

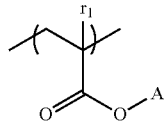

wherein in the General Formula (1), $r_1$ represents a hydrogen atom or a methyl group;

A represents a group having an azomethine structure represented by the following General Formula (2):

[Chemical Formula 11]

General Formula (2)

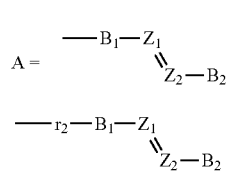

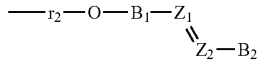

in the General Formula (2), $Z_1$ and $Z_2$ each independently represent N or CH, while $Z_1 \neq Z_2$;

each $B_1$ independently represents a substituted or unsubstituted divalent aromatic hydrocarbon group or a substituted or unsubstituted divalent aromatic heterocyclic group;

each $B_2$ independently represents a substituted or unsubstituted monovalent aromatic hydrocarbon group or a substituted or unsubstituted monovalent aromatic heterocyclic group;

each $r_2$ independently represents an alkylene group having 1 to 18 carbon atoms; and an activation energy Ea represented by the following Formula (1) of a compound in which a hydrogen atom is bonded, instead of an oxygen atom, to A in the General Formula (1) is 60 kJ/mol or more:

Ea (kJ/mol)=(Total energy of TS (kJ/mol))−(Total energy of cis-form (kJ/mol))     Formula (1):

wherein in the Formula (1), TS represents a transition state represented by General Formula (3); and a cis-form represents an isomer represented by General Formula (4).

[Chemical Formula 12]

General Formula (3)

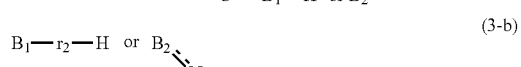

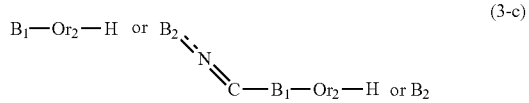

General Formula (4)

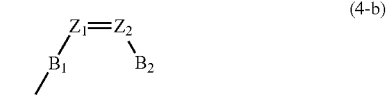

38. The polymer as described in the above item 37, wherein each $B_1$ independently represents a substituted or unsubstituted phenylene group or a substituted or unsubstituted divalent aromatic heterocyclic group; and each $B_2$ independently represents a substituted or unsubstituted phenyl group or a substituted or unsubstituted monovalent aromatic heterocyclic group.

39. The polymer as described in the above item 38, wherein each $B_1$ independently represents a phenylene group that is bonded to an oxygen atom (in the case of (2-a) or (2-c)) or $r_2$ (in the case of (2-b)) at a para-position with respect to $Z_1$; and each $B_2$ independently represents a phenyl group that is unsubstituted or has a substituent selected among an alkyl group having 1 to 18 carbon atoms, an alkoxy group having 1 to 18 carbon atoms, and a dialkylamino group having 2 to 10 carbon atoms at a para-position with respect to $Z_2$.

40. The polymer as described in the above item 39, wherein at least one of $B_1$ and $B_2$ does not have substitution at two ortho-positions and two meta-positions with respect to $Z_1$ or $Z_2$, or is substituted with a group selected among a halogen atom, an alkyl group having 1 to 4 carbon atoms, an alkoxy group having 1 to 4 carbon atoms, and a dialkylamino group having 2 to 10 carbon atoms.

41. The polymer as described in the above item 38, wherein each $B_1$ independently represents a phenylene group that is bonded to an oxygen atom (in the case of (2-a) or (2-c)) or $r_2$ (in the case of (2-b)) at the para-position with respect to $Z_1$; and
each $B_2$ independently represents an aromatic heterocyclic group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

42. The polymer as described in the above item 38, wherein each $B_1$ independently represents a substituted or unsubstituted divalent aromatic heterocyclic group and is bonded to an oxygen atom (in the case of (2-a) or (2-c)) or $r_2$ (in the case of (2-b)) at a position that is not adjacent to the bonding position to $Z_1$; and
each $B_2$ independently represents a phenyl group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

43. The polymer as described in the above item 38, wherein each $B_1$ independently represents a substituted or unsubstituted divalent aromatic heterocyclic group and is bonded to an oxygen atom (in the case of (2-a) or (2-c)) or $r_2$ (in the case of (2-b)) at a position that is not adjacent to the bonding position to $Z_1$; and
each $B_2$ independently represents an aromatic heterocyclic group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

44. The polymer as described in any one of the above items 37 to 43, wherein the number average molecular weight Mn is 3,500 or more.

45. The polymer as described in any one of the above items 37 to 44, further including other structural unit having a vinyl-based polymerizable group.

46. The polymer as described in the above item 45, wherein the polymer includes, as the other structural unit, a structural unit derived from a styrene derivative, an acrylic acid derivative, a methacrylic acid derivative, or an olefin derivative.

47. The polymer as described in any one of the above items 37 to 44, wherein the polymer is represented by the following General Formula (5):

[Chemical Formula 13]

General Formula (5)

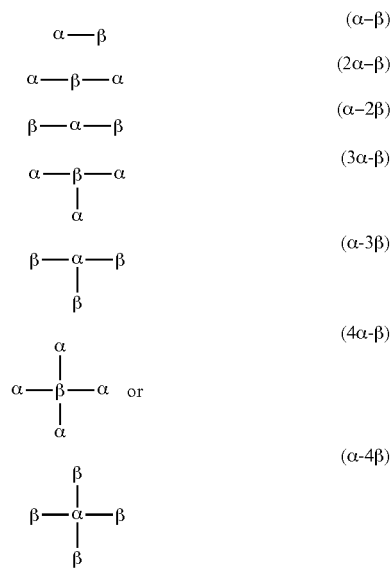

wherein in the General Formula (5), α represents a polymer block including a structural unit represented by the General Formula (1); and β represents a polymer block that does not include an azomethine structure ($B_1$—$Z_1$=$Z_2$—$B_2$) in the General Formula (1).

48. The polymer as described in the above item 47, wherein the number average molecular weight of the sum of polymer blocks α included in the polymer represented by the General Formula (5) is 1,000 or more, the number average molecular weight of the sum of polymer blocks β is 1,000 or more, and the total number average molecular weight of the polymer represented by the General Formula (5) is 3,500 or more.

49. The polymer as described in the above item 47 or 48, wherein the polymer block β is a polymer block including at least one of structural units derived from a styrene derivative, a (meth)acrylic acid derivative, and an olefin derivative.

50. The polymer as described in any one of the above items 37 to 49, wherein a wavelength of the light is from 280 nm to 480 nm.

51. A toner including the polymer as described in any one of the above items 37 to 50.

52. The toner as described in the above item 51, further including a binder resin.

53. The toner as described in the above item 51 or 52, wherein the binder resin includes at least one selected from the group consisting of a styrene-acrylic resin and a polyester resin.

54. An image forming method, including a step of forming a toner image formed from the toner as described in any one of the above items 51 to 53 on a recording medium; and a step of irradiating the toner image with light and thereby softening the toner image.

55. The image forming method as described in the above item 54, wherein a wavelength of the light is from 280 nm to 480 nm.

56. The image forming method as described in the above item 54 or 55, further including a step of pressing the toner image.

57. The image forming method as described in the above item 56, wherein in the step of pressing, the toner image is further heated.

58. A photoresponsive adhesive containing the polymer as described in any one of the above items 37 to 50.

BRIEF DESCRIPTION OF THE DRAWING

The advantages and features provided by one or more embodiments of the invention will become more fully understood from the detailed description given hereinbelow and appended drawings which are given by way of illustration only, and thus are not intended as a definition of the limits of the present invention.

In FIG. 1, reference numeral 1 represents a photoreceptor; reference numeral 2 a charging device; reference numeral 3 an exposure device; reference numeral 4 a developing unit; reference numeral 5 a transfer unit; reference numeral 7 a paper conveyance system; reference numeral 8 a cleaning unit; reference numeral 9 a compression unit; reference numeral 10 an image forming unit; reference numeral 11 a paper feeder; reference numeral 12 a conveyance roller; reference numeral 13 a conveyance belt; reference numeral 14 a paper ejection unit; reference numeral 15 a manual paper feeder; reference numeral 16 a tray; reference numeral 17 a thermometer/hygrometer; reference numeral 20 an image processing unit; reference numeral 24 a paper inverting unit; reference numeral 40 an irradiation unit; reference unit 71 an image reading apparatus; reference numeral 72 an automatic document feeder; reference numeral 85 a blade; reference numeral 90 a control unit; reference numerals 91 and 92 pressing members; reference numeral 100 an image forming apparatus; reference numeral d a document; and reference numeral S a recording paper.

In FIG. 2, reference numeral 1 represents a photoreceptor; reference numeral 2 a charging device; reference numeral 3 an exposure device; reference numeral 4 a developing unit; reference numeral 5 a transfer unit; reference numeral 8 a cleaning unit; reference numeral 9 a compression unit; reference numeral 10 an image forming unit; reference numeral 13 a conveyance belt; reference numeral 40 an irradiation unit; reference numeral 85 a blade; and reference numerals 91 and 92 pressing members.

DETAILED DESCRIPTION OF EMBODIMENTS

Figure 1:
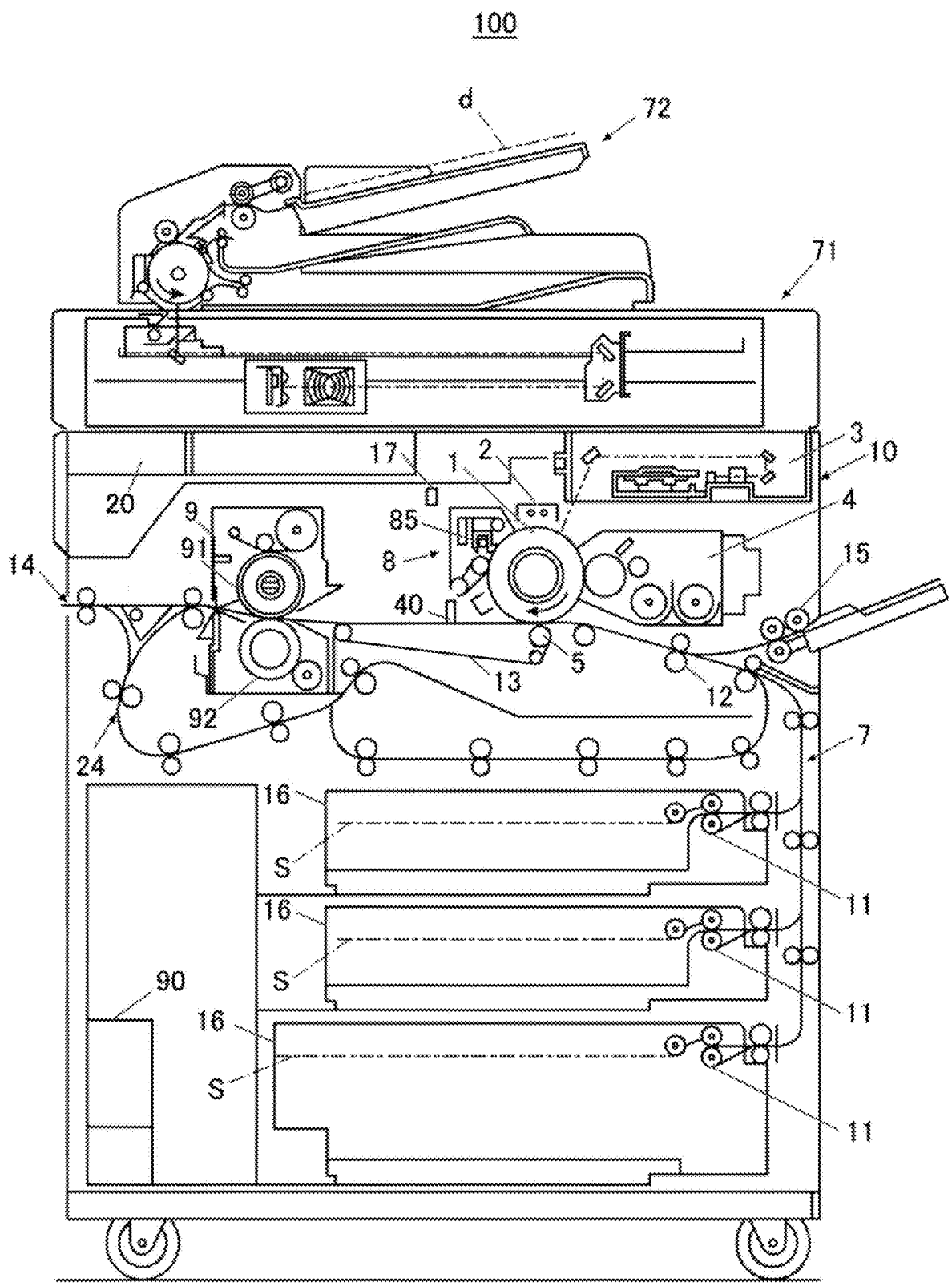
FIG. 1 is a schematic configuration diagram illustrating an image forming apparatus used for the image forming method according to an embodiment of the present invention.

Hereinafter, one or more embodiments of the present invention will be described with reference to the drawings. However, the scope of the invention is not limited to the disclosed embodiments.

In the present specification, unless stated otherwise, the operation and the measurement of physical properties and the like are carried out under the conditions of room temperature (from 20° C. to 25° C.)/relative humidity of from 40% RH to 50% RH.

First Embodiment

A first embodiment of the present invention is a polymer including a structural unit derived from an azomethine derivative having a polymerizable group as represented by the following Chemical Formula (1), the polymer being reversibly fluidized and non-fluidized by being irradiated with light.

[Chemical Formula 14]

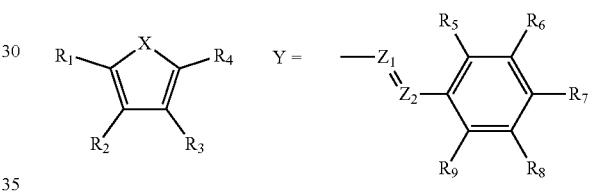

(1)

In the Chemical Formula (1),

X represents $NR_{10}$, O, or S;

$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

either $R_3$ or $R_4$ represents a group represented by Y, while the other one represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_{10}$ represents a group having a polymerizable group, a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$Z_1$ and $Z_2$ each represent N or CH, while $Z_1 \neq Z_2$;

$R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

wherein at least one of $R_1$, $R_2$, $R_5$ to $R_7$, $R_{10}$, and the one that has not been selected as a group represented by Y among $R_3$ and $R_4$, represents a group having a polymerizable group;

in a case in which at least one of $R_1$, $R_2$, $R_{10}$, and the one that has not been selected as a group represented by Y among $R_3$ and $R_4$, represents a group having a polymerizable group, those other than the group having a polymerizable group and the group represented by Y among $R_1$, $R_2$, $R_{10}$, and $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms; and in a case in which at least one of $R_5$ to $R_7$ is a group having a polymerizable group, those other than the group having a polymerizable group among $R_5$ to $R_7$, as well as $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms.

When such a polymer including a structural unit derived from an azomethine derivative represented by the Chemical Formula (1) is used, a photoresponsive compound that is reversibly fluidized and non-fluidized by being irradiated with light and does not undergo coloration to the extent that does not affect the reproduction of a desired color when applied to a toner or an adhesive, can be realized.

That is, according to the first embodiment of the present invention, a polymer that is reversibly fluidized and non-fluidized by being irradiated with light and does not undergo noticeable coloration, is obtained.

The details of why the above-described effects are obtained by the polymer of the present invention are not clearly understood; however, the following mechanism may be considered. Meanwhile, the following mechanism is based on speculation, and the present invention is not limited to the following mechanism. In the following description, a polymer including a structural unit represented by the Chemical Formula (1) is also referred to as "polymer including a structural unit derived from an azomethine derivative".

An azobenzene compound having a long-chained alkyl chain at the terminals is known to be a material that absorbs light and is softened from a solid state (photo-induced phase transition), and it is speculated that this photo-induced phase transition occurs as a result of the crystal structure being destroyed by cis-trans isomerization. In the azobenzene compounds described in Japanese Patent Application Laid-Open No. 2011-256155 (corresponding to US Patent Application Publication No. 2013/066068) or Japanese Patent Application Laid-Open No. 2011-256291, phase change occurs concomitantly with an isomerization reaction caused by light irradiation; however, these compounds exhibit strong absorption originating from n-π* transition in the visible light region and are colored in orange. Therefore, there has been a problem that a desired color cannot be reproduced when the compounds are applied to industrial products.

In the present invention, provision of a polymer that is reversibly fluidized and non-fluidized by being irradiated with light and does not undergo noticeable coloration was realized by using a polymer including a structural unit derived from an azomethine derivative. By introducing a structural unit derived from an azomethine derivative in place of an azobenzene compound, the strong n-π* absorption in an azobenzene compound can be weakened to a large extent, and therefore, a polymer that does not undergo noticeable coloration can be realized.

A polymer including a structural unit derived from an azomethine derivative can induce a reversible fluidization and non-fluidization phenomenon, as the azomethine derivative absorbs light and the heat energy released in the process of light excitation and deactivation is transferred to the repeating units (structural units) to be bonded (photo-thermal conversion). Particularly, when the polymer is a trans-form, in addition to the above-described photo-thermal conversion, trans-cis photoisomerization can occur more easily as a result of light irradiation, and a cis-form having a low Tg is likely to be produced. It is speculated that when a regular structure is destroyed by being photoisomerized and undergoes phase transition, a more efficient fluidization and non-fluidization phenomenon can be induced. Therefore, in order to induce a reversible fluidization and non-fluidization phenomenon, it is thought that many trans-forms (E) need to be isomerized into cis-forms (Z). However, it is generally known that an azomethine derivative has a faster cis-trans isomerization rate compared to an azobenzene derivative, and it has been anticipated that it is disadvantageous to induce a reversible fluidization and non-fluidization phenomenon in an azomethine derivative in which an unsubstituted benzene ring is bonded to both terminals of a C=N bond.

In the present invention, it is speculated that when a heterocyclic ring was introduced into the nitrogen atom side or the carbon atom side of a C=N bond in the azomethine derivative, the amount of cis-forms (Z) increased at the time of light irradiation, and fluidization concomitant with a photoisomerization reaction could be induced. This is thought to be based on the fact that the cis-trans isomerization rate is decreased by introducing not a benzene ring but a heterocyclic ring.

Furthermore, by making the azomethine derivative into a high-molecular weight compound, the toughness of the material can also be enhanced. Therefore, it is considered that excellent image strength can be obtained particularly when the compound is used in a toner.

From the reasons described above, it is thought that the polymer having a structural unit derived from an azomethine derivative of the present invention is colorless and can induce a reversible fluidization and non-fluidization phenomenon concomitantly with isomerization, and a toner that can be fixed by light irradiation and has high color reproducibility can be obtained by introducing the polymer into a toner.

The polymer of the present invention undergoes a change from a non-fluid state to a fluid state when irradiated with light and undergoes a further change to a non-fluid state. The change from a fluid state to a non-fluid state does not necessarily require light irradiation. Meanwhile, fluid state according to the present invention refers to a state in which the system is transformed without any external force or by a small external force.

Hereinafter, preferred embodiments of the present invention will be described. Meanwhile, according to the present specification, the expression "X to Y" representing a range means "X or more and Y or less". Furthermore, according to the present specification, unless particularly stated otherwise, operations and measurement of physical properties and the like are carried out under the conditions of room temperature (20° C. to 25° C.)/relative humidity of 40% to 50% RH.

<Polymer Including Structural Unit Derived from Azomethine Derivative Having Polymerizable Group>

The polymer including a structural unit derived from an azomethine derivative having a polymerizable group of the present invention is a polymer including a structural unit represented by the following Chemical Formula (1), the polymer being reversibly fluidized and non-fluidized by being irradiated with light. With regard to the polymer of the present invention, it is speculated that when a heterocyclic ring was introduced into the benzene ring of the azomethine derivative, the cis-trans isomerization rate was decreased, the amount of cis-forms (Z) increased at the time of light irradiation, and fluidization concomitant with a photoisomerization reaction could be induced. The polymer of the present invention is not particularly limited; however, from the viewpoint of making it easy to reliably introduce an azomethine group into the molecule and efficiently inducing reversible fluidization and non-fluidization, it is preferable that the polymer of the present invention is a polymer obtainable by using an azomethine derivative having a polymerizable group as represented by the following Chemical Formula (1) as a monomer (azomethine derivative monomer) and polymerizing this.

[Chemical Formula 15]

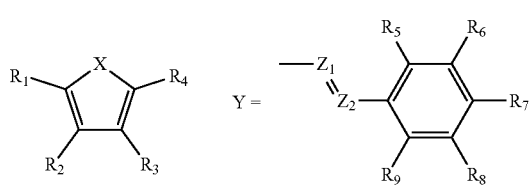

(1)

In the Chemical Formula (1), X represents $NR_{10}$, O, or S.

$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms an alkoxycarbonyl group having 2 to 16 carbon atoms, or an acyloxy group having 2 to 16 carbon atoms.

Either $R_3$ or $R_4$ represents a group represented by Y, while the other one represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

$R_{10}$ represents a group having a polymerizable group, a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

$Z_1$ and $Z_2$ each represent N or CH, while $Z_1 \neq Z_2$.

$R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

$R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

At this time, at least one of $R_1$, $R_2$, $R_5$ to $R_7$, $R_{10}$, and the one that has not been selected as a group represented by Y among $R_3$ and $R_4$ represents a group having a polymerizable group.

In a case in which at least one of $R_1$, $R_2$, $R_{10}$, and the one that has not been selected as a group represented by Y among $R_3$ and $R_4$, represents a group having a polymerizable group, those other than the group having a polymerizable group and the group represented by Y among $R_1$, $R_2$, $R_{10}$, and $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms; and in a case in which at least one of $R_5$ to $R_7$ is a group having a polymerizable group, those other than the group having a polymerizable group among $R_5$ to $R_7$, as well as $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms.

It is speculated that when $R_1$ to $R_{10}$ are selected as described above, the azomethine derivative exhibits intermolecular packing (π-π interaction) at the azomethine group part and exhibits high thermal mobility when subjected to trans-cis isomerization, and therefore, the azomethine derivative can easily induce a fluidization phenomenon while increasing the strength of the material.

Here, the alkyl group having 1 to 16 carbon atoms, the alkoxy group having 1 to 16 carbon atoms, the acyl group having 2 to 16 carbon atoms, the alkoxycarbonyl group having 2 to 16 carbon atoms, or the acyloxy group having 2 to 16 carbon atoms, as a substituent on the benzene ring in the case of having the group having a polymerizable group on the 5-membered heterocyclic ring, or as a substituent on the 5-membered heterocyclic ring in the case of having the group having a polymerizable group on the benzene ring, are preferably an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, respectively. More preferably, the groups are an alkyl group having 1 to 8 carbon atoms, an alkoxy group having 1 to 8 carbon atoms, an acyl group having 2 to 8 carbon atoms, an alkoxycarbonyl group having 2 to 8 carbon atoms, or an acyloxy group having 2 to 8 carbon atoms, respectively. It is speculated that when the configuration is adopted, the azomethine derivative exhibits intermolecular packing (π-π interaction) at the azomethine group part and exhibits high thermal mobility when subjected to trans-cis isomerization, and therefore, the azomethine derivative can easily induce a fluidization phenomenon while increasing the strength of the material.

In a more preferred embodiment of the present invention, from the viewpoint of the ease of achieving photoisomerization, in a case in which at least one of $R_1$, $R_2$, $R_{10}$, and the one that has not been selected as the group represented by Y among $R_3$ and $R_4$ is a group having a polymerizable group, it is preferable that $R_5$ to $R_9$ each independently represent a hydrogen atom, an alkyl group having 1 to 8 carbon atoms, or an alkoxy group having 1 to 8 carbon atoms. Furthermore, from the viewpoint of the ease of achieving photoisomerization, in a case in which at least one of $R_5$ to $R_7$ is a group having a polymerizable group, it is preferable that $R_1$, $R_2$, $R_{10}$, and the one that has not been selected as the group represented by Y among $R_3$ and $R_4$ each independently represent a hydrogen atom, an alkyl group having 1 to 8 carbon atoms, or an alkoxy group having 1 to 8 carbon atoms.

In the present invention, the heteroatom of the X is preferably a sulfur atom (S) or a nitrogen atom (N), from the viewpoint that fixability is improved.

Examples of the halogen atom include a fluorine atom (F), a chlorine atom (Cl), a bromine atom (Br), an iodine atom (I), and the like.

Examples of the alkyl group to be used for $R_1$ to $R_{10}$ are not particularly limited, and examples include linear alkyl groups such as a methyl group, an ethyl group, an n-propyl group, an n-butyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, and an n-hexadecyl group; and branched alkyl groups such as an isopropyl group, a sec-butyl group, an isobutyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group to be used for $R_1$ to $R_{10}$ include linear alkoxy groups such as a methoxy group, an ethoxy group, an n-propoxy group, an n-butoxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, and an n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the acyl group to be used for $R_1$ to $R_{10}$ include saturated or unsaturated, linear or branched acyl groups, and examples include an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyryl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, an undecylenoyl group, and the like.

Examples of the alkoxycarbonyl group to be used for $R_1$ to $R_{10}$ include linear or branched alkoxycarbonyl groups, and examples include linear alkoxycarbonyl groups such as a methoxycarbonyl group, an ethoxycarbonyl group, an n-butoxycarbonyl group, an n-hexyloxycarbonyl group, an n-heptyloxycarbonyl group, an n-octyloxycarbonyl group, an n-nonyloxycarbonyl group, an n-decyloxycarbonyl group, an n-undecyloxycarbonyl group, an n-dodecyloxycarbonyl group, an n-tridecyloxycarbonyl group, an n-tetradecyloxycarbonyl group, and an n-pentadecyloxycarbonyl group; and branched alkoxycarbonyl groups such as a 1-methylpentyloxycarbonyl group, a 4-methyl-2-pentyloxycarbonyl group, a 3,3-dimethylbutyloxycarbonyl group, a 2-ethylbutyloxycathonyl group, a 1-methylhexyloxycarbonyl group, a t-octyloxycarbonyl group, a 1-methylheptyloxycarbonyl group, a 2-ethylhexyloxycarbonyl group, a 2-propylpentyloxycarbonyl group, a 2,2-dimethylheptyloxycarbonyl group, a 2,6-dimethyl-4-heptyloxycalbonyl group, a 3,5,5-trimethylhexyloxycarbonyl group, a 1-methyldecyloxycalbonyl group, and a 1-hexylheptyloxycalbonyl group.

Examples of the acyloxy group to be used for $R_1$ to $R_{10}$ include saturated or unsaturated, linear or branched acyl groups, and examples include an acetoxy group, a propionyloxy group, a butanoyloxy group, an isobutanoyloxy group, a pentanoyloxy group, an isopentanoyloxy group, a sec-pentanoyloxy group, a t-pentanoyloxy group, a hexanoyloxy group, a heptanoyloxy group, an octanoyloxy group, a t-octanoyloxy group, a 2-ethylhexanoyloxy group, a nonanoyloxy group, an isononanoyloxy group, a decanoyloxy group, an isodecanoyloxy group, an undecanoyloxy group, a lauroyloxy group, a myristoyloxy group, a palmitoyloxy group, and the like.

The alkyl group, alkoxy group, acyl group, alkoxycarbonyl group, or acyloxy group described above may be linear or branched; however, from the viewpoint of constituting a structure that can easily undergo photo-induced phase transition, it is more preferable that the groups are linear.

Furthermore, some of the alkyl groups, alkoxy groups, acyl groups, alkoxycarbonyl groups, or acyloxy groups described above may be substituted with a substituent. Examples of the substituent include a halogen atom, a cyano group, a nitro group, a hydroxy group, a carboxy group, and the like.

The number of polymerizable groups included in one molecule of the azomethine derivative having a polymerizable group may be one, or may be two or more. Above all, from the viewpoint that it is easy to obtain a polymer that can easily melt even with a low amount of light irradiation energy, it is preferable that the number of polymerizable groups included in one molecule of the azomethine derivative having a polymerizable group is one, that is, the azomethine derivative is a monofunctional polymerizable monomer.

Examples of the polymerizable group include a (meth) acryloyl group, an epoxy group, and a vinyl group; however, the polymerizable group is preferably a (meth)acryloyl group or a vinyl group. Regarding the method for synthesizing a polymer, anionic polymerization, cationic polymerization, and living radical polymerization are known; however, when the polymerizable group is a (meth)acryloyl group or a vinyl group, it is preferable because the polymerizable group can be easily applied to these polymerization methods. Above all, a (meth)acryloyl group is preferred. Meanwhile, the term (meth)acryloyl group means an acryloyl group and a methacryloyl group.

That is, it is preferable that the azomethine derivative having a polymerizable group has a group represented by any one of the following Formulae (i) to (iv) as the group having a polymerizable group. When the azomethine derivative has these groups having a polymerizable group, it is preferable because the groups are suitable for the synthesis of the polymer. Above all, from the viewpoint of the ease of achieving softening and melting, a group represented by (ii), (iii), or (iv) is preferred, and a group of (iii) is more preferred.

[Chemical Formula 16]

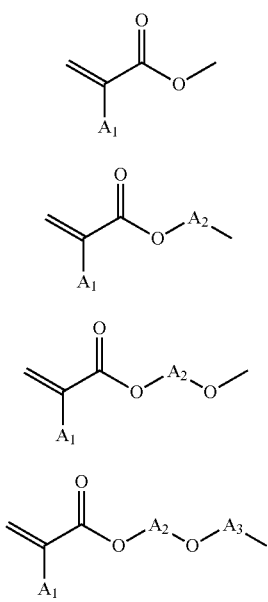

In the Formulae (i) to (iv), each $A_1$ independently represents a hydrogen atom or a methyl group. Each $A_2$ independently represents an alkylene group having 1 to 18 carbon atoms. $A_2$ is preferably an alkylene group having 3 to 12 carbon atoms. The alkylene group may be linear or may be branched, and the alkylene group is preferably linear. Some of the alkylene groups may be substituted with a substituent. Examples of the substituent include a halogen group, a nitro group, a hydroxy group, a carboxy group, and the like. Each A independently represents an alkylene group having 1 to 6 carbon atoms. $A_3$ is preferably an alkylene group having 1 to 4 carbon atoms. The alkylene group may be linear or may be branched, and the alkylene group is preferably linear. Some of the alkylene groups may be substituted with a substituent. Examples of the substituent include those described above.

With regard to the azomethine derivative having a polymerizable group represented by the Chemical Formula (1), at least one of $R_1$, $R_2$, $R_5$ to $R_7$, $R_{10}$, and the one that has not been selected as a group represented by Y among $R_3$ and $R_4$ represents a group having a polymerizable group; however, from the viewpoint of making it easier to cause photoisomerization and thereby making it easier to melt or soften the polymer or a toner image formed from a toner using this polymer even by irradiation with light having lower energy, it is preferable that the azomethine derivative has a group having a polymerizable group at $R_7$, $R_{10}$, or any one of $R_1$ to $R_4$, which is not adjacent to the group represented by Y; and it is more preferable that the azomethine derivative includes the group having a polymerizable group at $R_7$.

The azomethine derivative having a polymerizable group is preferably a compound represented by the following Chemical Formula (2), from the viewpoint of making it easier to cause photoisomerization and thereby making it easier to melt or soften the polymer or a toner image formed from a toner using this polymer even by irradiation with light having lower energy.

[Chemical Formula 17]

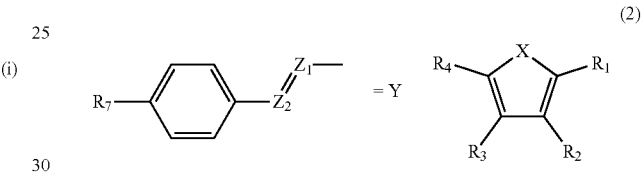

(2)

In the Chemical Formula (2),

X represents $NR_{10}$, O, or S;

$R_1$ and $R_2$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

either $R_3$ or $R_4$ represents a group represented by Y, while the other one represents a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_{10}$ represents a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$Z_1$ and $Z_2$ each represents N or CH, while $Z_1 \neq Z_2$; and $R_7$ represents a group having a polymerizable group.

At this time, the group having a polymerizable group is preferably a group represented by any one of the above-mentioned Formulae (i) to (iv), and more preferably a group represented by the Formula (iii).

Furthermore, with regard to the azomethine derivative having a polymerizable group represented by the Chemical Formula (2), it is preferable to satisfy the condition of:

(1) $R_1$, $R_2$, $R_{10}$, and the one that has not been selected as a group represented by Y among $R_3$ and $R_4$ all represent a hydrogen atom; or (2) among $R_1$, $R_2$, $R_{10}$, and the one that has not been selected as a group represented by Y among $R_3$ and $R_4$, any one of $R_1$ to $R_4$, which is not adjacent to Y, represents a cyano group, a nitro group, a hydroxy group, a carboxy group, an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, the others (among $R_1$, $R_2$, $R_{10}$, and the one that has not been selected as a group represented by Y among $R_3$ and $R_4$, those other than the group selected as the "any one of $R_1$ to $R_4$, which is not adjacent to Y") each independently represent a hydrogen atom, a cyano group, a nitro group, a hydroxy group, a carboxy group, an alkyl group having 1 to 4 carbon atoms, or an alkoxy group having 1 to 4 carbon atoms, while $R_{10}$ represents a hydrogen atom, an alkyl group having 1 to 4 carbon atoms, or an alkoxy group having 1 to 4 carbon atoms; or (3) $R_{10}$ represents an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, while $R_1$, $R_2$, and the one that has not been selected as a group represented by Y among $R_3$ and $R_4$ each independently represent a hydrogen atom, a cyano group, a nitro group, a hydroxy group, a carboxy group, an alkyl group having 1 to 4 carbon atoms, or an alkoxy group having 1 to 4 carbon atoms. By adopting the configuration, it is made easier to cause photoisomerization, and a polymer, or a toner image formed from a toner using this polymer can be melted or softened easily even by irradiation with light having lower energy.

Meanwhile, among the azomethine derivatives represented by the Chemical Formula (2), a preferred embodiment is a compound in which X represents S; $Z_1$ represents CH; $Z_2$ represents N; $R_1$ represents an alkyl group having 1 to 12 carbon atoms or an alkoxy group having 1 to 12 carbon atoms (particularly, a linear alkyl group or alkoxy group); $R_2$ and $R_3$ each represent a hydrogen atom; $R_4$ represents a group represented by Y; and $R_7$ represents a group having a polymerizable group.

Furthermore, among the azomethine derivatives represented by the Chemical Formula (2), another preferred embodiment is a compound in which X represents $NR_{10}$; $Z_1$ represents CH; $Z_2$ represents N; $R_1$, $R_2$, and $R_4$ each represent a hydrogen atom; $R_3$ represents a group represented by Y; $R_7$ represents a group having a polymerizable group; $R_{10}$ represents an alkyl group having 1 to 12 carbon atoms or an alkoxy group having 1 to 12 carbon atoms (particularly, a linear alkyl group or alkoxy group).

Above all, from the viewpoint of making it easier to cause photoisomerization and thereby making it easier to melt or soften the polymer or a toner image formed from a toner using this polymer even by irradiation with light having lower energy, it is preferable that the azomethine derivative having a polymerizable group is a compound represented by the following Chemical Formula (3).

[Chemical Formula 18]

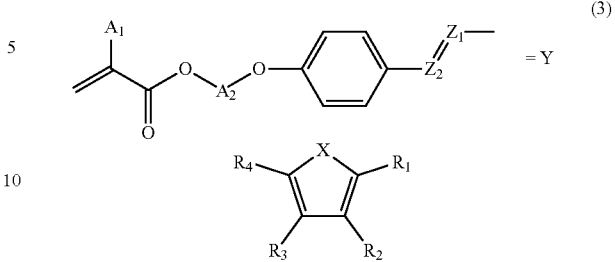

(3)

In the Chemical Formula (3),

X represents $NR_{10}$, O, or S;

either $R_3$ or $R_4$ represents a group represented by Y;

$Z_1$ and $Z_2$ each represent N or CH, while $Z_1 \neq Z_2$;

$A_1$ represents a hydrogen atom or a methyl group;

$A_2$ represents an alkylene group having 1 to 18 carbon atoms;

$R_1$, $R_2$, $R_{10}$, and the one that has not been selected as a group represented by Y among $R_3$ and $R_4$, all represent a hydrogen atom; or among $R_1$, $R_2$, $R_{10}$, and the one that has not been selected as a group represented by Y among $R_3$ and $R_4$, any one of $R_1$ to $R_4$, which is not adjacent to Y, is a cyano group, a nitro group, a hydroxy group, a carboxy group, an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, the others (among $R_1$, $R_2$, $R_{10}$, and the one that has not been selected as a group represented by Y among $R_3$ and $R_4$, those other than the group selected as the "any one of $R_1$ to $R_4$, which is not adjacent to Y") each independently represent a hydrogen atom, a cyano group, a nitro group, a hydroxy group, a carboxy group, an alkyl group having 1 to 4 carbon atoms, or an alkoxy group having 1 to 4 carbon atoms, while $R_{10}$ represents a hydrogen atom, an alkyl group having 1 to 4 carbon atoms, or an alkoxy group having 1 to 4 carbon atoms; or $R_{10}$ represents an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, and $R_1$, $R_2$, and the one that has not been selected as the group represented by Y among $R_3$ and $R_4$ each independently represent a hydrogen atom, a cyano group, a nitro group, a hydroxy group, a carboxy group, an alkyl group having 1 to 4 carbon atoms, or an alkoxy group having 1 to 4 carbon atoms.

Regarding the azomethine derivative having a polymerizable group, derivatives 1 to 102, in which X, Y, $Z_1$, $Z_2$, and $R_1$ to $R_{10}$ as disclosed in the following Table 1 are appropriately selected, and the like may be mentioned.

Meanwhile, in the polymer of the present invention, the structural units derived from an azomethine derivative having a polymerizable group as represented by the Chemical Formula (1) may be used singly, or two or more kinds thereof may be used in combination.

TABLE 1

| | | Group having polymerizable group | | | Azomethine derivative | | | Z | |
|---|---|---|---|---|---|---|---|---|---|
| | Structure | $A_1$ | $A_2$ Carbon number | $A_3$ Carbon number | Polymerizable group position | X | Y | $Z_1$ | $Z_2$ |
| 1 | (iii) | H | 6 | — | $R_7$ | S | $R_4$ | CH | N |
| 2 | (iii) | H | 6 | — | $R_7$ | S | $R_4$ | CH | N |
| 3 | (iii) | H | 6 | — | $R_7$ | S | $R_4$ | CH | N |
| 4 | (iii) | H | 6 | — | $R_1$ | S | $R_4$ | CH | N |
| 5 | (iii) | H | 6 | — | $R_7$ | S | $R_4$ | CH | N |
| 6 | (iii) | H | 6 | — | $R_7$ | S | $R_4$ | CH | N |
| 7 | (iii) | H | 6 | — | $R_7$ | S | $R_4$ | CH | N |
| 8 | (iii) | H | 6 | — | $R_7$ | S | $R_4$ | CH | N |
| 9 | (iii) | H | 6 | — | $R_7$ | S | $R_4$ | CH | N |
| 10 | (iii) | H | 6 | — | $R_7$ | S | $R_4$ | CH | N |
| 11 | (iii) | H | 6 | — | $R_7$ | S | $R_4$ | CH | N |
| 12 | (iii) | H | 6 | — | $R_7$ | S | $R_4$ | CH | N |
| 13 | (iii) | H | 6 | — | $R_7$ | S | $R_4$ | CH | N |
| 14 | (iii) | H | 6 | — | $R_7$ | S | $R_4$ | CH | N |
| 15 | (iii) | H | 6 | — | $R_7$ | S | $R_4$ | CH | N |
| 16 | (iii) | H | 6 | — | $R_7$ | S | $R_4$ | CH | N |
| 17 | (iii) | H | 6 | — | $R_7$ | S | $R_4$ | CH | N |
| 18 | (iii) | H | 6 | — | $R_7$ | S | $R_4$ | CH | N |
| 19 | (iii) | H | 6 | — | $R_7$ | S | $R_4$ | CH | N |
| 20 | (iii) | H | 6 | — | $R_7$ | S | $R_4$ | CH | N |
| 21 | (iii) | H | 6 | — | $R_7$ | S | $R_4$ | CH | N |
| 22 | (iii) | H | 6 | — | $R_7$ | S | $R_4$ | CH | N |
| 23 | (iii) | H | 6 | — | $R_7$ | S | $R_4$ | CH | N |
| 24 | (iii) | H | 6 | — | $R_7$ | S | $R_4$ | CH | N |
| 25 | (iii) | H | 6 | — | $R_7$ | S | $R_4$ | CH | N |
| 26 | (iii) | H | 6 | — | $R_7$ | S | $R_4$ | CH | N |
| 27 | (iii) | H | 6 | — | $R_7$ | S | $R_3$ | CH | N |
| 28 | (iii) | H | 6 | — | $R_7$ | S | $R_3$ | CH | N |
| 29 | (iii) | H | 6 | — | $R_7$ | S | $R_3$ | CH | N |
| 30 | (iii) | H | 6 | — | $R_7$ | S | $R_3$ | CH | N |

| | Azomethine derivative R | | | | | | | | | |
|---|---|---|---|---|---|---|---|---|---|---|
| | $R_1$ | $R_2$ | $R_3$ | $R_4$ | $R_5$ | $R_6$ | $R_7$ | $R_8$ | $R_9$ | $R_{10}$ |
| 1 | $CH_3$ | H | H | — | H | H | — | H | H | — |
| 2 | $C_6H_{13}$ | H | H | — | H | H | — | H | H | — |
| 3 | $C_8H_{17}$ | H | H | — | H | H | — | H | H | — |
| 4 | $C_{12}H_{25}$ | H | H | — | H | H | — | H | H | — |
| 5 | $C(CH_3)_3$ | H | H | — | H | H | — | H | H | — |
| 6 | $OCH_3$ | H | H | — | H | H | — | H | H | — |
| 7 | $OC_6H_{13}$ | H | H | — | H | H | — | H | H | — |
| 8 | $COOCH_3$ | H | H | — | H | H | — | H | H | — |
| 9 | $COOC_6H_{13}$ | H | H | — | H | H | — | H | H | — |
| 10 | $CHOCH_3$ | H | H | — | H | H | — | H | H | — |
| 11 | $CHOC_6H_{13}$ | H | H | — | H | H | — | H | H | — |
| 12 | H | H | H | — | H | H | — | H | H | — |
| 13 | Br | H | H | — | H | H | — | H | H | — |
| 14 | CN | H | H | — | H | H | — | H | H | — |
| 15 | $NO_2$ | H | H | — | H | H | — | H | H | — |
| 16 | $C_6H_{13}$ | $CH_3$ | H | — | H | H | — | H | H | — |
| 17 | $C_6H_{13}$ | $C_3H_7$ | H | — | H | H | — | H | H | — |
| 18 | $C_6H_{13}$ | $C(CH_3)_3$ | H | — | H | H | — | H | H | — |
| 19 | $C_6H_{13}$ | Br | H | — | H | H | — | H | H | — |
| 20 | $C6H_{13}$ | H | $CH_3$ | — | H | H | — | H | H | — |
| 21 | $C_6H_{13}$ | $CH_3$ | $CH_3$ | — | H | H | — | H | H | — |
| 22 | $C_6H_{13}$ | H | H | — | $CH_3$ | H | — | H | H | — |
| 23 | $C_6H_{13}$ | H | H | — | H | $CH_3$ | — | H | H | — |
| 24 | $C_6H_{13}$ | H | H | — | H | $CH_3$ | — | $CH_3$ | H | — |
| 25 | H | $C_6H_{13}$ | H | — | H | H | — | H | H | — |
| 26 | $CH_3$ | $C_6H_{13}$ | H | — | H | H | — | H | H | — |
| 27 | $CH_3$ | H | — | H | H | H | — | H | H | — |
| 28 | $CH_3$ | $CH_3$ | — | H | H | H | — | H | H | — |
| 29 | $C_6H_{13}$ | H | — | H | H | H | — | H | H | — |
| 30 | $C_6H_{13}$ | H | — | $CH_3$ | H | H | — | H | H | — |

TABLE 1-continued

| | Polymerizable group | | | | Azomethine derivative | | | | | | | | | | | | | |
|---|---|---|---|---|---|---|---|---|---|---|---|---|---|---|---|---|---|---|
| | | | | | | | Z | | R | | | | | | | | | |
| | Structure | $A_1$ | $A_2$ Carbon number | $A_3$ Carbon number | Polymerizable group position | X | Y | $Z_1$ | $Z_2$ | $R_1$ | $R_2$ | $R_3$ | $R_4$ | $R_5$ | $R_6$ | $R_7$ | $R_8$ | $R_9$ | $R_{10}$ |
| 31 | (iii) | H | 6 | — | $R_7$ | S | $R_4$ | N | CH | $CH_3$ | H | H | — | H | H | — | H | H | — |
| 32 | (iii) | H | 6 | — | $R_7$ | S | $R_4$ | N | CH | $C_6H_{13}$ | H | H | — | H | H | — | H | H | — |
| 33 | (iii) | H | 3 | — | $R_7$ | S | $R_4$ | N | CH | $CH_3$ | H | H | — | H | H | — | H | H | — |
| 34 | (iii) | H | 3 | — | $R_7$ | S | $R_4$ | N | CH | $C_6H_{13}$ | H | H | — | H | H | — | H | H | — |
| 35 | (iii) | H | 8 | — | $R_7$ | S | $R_4$ | CH | N | $C_6H_{13}$ | H | H | — | H | H | — | H | H | — |
| 36 | (iii) | H | 12 | — | $R_7$ | S | $R_4$ | CH | N | $CH_3$ | H | H | — | H | H | — | H | H | — |
| 37 | (iii) | H | 12 | — | $R_7$ | S | $R_4$ | CH | N | $C_6H_{13}$ | H | H | — | H | H | — | H | H | — |
| 38 | (ii) | H | 6 | — | $R_7$ | S | $R_4$ | CH | N | $CH_3$ | H | H | — | H | H | — | H | H | — |
| 39 | (ii) | H | 6 | — | $R_7$ | S | $R_4$ | CH | N | $C_6H_{13}$ | H | H | — | H | H | — | H | H | — |
| 40 | (ii) | H | 6 | — | $R_7$ | S | $R_3$ | CH | N | $CH_3$ | H | — | H | H | H | — | H | H | — |
| 41 | (iii) | $CH_3$ | 6 | — | $R_7$ | S | $R_4$ | CH | N | $CH_3$ | H | H | — | H | H | — | H | H | — |
| 42 | (iii) | $CH_3$ | 6 | — | $R_7$ | S | $R_4$ | CH | N | $C_6H_{13}$ | H | H | — | H | H | — | H | H | — |
| 43 | (iii) | $CH_3$ | 8 | — | $R_7$ | S | $R_4$ | CH | N | $CH_3$ | H | H | — | H | H | — | H | H | — |
| 44 | (iii) | $CH_3$ | 6 | — | $R_7$ | S | $R_4$ | N | CH | $CH_3$ | H | H | — | H | H | — | H | H | — |
| 45 | (iii) | H | 6 | — | $R_6$ | S | $R_4$ | CH | N | $CH_3$ | H | H | — | H | — | H | H | H | — |
| 46 | (iii) | H | 6 | — | $R_5$ | S | $R_4$ | CH | N | $CH_3$ | H | H | — | — | H | H | — | H | H | — |
| 47 | (iii) | H | 6 | — | $R_1$ | S | $R_4$ | CH | N | — | H | H | — | H | H | $CH_3$ | H | H | — |
| 48 | (iii) | H | 6 | — | $R_1$ | S | $R_4$ | CH | N | — | H | H | — | H | H | $C_6H_{13}$ | H | H | — |
| 49 | (iii) | H | 6 | — | $R_1$ | S | $R_4$ | CH | N | — | H | H | — | H | H | $C_{12}H_{25}$ | H | H | — |
| 50 | (iii) | H | 6 | — | $R_1$ | S | $R_4$ | CH | N | — | H | H | — | H | H | $OC_6H_{13}$ | H | H | — |
| 51 | (iii) | H | 6 | — | $R_1$ | S | $R_4$ | CH | N | — | H | H | — | H | H | H | H | H | — |
| 52 | (iii) | H | 6 | — | $R_1$ | S | $R_4$ | CH | N | — | H | H | — | H | $CH_3$ | $C_6H_{13}$ | H | H | — |
| 53 | (iii) | H | 6 | — | $R_1$ | S | $R_4$ | CH | N | — | $CH_3$ | H | — | H | H | H | H | H | — |
| 54 | (iii) | H | 6 | — | $R_1$ | S | $R_3$ | CH | N | — | H | — | H | H | H | $CH_3$ | H | H | — |
| 55 | (iv) | H | 6 | 1 | $R_1$ | S | $R_4$ | CH | N | — | H | H | — | H | H | $CH_3$ | H | H | — |
| 56 | (iv) | H | 6 | 2 | $R_1$ | S | $R_4$ | CH | N | — | H | H | — | H | H | $CH_3$ | H | H | — |
| 57 | (iii) | H | 6 | — | $R_2$ | S | $R_4$ | CH | N | H | — | H | — | H | H | H | H | H | — |
| 58 | (iii) | H | 6 | — | $R_2$ | S | $R_3$ | CH | N | H | — | — | H | H | H | H | H | H | — |
| 59 | (iii) | H | 6 | — | $R_7$ | O | $R_4$ | CH | N | $CH_3$ | H | H | — | H | H | — | H | H | — |
| 60 | (iii) | H | 6 | — | $R_7$ | O | $R_4$ | CH | N | $C_6H_{13}$ | H | H | — | H | H | — | H | H | — |

| | Group having polymerizable group | | | | | Azomethine derivative | | | |
|---|---|---|---|---|---|---|---|---|---|
| Polymer | Structure | $A_1$ | $A_2$ Carbon number | $A_3$ Carbon number | Polymerizable group position | X | Y | $Z_1$ | $Z_2$ |
| 61 | (iii) | H | 6 | — | $R_7$ | O | $R_4$ | CH | N |
| 62 | (iii) | H | 6 | — | $R_7$ | O | $R_3$ | CH | N |
| 63 | (iii) | H | 6 | — | $R_7$ | O | $R_4$ | N | CH |
| 64 | (iii) | H | 6 | — | $R_1$ | O | $R_4$ | CH | N |
| 65 | (iii) | H | 6 | — | $R_7$ | $NR_{10}$ | $R_3$ | CH | N |
| 66 | (iii) | H | 6 | — | $R_7$ | $NR_{10}$ | $R_3$ | CH | N |
| 67 | (iii) | H | 6 | — | $R_7$ | $NR_{10}$ | $R_3$ | CH | N |
| 68 | (iii) | H | 6 | — | $R_7$ | $NR_{10}$ | $R_3$ | CH | N |
| 69 | (iii) | H | 6 | — | $R_7$ | $NR_{10}$ | $R_3$ | CH | N |
| 70 | (iii) | H | 6 | — | $R_7$ | $NR_{10}$ | $R_3$ | CH | N |
| 71 | (iii) | H | 6 | — | $R_7$ | $NR_{10}$ | $R_3$ | CH | N |
| 72 | (iii) | H | 6 | — | $R_7$ | $NR_{10}$ | $R_3$ | CH | N |
| 73 | (iii) | H | 6 | — | $R_7$ | $NR_{10}$ | $R_3$ | CH | N |
| 74 | (iii) | H | 6 | — | $R_7$ | $NR_{10}$ | $R_3$ | CH | N |
| 75 | (iii) | H | 6 | — | $R_7$ | $NR_{10}$ | $R_3$ | CH | N |
| 76 | (iii) | H | 6 | — | $R_7$ | $NR_{10}$ | $R_3$ | CH | N |
| 77 | (iii) | H | 6 | — | $R_7$ | $NR_{10}$ | $R_3$ | CH | N |
| 78 | (iii) | H | 6 | — | $R_7$ | $NR_{10}$ | $R_3$ | CH | N |
| 79 | (iii) | H | 6 | — | $R_7$ | $NR_{10}$ | $R_3$ | CH | N |
| 80 | (iii) | H | 6 | — | $R_7$ | $NR_{10}$ | $R_4$ | CH | N |
| 81 | (iii) | H | 6 | — | $R_7$ | $NR_{10}$ | $R_4$ | CH | N |
| 82 | (iii) | H | 6 | — | $R_7$ | $NR_{10}$ | $R_4$ | CH | N |
| 83 | (iii) | H | 6 | — | $R_7$ | $NR_{10}$ | $R_4$ | CH | N |
| 84 | (iii) | H | 6 | — | $R_7$ | $NR_{10}$ | $R_4$ | CH | N |
| 85 | (iii) | H | 6 | — | $R_1$ | $NR_{10}$ | $R_3$ | CH | N |
| 86 | (iii) | H | 6 | — | $R_2$ | $NR_{10}$ | $R_4$ | CH | N |
| 87 | (iii) | H | 6 | — | $R_1$ | $NR_{10}$ | $R_3$ | CH | N |
| 88 | (iii) | H | 6 | — | $R_1$ | $NR_{10}$ | $R_3$ | CH | N |
| 89 | (iii) | H | 6 | — | $R_1$ | $NR_{10}$ | $R_3$ | CH | N |
| 90 | (iii) | H | 6 | — | $R_{10}$ | $NR_{10}$ | $R_3$ | CH | N |
| 91 | (iii) | H | 6 | — | $R_{10}$ | $NR_{10}$ | $R_3$ | CH | N |
| 92 | (iii) | H | 6 | — | $R_{10}$ | $NR_{10}$ | $R_3$ | CH | N |
| 93 | (iii) | H | 6 | — | $R_{10}$ | $NR_{10}$ | $R_3$ | CH | N |
| 94 | (iii) | H | 6 | — | $R_{10}$ | $NR_{10}$ | $R_3$ | CH | N |
| 95 | (iii) | H | 6 | — | $R_{10}$ | $NR_{10}$ | $R_3$ | CH | N |
| 96 | (iii) | H | 6 | — | $R_{10}$ | $NR_{10}$ | $R_3$ | CH | N |

TABLE 1-continued

| | | | | | | | | | | |
|---|---|---|---|---|---|---|---|---|---|---|
| 97 | (iii) | H | 6 | — | $R_{10}$ | $NR_{10}$ | $R_4$ | CH | N | |
| 98 | (iii) | $CH_3$ | 6 | — | $R_7$ | $NR_{10}$ | $R_4$ | CH | N | |
| 99 | (iii) | $CH_3$ | 6 | — | $R_7$ | $NR_{10}$ | $R_4$ | CH | N | |
| 100 | (iii) | $CH_3$ | 8 | — | $R_7$ | $NR_{10}$ | $R_4$ | CH | N | |
| 101 | (iii) | $CH_3$ | 6 | — | $R_7$ | $NR_{10}$ | $R_4$ | CH | N | |
| 102 | (iii) | $CH_3$ | 6 | — | $R_7$ | $NR_{10}$ | $R_4$ | N | CH | |

| | | | | | Azomethine derivative | | | | | |
|---|---|---|---|---|---|---|---|---|---|---|
| Polymer | $R_1$ | $R_2$ | $R_3$ | $R_4$ | $R_5$ | $R_6$ | $R_7$ | $R_8$ | $R_9$ | $R_{10}$ |
| 61 | H | H | H | — | H | H | — | H | H | — |
| 62 | $CH_3$ | H | — | H | H | H | — | H | H | — |
| 63 | $CH_3$ | H | H | — | H | H | — | H | H | — |
| 64 | — | H | H | — | H | H | $CH_3$ | H | H | — |
| 65 | H | H | — | H | H | H | — | H | H | H |
| 66 | H | H | — | H | H | H | — | H | H | $CH_3$ |
| 67 | H | H | — | H | H | H | — | H | H | $C_6H_{13}$ |
| 68 | H | H | — | H | H | H | — | H | H | $C_8H_{17}$ |
| 69 | H | H | — | H | H | H | — | H | H | $C(CH_3)_3$ |
| 70 | $CH_3$ | H | — | H | H | H | — | H | H | $CH_3$ |
| 71 | $CH_3$ | $CH_3$ | — | H | H | H | — | H | H | $CH_3$ |
| 72 | H | H | — | H | H | H | — | H | H | $OCOCH_3$ |
| 73 | $CH_3$ | H | — | H | H | H | — | H | H | H |
| 74 | $C_6H_{13}$ | H | — | H | H | H | — | H | H | H |
| 75 | $C_8H_{17}$ | H | — | H | H | H | — | H | H | H |
| 76 | $CH_3$ | H | — | H | H | H | — | H | H | $CH_3$ |
| 77 | $C_6H_{13}$ | H | — | H | H | H | — | H | H | $CH_3$ |
| 78 | $C_8H_{17}$ | H | — | H | H | H | — | H | H | $CH_3$ |
| 79 | $CH_3$ | $CH_3$ | — | H | H | H | — | H | H | $CH_3$ |
| 80 | $CH_3$ | H | H | — | H | H | — | H | H | H |
| 81 | $C_6H_{13}$ | H | H | — | H | H | — | H | H | H |
| 82 | H | $CH_3$ | H | — | H | H | — | H | H | H |
| 83 | H | H | H | — | H | H | — | H | H | $CH_3$ |
| 84 | H | H | H | — | H | H | — | H | H | H |
| 85 | — | H | — | H | H | H | $CH_3$ | H | H | $CH_3$ |
| 86 | H | — | H | — | H | H | $CH_3$ | H | H | $CH_3$ |
| 87 | — | H | — | H | H | H | $C_6H_{13}$ | H | H | $CH_3$ |
| 88 | — | H | — | H | H | H | $C_{12}H_{25}$ | H | H | $CH_3$ |
| 89 | — | H | — | H | H | $CH_3$ | $C_6H_{13}$ | H | H | $CH_3$ |
| 90 | H | H | — | H | H | H | $CH_3$ | H | H | — |
| 91 | H | H | — | H | H | H | $C_6H_{13}$ | H | H | — |
| 92 | H | H | — | H | H | H | $C_{12}H_{25}$ | H | H | — |
| 93 | H | H | — | H | H | $CH_3$ | $CH_3$ | H | H | — |
| 94 | H | H | — | H | H | $CH_3$ | $C_6H_{13}$ | H | H | — |
| 95 | H | H | — | H | H | H | $OC_6H_{13}$ | H | H | — |
| 96 | H | H | — | H | H | H | H | H | H | — |
| 97 | H | H | H | — | H | H | $CH_3$ | H | H | — |
| 98 | $CH_3$ | H | H | — | H | H | — | H | H | H |
| 99 | $C_6H_{13}$ | H | H | — | H | H | — | H | H | H |
| 100 | $CH_3$ | H | H | — | H | H | — | H | H | H |
| 101 | $CH_3$ | H | H | — | H | H | — | H | H | H |
| 102 | $CH_3$ | H | H | — | H | H | — | H | H | H |

<Method for Preparing Azomethine Derivative Having Polymerizable Group>

The method for preparing an azomethine derivative having a polymerizable group is not particularly limited. For example, the azomethine derivative can be prepared by first preparing a desired azomethine derivative and introducing a polymerizable group into the azomethine derivative thus obtained.

For example, in the case of preparing an azomethine derivative containing a thiophene ring, as a first step, an aniline derivative is reacted with a thiophene carboxyaldehyde derivative as a compound having a thiophene ring. At this time, in a case in which either the aniline derivative or the thiophene carboxyaldehyde derivative as a raw material has an OH group as a substituent, a polymerizable group can be easily introduced into the position of the OH group.

For example, in the case of an azomethine derivative in which X of the Chemical Formula (1) represents S; $R_1$ represents a methyl group; $R_2$ and $R_3$ each represent H; $R_4$ represents a group represented by Y; $Z_1$ represents CH; $Z_2$ represents N; $R_7$ represents a group having a polymerizable group; and $R_5$, $R_6$, $R_8$, and $R_9$ each represent H, an intermediate A can be obtained by the following reaction scheme.

Specifically, when 4-hydroxyaniline and 5-methylthiophene-2-carboxyaldehyde are treated (reaction is carried out by heating to reflux in a solvent such as ethanol (EtOH) or methanol (MeOH), the reaction liquid is filtered, a powder thus obtained is washed with cold ethanol, and recrystallization from methanol/ethanol is carried out), the target substance can be obtained.

[Chemical Formula 19]

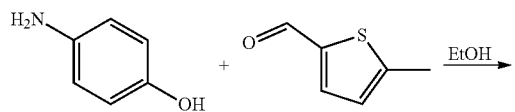

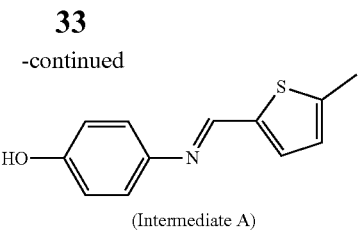

(Intermediate A)

Subsequently, as a second stage, a polymerizable group is introduced into the intermediate A. The method of introducing a polymerizable group is also not particularly limited. For example, in the case of introducing a linker portion —$C_6H_{12}$— into the intermediate A, for example, Cl—$C_6H_{12}$—OH is caused to act as a halogenated alcohol compound, and the following intermediate B is obtained.

The reaction conditions are not particularly limited; however, for example, it is preferable that the reaction is carried out in a solvent such as dimethylformamide (DMF), in the presence of potassium carbonate and potassium iodide, preferably at a temperature in the range of from 0° C. to 100° C., more preferably in the range of from 0° C. to 60° C., and even more preferably in the range of from 0° C. to 40° C.

[Chemical Formula 20]

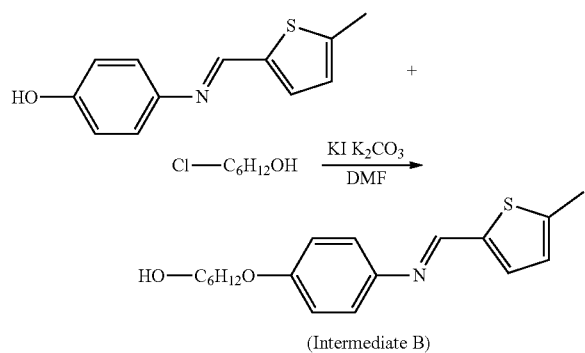

(Intermediate B)

Subsequently, as a third stage, the intermediate B is reacted with a compound for constituting a polymerizable group, for example, an acrylic acid salt or a methacrylic acid salt. The reaction conditions are not particularly limited. For example, it is preferable that the reaction is carried out in a known organic solvent in the presence of a tertiary amine such as triethylamine or triethanolamine. Preferably, while a mixed liquid including the intermediate B, a tertiary amine, and a solvent is maintained at 0° C. to 10° C., a compound for constituting a polymerizable group, such as an acrylic acid salt or a methacrylic acid salt, is added dropwise to this mixed liquid, and the mixture is mixed. Subsequently, the mixed liquid is reacted, for example, for about 5 to 10 hours at room temperature, and thereby an azomethine derivative having a polymerizable group can be obtained.

[Chemical Formula 21]

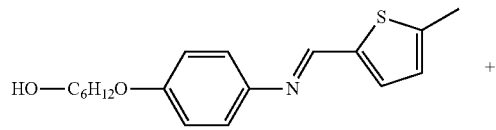

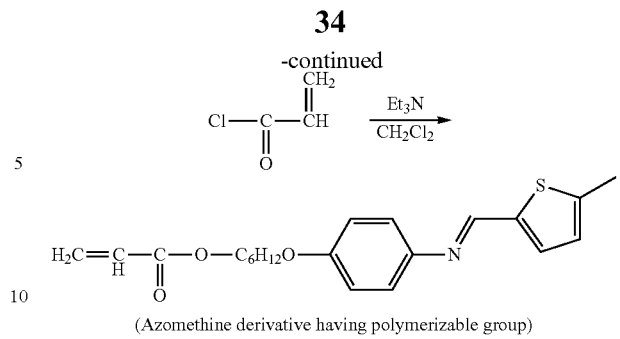

(Azomethine derivative having polymerizable group)

Meanwhile, an azomethine derivative having a desired substituent can be obtained by changing the raw materials to be used to other compounds in the first stage. For example, by reacting a benzaldehyde derivative with an aminothiophene derivative, an azomethine derivative in which $Z_1$ of the Chemical Formula (1) represents N; and $Z_2$ represents CH, can be obtained. Furthermore, by using a compound having a furan ring or a pyrrole ring instead of a compound having a thiophene ring as a raw material, an azomethine derivative in which the heteroatom of X is O or N can be obtained. Furthermore, by changing the compounds to be added in the second stage and the third stage, groups having a polymerizable group, which have different structures, can be introduced. An ordinarily skilled person in the art can synthesize a desired azomethine derivative having a polymerizable group by appropriately performing the changes and selecting appropriate reaction conditions.

Furthermore, a polymerizable group can also be introduced into the intermediate A without carrying out the second stage, by appropriately selecting the raw materials to be used in the first stage described above.

<Structural Unit Other than Structural Unit Derived from Azomethine Derivative>

The polymer of the present invention may also include a structural unit (other structural unit) other than the structural unit derived from an azomethine derivative having a polymerizable group as represented by the Chemical Formula (1).

The other structural unit is not particularly limited as long as the structural unit does not contain an azomethine group; however, the other structural unit is preferably a structural unit that constitutes a thermoplastic resin which is softened by heating.

Regarding the other structural unit, from the viewpoint that synthesis of a copolymer is easy, a structural unit having a vinyl-based polymerizable group is preferred. Specifically, for example, a styrene derivative, a (meth)acrylic acid derivative, an olefin derivative, a vinyl ester derivative, a vinyl ether derivative, a vinyl ketone derivative, and the like are used, and a structural unit derived from a styrene derivative, a (meth)acrylic acid derivative, or an olefin derivative is preferred.

Examples of the styrene derivative include styrene, o-methylstyrene, m-methylstyrene, p-methylstyrene, methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, and the like.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

Examples of the olefin derivative include ethylene, propylene, n-butylene, isobutylene, n-pentene, and the like. The olefin derivative may be linear or branched, and the number of carbon chains is also not particularly limited.

Examples of the vinyl ester derivative include vinyl propionate, vinyl acetate, vinyl benzoate, and the like. Examples of the vinyl ether derivative include vinyl methyl ether, vinyl ethyl ether, and the like. Examples of the vinyl ketone derivative include vinyl methyl ketone, vinyl ethyl ketone, vinyl hexyl ketone, and the like.

The content of the other structural unit in the polymer is not particularly limited and can be appropriately selected; however, the content is preferably 70% by mass or less, and more preferably 40% by mass or less, with respect to a total amount of 100% by mass of all the structural units constituting the polymer.

The number average molecular weight (total number average molecular weight) Mn of the polymer of the present invention is not particularly limited; however, the number average molecular weight is preferably 3,500 or more, more preferably 3,500 to 100,000, even more preferably 3,500 to 70,000, still more preferably 3,500 to 50,000, and particularly preferably 5,000 to 50,000. When the number average molecular weight of the polymer is 3,500 or more, it is preferable because toughness is excellent, and when the polymer is used as a toner, a toner image having excellent fixability can be obtained more easily. Furthermore, when the number average molecular weight is 100,000 or less, it is preferable because the efficiency for isomerization as well as softening and melting becomes high.

The number average molecular weight of the polymer of the present invention can be measured by gel permeation chromatography (GPC). Specifically, measurement can be made by the method described in the Examples that will be described below.

<Method for Preparing Polymer>

The method for synthesizing the polymer of the present invention is not particularly limited, and a method of polymerizing the azomethine derivative having a polymerizable group as a monomer using a known polymerization initiator, such as anionic polymerization, cationic polymerization, or living radical polymerization, can be used. If necessary, a known chain transfer agent may also be used.

Regarding the polymerization initiator, for example, an azo-based or diazo-based polymerization initiator or a peroxide-based polymerization initiator as disclosed below is used.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, tris(t-butylperoxy)triazine, and the like.

Examples of the chain transfer agent include benzyl dithiobenzoate, 1-phenylethyl dithiobenzoate, a 2-phenylprop-2-yl dithiobenzoate, a 1-acetoxyethyl dithiobenzoate, hexakis(thiobenzoylthiomethyl)benzene, 1,4-bis(thiobenzoylthiomethyl)benzene, 1,2,4,5-tetrakis(thiobenzoylthiomethyl)benzene, 1,4-bis-(2-(thiobenzoylthio)prop-2-yl)benzene, 1-(4-methoxyphenyl)ethyl dithiobenzoate, benzyl dithioacetate; ethoxycarbonylmethyl dithioacetate, 2-(ethoxycarbonyl)prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl)prop-2-yl dithiobenzoate, 3- and 4-vinylbenzyl dithiobenzoate, S-benzyl diethoxyphosphinyl dithioformate, t-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate, and the like.

The polymerization temperature may vary depending on the type of the monomers or polymerization initiators to be used; however, the polymerization temperature is preferably 50° C. to 100° C., and more preferably 55° C. to 90° C. Furthermore, the polymerization time may vary depending on the type of the monomer or the polymerization initiator to be used; however, for example, the polymerization time is preferably 2 to 60 hours.

A wavelength of the light to be irradiated when a polymer including a structural unit derived from the above-mentioned azomethine derivative is fluidized by light irradiation is preferably in the range of from 280 nm to 480 nm, more preferably in the range of from 300 nm to 420 nm, and even more preferably in the range of from 330 nm to 420 nm. When the wavelength is in the above-mentioned range, crystals are susceptible to being destroyed (photo-meltability is satisfactory), and fixability is improved. Furthermore, by irradiating with irradiation light having the above-described wavelength, the polymer can be fluidized even without applying heat or pressure. However, when the polymer is fluidized, fluidization may be accelerated by applying heat or pressure in addition to light irradiation. By applying heat or pressure, the polymer can be fluidized with a smaller amount of light irradiation. Therefore, by introducing the polymer including a structural unit derived from the azomethine derivative into a toner, fixation at the above-mentioned wavelength is enabled, and a toner having high color reproducibility can be obtained.

Meanwhile, a portion of visible light is included in the wavelength range described above. Therefore, it is desirable that the polymer including a structural unit derived from the azomethine derivative is not fluidized only by receiving solar light (natural light) or light produced by illuminations such as fluorescent lamps, but is fluidized by employing low cost conditions in which the amount of irradiation and the irradiation time are suppressed as much as possible. From such a viewpoint, regarding the irradiation conditions for the light to be irradiated when the polymer including a structural unit derived from the azomethine derivative is fluidized, the amount of irradiation is preferably in the range of from 0.1 $J/cm^2$ to 200 $J/cm^2$, more preferably in the range of from 0.1 $J/cm^2$ to 100 $J/cm^2$, and even more preferably in the range of from 0.1 $J/cm^2$ to 50 $J/cm^2$.

On the other hand, as to the conditions for non-fluidizing (re-solidifying) the polymer including a structural unit derived from the azomethine derivative, it is preferable that the polymer is left to stand at room temperature (in the range of 25° C.±15° C.) (in a natural environment). At this time, it is desirable to leave the polymer in the dark; however, the polymer may receive visible light such as natural light or fluorescent light. Furthermore, it is more preferable when heat is applied in the course of non-fluidizing the polymer. Furthermore, it is also acceptable to apply light.

In a case in which the polymer including a structural unit derived from the azomethine derivative is non-fluidized by heating, the heating temperature is preferably in the range of from 0° C. to 200° C., and more preferably in the range of from 20° C. to 150° C.

Second Embodiment

A second embodiment of the present invention is a high-molecular weight compound represented by the following General Formula (1), the high-molecular weight compound being reversibly fluidized and non-fluidized by being irradiated with light.

[Chemical Formula 22]

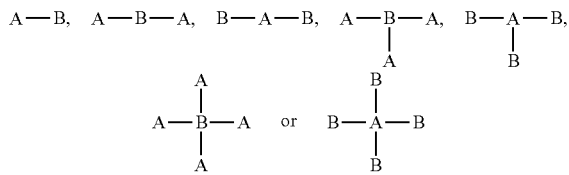

(1)

In the General Formula (1), A represents a polymer block including a structural unit derived from an azomethine derivative having a polymerizable group represented by Chemical Formula (2); and B represents a polymer block that does not include a structure derived from the azomethine derivative represented by the Chemical Formula (2).

[Chemical Formula 23]

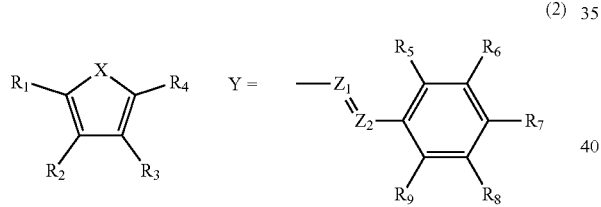

(2)

In the Chemical Formula (2),

X represents $NR_{10}$, O, or S;

$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

either $R_3$ or $R_4$ represents a group represented by Y, while the other one represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_{10}$ represents a group having a polymerizable group, a hydrogen atom, a halogen atom, a hydroxy group, an alkyl group having 1 to 16 carbon atoms, an alkoxy group having 1 to 16 carbon atom, an acyl group having 2 to 16 carbon atoms, an alkoxycarbonyl group having 2 to 16 carbon atoms, or an acyloxy group having 2 to 16 carbon atoms;

$Z_1$ and $Z_2$ each represent N or CH, while $Z_1 \neq Z_2$;

$R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atom, an alkoxycarbonyl group having 2 to 16 carbon atoms, or an acyloxy group having 2 to 16 carbon atoms;

wherein at least one of $R_1$, $R_2$, $R_5$ to $R_7$, $R_{10}$, and the one that has not been selected as the group represented by Y among $R_3$ and $R_4$ represents a group having a polymerizable group;

in a case in which at least one of $R_1$, $R_2$, $R_{10}$, and the one that has not been selected as the group represented by Y among $R_3$ and $R_4$, represents a group having a polymerizable group, those other than the group having a polymerizable group and the group represented by Y among $R_1$, $R_2$, $R_{10}$, and $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms; and in a case in which at least one of $R_5$ to $R_7$ is a group having a polymerizable group, those other than the group having a polymerizable group among $R_5$ to $R_7$, as well as $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms.

Such a high-molecular weight compound including a block copolymer including a structural unit derived from an azomethine derivative can realize a photoresponsive high-molecular weight compound that has high toughness, is reversibly fluidized and non-fluidized by being irradiated with light, and does not undergo coloration to the extent that does not affect the reproduction of a desired color when the high-molecular weight compound is applied to a toner or an adhesive. Furthermore, when the high-molecular weight compound is applied to a toner, the rate of softening caused by light irradiation is enhanced, and the fixability of images is excellent.

That is, according to the second embodiment of the present invention, a high-molecular weight compound that has high toughness, is reversibly fluidized and non-fluidized by being irradiated with light, and does not undergo noticeable coloration, can be obtained.

The details of why the above-described effects are obtained by the high-molecular weight compound of the present invention are not clearly understood; however, the following mechanism may be considered. Meanwhile, the following mechanism is based on speculation, and the present invention is not limited to the following mechanism. In the following description, a high-molecular weight compound represented by the Chemical Formula (1) is also referred to as "high-molecular weight compound including a structural unit derived from an azomethine derivative" or "high-molecular weight compound of the present invention".

An azobenzene compound having a long-chained alkyl chain at the terminals is known to be a material that absorbs light and is softened from a solid state (photo-induced phase transition), and it is speculated that this photo-induced phase transition occurs as a result of the crystal structure being destroyed by cis-trans isomerization. In the azobenzene compounds described in Japanese Patent Application Laid-Open No. 2011-256155 (corresponding to US Patent Application Publication No. 2013/066068) or Japanese Patent Application Laid-Open No. 2011-256291, phase change occurs concomitantly with an isomerization reaction caused by light irradiation; however, these compounds exhibit strong absorption originating from n-π* transition in the visible light region and are colored in orange. Therefore, there has been a problem that a desired color cannot be reproduced when the compounds are applied to industrial products.

In the present invention, provision of a high-molecular weight compound that is reversibly fluidized and non-fluidized by being irradiated with light and does not undergo noticeable coloration was realized by using a structural unit derived from an azomethine derivative. By introducing a structural unit derived from an azomethine derivative in place of an azobenzene compound, the strong n-π* absorption in an azobenzene compound can be weakened to a large extent, and therefore, a polymer that does not undergo noticeable coloration can be realized.

A high-molecular weight compound including a structural unit derived from an azomethine derivative can induce a reversible fluidization and non-fluidization phenomenon, as the azomethine derivative absorbs light and the heat energy released in the process of light excitation and deactivation is transferred to the repeating units (structural units) to be bonded (photo-thermal conversion). Particularly, when the azomethine derivative is a trans-form, in addition to the above-described photo-thermal conversion, trans-cis photoisomerization can occur more easily as a result of light irradiation, and a cis-form having a low Tg is likely to be produced. It is speculated that when a regular structure is destroyed by being photoisomerized and undergoes phase transition, a more efficient fluidization and non-fluidization phenomenon can be induced. Therefore, in order to induce a reversible fluidization and non-fluidization phenomenon, it is thought that many trans-forms (E) need to be isomerized into cis-forms (Z). However, it is generally known that an azomethine derivative has a faster cis-trans isomerization rate compared to an azobenzene derivative, and it has been anticipated that it is disadvantageous to induce a reversible fluidization and non-fluidization phenomenon in an azomethine derivative in which an unsubstituted benzene ring is bonded to both terminals of a C=N bond.

In the present invention, it is speculated that when a heterocyclic ring was introduced into the nitrogen atom side or the carbon atom side of a C=N bond in the azomethine derivative, the amount of cis-forms (Z) increased at the time of light irradiation, and fluidization concomitant with a photoisomerization reaction could be induced. This is thought to be based on the fact that the cis-trans isomerization rate is decreased by introducing not a benzene ring but a heterocyclic ring.

Furthermore, by making the azomethine derivative into a high-molecular weight compound, the toughness of the material can also be enhanced. Therefore, it is considered that excellent image strength can be obtained particularly when the compound is used in a toner.

In the present invention, an azomethine derivative component and a component that does not include the azomethine derivative are made into a high-molecular weight compound so as to have a block copolymer structure. By making a high-molecular weight compound, the azomethine derivative absorbs light, the heat energy released in the process of light excitation and deactivation is transferred to the repeating units (structural units) to be bonded (photo-thermal conversion) and softens the repeating units, and thus a high-molecular weight compound thus obtainable is melted or softened. Furthermore, it is speculated that by forming a block copolymer, the azomethine derivative can easily form a domain in the high-molecular weight compound and efficiently induces softening and melting.

From the reasons described above, it is thought that the high-molecular weight compound having a structural unit derived from an azomethine derivative of the present invention has high toughness, is colorless, and can induce a reversible fluidization and non-fluidization phenomenon concomitantly with isomerization. Therefore, by introducing the high-molecular weight compound into a toner, a toner that can be fixed by light irradiation, has high color reproducibility, and gives excellent image strength can be obtained.

The high-molecular weight compound of the present invention undergoes a change from a non-fluid state to a fluid state when irradiated with light and undergoes a further change to a non-fluid state. The change from a fluid state to a non-fluid state does not necessarily require light irradiation. Meanwhile, fluid state according to the present invention refers to a state in which the system is transformed without any external force or by a small external force.

Hereinafter, preferred embodiments of the present invention will be described. Meanwhile, according to the present specification, the expression "X to Y" representing represents a range means "X or more and Y or less". Furthermore, according to the present specification, unless particularly stated otherwise, operations and measurement of physical properties and the like are carried out under the conditions of room temperature (20° C. to 25° C.)/relative humidity of 40% to 50% RH.

[Configuration of High-Molecular Weight Compound]

The high-molecular weight compound of the present invention is a high-molecular weight compound (block copolymer) including a polymer block (A) including a structural unit derived from an azomethine derivative having a polymerizable group and a polymer block B that does not include the structure derived from an azomethine derivative, and has any one of the following two-block to five-block copolymer structures.

[Chemical Formula 24]

$$A-B-A \atop {\textstyle |} \atop A \quad (3A\text{-}B)$$

$$B-A-B \atop {\textstyle |} \atop B \quad (A\text{-}3B)$$

$$\begin{array}{c} A \\ | \\ A-B-A \\ | \\ A \end{array} \quad (4A\text{-}B)$$

$$\begin{array}{c} B \\ | \\ B-A-B \\ | \\ B \end{array} \quad (A\text{-}4B)$$

Among the block copolymer structures described above, from the viewpoint of the ease of softening and melting and the image strength at the time of being used as a toner, a block copolymer structure of A-B-A (also represented as 2A-B) or B-A-B (also represented as 2B-A) is preferred, and a block copolymer structure of A-B-A is more preferred.

<Polymer Block (A) Including Structural Unit Derived from Azomethine Derivative Having Polymerizable Group>

A polymer block (A) including a structural unit derived from an azomethine derivative having a polymerizable group includes a structural unit derived from an azomethine derivative having a polymerizable group represented by the following Chemical Formula (2).

It is thought that as in the case of the following Chemical Formula (2), when a predetermined heterocyclic ring is introduced into the benzene ring of the azomethine derivative, the cis-trans isomerization rate is decreased, the amount of a cis-form (Z) increases at the time of light irradiation, and fluidization concomitant with a photoisomerization reaction can be induced.

The polymer block (A) is not particularly limited; however, from the viewpoint of making it easy to reliably introduce an azomethine group into the molecule and efficiently inducing reversible fluidization and non-fluidization, it is preferable that the polymer block (A) is a polymer block obtainable by using an azomethine derivative having a polymerizable group as represented by the following Chemical Formula (2) as a monomer (azomethine derivative monomer) and polymerizing this azomethine derivative.

[Chemical Formula 25]

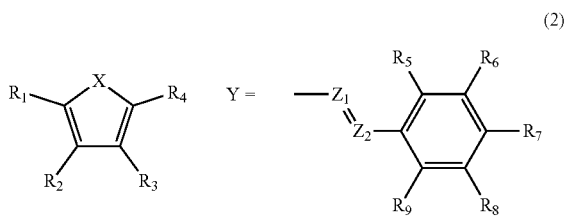

(2)

In the Chemical Formula (2), X represents $NR_{10}$, O, or S.

$R_1$ and $R_2$ each independently represent a group having a polymerizable group, a hydrogen atom, a halogen atom, a cyano group, a nitro group, a hydroxy group, a carboxy group, an alkyl group having 1 to 16 carbon atom, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

Either $R_3$ or $R_4$ represents a group represented by Y, and the other one represents a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

$R_{10}$ represents a group having a polymerizable group, a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

$Z_1$ and $Z_2$ each represent N or CH, while $Z_1 \neq Z_2$.

$R_5$ to $R_7$ each independently represent a group having a polymerizable group, a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

$R_8$ and $R_9$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms.

At this time, at least one of $R_1$, $R_2$, $R_5$ to $R_7$, $R_{10}$, and the one that has not been selected as the group represented by Y among $R_3$ and $R_4$ represents a group having a polymerizable group.

In a case in which at least one of $R_1$, $R_2$, $R_{10}$, and the one that has not been selected as the group represented by Y among $R_3$ and $R_4$, represents a group having a polymerizable group, those other than the group having a polymerizable group and the group represented by Y among $R_1$, $R_2$, $R_{10}$, and $R_3$ or $R_4$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms, provided that $R_{10}$ is selected from a hydrogen atom, a halogen atom, a hydroxy group, a carboxy group, an alkyl group having 1 to 4 carbon atoms, or an alkoxy group having 1 to 4 carbon atoms, and in a case in which at least one of $R_5$ to $R_7$ is a group having a polymerizable group, those other than the group having a polymerizable group among $R_5$ to $R_7$, as well as $R_8$ and $R_9$ are each independently selected from a hydrogen atom, a halogen atom, a cyano group, a nitro group, a hydroxy group, a carboxy group, an alkyl group having 1 to 4 carbon atoms, or an alkoxy group having 1 to 4 carbon atoms.

It is speculated that when $R_1$ to $R_{10}$ are selected as described above, the azomethine derivative exhibits intermolecular packing (π-π interaction) at the azomethine group part and exhibits high thermal mobility when subjected to trans-cis isomerization, and therefore, the azomethine derivative can easily induce a fluidization phenomenon while increasing the strength as a material.

Here, the alkyl group having 1 to 16 carbon atoms, the alkoxy group having 1 to 16 carbon atoms, the acyl group having 2 to 16 carbon atoms, the alkoxycarbonyl group having 2 to 16 carbon atoms, or the acyloxy group having 2 to 16 carbon atoms, as a substituent on the benzene ring in the case of having the group having a polymerizable group on the 5-membered heterocyclic ring, or as a substituent on the 5-membered heterocyclic ring in the case of having the group having a polymerizable group on the benzene ring, are preferably an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, respectively. More preferably, the groups are an alkyl group having 1 to 8 carbon atoms, an alkoxy group having 1 to 8 carbon atoms, an acyl group having 2 to 8 carbon atoms, an alkoxycarbonyl group having 2 to 8 carbon atoms, or an acyloxy group having 2 to 8 carbon atoms, respectively. It is speculated that when this configuration is adopted, the azomethine derivative exhibits intermolecular packing (π-π interaction) at the azomethine group part and exhibits high thermal mobility when subjected to trans-cis isomerization, and therefore, the azomethine derivative can easily induce a fluidization phenomenon while increasing the strength as a material.

According to a more preferred embodiment of the present invention, from the viewpoint of the ease of achieving photoisomerization, in a case in which at least one of $R_1$, $R_2$, $R_{10}$, and the one that has not been selected as the group represented by Y among $R_3$ and $R_4$ represents a group having a polymerizable group, it is preferable that $R_5$ to $R_9$ each independently represent a hydrogen atom, an alkyl group having 1 to 8 carbon atoms, or an alkoxy group having 1 to 8 carbon atoms. Furthermore, from the viewpoint of the ease of achieving photoisomerization, in a case in which at least one of $R_5$ to $R_7$ is a group having a polymerizable group, it is preferable that $R_1$, $R_2$, $R_{10}$, and the one that has not been selected as the group represented by Y among $R_3$ and $R_4$ each independently represent a hydrogen atom, an alkyl group having 1 to 8 carbon atoms, or an alkoxy group having 1 to 8 carbon atoms.

In the present invention, it is preferable that the heteroatom of the X is a sulfur atom (S) or a nitrogen atom (N), from the viewpoint that fixability is improved in the case of being used as a toner.

Examples of the halogen atom include a fluorine atom (F), a chlorine atom (Cl), a bromine atom (Br), an iodine atom (I), and the like.

Examples of the alkyl group to be used for $R_1$ to $R_{10}$ are not particularly limited, and examples include linear alkyl groups such as a methyl group, an ethyl group, an n-propyl group, an n-butyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, and an n-hexadecyl group; and branched alkyl groups such as an isopropyl group, a sec-butyl group, an isobutyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group to be used for $R_1$ to $R_{10}$ include linear alkoxy groups such as a methoxy group, an ethoxy group, an n-propoxy group, an n-butoxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, and an n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the acyl group to be used for $R_1$ to $R_{10}$ include saturated or unsaturated, linear or branched acyl groups, and examples include an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyryl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, an undecylenoyl group, and the like.

Examples of the alkoxycarbonyl group to be used for $R_1$ to $R_{10}$ include linear or branched alkoxycarbonyl groups, and examples include a methoxycathonyl group, an ethoxycarbonyl group, an n-butoxycarbonyl group, an n-hexyloxycathonyl group, an n-heptyloxycarbonyl group, an n-octyloxycarbonyl group, an n-nonyloxycarbonyl group, an n-decyloxycarbonyl group, an n-undecyloxycarbonyl group, an n-dodecyloxycarbonyl group, an n-tridecyloxycathonyl group, an n-tetradecyloxycarbonyl group, and an n-pentadecyloxycarbonyl group; and branched alkoxycarbonyl groups such as a 1-methylpentyloxycarbonyl group, a 4-methyl-2-pentyloxycarbonyl group, a 3,3-dimethylbutyloxycarbonyl group, a 2-ethylbutyloxycarbonyl group, a 1-methylhexyloxycathonyl group, a t-octyloxycarbonyl group, a 1-methylheptyloxycarbonyl group, a 2-ethylhexyloxycarbonyl group, a 2-propylpentyloxycarbonyl group, a 2,2-dimethylheptyloxycarbonyl group, a 2,6-dimethyl-4-heptyloxycarbonyl group, a 3,5,5-trimethylhexyloxycarbonyl group, a 1-methyldecyloxycarbonyl group, a 1-hexylheptyloxycarbonyl group, and the like.

Examples of the acyloxy group to be used for $R_1$ to $R_{10}$ include saturated or unsaturated, linear or branched acyl groups, and examples include an acetoxy group, a propionyloxy group, a butanoyloxy group, an isobutanoyloxy group, a pentanoyloxy group, an isopentanoyloxy group, a sec-pentanoyloxy group, a t-pentanoyloxy group, a hexanoyloxy group, a heptanoyloxy group, an octanoyloxy group, a t-octanoyloxy group, a 2-ethylhexanoyloxy group, a nonanoyloxy group, an isononanoyloxy group, a decanoyloxy group, an isodecanoyloxy group, an undecanoyloxy group, a lauroyloxy group, a myristoyloxy group, a palmitoyloxy group, and the like.

The alkyl group, alkoxy group, acyl group, alkoxycarbonyl group, or acyloxy group described above may be linear or branched; however, from the viewpoint of constituting a structure that can easily undergo photo-induced phase transition, it is more preferable that the groups are linear.

Furthermore, some of the alkyl groups, alkoxy groups, acyl groups, alkoxycarbonyl groups, or acyloxy groups described above may be substituted with a substituent. Examples of the substituent include a halogen atom, a cyano group, a nitro group, a hydroxy group, a carboxy group, and the like.

The number of polymerizable groups included in one molecule of the azomethine derivative having a polymerizable group may be one, or may be two or more. Above all, from the viewpoint that it is easy to obtain a high-molecular weight compound that can easily melt even with a low amount of light irradiation energy, it is preferable that the number of polymerizable groups included in one molecule of the azomethine derivative having a polymerizable group is one, that is, the azomethine derivative is a monofunctional polymerizable monomer.

Examples of the polymerizable group include a (meth)acryloyl group, an epoxy group, and a vinyl group; however, the polymerizable group is preferably a (meth)acryloyl group or a vinyl group. Regarding the method for synthesizing a block copolymer, anionic polymerization, cationic polymerization, and living radical polymerization are known. Above all, a convenient synthesis method may be a living radical polymerization method such as an ATRP method, an ARGET-ATRP method, or an RAFT method. When the polymerizable group is a (meth)acryloyl group or a vinyl group, it is preferable because a living radical polymerization method such as an ATRP method, an ARGET-ATRP method, or an RAFT method can be used. Above all, a (meth)acryloyl group is preferred. Meanwhile, the term (meth)acryloyl group means an acryloyl group and a methacryloyl group.

That is, it is preferable that the azomethine derivative having a polymerizable group has a group represented by any one of the following Formulae (i) to (iv) as the group having a polymerizable group. When the azomethine derivative has such a group having a polymerizable group, it is preferable because it is suitable for the synthesis of a block copolymer according to a living radical polymerization method. Above all, from the viewpoint of the ease of achieving softening and melting, it is preferable to have a group represented by (ii), (iii), or (iv); and it is more preferable to have a group of (iii).

[Chemical Formula 26]

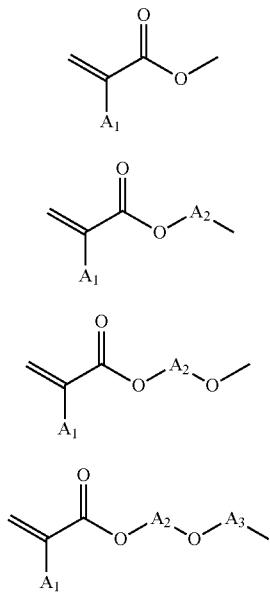

In the Formulae (i) to (iv), each $A_1$ independently represents a hydrogen atom or a methyl group. Each $A_2$ independently represents an alkylene group having 1 to 18 carbon atoms. It is preferable that each $A_2$ independently represents an alkylene group having 3 to 12 carbon atoms. The above-mentioned alkylene group may be linear or may be branched, and the alkylene group is preferably linear. Some of the alkylene groups may be substituted with a substituent. Examples of the substituent include a halogen group, a nitro group, a hydroxy group, a carboxy group, and the like. Each $A_3$ independently represents an alkylene group having 1 to 6 carbon atoms. It is preferable that each $A_3$ represents an alkylene group having 1 to 4 carbon atoms. The above-mentioned alkylene group may be linear or may be branched, and it is preferable that the alkylene group is linear. Some of the alkylene groups may be substituted with a substituent. Examples of the substituent include substituents similar to those described above.

With regard to the azomethine derivative having a polymerizable group as represented by the Chemical Formula (2), at least one of $R_1$, $R_2$, $R_5$ to $R_7$, $R_{10}$, and the one that has not been selected as the group represented by Y among $R_3$ and $R_4$ represents a group having a polymerizable group; however, from the viewpoint of making it easier to cause photoisomerization and thereby making it easier to melt or soften the high-molecular weight compound or a toner image formed from a toner using this high-molecular weight compound even by irradiation with light having lower energy, it is preferable that the azomethine derivative has a group having a polymerizable group at $R_7$, $R_{10}$, or any one of $R_1$ to $R_4$, which is not adjacent to the group represented by Y, and it is more preferable that the azomethine derivative includes a group having a polymerizable group at $R_7$. At this time, it is even more preferable that $R_5$, $R_6$, $R_8$, and $R_9$ are all hydrogen atoms.

It is preferable that the azomethine derivative having a polymerizable group is a compound represented by the following Chemical Formula (3), from the viewpoint of making it easier to cause photoisomerization and thereby making it easier to melt or soften the high-molecular weight compound or a toner image formed from a toner using this high-molecular weight compound even by irradiation with light having lower energy.

[Chemical Formula 27]

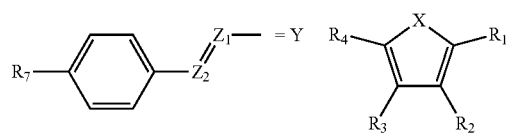

(3)

In Chemical Formula (3),
X represents $NR_{10}$, O, or S;
$R_1$ and $R_2$ each independently represent a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;
either $R_3$ or $R_4$ represents a group represented by Y, while the other one represents a hydrogen atom, a halogen atom, a cyano group, a nitro group, a hydroxy group, a carboxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atom, or an acyloxy group having 2 to 16 carbon atoms;

$R_{10}$ represents a hydrogen atom, a halogen atom, a hydroxy group, an alkyl group having 1 to 16 carbon atoms, an alkoxy group having 1 to 16 carbon atoms, an acyl group having 2 to 16 carbon atoms, an alkoxycarbonyl group having 2 to 16 carbon atoms, or an acyloxy group having 2 to 16 carbon atoms;

$Z_1$ and $Z_2$ each represent N or CH, while $Z_1 \neq Z_2$; and $R_7$ represents a group having a polymerizable group.

At this time, the group having a polymerizable group is preferably a group represented by any one of the above-described Formulae (i) to (iv), and more preferably a group represented by the Formula (iii).

Furthermore, with regard to an azomethine derivative having a polymerizable group as represented by the Chemical Formula (3), it is preferable to satisfy the condition of:

(1) $R_1$, $R_2$, $R_{10}$, and the one that has not been selected as the group represented by Y among $R_3$ and $R_4$ all represent a hydrogen atom; or (2) among $R_1$, $R_2$, $R_{10}$, and the one that has not been selected as the group represented by Y among $R_3$ and $R_4$, any one of $R_1$ to $R_4$, which is not adjacent to Y, represents a cyano group, a nitro group, a hydroxy group, a carboxy group, an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, the others (among $R_1$, $R_2$, $R_{10}$, and the one that has not been selected as the group represented by Y among $R_3$ and $R_4$, those other than the group selected as the "any one of $R_1$ to $R_4$, which is not adjacent to Y") each independently represent a hydrogen atom, a cyano group, a nitro group, a hydroxy group, a carboxy group, an alkyl group having 1 to 4 carbon atoms, or an alkoxy group having 1 to 4 carbon atoms, while $R_{10}$ represents a hydrogen atom, an alkyl group having 1 to 4 carbon atoms, or an alkoxy group having 1 to 4 carbon atoms; or (3) $R_{10}$ represents an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, while $R_1$, $R_2$, and the one that has not been selected as the group represented by Y among $R_3$ and $R_4$ each independently represent a hydrogen atom, a cyano group, a nitro group, a hydroxy group, a carboxy group, an alkyl group having 1 to 4 carbon atoms, or an alkoxy group having 1 to 4 carbon atoms. By adopting the configuration, it is made easier to cause photoisomerization, and a high-molecular weight compound, or a toner image formed from a toner using this high-molecular weight compound can be melted or softened easily even by irradiation with light having lower energy.

Meanwhile, among the azomethine derivatives represented by the Chemical Formula (3), a preferred embodiment is a compound in which X represents S; $Z_1$ represents CH; $Z_2$ represents N; $R_1$ represents an alkyl group having 1 to 12 carbon atoms or an alkoxy group having 1 to 12 carbon atoms (particularly, a linear alkyl group or alkoxy group); $R_2$ and $R_3$ each represent a hydrogen atom; $R_4$ represents a group represented by Y; and $R_7$ represents a group having a polymerizable group.

Furthermore, among the azomethine derivatives represented by the Chemical Formula (3), another preferred embodiment is a compound in which X represents $NR_{10}$; $Z_1$ represents CH; $Z_2$ represents N; $R_1$, $R_2$, and $R_4$ each represent a hydrogen atom; $R_3$ represents a group represented by Y; $R_7$ represents a group having a polymerizable group; $R_{10}$ represents an alkyl group having 1 to 12 carbon atoms or an alkoxy group having 1 to 12 carbon atoms (particularly, a linear alkyl group or alkoxy group).

Above all, from the viewpoint of making it easier to cause photoisomerization and thereby making it easier to melt or soften the high-molecular weight compound or a toner image formed from a toner using this high-molecular weight compound even by irradiation with light having lower energy, it is preferable that the azomethine derivative having a polymerizable group is a compound represented by the following Chemical Formula (4).

[Chemical Formula 28]

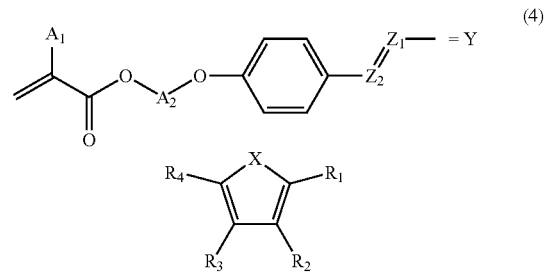

In Chemical Formula (4),

X represents $NR_{10}$, O, or S;

either $R_3$ or $R_4$ represents a group represented by Y;

$Z_1$ and $Z_2$ each represent N or CH, while $Z_1 \neq Z_2$;

$A_1$ represents a hydrogen atom or a methyl group;

$A_2$ represents an alkylene group having 1 to 18 carbon atoms; and $R_1$, $R_2$, $R_{10}$, and the one that has not been selected as the group represented by Y among $R_3$ and $R_4$, all represent a hydrogen atom; or among $R_1$, $R_2$, $R_{10}$, and the one that has not been selected as the group represented by Y among $R_3$ and $R_4$, any one of $R_1$ to $R_4$, which is not adjacent to Y, represents a cyano group, a nitro group, a hydroxy group, a carboxy group, an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, the others (among $R_1$, $R_2$, $R_{10}$, and the one that has not been selected as the group represented by Y among $R_3$ and $R_4$, those other than the group selected as "any one of $R_1$ to $R_4$, which is not adjacent to Y") each independently represent a hydrogen atom, a cyano group, a nitro group, a hydroxy group, a carboxy group, an alkyl group having 1 to 4 carbon atoms, or an alkoxy group having 1 to 4 carbon atoms, while $R_{10}$ represents a hydrogen atom, an alkyl group having 1 to 4 carbon atoms, or an alkoxy group having 1 to 4 carbon atoms; or $R_{10}$ represents an alkyl group having 1 to 12 carbon atoms, an alkoxy group having 1 to 12 carbon atoms, an acyl group having 2 to 12 carbon atoms, an alkoxycarbonyl group having 2 to 12 carbon atoms, or an acyloxy group having 2 to 12 carbon atoms, while $R_1$, $R_2$, and the one that has not been selected as the group represented by Y among $R_3$ and $R_4$ each independently represent a hydrogen atom, a cyano group, a nitro group, a hydroxy group, a carboxy group, an alkyl group having 1 to 4 carbon atoms, or an alkoxy group having 1 to 4 carbon atoms.

Meanwhile, in the high-molecular weight compound of the present invention, the structural unit derived from an azomethine derivative having a polymerizable group as represented by the Chemical Formula (2) may be used singly, or two or more kinds thereof may be used in combination.

<Method for Preparing Azomethine Derivative Having Polymerizable Group>

The method for preparing an azomethine derivative having a polymerizable group is not particularly limited. For example, the azomethine derivative can be prepared by first preparing a desired azomethine derivative and introducing a polymerizable group into the azomethine derivative thus obtained.

For example, in the case of preparing an azomethine derivative having a thiophene ring, as a first stage, an aniline derivative is reacted with a thiophene carboxyaldehyde derivative as a compound having a thiophene ring. At this time, in a case in which either the aniline derivative or the thiophene carboxyaldehyde derivative as a raw material has an OH group as a substituent, a polymerizable group can be easily introduced into the position of the OH group.

For example, in the case of an azomethine derivative in which X of the Chemical Formula (2) represents S; $R_1$ represents a methyl group; $R_2$ and $R_3$ each represent H; $R_4$ represents a group represented by Y; $Z_1$ represents CH; $Z_2$ represents N; $R_7$ represent a group having a polymerizable group; and $R_5$, $R_6$, $R_8$, and $R_9$ each represent H, an intermediate A can be obtained by the following reaction scheme.

Specifically, when 4-hydroxyaniline and 5-methylthiophene-2-carboxyaldehyde are treated (a reaction is carried out by heating to reflux in a solvent such as ethanol (EtOH) or methanol (MeOH), the reaction liquid is filtered, a powder thus obtained is washed with cold ethanol, and recrystallization from methanol/ethanol is carried out), a target substance can be obtained.

[Chemical Formula 29]

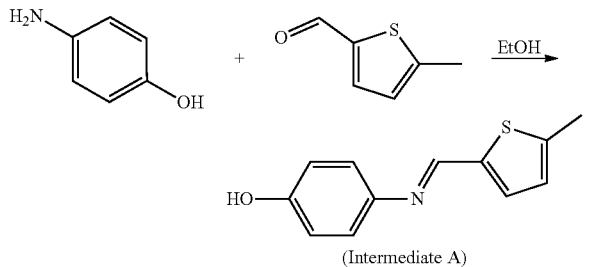

(Intermediate A)

Subsequently, as a second stage, a polymerizable group is introduced into the intermediate A. The method for introducing a polymerizable group is also not particularly limited. For example, in the case of introducing a linker portion —$C_6H_{12}$— into the intermediate A, for example, Cl—$C_6H_{12}$—OH is caused to act as a halogenated alcohol compound, and the following intermediate B is obtained.

The reaction conditions are not particularly limited; however, for example, it is preferable that the reaction is carried out in a solvent such as dimethylformamide (DMF), in the presence of potassium carbonate and potassium iodide, preferably at a temperature in the range of from 0° C. to 100° C., more preferably in the range of from 0° C. to 60° C., and even more preferably in the range of from 0° C. to 40° C.

[Chemical Formula 30]

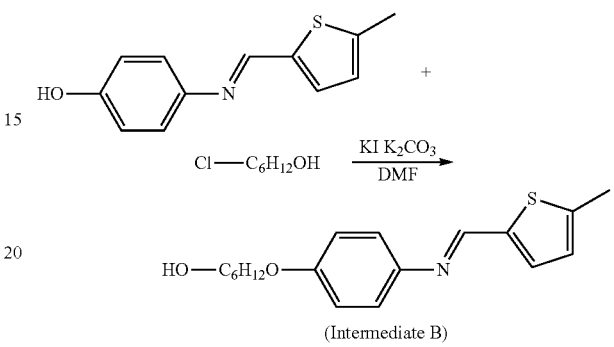

(Intermediate B)

Subsequently, as a third stage, the intermediate B is reacted with a compound for constituting a polymerizable group, for example, an acrylic acid salt or a methacrylic acid salt. The reaction conditions are not particularly limited. For example, it is preferable to carry out the reaction in a known organic solvent in the presence of a tertiary amine such as triethylamine or triethanolamine. Preferably, while a mixed liquid including the intermediate B, a tertiary amine, and a solvent is maintained at 0° C. to 10° C., a compound for constituting a polymerizable group, such as an acrylic acid salt or a methacrylic acid salt, is added dropwise to this mixed liquid, and the mixture is mixed. Subsequently, the mixed liquid is reacted, for example, for about 5 to 10 hours at room temperature, and thereby an azomethine derivative having a polymerizable group can be obtained.

[Chemical Formula 31]

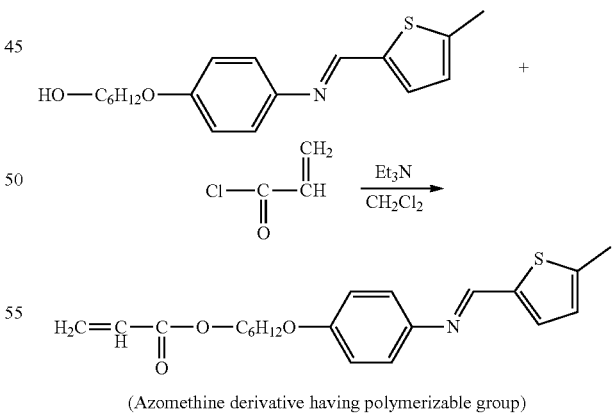

(Azomethine derivative having polymerizable group)

Meanwhile, an azomethine derivative having a desired substituent can be obtained by changing the raw materials to be used to other compounds in the first stage. For example, by reacting a benzaldehyde derivative with an aminothiophene derivative, an azomethine derivative in which $Z_1$ of Chemical Formula (2) represents N; and $Z_2$ represents CH, can be obtained. Furthermore, by using a compound having a furan ring or a pyrrole ring instead of a compound having a thiophene ring as a raw material, an azomethine derivative in which the heteroatom of X is O or N can be obtained. Furthermore, by changing the compounds to be added in the second stage and the third stage, groups having a polymerizable group, which have different structures, can be introduced. An ordinarily skilled person in the art can synthesize a desired azomethine derivative having a polymerizable group by appropriately performing the changes and selecting appropriate reaction conditions.

Furthermore, a polymerizable group can also be introduced into the intermediate A without carrying out the second stage, by appropriately selecting the raw materials to be used in the first stage.

<Polymer Block B that does not Include Structure Derived from Azomethine Derivative>

The polymer block B is not particularly limited as long as it does not include a structure derived from the azomethine derivative represented by the Chemical Formula (2) in the structural unit constituting the polymer block B. Particularly, it is preferable that the polymer block B does not include an azomethine group and a structure derived from an azomethine derivative.

It is preferable that the structural unit constituting the polymer block B is a structural unit constituting a thermoplastic resin that is softened by heating. It is speculated that when a component of a thermoplastic resin is included in the same high-molecular weight compound with a component including an azomethine derivative, softening and melting occurring as a result of light irradiation of the component including an azomethine derivative is effectively propagated, and a significant softening and melting phenomenon can be induced in the high-molecular weight compound as a whole. Moreover, it is speculated that when a thermoplastic resin component is incorporated, toughness is further enhanced, and excellent image strength can be obtained when used as a toner.

Regarding the structural unit constituting the polymer block B, from the viewpoint of being applied to the synthesis of a block copolymer according to a living radical polymerization method such as an ATRP method, an ARGET-ATRP method, or an RAFT method, the structural unit is preferably a structural unit having a vinyl-based polymerizable group. Specifically, for example, a styrene derivative, a (meth)acrylic acid derivative, an olefin derivative, a vinyl ester derivative, a vinyl ether derivative, a vinyl ketone derivative, and the like are used, and it is preferable that the structural unit is a styrene derivative, a (meth)acrylic acid derivative, or an olefin derivative. That is, the polymer block B is preferably a polymer block including at least one of structural units derived from a styrene derivative, a (meth)acrylic acid derivative, and an olefin derivative.

Examples of the styrene derivative include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, and the like.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

Examples of the olefin derivative include ethylene, propylene, n-butylene, isobutylene, n-pentene, and the like. The olefin derivative may be linear or branched, and the number of carbon chains is also not particularly limited.

Examples of the vinyl ester derivative include vinyl propionate, vinyl acetate, vinyl benzoate, and the like. Examples of the vinyl ether derivative include vinyl methyl ether, vinyl ethyl ether, and the like. Examples of the vinyl ketone derivative include vinyl methyl ketone, vinyl ethyl ketone, vinyl hexyl ketone, and the like.

The number average molecular weight (number average molecular weight of the sum) of the polymer blocks A included in the high-molecular weight compound represented by the General Formula (1) according to the present invention is not particularly limited; however, the number average molecular weight is preferably 1,000 or more, more preferably 1,000 to 100,000, even more preferably 1,000 to 70,000, still more preferably 1,000 to 50,000, and particularly preferably 3,000 to 50,000. When the number average molecular weight of the sum of the polymer blocks A is 1,000 or more, it is preferable because a toner image having excellent fixability can be more easily obtained when the high-molecular weight compound is used as a toner. Furthermore, when the number average molecular weight of the sum of the polymer blocks A is 100,000 or less, it is preferable because the efficiency of softening and melting is increased. Here, regarding the number average molecular weight of the sum of the polymer blocks A, in a case in which the high-molecular weight compound represented by the General Formula (1) includes a single polymer block A, the number average molecular weight refers to the number average molecular weight of this polymer block A; and in a case in which the high-molecular weight compound includes a plurality of polymer blocks A, the number average molecular weight means the sum total of the number average molecular weights of the various polymer blocks A.

The number average molecular weight (number average molecular weight of the sum) of the polymer blocks B included in the high-molecular weight compound represented by the General Formula (1) is not particularly limited; however, the number average molecular weight is preferably 1,000 or more, more preferably 1,000 to 100,000, even more preferably 1,000 to 70,000, still more preferably 1,000 to 50,000, and particularly preferably 3,000 to 50,000. When the number average molecular weight of the sum of the polymer blocks B is 1,000 or more, it is preferable because a toner image having excellent fixability can be more easily obtained when used as a toner. Furthermore, when the number average molecular weight of the sum of the polymer blocks B is 100,000 or less, it is preferable because the efficiency of softening and melting is increased. Here, regarding the number average molecular weight of the sum of the polymer blocks B, in a case in which the high-molecular weight compound represented by the General Formula (1) includes a single polymer block B, the number average molecular weight refers to the number average molecular weight of this polymer block B, and in a case in which the high-molecular weight compound includes a plurality of polymer blocks B, the number average molecular weight means the sum total of the number average molecular weights of the various polymer blocks B.

Furthermore, the total number average molecular weight Mn of the high-molecular weight compound represented by the General Formula (1) is preferably 3,500 or more, more preferably 3,500 to 100,000, even more preferably 3,500 to 70,000, still more preferably 3,500 to 50,000, and particularly preferably 5,000 to 50,000. When the total number average molecular weight Mn of the high-molecular weight compound represented by the General Formula (1) is 3,500 or more, it is preferable because a toner image having excellent fixability can be more easily obtained when used as a toner. Furthermore, when the total number average molecular weight is 100,000 or less, it is preferable because the efficiency of softening and melting is increased.

Therefore, according to a preferred embodiment of the present invention, the number average molecular weight of the sum of the polymer blocks A included in the high-molecular weight compound represented by the General Formula (1) is 1,000 or more, the number average molecular weight of the sum of the polymer blocks B is 1,000 or more, and the total number average molecular weight Mn of the high-molecular weight compound represented by the General Formula (1) is 3,500 or more.

With regard to the high-molecular weight compound represented by the General Formula (1) of the present invention, the ratio of the number average molecular weight of the sum of the polymer blocks A and the number average molecular weight of the sum of the polymer blocks B is not particularly limited; however, from the viewpoints of the ease of achieving softening and melting and the image strength, the ratio of the number average molecular weight of the sum of the polymer blocks A:the number average molecular weight of the sum of the polymer blocks B is preferably 1:20 to 20:1, and more preferably 1:15 to 15:1.

The number average molecular weight of the high-molecular weight compound represented by the General Formula (1) of the present invention, and the number average molecular weights of the polymer blocks A and B included in the high-molecular weight compound represented by the General Formula (1) can be measured by gel permeation chromatography (GPC). Specifically, the number average molecular weights can be measured by the method described in the Examples that will be described below.

<Method for Preparing Block Copolymer>

The method for synthesizing the high-molecular weight compound (block copolymer) represented by General Formula (1) is not particularly limited, and any known method such as anionic polymerization, cationic polymerization, or living radical polymerization can be used. Above all, as a convenient synthesis method, living radical polymerization methods such as an atom transfer radical polymerization method (ATRP method), an ARGET-ATRP method, and an RAFT method can be suitably used.

To mention the ATRP method as an example, synthesis can be carried out by a method of employing a monofunctional, bifunctional, trifunctional, or tetrafunctional compound containing a halogen element as an initiator and as a starting material, and polymerizing a monomer that becomes the structural unit of the polymer block A or B in the presence of a catalyst.

In the stage of polymerizing a monomer, for example, a monomer that becomes a structural unit of either the polymer block A or B (block that becomes as a core portion of the block copolymer) is polymerized in the presence of an initiator, a catalyst, and a ligand, and a macroinitiator is produced.

Examples of the initiator include butyl 2-bromoisobutyrate, ethyl 2-bromoisobutyrate, ethylene bis(2-bromoisobutyrate), 1,1,1-tris(2-bromoisobutyryloxymethyl)ethane, pentaerythritol tetrakis(2-bromoisobutyrate), α,α'-dibromo-p-xylene, ethyl bromoacetate, 2-bromoisobutyryl bromide, mixtures thereof, and the like; however, the initiator is not limited to these.

Regarding the catalyst, there are copper(I) catalysts, iron (II) catalysts, and the like, and examples include Cu(I)Cl, Cu(I)Br, Fe(II)Cl, Fe(II)Br, mixtures thereof, and the like.

Regarding the ligand, any known ligand can be used; however, one or more kinds selected from the group consisting of 2,2'-bipyridyl, 4,4'-dimethyl-2,2'-bipyridyl, 4,4'-di-t-butyl-2,2'-bipyridyl, 1,1,4,7,10,10-hexamethyltriethylenetetramine, N,N,N',N'',N''-pentamethyldiethylenertriamine, cyclam(1,4,8,11-tetraazacyclotetradecane), 1,4,8,11-tetramethylcyclam(1,4,8,11-tetramethyl-1,4,8,11-tetraazacyclotetradecane), tris [2-(dimethylamino)ethyl]amine, and the like are preferred.

The amounts of use of the catalyst and the ligand are not particularly limited and can be appropriately determined by referring to conventionally known information.

Next, the above-mentioned macroinitiator obtained by polymerization is isolated and is used as an initiator, and among the monomers that become the structural units of the polymer block A or B, polymerization of a monomer that has not been used for the synthesis of the macroinitiator is carried out again in the presence of a catalyst and a ligand. Alternatively, in a stage in which the monomer has been almost entirely consumed in the synthesis of the macroinitiator, a monomer that has not been used for the synthesis of the macroinitiator may be added, without isolating the macroinitiator, and polymerization may be continued. Through these operations, an intended block copolymer can be obtained.

It is preferable that the various reactions described above are carried out in an inert atmosphere of nitrogen, a noble gas such as argon, or the like. The various reactions described above can be carried out at a temperature of, for example, 25° C. to 160° C., and preferably 35° C. to 130° C. Furthermore, the various reactions described above may be carried out without using a solvent or may be carried out in a solvent such as an organic solvent.

Meanwhile, in regard to the reaction for obtaining a macroinitiator by polymerizing a monomer that becomes the structural unit of any one of the polymer block A or B, and to the reaction for obtaining a block copolymer by reacting the macroinitiator with a monomer that becomes the structural unit of the other polymer block, the types and amounts of use of the catalyst and ligand to be used, and the conditions such as the temperature at the time of reaction may be identical or different.

<Fluidization and Non-Fluidization by Light Irradiation>

A wavelength of the light to be irradiated when the high-molecular weight compound including a structural unit derived from an azomethine derivative is fluidized by being irradiated with light is preferably in the range of from 280 nm to 480 nm, more preferably in the range of from 300 nm to 420 nm, and even more preferably in the range of from 330 nm to 420 nm. When the wavelength is in the above-mentioned range, crystals are susceptible to being destroyed (photo-meltability is satisfactory), and fixability is improved. Furthermore, by irradiating with irradiation light having the above-described wavelength, the compound can be fluidized even without applying heat or pressure. However, when the compound is fluidized, fluidization may be accelerated by applying heat or pressure in addition to light irradiation. By applying heat or pressure, the compound can be fluidized with a smaller amount of light irradiation. Therefore, by introducing the high-molecular weight compound of the present invention into a toner, fixation at the above-mentioned wavelength is enabled, and a toner having high color reproducibility and excellent image strength can be obtained.

Meanwhile, a portion of visible light is included in the wavelength range described above. Therefore, it is desirable that the high-molecular weight compound of the present invention is not fluidized only by receiving solar light (natural light) or light produced by illuminations such as fluorescent lamps, but is fluidized by employing low cost conditions in which the amount of irradiation and the irradiation time are suppressed as much as possible. From such a viewpoint, regarding the irradiation conditions for the light to be irradiated when the high-molecular weight compound of the present invention is fluidized, the amount of irradiation is preferably in the range of from 0.1 J/cm² to 200 J/cm², more preferably in the range of from 0.1 J/cm² to 100 J/cm², and even more preferably in the range of from 0.1 J/cm² to 50 J/cm².

On the other hand, as to the conditions for non-fluidizing (re-solidifying) the high-molecular weight compound of the present invention, it is preferable that the high-molecular weight compound is left to stand at room temperature (in the range of 25° C.±15° C.) (in a natural environment). At this time, it is desirable to leave the compound in the dark; however, the compound may receive visible light such as natural light or fluorescent light. Furthermore, it is more preferable when heat is applied in the course of non-fluidizing the compound. Furthermore, it is also acceptable to apply light.

In the case of non-fluidizing the high-molecular weight compound of the present invention by heating, the heating temperature is preferably in the range of from 0° C. to 200° C., and more preferably in the range of from 20° C. to 150° C.

Third Embodiment

A third embodiment of the present invention is a photoresponsive polymer that includes a structural unit represented by the following General Formula (1), the photoresponsive polymer being fluidized by being irradiated with light and reversibly non-fluidized:

[Chemical Formula 32]

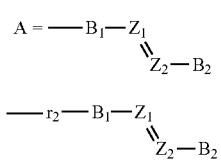

General Formula (1)

wherein in the General Formula (1), $r_1$ represents a hydrogen atom or a methyl group;

A represents a group having an azomethine structure represented by the following General Formula (2):

[Chemical Formula 33]

General Formula (2)

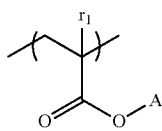

(2-a)

(2-b)

(2-c)

in the General Formula (2), $Z_1$ and $Z_2$ each independently represent N or CH, while $Z_1 \neq Z_2$;

each $B_1$ independently represents a substituted or unsubstituted divalent aromatic hydrocarbon group or a substituted or unsubstituted divalent aromatic heterocyclic group;

each $B_2$ independently represents a substituted or unsubstituted monovalent aromatic hydrocarbon group or a substituted or unsubstituted monovalent aromatic heterocyclic group;

each $r_2$ independently represents an alkylene group having 1 to 18 carbon atoms; and an activation energy Ea represented by the following Formula (1) of a compound in which a hydrogen atom is bonded, instead of an oxygen atom, to A in the General Formula (1), is 60 kJ/mol or more.

Ea (kJ/mol)=(Total energy of TS (kJ/mol))−(Total energy of cis-form (kJ/mol))  Formula (1):

In the above Formula (1), TS refers to a transition state represented by General Formula (3); and the cis-form refers to an isomer represented by General Formula (4).

[Chemical Formula 34]

General Formula (3)

 (3-a)

 (3-b)

 (3-c)

General Formula (4)

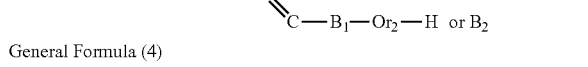

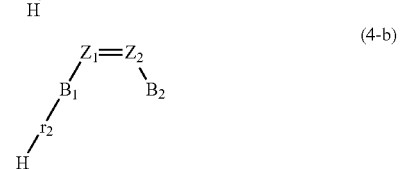 (4-a)

(4-b)

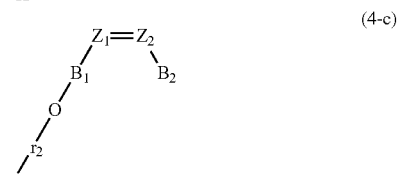 (4-c)

When a polymer that includes a structural unit including a group having an azomethine structure represented by the above-described General Formula (1), for which a compound having a hydrogen atom bonded to the structure represented by the above-mentioned General Formula (2) has predetermined activation energy for cis-trans isomerization, is used, a photoresponsive polymer that is fluidized by being irradiated with light and being reversibly non-fluidized, has excellent toughness, and undergoes less coloration to the extent that does not affect the reproduction of a desired color when the polymer is applied to a toner or an adhesive, can be realized.

That is, according to the third embodiment of the present invention, a polymer that is fluidized by being irradiated with light and being reversibly non-fluidized, has excellent toughness, and does not undergo noticeable coloration, can be provided.

The details of why the above-described effects are obtained by the polymer of the present invention are not clearly understood; however, the following mechanism may be considered. Meanwhile, the following mechanism is based on speculation, and the present invention is not limited to the mechanism. In the following description, a structural unit represented by the General Formula (1) is also referred to as "structural unit including a group having an azomethine structure".

An azobenzene derivative having a long-chained alkyl chain at the terminals is known to be a material that absorbs light and is softened from a solid state (photo-induced phase transition), that is, fluidized when irradiated with light, and it is speculated that this photo-induced phase transition occurs as a result of the crystal structure being destroyed by cis-trans isomerization. In the azobenzene derivatives described in Japanese Patent Application Laid-Open No. 2011-256155 (corresponding to US Patent Application Publication No. 2013/066068) or Japanese Patent Application Laid-Open No. 2011-256291, phase change occurs concomitantly with an isomerization reaction caused by light irradiation; however, since these compounds exhibit relatively low molecular weights, there is a problem that the toughness of the materials is low. Furthermore, since these compounds exhibit strong absorption originating from n-π* transition in the visible light region and are colored in orange, there has been a problem that it is difficult to reproduce a desired color when the compounds are applied to industrial products.

In the present invention, provision of a polymer that is fluidized by being irradiated with light and being reversibly non-fluidized, has high toughness, and does not undergo noticeable coloration was realized by using a polymer including a structural unit including a group having an azomethine structure (structural unit derived from an azomethine derivative). By introducing a structural unit including a group having an azomethine structure, the strong n-π* absorption in the azobenzene derivative can be weakened to a large extent, and therefore, a polymer that does not undergo noticeable coloration can be realized.

In the polymer including a structural unit including a group having an azomethine structure, the azomethine derivative absorbs light and induces a fluidization and non-fluidization phenomenon as the heat energy released in the process of light excitation and deactivation is transferred to the repeating units (structural units) to be bonded (photothermal conversion). Particularly, it is speculated that when the azomethine derivative that is included in the polymer is a trans-form, in addition to the above-described photothermal conversion, the non-fluid trans-form (E) is irradiated with light and is isomerized into the cis-form (Z), and as many trans-forms are changed to cis-forms having a low Tg, the regular structure is destroyed and undergoes phase transition change, a fluidization phenomenon can be induced. Furthermore, it is speculated that when a cis-form turns back and forth to a trans-form, a regular structure is formed again, and a non-fluidization phenomenon can be induced. Therefore, it is speculated that in order to induce a fluidization phenomenon, many trans-forms (E) need to be isomerized into cis-forms (Z). However, it is generally known that that an azomethine derivative has a faster rate of isomerization from a cis-form to a trans-form compared to an azobenzene derivative, and it has been anticipated that it is disadvantageous to induce fluidization and subsequent reversible non-fluidization in an azomethine derivative in which an unsubstituted benzene ring is bonded to both terminals of a C=N bond.

When it is said that the rate of isomerization from the Z-form to the E-form is fast, it is thought that since the energy barrier in the isomerization reaction from the Z-form to the E-form is low, the compound returns rapidly to the trans-form (E). The present inventors thought that by controlling the energy barrier (activation energy Ea) in the isomerization reaction from the Z-form to the E-form, the rate of isomerization from the Z-form to the E-form can be controlled. Then, the inventors found that by adjusting the energy barrier (activation energy Ea) in the isomerization reaction from the Z-form to the E-form to 60 kJ/mol or greater, the reaction rate of the isomerization reaction from the Z-form to the E-form can be controlled, and the compound can be fluidized by being irradiated with light and be reversibly non-fluidized.

Meanwhile, when a compound is fluidized by being irradiated with light and is reversibly non-fluidized, it implies that the compound changes from a non-fluid state to a fluid state by light irradiation, and further returns to a non-fluid state.

Moreover, it is speculated that by making the azomethine derivative into a high-molecular weight compound, the azomethine derivative absorbed light, the heat energy released in the process of light excitation and deactivation was transferred to the structural units to be bonded (photothermal conversion), and thereby the azomethine derivative was melted or softened effectively. Further, by making the azomethine derivative into a high-molecular weight compound, the toughness of the material can also be enhanced. Therefore, it is speculated that excellent fixability (image strength) can be obtained particularly when used in a toner.

Furthermore, by introducing a structural unit including a group having an azomethine structure, the strong n-π* absorption in the azobenzene derivative can be weakened to a large extent, and therefore, a polymer that does not undergo noticeable coloration can be realized.

For the reasons described above, it is considered that the polymer having a structural unit including a group having an azomethine structure of the present invention can induce a phenomenon of fluidization and reversible non-fluidization concomitantly with photoisomerization. Furthermore, since the polymer of the present invention has excellent toughness and does not undergo noticeable coloration, the polymer can be suitably used for a toner or a photoresponsive adhesive.

Meanwhile, fluid state according to the present invention refers to a state that is transformed without any external force or by a small external force.

Hereinafter, preferred embodiments of the present invention will be described. Meanwhile, according to the present specification, the expression "X to Y" representing a range means "X or more and Y or less". Furthermore, according to the present specification, unless particularly stated otherwise, operations and measurement of physical properties and the like are carried out under the conditions of room temperature (20° C. to 25° C.)/relative humidity of 40% to 50% RH.

<Polymer Including Structural Unit Including Group Having Azomethine Structure>

The polymer of the present invention is a polymer that includes a structural unit represented by the following General Formula (1), which is fluidized by being irradiated with light, and is reversibly non-fluidized.

[Chemical Formula 35]

General Formula (1)

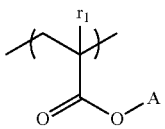

In the General Formula (1), $r_1$ represents a hydrogen atom or a methyl group;
A represents a group having an azomethine structure represented by the following General Formula (2):

[Chemical Formula 36]

General Formula (2)

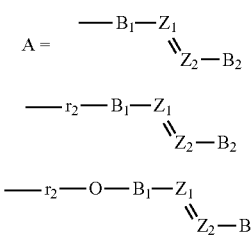

In the General Formula (2), $Z_1$ and $Z_2$ each independently represent N or CH, while $Z_1 \neq Z_2$;
each $B_1$ independently represents a substituted or unsubstituted divalent aromatic hydrocarbon group or a substituted or unsubstituted divalent aromatic heterocyclic group;
each $B_2$ independently represents a substituted or unsubstituted monovalent aromatic hydrocarbon group or a substituted or unsubstituted monovalent aromatic heterocyclic group; and
each $r_2$ independently represents an alkylene group having 1 to 18 carbon atoms.

The polymer of the present invention is a photoresponsive polymer, for which an activation energy Ea represented by the following Formula (1) of a compound in which a hydrogen atom is bonded, instead of an oxygen atom, to A in the General Formula (1), is 60 kJ/mol or more:

Ea (kJ/mol)=(Total energy of TS (kJ/mol))−(Total energy of cis-form (kJ/mol))    Formula (1):

In the above Formula (1), TS represents a transition state represented by General Formula (3); and the cis-form represents an isomer represented by General Formula (4).

[Chemical Formula 37]
General Formula (3)

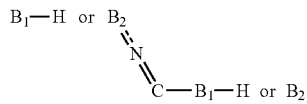
(3-a)

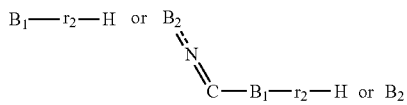
(3-b)

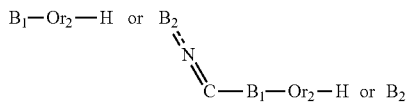
(3-c)

General Formula (4)

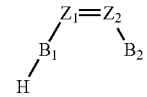
(4-a)

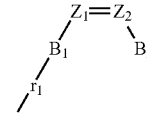
(4-b)

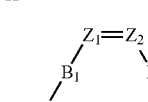
(4-c)

With regard to the polymer of the present invention, it is speculated that when the energy barrier (activation energy Ea) for an isomerization reaction from a cis-form to a trans-form of a compound in which a hydrogen atom is bonded to the structure represented by the General Formula (2), is adjusted to 60 kJ/mol or more, the reaction rate of the isomerization reaction from the Z-form to the E-form is decreased, the amount of the cis-form at the time of light irradiation is relatively increased, and fluidization concomitant with a photoisomerization reaction can be effectively induced. The polymer of the present invention is not particularly limited; however, from the viewpoint of making it easier to reliably introduce an azomethine group into the molecule and efficiently inducing fluidization and reversible non-fluidization, it is preferable that the polymer of the present invention is a polymer including a structural unit including a group having an azomethine structure.

Furthermore, since the polymer of the present invention exhibits high thermal mobility when the polymer is isomerized from a trans-form to a cis-form while exhibiting intermolecular packing (π-π interaction) at the azomethine group part, it is speculated that the polymer of the present invention can easily induce a fluidization phenomenon while increasing the strength of the material.

When the activation energy Ea represented by Formula (1) is below 60 kJ/mol, since the barrier of the isomerization reaction from the cis-form to the trans-form is low, even if the compound is isomerized to a fluid cis-form by light irradiation, the compound returns rapidly to the non-fluid trans-form. Therefore, fluidization by light irradiation and subsequent reversible non-fluidization cannot be realized.

Preferably, the activation energy Ea is 63 kJ/mol or more, more preferably 65 kJ/mol or more, and even more preferably 67 kJ/mol or more. Furthermore, from the viewpoint of the ease of returning to a trans-form, the activation energy Ea is preferably 100 kJ/mol or less, more preferably 95 kJ/mol or less, even more preferably 90 kJ/mol or less, and still more preferably 80 kJ/mol or less. In this way, the effects of the present invention can be obtained more easily.

According to the present invention, as shown in the Formula (1), the energy barrier (activation energy Ea) for an isomerization reaction from a cis-form to a trans-form can be determined as a value obtained by subtracting the total energy of the cis-form from the total energy of a transition state of a compound in which a hydrogen atom is bonded, instead of an oxygen atom, to the group A having an azomethine structure in the General Formula (1). The structure of the transition state can be represented by the General Formula (3), and the structure of the cis-form can be represented by the General Formula (4). Meanwhile, the General Formulae (3) and (4) represent the disposition (position) of $B_1$ and $B_2$ with respect to the $Z_1=Z_2$ bond, and the positions of the parts of H, $r_2$-H, and O-$r_2$-H depend on the structure of the group A having an azomethine structure including the structure of $B_1$.

Here, the calculation of the molecular structure and the total energy of the cis-form of the above-described compound, and the molecular structure and the total energy of the transition state of the above-described compound can be carried out using Gaussian 16 (Revision B.01, M. J. Frisch, G. W. Trucks, H. B. Schlegel, G. E. Scuseria, M. A. Robb, J. R. Cheeseman, G Scalmani, V Barone, G. A. Petersson, H. Nakatsuji, X. Li, M. Caricato, A. V. Marenich, J. Bloino, B. G. Janesko, R. Gomperts, B. Mennucci, H. P. Hratchian, J V Ortiz, A. F. Izmaylov, J. L. Sonnenberg, D. Williams-Young, F. Ding, F. Lipparini, F. Egidi, J. Goings, B. Peng, A. Petrone, T. Henderson, D. Ranasinghe, V. G. Zakrzewski, J. Gao, N. Rega, G. Zheng, W. Liang, M. Hada, M. Ehara, K. Toyota, R. Fukuda, J. Hasegawa, M. Ishida, T Nakajima, Y. Honda, O. Kitao, H. Nakai, T. Vreven, K. Throssell, J. A. Montgomery, Jr., J. E. Peralta, F. Ogliaro, M. J. Bearpark, J. J. Heyd, E. N. Brothers, K. N. Kudin, V. N. Staroverov, T. A. Keith, R. Kobayashi, J. Normand, K. Raghavachari, A. P. Rendell, J. C. Burant, S. S. Iyengar, J. Tomasi, M. Cossi, J. M. Millam, M. Klene, C. Adamo, R. Cammi, J W Ochterski, R. L. Martin, K. Morokuma, O. Farkas, J B Foresman, and D. J. Fox, Gaussian, Inc., Wallingford CT, 2016.) software manufactured by Gaussian, Inc. in the USA, and as the calculation technique, a density functional method (B3LYP/6-31G(d)) can be used. Regarding the molecular structure of the cis-form, the most stable molecular structure, that is, the molecular structure having the lowest total energy, of an isomer represented by the General Formula (4) is calculated, and this total energy is designated as the total energy of the cis-form. Regarding the molecular structure of the transition state (TS), for the transition state represented by the General Formula (3), the saddle point of the corresponding molecular structure is calculated, and the total energy obtained at this time is designated as the total energy of the transition state. Meanwhile, there are no particular limitations in the software or the calculation technique, and the same value can be obtained by using any of them. From the calculation value obtained as such, the value of the activation energy Ea can be determined according to the Formula (1).

With regard to the polymer of the present invention, the activation energy Ea represented by the Formula (1) can be controlled to be 60 kJ/mol or more, by appropriately selecting the structures of $B_1$ and $B_2$ of the General Formula (1).

Specifically, the activation energy Ea can be increased by introducing an electron-donating structure into the group A having an azomethine structure and thereby increasing the electron density of the moiety of the azomethine part. For example, the activation energy Ea can be increased by employing an aromatic heterocyclic group having high electron-donating properties for at least one of $B_1$ and $B_2$. Furthermore, the activation energy Ea can be increased by introducing a substituent having high electron-donating properties into an aromatic hydrocarbon group or an aromatic heterocyclic group as $B_1$ and $B_2$.

Here, the aromatic hydrocarbon group is not particularly limited; however, an aryl group having 6 to 30 carbon atoms is preferred, and examples include a phenyl group, a naphthyl group, an anthracenyl group, a phenanthrenyl group, a pyrenyl group (for $B_1$, divalent groups derived from these groups), and the like. Above all, from the viewpoint that fluidization and non-fluidization occur effectively, a phenyl group (for $B_1$, a phenylene group) is preferred.

The aromatic heterocyclic group is not particularly limited; however, an aromatic heterocyclic group having 2 to 30 carbon atoms is preferred. Furthermore, a group having high electron-donating properties is preferred, and examples include a thienyl group, a pyrrolyl group, a pyrazolyl group, an imidazolyl group, a pyridyl group, a pyrimidinyl group, a pyrazinyl group, a triazinyl group, a benzothienyl group, a benzimidazolyl group, an indolyl group, an isoindolyl group, quinolinyl group, an isoquinolinyl group, a quinazolinyl group, a quinoxalinyl group, a naphthyridinyl group, an acridinyl group, a carbazolyl group, a dibenzothienyl group (for $B_1$, divalent groups derived from these groups), and the like; however, the group is not limited to these. Above all, from the viewpoint that the activation energy is increased, and fluidization and non-fluidization occur effectively, a thienyl group, a pyrrolyl group, a pyrazolyl group, an imidazolyl group, an indolyl group, and a carbazolyl group (for $B_1$, divalent groups derived from these groups) are preferred.

The aromatic hydrocarbon group or aromatic heterocyclic group described above may each have a substituent. The substituent is not particularly limited; however, examples include a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, an alkoxycarbonyl group having 2 to 19 carbon atoms, and the like. Preferred examples include a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms.

As described above, it is thought that the photo-induced phase transition of an azomethine derivative occurs, similarly to an azobenzene derivative, as the crystal structure is destroyed by cis-trans isomerization. Generally, since the intermolecular π-π interaction is strong, the photo-induced phase transition occurs only at the outermost surface of the crystal structure. Here, when the aromatic hydrocarbon group or aromatic heterocyclic group represented by $B_1$ or $B_2$ of the General Formula (1) has a substituent, the polymer including a structural unit including a group having an azomethine structure of the present invention forms a unique crystal structure in which within a periodic structure in which the π-π interaction is predominant, a structure that is isotropically disordered by thermal motion of these substituents co-exists. Therefore, when the cis-trans isomerization reaction proceeds locally and the π-π interaction of the moiety of the azomethine derivative is reduced, isotropic fusion occurs in a chain reaction over the entire system.

Therefore, it is considered that the cis-trans isomerization can proceed more easily, and fluidization can be exhibited more easily.

At this time, it is preferable that at least one of the above-described substituents is a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 18 carbon atoms, or an alkoxycarbonyl group having 2 to 18 carbon atoms. It is considered that by adopting such a structure, cis-trans isomerization can proceed more easily, and fluidization can be exhibited more easily. Among these, from the viewpoint of having high thermal mobility, it is more preferable that the substituent is an alkyl group having 1 to 18 carbon atoms, an alkoxy group having 1 to 18 carbon atoms, or a dialkylamino group having 2 to 10 carbon atoms.

Regarding the number of carbon atoms of the substituent, more preferably, the alkyl group is an alkyl group having 1 to 12 carbon atoms, and even more preferably an alkyl group having 4 to 12 carbon atoms. Furthermore, more preferably, the alkoxy group is an alkoxy group having 1 to 12 carbon atoms, and even more preferably an alkoxy group having 4 to 12 carbon atoms. Furthermore, more preferably, the dialkylamino group is a dialkylamino group having 2 to 8 carbon atoms, and even more preferably a dialkylamino group having 4 to 6 carbon atoms. More preferably, the acyl group is an acyl group having 2 to 13 carbon atoms, and even more preferably an acyl group having 5 to 13 carbon atoms. Furthermore, more preferably, the alkoxycarbonyl group is an alkoxycarbonyl group having 2 to 13 carbon atoms, and even more preferably, an alkoxycarbonyl group having 5 13 carbon atoms is even more preferred. As such, when a long-chained substituent is introduced, crystals are susceptible to destruction, photo-meltability is improved, and fixability is improved.

Examples of the alkyl group having 1 to 18 carbon atoms are not particularly limited, and examples include linear alkyl groups such as a methyl group, an ethyl group, an n-propyl group, an n-butyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, and an n-hexadecyl group; and branched alkyl groups such as an isopropyl group, a sec-butyl group, an isobutyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group having 1 to 18 carbon atoms include linear alkoxy groups such as a methoxy group, an ethoxy group, an n-propoxy group, an n-butoxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, and an n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the alkylamino group having 1 to 10 carbon atoms include, for example, a methylamino group, an ethylamino group, an n-propylamino group, an n-butylamino group, an isobutylamino group, an n-hexylamino group, an n-heptylamino group, an n-octylamino group, an n-nonylamino group, an n-decylamino group, and the like.

Examples of the dialkylamino group having 2 to 10 carbon atoms include, for example, a dimethylamino group, a diethylamino group, a di-n-propylamino group, a di-n-butylamino group, a diisobutylamino group, a methylethylamino group, and the like.

Examples of the acyl group having 2 to 19 carbon atoms include saturated or unsaturated, linear or branched acyl groups, and examples include an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyryl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, a stearoyl group, a behenoyl group, an undecylenoyl group, an oleoyl group, and the like.

Examples of the alkoxycathonyl group having 2 to 19 carbon atoms include linear or branched alkoxycarbonyl groups, and examples include linear alkoxycarbonyl groups such as a methoxycarbonyl group, an ethoxycarbonyl group, an n-butoxycarbonyl group, an n-hexyloxycarbonyl group, an n-heptyloxycarbonyl group, an n-octyloxycarbonyl group, an n-nonyloxycarbonyl group, an n-decyloxycarbonyl group, an n-undecyloxycarbonyl group, an n-dodecyloxycarbonyl group, an n-tridecyloxycarbonyl group, an n-tetradecyloxycarbonyl group, an n-pentadecyloxycarbonyl group, and an n-hexadecyloxycarbonyl group; and branched alkoxycarbonyl groups such as a 1-methylpentyloxycarbonyl group, a 4-methyl-2-pentyloxycathonyl group, a 3,3-dimethylbutyloxycarbonyl group, a 2-ethylbutyloxycarbonyl group, a 1-methylhexyloxycarbonyl group, a t-octyloxycarbonyl group, a 1-methylheptyloxycathonyl group, a 2-ethylhexyloxycarbonyl group, a 2-propylpentyloxycarbonyl group, a 2,2-dimethylheptyloxycarbonyl group, a 2,6-dimethyl-4-heptyloxycarbonyl group, a 3,5,5-trimethylhexyloxycarbonyl group, a 1-methyldecyloxycarbonyl group, and a 1-hexylheptyloxycarbonyl group.

The structural unit represented by the General Formula (1) has one polymerizable group with respect to one group having the azomethine part. Thereby, a polymer that is prone to melt is easily obtained even with a low amount of light irradiation energy.

The group having a polymerizable group of the General Formula (1) has a group represented by any one of the following Formulae (i) to (iii). When these groups having a polymerizable group are included, it is preferable because it is suitable for the synthesis of the polymer. Thereby, polymers in which A in General Formula (1) is represented by General Formula (2-a), (2-b), or (2-c) can be obtained. For each of them, above all, from the viewpoint of the ease of achieving softening and melting, it is preferable that the polymer has a group represented by (ii) or (iii), and it is more preferable that the polymer has a group represented by (iii). That is, in regard to the General Formula (1), it is preferable that A is a group having an azomethine structure as represented by the General Formula (2-b) or (2-c), and it is more preferable that A is a group having an azomethine structure as represented by General Formula (2-c).

[Chemical Formula 38]

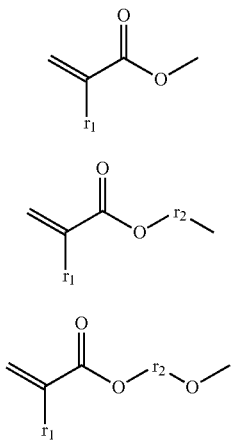

In the Formulae (i) to (iii), $r_1$ corresponds to $r_1$ of the General Formula (1), and each $r_1$ independently represents a hydrogen atom or a methyl group. $r_2$ corresponds to $r_2$ of the General Formulae (2-b) and (2-c), and each $r_2$ independently represents an alkylene group having 1 to 18 carbon atoms. Preferably, $r_2$ represents an alkylene group having 3 to 12 carbon atoms. The alkylene group may be linear or may be branched, and preferably, the alkylene group is linear. Some of the alkylene groups may be substituted with a substituent. Examples of the substituent include a halogen group, a nitro group, a hydroxy group, a carboxy group, and the like.

Preferably, in the General Formula (1), each $B_1$ independently represents a substituted or unsubstituted phenylene group or a substituted or unsubstituted divalent aromatic heterocyclic group; and each $B_2$ independently represents a substituted or unsubstituted phenyl group or a substituted or unsubstituted monovalent aromatic heterocyclic group. By adopting such a configuration, fluidization and non-fluidization can occur more effectively. Particularly, in a case in which $B_1$ or $B_2$ is an aromatic heterocyclic group, since the molar absorption coefficient in the solution is small compared to the case in which $B_1$ and $B_2$ are phenyl groups, when irradiated with light, light can reach to a deeper direction. Therefore, the upper layer as well as lower layers can be photo-melted, and thus it is speculated that it is advantageous to induce fluidization.

Furthermore, a preferred embodiment of the present invention is a polymer in which in the General Formula (1), each $B_1$ independently represents a phenylene group that is bonded to an oxygen atom (in the case of (2-a) or (2-c)) or $r_2$ (in the case of (2-b)) at a para-position with respect to $Z_1$; each $B_2$ independently represents a phenyl group that is unsubstituted or has a substituent selected among an alkyl group having 1 to 18 carbon atoms, an alkoxy group having 1 to 18 carbon atoms, and a dialkylamino group having 2 to 10 carbon atoms at a para-position with respect to $Z_2$. At this time, $B_1$ may also have a substituent on a carbon atom other than the carbon atoms bonded to $Z_1$ or the oxygen atom (in the case of (2-a) or (2-c)) or $r_2$ (in the case of (2-b)). Here, the specific forms of the respective substituents are as described above.

In an azomethine derivative having a benzene ring introduced at the two terminals, the electron density of the azomethine part is decreased compared to the case in which any one is an electron-donating aromatic heterocyclic group, while the activation energy is susceptible to decreasing; however, by introducing the above-mentioned substituents, the electron density of the azomethine part can be increased, the activation energy can be controlled to a predetermined range, and a fluidization and reversible non-fluidization phenomenon can be induced effectively. Furthermore, production of lattice defects, exhibition of free volume, reduction of the π-π interaction, and the like that act advantageously on cis-trans isomerization occur. Therefore, it is considered that the cis-trans isomerization can proceed more easily, and fluidization can be exhibited more easily.

That is, in an azomethine derivative having a benzene ring at both terminals of the C=N bond, when $B_2$ is an unsubstituted phenyl group or is a phenyl group having one or more electron-donating substituents (an alkoxy group, a dialkylamino group, and the like), the electron density of the azomethine part increases compared to the case of having an electron-withdrawing substituent only. Therefore, the activation energy is likely to be increased, and a fluidization and reversible non-fluidization phenomenon can be effectively induced, which is therefore preferable.

As described above, when $B_2$ is a phenyl group that is unsubstituted or has a substituent selected among an alkyl group having 1 to 18 carbon atoms, an alkoxy group having 1 to 18 carbon atoms, and a dialkylamino group having 2 to 10 carbon atoms at a para-position with respect to $Z_2$, crystals are susceptible to destruction, photo-meltability is improved, and excellent fixability can be obtained when used as a toner. Regarding such a substituent at the para-position, from the viewpoint that crystals are easily destroyed by introducing a long-chained substituent, and that the effect of improving photomeltability is high, the substituent is more preferably an alkyl group having 4 to 12 carbon atoms, an alkoxy group having 4 to 12 carbon atoms, or a dialkylamino group having 4 to 10 carbon atoms.

At this time, it is preferable that at least one of $B_1$ and $B_2$ does not have substitution at two ortho-positions and two meta-positions with respect to $Z_1$ or $Z_2$, or is substituted with a group selected among a halogen atom, an alkyl group having 1 to 4 carbon atoms, an alkoxy group having 1 to 4 carbon atoms, and a dialkylamino group having 2 to 10 carbon atoms. That is, four carbon atoms in total at the two ortho-positions and the two meta-positions may all be unsubstituted; or the four carbon atoms in total may be each substituted with a group selected among a halogen atom, an alkyl group having 1 to 4 carbon atoms, an alkoxy group having 1 to 4 carbon atoms, and a dialkylamino group having 2 to 10 carbon atoms; or some of the four carbon atoms in total may be unsubstituted, while the others may be substituted with a group selected among a halogen atom, an alkyl group having 1 to 4 carbon atoms, an alkoxy group having 1 to 4 carbon atoms, and a dialkylamino group having 2 to 10 carbon atoms. Furthermore, in the case of being substituted, as long as the substituent is selected among a halogen atom, an alkyl group having 1 to 4 carbon atoms, an alkoxy group having 1 to 4 carbon atoms, and a dialkylamino group having 2 to 10 carbon atoms, the substitution may be achieved with the same group, or substitution may be achieved with different groups. Meanwhile, the alkyl group and the alkoxy group may be linear or branched. When such a configuration is adopted, the steric hindrance near the C=N bond can be controlled, and fluidization and non-fluidization can be effectively exhibited. Furthermore, it is preferable because the melting point of the compound can be controlled to a suitable range.

Therefore, according to a preferred embodiment of the present invention, —$B_1$—$Z_1$=$Z_2$—$B_2$ in the group A having an azomethine structure of the General Formula (1) has the following structure.

[Chemical Formula 39]

(Structural Example 1)

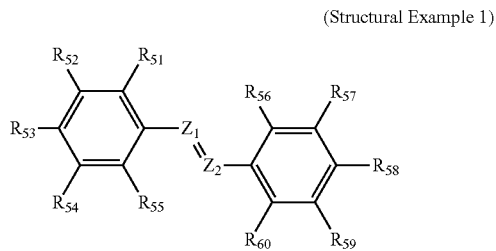

In the formula, $Z_1$ and $Z_2$ each represent N or CH, while $Z_1 \neq Z_2$;

$R_{53}$ represents a linking moiety to an oxygen atom (in the case of (2-a) or (2-c)) or $r_2$ (in the case of (2-b)) in the General Formula (1);

$R_{56}$ to $R_{60}$ all represent a hydrogen atom, or $R_{58}$ represents an alkyl group having 1 to 18 carbon atoms, an alkoxy group having 1 to 18 carbon atoms, or a dialkylamino group having 2 to 10 carbon atoms, and preferably represents an alkyl group having 4 to 12 carbon atoms, an alkoxy group having 4 to 12 carbon atoms, or a dialkylamino group having 4 to 10 carbon atoms; $R_{56}$, $R_{57}$, $R_{59}$, and $R_{60}$ each independently represent a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms; and $R_{51}$, $R_{52}$, $R_{54}$, and $R_{55}$ each independently represent a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms.

More preferably, with regard to the above-described formula, it is preferable that at least one of the following is satisfied:

$R_{51}$, $R_{52}$, $R_{54}$, and $R_{55}$ each independently represent a hydrogen atom, a halogen atom, an alkyl group having 1 to 4 carbon atoms, an alkoxy group having 1 to 4 carbon atoms, or a dialkylamino group having 2 to 10 carbon atoms (in a preferred embodiment, $R_{51}$, $R_{52}$, $R_{54}$, and $R_{55}$ are all hydrogen atoms); or $R_{56}$, $R_{57}$, $R_{59}$, and $R_{60}$ each independently represent a hydrogen atom, a halogen atom, an alkyl group having 1 to 4 carbon atoms, an alkoxy group having 1 to 4 carbon atoms, or a dialkylamino group having 2 to 10 carbon atoms (in a preferred embodiment, $R_{56}$, $R_{57}$, $R_{59}$, and $R_{60}$ are all hydrogen atoms).

Another preferred embodiment of the present invention is a polymer in which in the General Formula (1) described above, each $B_1$ independently represents a phenylene group that is bonded to an oxygen atom (in the case of (2-a) or (2-c)) or $r_2$ (in the case of (2-b)) at the para-position with respect to $Z_1$; and each $B_2$ independently represents an unsubstituted aromatic heterocyclic group, or an aromatic heterocyclic group substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

Through the configuration described above, the electron density of the azomethine part can be increased, the activation energy can be controlled to a predetermined range, and a phenomenon of fluidization brought by light irradiation and reversible non-fluidization can be effectively induced. Furthermore, production of lattice defects, exhibition of free volume, reduction of the π-π interaction, and the like that act advantageously on cis-trans isomerization occur. Therefore, it is considered that the cis-trans isomerization can proceed more easily, and fluidization can be exhibited more easily. Here, specific forms of the aromatic heterocyclic groups and the respective substituents are as described above.

When $B_1$ is a phenylene group that is bonded to an oxygen atom (in the case of (2-a) or (2-c)) or $r_2$ (in the case of (2-b)) at the para-position with respect to $Z_1$, by having a long-chained substituent at the para-position with respect to $Z_1$, crystals are susceptible to destruction, photo-meltability is improved, and fixability is improved when used for a toner.

Furthermore, it is preferable that the aromatic heterocyclic group of $B_2$ is unsubstituted, or the aromatic heterocyclic group is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. By the configuration described above, the activation energy can be easily controlled to a predetermined range, and a fluidization and reversible non-fluidization phenomenon can be effectively induced. Furthermore, production of lattice defects, exhibition of free volume, reduction of the π-π interaction, and the like that act advantageously on cis-trans isomerization occur. Therefore, it is considered that the cis-trans isomerization can proceed more easily, and fluidization can be exhibited more easily.

Here, in this embodiment in which $B_1$ is a phenylene group and $B_2$ is an aromatic heterocyclic group, it is preferable that $Z_1$ represents N, and $Z_2$ represents CH. Furthermore, in this embodiment, it is preferable that the aromatic heterocyclic group of $B_2$ is a thienyl group, a pyrrolyl group, a pyrazolyl group, or an imidazolyl group, all of which are substituted or unsubstituted; and it is particularly preferable that the aromatic heterocyclic group is a substituted or unsubstituted thienyl group or pyrrolyl group.

In such a structural unit, since the activation energy for the isomerization from a cis-form to a trans-form can be easily controlled to 60 kJ/mol or more, it is speculated that the rate of a reversion reaction can be controlled, and a sufficient amount of cis-forms are obtained.

According to the above-described preferred embodiment of the present invention, as an example of the structure of —$B_1$—$Z_1$=$Z_2$—$B_2$ for the group A having an azomethine structure of the General Formula (1), the following structure may be mentioned.

[Chemical Formula 40]

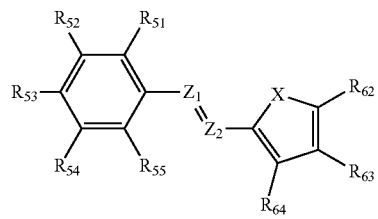

(Structural Example 2)

In the formula, $Z_1$ and $Z_2$ each represent N or CH, while $Z_1 \neq Z_2$;

$R_{53}$ represents a linking moiety to an oxygen atom (in the case of (2-a) or (2-c)) or $r_2$ (in the case of (2-b)) in the General Formula (1);

X represents S, O, or $NR_{61}$, preferably S or $NR_{61}$, $R_{61}$ represents a hydrogen atom, an alkyl group having 1 to 18 carbon atoms, or an alkoxycarbonyl group having 2 to 19 carbon atoms;

$R_{62}$ to $R_{64}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms (in an embodiment, $R_{62}$ to $R_{64}$ are all hydrogen atoms); and $R_{51}$, $R_{52}$, $R_{54}$, and $R_{55}$ each independently represent a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms.

According to the preferred embodiment of the present invention as described above, as another example of the structure of $-B_1-Z_1=Z_2-B_2$ for the group A having an azomethine structure of the General Formula (1), the following structure may be mentioned.

[Chemical Formula 41]

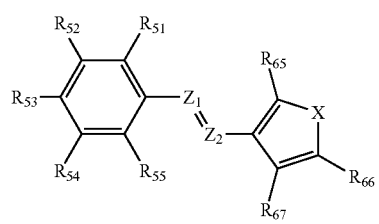

(Structural Example 3)

In the formula, $Z_1$, $Z_2$, X, and $R_{51}$ to $R_{55}$ are similar to those of the above-described Structural Example 2;

$R_{65}$ to $R_{67}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms, and according to an embodiment, $R_{65}$ to $R_{67}$ are all hydrogen atoms.

According to the preferred embodiment of the present invention as described above, as another example of the structure of $-B_1-Z_1=Z_2-B_2$ for the group A having an azomethine structure of the General Formula (1), the following structure may be mentioned.

[Chemical Formula 42]

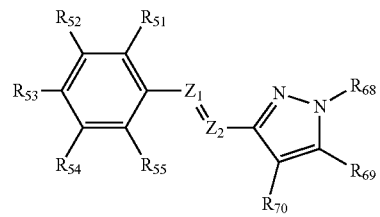

(Structural Example 4)

In the formula, $Z_1$, $Z_2$, X, and $R_{51}$ to $R_{55}$ are similar to those of the Structural Example 2;

$R_{68}$ to $R_{70}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms; and according to an embodiment, $R_{68}$ to $R_{70}$ are all hydrogen atoms.

According to the preferred embodiment of the present invention as described above, as another example of the structure of $-B_1-Z_1=Z_2-B_2$ for the group A having an azomethine structure of the General Formula (1), the following structure may be mentioned.

[Chemical Formula 43]

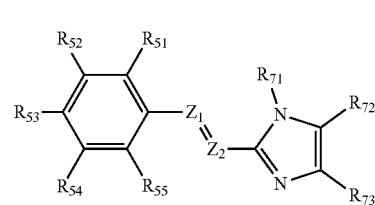

(Structural Example 5)

In the formula, $Z_1$, $Z_2$, X, and $R_{51}$ to $R_{55}$ are similar to those for the Structural Example 2;

$R_{71}$ to $R_{73}$ each independently represent a hydrogen atom, a halogen atom, a cyano group, a nitro group, an alkyl group having 1 to 18 carbon atom, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms; and according to an embodiment, $R_{71}$ to $R_{73}$ are all hydrogen atoms.

Still another preferred embodiment of the present invention is a polymer in which in the General Formula (1), each $B_1$ independently represents a substituted or unsubstituted divalent aromatic heterocyclic group and is bonded to an oxygen atom (in the case of (2-a) or (2-c)) or $r_2$ (in the case of (2-b)) at a position that is not adjacent to the bonding position to $Z_1$; and each $B_2$ independently represents a phenyl group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. Through the configuration described above, the electron density of the azomethine part can be increased, the activation energy can be controlled to a predetermined range, and a phenomenon of fluidization brought by light irradiation and reversible non-fluidization can be effectively induced. Furthermore, production of lattice defects, exhibition of free volume, reduction of the π-π interaction, and the like that act advantageously on cis-trans isomerization occur. Therefore, it is considered that the cis-trans isomerization can proceed more easily, and fluidization can be exhibited more easily. Furthermore, for the aromatic heterocyclic group of $B_1$, it is speculated that by introducing a polymerizable group into a position that is not adjacent to the bonding position to $Z_1$, steric hindrance is reduced when a polymer is produced, and therefore, melting and softening can be easily carried out. From the viewpoint of further enhancing photo-meltability, it is more preferable that $B_1$ represents a divalent aromatic heterocyclic group substituted with an alkyl group having 4 to 12 carbon atoms, an alkoxy group having 4 to 12 carbon atoms, or a dialkylamino group having 4 to 10 carbon atoms. Here, specific forms of the aromatic heterocyclic groups and the respective substituents are as described above.

At this time, it is preferable that $B_2$ represents a phenyl group substituted with a halogen atom, a cyano group, a nitro group, an alkyl group having 1 to 18 carbon atoms, an alkoxy group having 1 to 18 carbon atoms, or a dialkylamino group having 2 to 10 carbon atoms. Thereby, production of lattice defects, exhibition of free volume, reduction of the π-π interaction, and the like that act advantageously on cis-trans isomerization occur. Therefore, it is thought that cis-trans isomerization can proceed more easily, and fluidization is easily exhibited.

Here, in this embodiment in which $B_1$ represents an aromatic heterocyclic group and $B_2$ represents a phenyl group, it is preferable that $Z_1$ represents CH, and $Z_2$ represents N. Furthermore, in this embodiment, it is preferable that the aromatic heterocyclic group of $B_1$ is a group having a thiophene ring, a pyrrole ring, a pyrazole ring, or an imidazole ring, all of which are substituted or unsubstituted, and it is particularly preferable that the aromatic heterocyclic group is a group having a substituted or unsubstituted thiophene ring or pyrrole ring.

Regarding such a structural unit, since the activation energy for the isomerization from a cis-form to a trans-form can be easily controlled to 60 kJ/mol or more, and the rate of a reversion reaction can be controlled, a sufficient amount of cis-forms is obtained, and at the same time, the molar absorption coefficient in a solution is small compared to the case in which $B_1$ and $B_2$ have 6-membered rings. Therefore, it is speculated that since light can reach to a deeper direction when the compound is irradiated with light, upper layers as well as lower layers can be photo-melted, and it is advantageous to induce fluidization.

Still another preferred embodiment of the present invention is a polymer in which in the General Formula (1), each $B_1$ independently represents a substituted or unsubstituted divalent aromatic heterocyclic group and is bonded to an oxygen atom (in the case of (2-a) or (2-c)) or $r_2$ (in the case of (2-b)) at a position that is not adjacent to the bonding position to $Z_1$; and each $B_2$ independently represents an aromatic heterocyclic group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

Through the configuration described above, the electron density of the azomethine part can be increased, the activation energy can be controlled to a predetermined range, and a phenomenon of fluidization brought by light irradiation and reversible non-fluidization can be effectively induced. Furthermore, production of lattice defects, exhibition of free volume, reduction of the π-π interaction, and the like that act advantageously on cis-trans isomerization occur. Therefore, it is considered that the cis-trans isomerization can proceed more easily, and fluidization can be exhibited more easily. Furthermore, with regard to the aromatic heterocyclic group of $B_1$, it is thought that by introducing a polymerizable group into a position that is not adjacent to the bonding position to $Z_1$, steric hindrance is reduced when a polymer is produced, and therefore, melting and softening can be easily carried out. Here, the aromatic heterocyclic groups constituting $B_1$ and $B_2$ may have the same cyclic structure or may have mutually different cyclic structures.

At this time, preferably, $B_1$ represents an aromatic heterocyclic group having at least one substituent selected from an alkyl group having 1 to 18 carbon atoms, an alkoxy group having 1 to 18 carbon atoms, and a dialkylamino group having 2 to 10 carbon atoms. By adopting such a configuration, fluidization and non-fluidization can be exhibited effectively. Furthermore, it is preferable because the melting point of the compound can be controlled to a suitable range.

Meanwhile, from the viewpoint of further enhancing photo-meltability, it is more preferable that at least one of $B_1$ and $B_2$ is substituted with an alkyl group having 4 to 12 carbon atoms, an alkoxy group having 4 to 12 carbon atoms, or a dialkylamino group having 4 to 10 carbon atoms.

Specific forms of the aromatic heterocyclic groups constituting $B_1$ and $B_2$ and the substituents for the respective groups are similar to those described above.

Here, with regard to this embodiment in which $B_1$ and $B_2$ are aromatic heterocyclic groups, it is particularly preferable that the aromatic heterocyclic groups of $B_1$ and $B_2$ are each a group having a thiophene ring, a pyrrole ring, a pyrazole ring, or an imidazole ring, all of which are substituted or unsubstituted.

According to the preferred embodiment of the present invention as described above, as an example of the structure of $-B_1-Z_1=Z_2-B_2$ for the group A having an azomethine structure of the General Formula (1), the following structure may be mentioned.

[Chemical Formula 44]

(Structural Example 6)

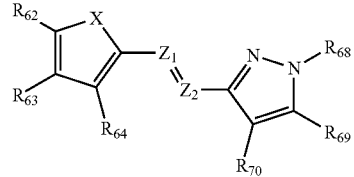

In the formula, $Z_1$ and $Z_2$ each represent N or CH, while $Z_1 \neq Z_2$;

$R_{62}$ and $R_{63}$ each independently represent a linking moiety to an oxygen atom (in the case of (2-a) or (2-c)) or $r_2$ (in the case of (2-b)) in General Formula (1), or a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms; while either $R_{62}$ or $R_{63}$ is a linking moiety to an oxygen atom (in the case of (2-a) or (2-c)) or $r_2$ (in the case of (2-b)) in General Formula (1);

$R_{64}$ represents a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms;

X represents S, O, or $NR_{61}$, and preferably S or $NR_{61}$, while $R_{61}$ represents a hydrogen atom, an alkyl group having 1 to 18 carbon atoms, or an alkoxycarbonyl group having 2 to 19 carbon atoms; and $R_{68}$ to $R_{70}$ all represent a hydrogen atom, or $R_{68}$ to $R_{70}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

According to the preferred embodiment of the present invention as described above, as another example of the structure of —$B_1$—$Z_1$=$Z_2$—$B_2$ for the group A having an azomethine structure of the General Formula (1), the following structure may be mentioned.

[Chemical Formula 45]

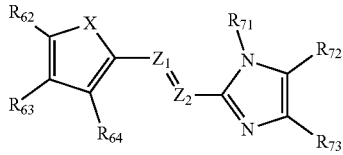

(Structural Example 7)

In the formula, $Z_1$ and $Z_2$ each represent N or CH, while $Z_1 \neq Z_2$;

$R_{62}$ and $R_{63}$ each independently represent a linking moiety to an oxygen atom (in the case of (2-a) or (2-c)) or $r_2$ (in the case of (2-b)) in General Formula (1), or a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms, while either $R_{62}$ or $R_{63}$ represents a linking moiety to an oxygen atom (in the case of (2-a) or (2-c)) or $r_2$ (in the case of (2-b)) in General Formula (1);

$R_{64}$ represents a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms;

X represents S, O, or $NR_{61}$, and preferably S or $NR_{61}$, while $R_{61}$ represents a hydrogen atom, an alkyl group having 1 to 18 carbon atoms, or an alkoxycarbonyl group having 2 to 19 carbon atoms; and $R_{71}$ to $R_{73}$ all represent a hydrogen atom, or $R_{71}$ to $R_{73}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

According to the preferred embodiment of the present invention as described above, as another example of the structure of —$B_1$—$Z_1$=$Z_2$—$B_2$ for the group A having an azomethine structure of the General Formula (1), the following structure may be mentioned.

[Chemical Formula 46]

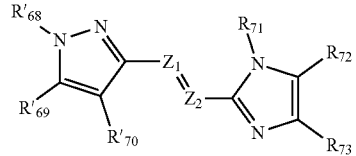

(Structural Example 8)

In the formula, $Z_1$ and $Z_2$ each represent N or CH, while $Z_1 \neq Z_2$;

$R'_{68}$ and $R'_{69}$ each independently represent a linking moiety to an oxygen atom (in the case of (2-a) or (2-c)) or $r_2$ (in the case of (2-b)) in General Formula (1), or a hydrogen atom, an alkyl group having 1 to 18 carbon atoms, or an alkoxycarbonyl group having 2 to 19 carbon atoms, while either $R'_{68}$ or $R'_{69}$ represents a linking moiety to an oxygen atom (in the case of (2-a) or (2-c)) or $r_2$ (in the case of (2-b)) in General Formula (1);

$R'_{70}$ represents a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms;

$R_{71}$ represents a hydrogen atom, an alkyl group having 1 to 18 carbon atoms, or an alkoxycarbonyl group having 2 to 19 carbon atoms; and $R_{72}$ and $R_{73}$ are both hydrogen atoms, or $R_{72}$ and $R_{73}$ each independently represent a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

Meanwhile, with regard to the polymer of the present invention, the structural unit represented by the General Formula (1) may be used singly or in combination of two or more kinds thereof.

Regarding specific examples of the structural unit represented by the General Formula (1), structural units shown in the following table may be mentioned. In addition, the values of the activation energy Ea for the photoisomerization from a cis-form to a trans-form of a compound including such a structural unit (compound in which a hydrogen atom is bonded instead of the oxygen atom bonded to A in the General Formula (1)) are shown.

TABLE 2

(Structural unit included in polymer)

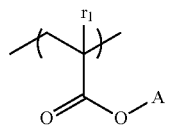

(Structure of group A having azomethine structure)

(2-a)

(2-b)

(2-c)

(Structure of B₁—Z₁=Z₂—B₂)

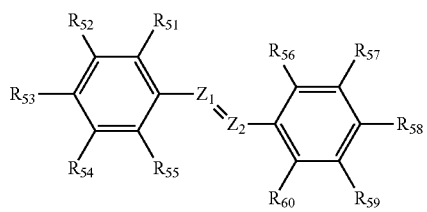

| Structural unit No. | $r_1$ | A | $r_2$ Carbon number | Position of substitution for $B_1$ | $Z_1$ | $Z_2$ | $R_{51}$ | $R_{52}$ | $R_{53}$ | $R_{54}$ | $R_{55}$ | $R_{56}$ | $R_{57}$ | $R_{58}$ | $R_{59}$ | $R_{60}$ | Ea (kJ/mol) |
|---|---|---|---|---|---|---|---|---|---|---|---|---|---|---|---|---|---|
| 1 | H | (2-c) | 6 | $R_{53}$ | N | CH | H | H | — | H | H | H | H | $OC_6H_{13}$ | H | H | 62.83 |
| 2 | H | (2-c) | 6 | $R_{53}$ | N | CH | H | H | — | H | H | H | $CH_3$ | $OC_6H_{13}$ | H | H | 63.08 |
| 3 | H | (2-c) | 6 | $R_{53}$ | N | CH | H | H | — | H | H | H | H | $N(C_2H_5)_2$ | H | H | 71.21 |
| 4 | H | (2-c) | 6 | $R_{53}$ | N | CH | H | $CH_3$ | — | H | H | H | H | $N(C_2H_5)_2$ | H | H | 71.22 |

(Structure of B₁—Z₁=Z₂—B₂)

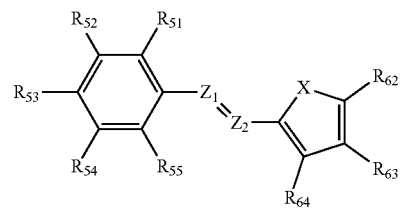

| Structural unit No. | $r_1$ | A | $r_2$ Carbon number | Position of substitution for $B_1$ | $Z_1$ | $Z_2$ | $R_{51}$ | $R_{52}$ | $R_{53}$ | $R_{54}$ | $R_{55}$ | X | $R_{61}$ | $R_{62}$ | $R_{63}$ | $R_{64}$ | Ea (kJ/mol) |
|---|---|---|---|---|---|---|---|---|---|---|---|---|---|---|---|---|---|
| 5 | H | (2-c) | 6 | $R_{53}$ | N | CH | H | H | — | H | H | O | — | H | H | H | 73.87 |
| 6 | H | (2-c) | 6 | $R_{53}$ | N | CH | H | H | — | H | H | S | — | $CH_3$ | H | H | 68.99 |
| 7 | H | (2-c) | 6 | $R_{53}$ | N | CH | H | H | — | H | H | S | — | $OCH_3$ | H | H | 69.28 |
| 8 | H | (2-c) | 6 | $R_{53}$ | N | CH | H | H | — | H | H | S | — | $N(CH_3)_2$ | H | H | 70.10 |
| 9 | H | (2-b) | 6 | $R_{53}$ | N | CH | H | H | — | H | H | S | — | H | H | H | 65.68 |
| 10 | H | (2-c) | 6 | $R_{53}$ | N | CH | H | H | — | H | H | $NR_{61}$ | $CH_3$ | H | H | H | 72.39 |
| 11 | H | (2-b) | 6 | $R_{53}$ | N | CH | H | H | — | H | H | $NR_{61}$ | $CH_3$ | H | H | H | 68.15 |
| 12 | H | (2-c) | 2 | $R_{53}$ | N | CH | H | H | — | H | H | $NR_{61}$ | H | $CH_3$ | H | H | 72.33 |
| 13 | H | (2-c) | 6 | $R_{53}$ | N | CH | H | H | — | H | H | $NR_{61}$ | H | H | H | H | 72.76 |
| 14 | H | (2-c) | 6 | $R_{52}$ | N | CH | H | — | H | H | H | S | — | $CH_3$ | H | H | 64.71 |

TABLE 2-continued (Structure of B₁—Z₁=Z₂—B₂)

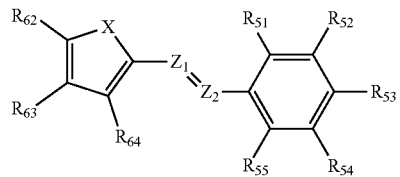

| Structural unit No. | $r_1$ | A | $r_2$ Carbon number | Position of substitution for $B_1$ | $Z_1$ | $Z_2$ | X | $R_{61}$ | $R_{62}$ | $R_{63}$ | $R_{64}$ | $R_{51}$ | $R_{52}$ | $R_{53}$ | $R_{54}$ | $R_{55}$ | Ea (kJ/mol) |
|---|---|---|---|---|---|---|---|---|---|---|---|---|---|---|---|---|---|
| 15 | H | (2-b) | 1 | $R_{62}$ | CH | N | S | — | — | H | H | H | H | $OC_6H_{13}$ | H | H | 68.99 |
| 16 | H | (2-b) | 2 | $R_{61}$ | CH | N | $NR_{61}$ | — | H | H | H | H | H | $OC_6H_{13}$ | H | H | 71.13 |

(Structure of B₁—Z₁=Z₂—B₂)

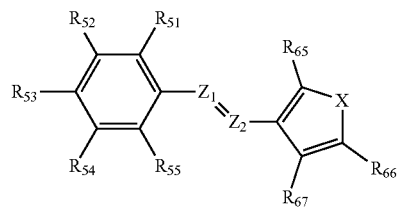

| Structural unit No. | $r_1$ | A | $r_2$ Carbon number | Position of substitution for $B_1$ | $Z_1$ | $Z_2$ | $R_{51}$ | $R_{52}$ | $R_{53}$ | $R_{54}$ | $R_{55}$ | X | $R_{61}$ | $R_{65}$ | $R_{66}$ | $R_{67}$ | Ea (kJ/mol) |
|---|---|---|---|---|---|---|---|---|---|---|---|---|---|---|---|---|---|
| 17 | H | (2-c) | 6 | $R_{53}$ | N | CH | H | H | — | H | H | $NR_{61}$ | $C_6H_{13}$ | H | H | H | 71.22 |
| 18 | H | (2-c) | 4 | $R_{53}$ | N | CH | H | H | — | H | H | $NR_{61}$ | H | H | H | H | 71.10 |
| 19 | $CH_3$ | (2-c) | 2 | $R_{53}$ | N | CH | H | H | — | H | H | $NR_{61}$ | $CH_3$ | H | H | H | 71.16 |
| 20 | H | (2-c) | 6 | $R_{53}$ | N | CH | H | H | — | H | H | $NR_{61}$ | H | H | H | H | 71.12 |

(Structure of B₁—Z₁=Z₂—B₂)

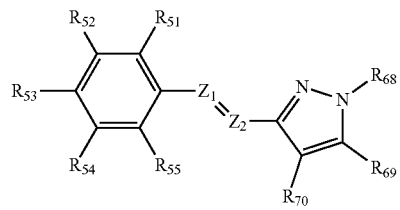

| Structural unit No. | $r_1$ | A | $r_2$ Carbon number | Position of substitution for $B_1$ | $Z_1$ | $Z_2$ | $R_{51}$ | $R_{52}$ | $R_{53}$ | $R_{54}$ | $R_{55}$ | $R_{68}$ | $R_{69}$ | $R_{70}$ | Ea (kJ/mol) |
|---|---|---|---|---|---|---|---|---|---|---|---|---|---|---|---|
| 21 | H | (2-c) | 6 | $R_{53}$ | N | CH | $CH_3$ | H | — | H | H | H | H | H | 72.32 |
| 22 | $CH_3$ | (2-b) | 6 | $R_{53}$ | N | CH | H | H | — | H | H | H | H | H | 67.58 |
| 23 | H | (2-b) | 6 | $R_{53}$ | CH | N | H | H | — | H | H | $CH_3$ | H | H | 65.33 |

(Structure of B₁—Z₁=Z₂—B₂)

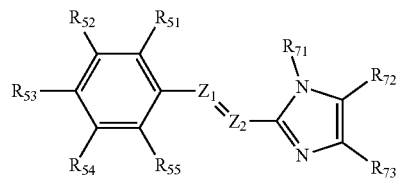

| Structural unit No. | $r_1$ | A | $r_2$ Carbon number | Position of substitution for $B_1$ | $Z_1$ | $Z_2$ | $R_{51}$ | $R_{52}$ | $R_{53}$ | $R_{54}$ | $R_{55}$ | $R_{71}$ | $R_{72}$ | $R_{73}$ | Ea (kJ/mol) |
|---|---|---|---|---|---|---|---|---|---|---|---|---|---|---|---|
| 24 | H | (2-c) | 8 | $R_{53}$ | N | CH | H | H | — | H | H | H | H | H | 71.95 |
| 25 | H | (2-c) | 6 | $R_{53}$ | N | CH | H | H | — | H | H | H | $C_2H_5$ | H | 73.06 |
| 26 | H | (2-c) | 6 | $R_{53}$ | CH | N | H | CH | — | H | H | H | H | H | 71.64 |

TABLE 2-continued (Structure of $B_1—Z_1=Z_2—B_2$)

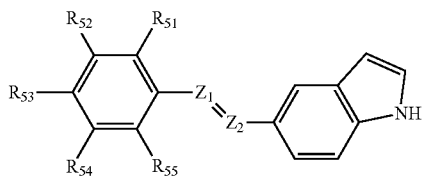

1

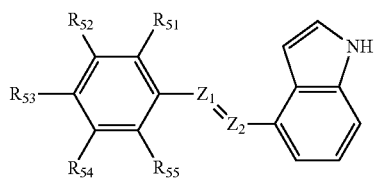

2

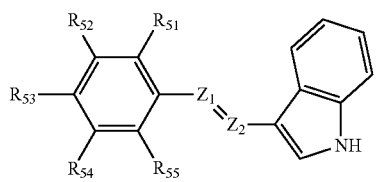

3

| Structural unit No. | $r_1$ | A | $r_2$ Carbon number | Position of substitution for $B_1$ | $Z_1$ | $Z_2$ | $B_1$ $R_{51}$ | $R_{52}$ | $R_{53}$ | $R_{54}$ | $R_{55}$ | $B_2$ | Ea (kJ/mol) |
|---|---|---|---|---|---|---|---|---|---|---|---|---|---|
| 27 | H | (2-c) | 6 | $R_{53}$ | N | CH | H | $CH_3$ | — | H | H | 2 | 64.41 |
| 28 | H | (2-c) | 6 | $R_{53}$ | N | CH | H | $CH_3$ | — | H | H | 3 | 74.61 |
| 29 | H | (2-c) | 6 | $R_{53}$ | CH | N | H | H | — | H | H | 1 | 63.44 |

(Structure of $B_1—Z_1=Z_2—B_2$)

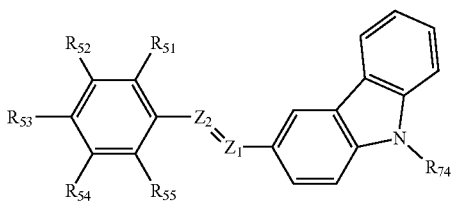

| Structural unit No. | $r_1$ | A | $r_2$ Carbon number | Position of substitution for $B_1$ | $Z_1$ | $Z_2$ | $B_2$ $R_{74}$ | $R_{51}$ | $R_{52}$ | $R_{53}$ | $R_{54}$ | $R_{55}$ | Ea (kJ/mol) |
|---|---|---|---|---|---|---|---|---|---|---|---|---|---|
| 30 | H | (2-b) | 6 | $R_{74}$ | CH | N | — | H | H | $N(C_2H_5)_2$ | H | H | 62.26 |

(Structure of $B_1—Z_1=Z_2—B_2$)

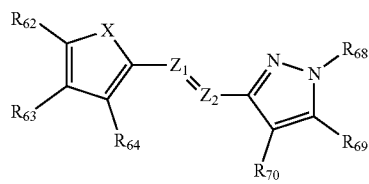

| Structural unit No. | $r_1$ | A | $r_2$ Carbon number | Position of substitution for $B_1$ | $Z_1$ | $Z_2$ | $B_1$ X | $R_{61}$ | $R_{62}$ | $R_{63}$ | $R_{64}$ | $B_2$ $R_{68}$ | $R_{69}$ | $R_{70}$ | Ea (kJ/mol) |
|---|---|---|---|---|---|---|---|---|---|---|---|---|---|---|---|
| 31 | H | (2-b) | 6 | $R_{62}$ | CH | N | S | — | — | H | H | $CH_3$ | H | H | 76.76 |
| 32 | H | (2-b) | 2 | $R_{61}$ | CH | N | $NR_{61}$ | — | H | H | H | $CH_3$ | H | H | 74.70 |

TABLE 2-continued (Structure of $B_1$—$Z_1$=$Z_2$—$B_2$)

[Structure diagram with substituted thiophene/furan ring connected via $Z_1$=$Z_2$ to an imidazole ring with $R_{62}$, $R_{63}$, $R_{64}$, X on left ring and $R_{71}$, $R_{72}$, $R_{73}$ on right ring]

| Structural unit No. | $r_1$ | A | $r_2$ Carbon number | Position of substitution for $B_1$ | $Z_1$ | $Z_2$ | $B_1$ X | $R_{61}$ | $R_{62}$ | $R_{63}$ | $R_{64}$ | $B_2$ $R_{71}$ | $R_{72}$ | $R_{73}$ | Ea (kJ/mol) |
|---|---|---|---|---|---|---|---|---|---|---|---|---|---|---|---|
| 33 | H | (2-b) | 6 | $R_{62}$ | N | CH | S | — | — | H | H | $CH_3$ | H | H | 66.42 |
| 34 | H | (2-b) | 2 | $R_{62}$ | CH | N | S | — | — | H | H | $OC_4H_9$ | H | H | 76.64 |

(Structure of $B_1$—$Z_1$=$Z_2$—$B_2$)

[Structure diagram with substituted thiophene/furan ring connected to an indole group]

| Structural unit No. | $r_1$ | A | $r_2$ Carbon number | Position of substitution for $B_1$ | $Z_1$ | $Z_2$ | $B_1$ X | $R_{61}$ | $R_{62}$ | $R_{63}$ | $R_{64}$ | Ea (kJ/mol) |
|---|---|---|---|---|---|---|---|---|---|---|---|---|
| 35 | H | (2-b) | 1 | $R_{62}$ | CH | N | $NR_{61}$ | H | — | H | H | 63.23 |

(Structure of $B_1$—$Z_1$=$Z_2$—$B_2$)

[Structure diagram with substituted pyrazole ring connected via $Z_1$=$Z_2$ to an imidazole ring]

| Structural unit No. | $r_1$ | A | $r_2$ Carbon number | Position of substitution for $B_1$ | $Z_1$ | $Z_2$ | $B_1$ $R'_{68}$ | $R'_{69}$ | $R'_{70}$ | $B_2$ $R_{71}$ | $R_{72}$ | $R_{73}$ | Ea (kJ/mol) |
|---|---|---|---|---|---|---|---|---|---|---|---|---|---|
| 36 | H | (2-b) | 1 | $R'_{68}$ | CH | N | — | H | H | $CH_3$ | H | H | 76.64 |

<Method for Preparing Azomethine Derivative Having Polymerizable Group>

The method for preparing an azomethine derivative having a polymerizable group is not particularly limited. For example, preparation can be carried out by first preparing a desired azomethine derivative and introducing a polymerizable group into the azomethine derivative thus obtained.

For example, in the case of preparing an azomethine derivative containing a thiophene ring, as a first stage, an aniline derivative is reacted with a thiophene carboxyaldehyde derivative as a compound having a thiophene ring. At this time, in a case in which any one of the aniline derivative or the thiophene carboxyaldehyde derivative as the raw material has an OH group as a substituent, a polymerizable group can be easily introduced into the position of the OH group.

For example, in the case of an azomethine derivative in which $Z_1$ of the General Formula (1) represents N; $Z_2$ represents CH; X represents S; $B_1$ represents a phenylene group, a polymerizable group being introduced into the para-position with respect to $Z_1$ in the phenylene group; and $B_2$ represents a 2-methylthienyl group and is bonded to $Z_2$ at the 5-position, an intermediate A can be obtained by the following reaction scheme.

Specifically, when 4-hydroxyaniline and 5-methylthiophene-2-carboxyaldehyde are treated (a reaction is carried out by heating to reflux in a solvent such as ethanol (EtOH) or methanol (MeOH), the reaction liquid is filtered, a powder thus obtained is washed with cold ethanol, and recrystallization from methanol/ethanol is carried out), a target substance can be obtained.

[Chemical Formula 47]

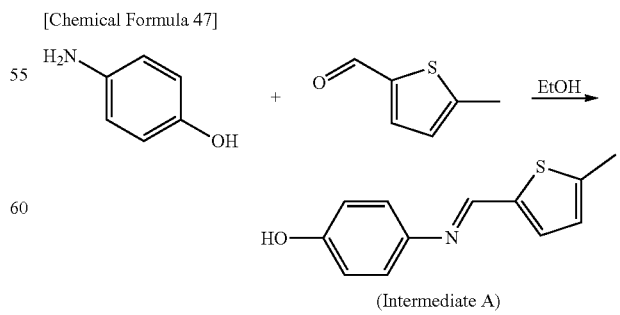

(Intermediate A)

Subsequently, as a second stage, a polymerizable group is introduced into the intermediate A. The method for introducing a polymerizable group is also not particularly limited. For example, in the case of introducing a linker part —$C_6H_{12}$— into the intermediate A, for example, Cl—$C_6H_{12}$—OH is caused to act as a halogenated alcohol compound, and the following intermediate B is obtained.

The reaction conditions are not particularly limited; however, for example, it is preferable that the reaction is carried out in a solvent such as dimethylformamide (DMF) in the presence of potassium carbonate and potassium iodide, at a temperature of preferably in the range of from 0° C. to 100° C., more preferably in the range of from 0° C. to 60° C., and even more preferably in the range of from 0° C. to 40° C.

[Chemical Formula 48]

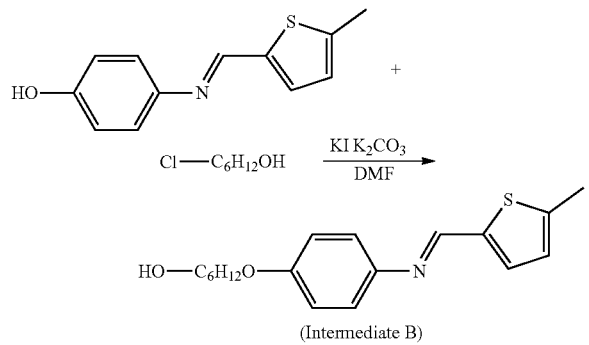

(Intermediate B)

Subsequently, as a third stage, a compound for constituting a polymerizable group, for example, an acrylic acid salt or a methacrylic acid salt, is reacted with the intermediate B. The reaction conditions are not particularly limited. For example, it is preferable that the reaction is carried out in a known organic solvent, in the presence of a tertiary amine such as triethylamine or triethanolamine. Preferably, while a mixed liquid including the intermediate B, a tertiary amine, and a solvent is maintained at 0° C. to 10° C., a compound for constituting a polymerizable group, such as an acrylic acid salt or a methacrylic acid salt, is added dropwise to this mixed liquid, and the mixture is mixed. Subsequently, the mixed liquid is reacted, for example, for about 5 to 10 hours at room temperature, and thereby an azomethine derivative having a polymerizable group can be obtained.

[Chemical Formula 49]

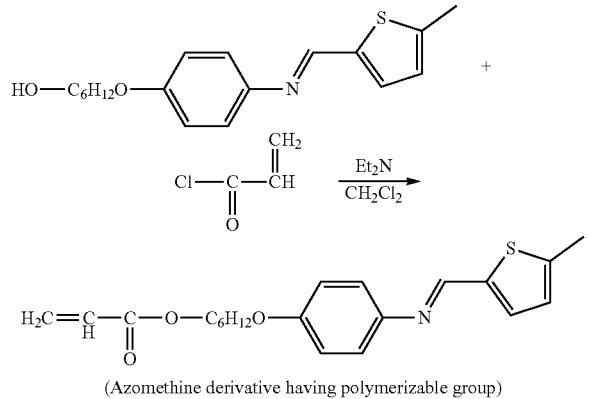

(Azomethine derivative having polymerizable group)

Meanwhile, by changing the raw materials to be used to other compounds in the first stage described above, an azomethine derivative having a desired substituent can be obtained. For example, when a benzaldehyde derivative is reacted with an aminothiophene derivative, an azomethine derivative in which $Z_1$ of the General Formula (1) represents CH; $Z_2$ represents N; $B_1$ represents a phenylene group; and $B_2$ represents a thienyl group, can be obtained. Furthermore, when another aromatic hydrocarbon compound or aromatic heterocyclic compound (carboxyaldehyde derivative) is used instead of the compound having a thiophene ring (thiophene carboxyaldehyde derivative) as a raw material, an azomethine derivative having a different structure of $B_2$ can be obtained. Similarly, when the aniline derivative as a raw material is changed to another aromatic hydrocarbon compound or aromatic heterocyclic compound having an amino group, an azomethine derivative having a different structure of $B_1$ can be obtained.

Furthermore, by changing the compounds to be added in the second stage and the third stage, groups having a polymerizable group, which have different structures, can be introduced. An ordinarily skilled person in the art can synthesize a desired azomethine derivative having a polymerizable group by appropriately performing the changes and selecting appropriate reaction conditions.

Furthermore, by appropriately selecting the raw materials to be used in the first stage, a polymerizable group can also be introduced into the intermediate A without carrying out the second stage.

<Structural Unit Other than Structural Unit Including Group Having Azomethine Structure>

The polymer of the present invention may also include a structural unit (other structural unit) other than the structural unit including a group having an azomethine structure having a polymerizable group as represented by the General Formula (1). In the case of a copolymer including other structural unit, the form of arrangement of the repeating units of the copolymer is also not particularly limited, and the copolymer may be any one of a random copolymer, a block copolymer, and an alternating copolymer.

Regarding the other structural unit described above, a structural unit that does not contain an azomethine group is preferred, and a structural unit constituting a thermoplastic resin that is softened by heating is more preferred.

Regarding the other structural unit, from the viewpoint that synthesis of a copolymer is easy, a structural unit having a vinyl-based polymerizable group is preferred. Specifically, for example, a styrene derivative, a (meth)acrylic acid derivative, an olefin derivative, a vinyl ester derivative, a vinyl ether derivative, a vinyl ketone derivative, and the like are used, and a structural unit derived from a styrene derivative, a (meth)acrylic acid derivative, or an olefin derivative is preferred.

Examples of the styrene derivative include styrene, o-methylstyrene, m-methylstyrene, p-methylstyrene, methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, and the like.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

Examples of the olefin derivative include ethylene, propylene, n-butylene, isobutylene, n-pentene, 3-methyl-1-pentene, and the like. The olefin derivatives may be linear or branched, and the number of carbon chains is also not particularly limited.

Examples of the vinyl ester derivative include vinyl propionate, vinyl acetate, vinyl benzoate, and the like. Examples of the vinyl ether derivative include vinyl methyl ether, vinyl ethyl ether, and the like. Examples of the vinyl ketone derivative include vinyl methyl ketone, vinyl ethyl ketone, vinyl hexyl ketone, and the like.

The content of the other structural unit in the polymer is not particularly limited and can be appropriately selected; however, the content is preferably 70% by mass or less, and more preferably 40% by mass or less, with respect to a total amount of 100% by mass of all the structural units that constitute the polymer.

The number average molecular weight Mn of the polymer of the present invention is not particularly limited; however, the number average molecular weight is preferably 3,500 or more, more preferably 3,500 to 100,000, even more preferably 3,500 to 70,000, still more preferably 3,500 to 50,000, and particularly preferably 5,000 to 50,000. When the number average molecular weight of the polymer is 3,500 or more, it is preferable because toughness is excellent, and a toner image having excellent fixability in the case of being used as a toner can be more easily obtained. Furthermore, when the number average molecular weight is 100,000 or less, it is preferable because the efficiency for isomerization and softening and melting is increased.

The number average molecular weight of the polymer of the present invention can be measured by gel permeation chromatography (GPC). Specifically, the number average molecular weight can be measured by the method described in the Examples that will be described below.

<Method for Preparing Polymer>

The method for synthesizing the polymer of the present invention is not particularly limited, and a method of polymerizing the above-mentioned azomethine derivative having a polymerizable group as a monomer can be used by using a known polymerization initiator, such as anionic polymerization, cationic polymerization, or living radical polymerization, can be used. If necessary, a known chain transfer agent may also be used.

Regarding the polymerization initiator, for example, an azo-based or diazo-based polymerization initiator or a peroxide-based polymerization initiator as disclosed below is used.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane, tris(t-butylperoxy) triazine, and the like.

Examples of the chain transfer agent include benzyl dithiobenzoate, 1-phenylethyl dithiobenzoate, 2-phenylpropy-2-yl dithiobenzoate, 1-acetoxyethyl dithiobenzoate, hexakis(thiobenzoylthiomethyl)benzene, 1,4-bis(thiobenzoylthiomethyl)benzene, 1,2,4,5-tetrakis(thibenzoylthiomethyl)benzene, 1,4-bis-(2-(thiobenzoylthio)prop-2-yl)benzene, 1-(4-methoxyphenyl)ethyl dithiobenzoate, benzyl dithioacetate, ethoxycarbonylmethyl dithioacetate, 2-(ethoxycarbonyl)prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl)prop-2-yl dithiobenzoate, 3- and 4-vinylbenzyl dithiobenzoate, S-benzyldiethoxyphosphinyl dithioformate, t-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate, and the like.

The polymerization temperature may vary depending on the type of the monomers or polymerization initiators to be used; however, the polymerization temperature is preferably 50° C. to 100° C., and more preferably 55° C. to 90° C. Furthermore, the polymerization time may vary depending on the type of the monomer or polymerization initiator to be used; however, for example, the polymerization time is preferably 2 to 60 hours.

Meanwhile, also for the copolymer including a structural unit other than the structural unit including the group having an azomethine structure as represented by the General Formula (1) (other structural unit), the preparation method for the copolymer is not particularly limited.

For example, in the case of preparing a random copolymer, in addition to the monomer for constituting the structural unit represented by General Formula (1) as a monomer that serves as a raw material, a monomer for constituting the other structural unit is mixed with a chain transfer agent, a polymerization initiator, and the like, a polymerization reaction is carried out, and thereby a desired copolymer can be obtained. Specific forms of the monomer constituting the other structural unit are as described above.

A preferred embodiment of the polymer of the present invention is a polymer represented by the following General Formula (5) (block copolymer).

[Chemical Formula 50]

General Formula (5)

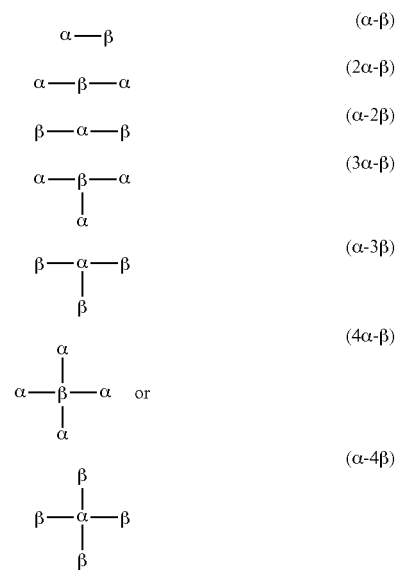

In the General Formula (5), α represents a polymer block including the structural unit represented by the General Formula (1); and β represents a polymer block that does not include an azomethine structure ($B_1$—$Z_1$=$Z_2$—$B_2$) in the General Formula (1).

As the polymer of the present invention is made into a high-molecular weight compound, the moiety having an azomethine structure absorbs light, and as the heat energy released in the process of light excitation and deactivation is transferred to the repeating units (structural units) to be bonded (photo-thermal conversion), melting or softening can proceed. Furthermore, it is speculated that when a block copolymer is formed, the moiety having an azomethine structure can easily form domains within the polymer and efficiently induces softening and melting. Therefore, the effects of the present invention can be obtained more noticeably.

Within the block copolymer structure described above, from the viewpoint of the ease of achieving softening and melting and the image strength at the time of being used as a toner, a block copolymer structure of α-β-α (also expressed as 2α-β) or β-α-β (also expressed as 2β-α) is preferred, and a block copolymer structure of α-β-α is more preferred.

Specific forms of the structural unit represented by the General Formula (1), which constitutes the polymer block α, are as described above.

A structural unit that constitutes the polymer block β does not include the azomethine structure ($B_1$—$Z_1$=$Z_2$—$B_2$) in the General Formula (1). Specifically, the form described as a structural unit other than the structural unit including the group having an azomethine structure as described above can be preferably used. Particularly, from the viewpoint of being applied to the synthesis of a block copolymer according to a living radical polymerization method such as an ATRP method, an ARGET-ATRP method, or an RAFT method, a structural unit having a vinyl-based polymerizable group is preferred. Specifically, for example, a styrene derivative, a (meth)acrylic acid derivative, an olefin derivative, a vinyl ester derivative, a vinyl ether derivative, a vinyl ketone derivative, or the like is used, and a styrene derivative, a (meth)acrylic acid derivative, or an olefin derivative is preferred. That is, the polymer block β is preferably a polymer block including at least one of structural units derived from a styrene derivative, a (meth)acrylic acid derivative, and an olefin derivative.

The number average molecular weight (number average molecular weight of the sum) of the polymer block α included in the polymer represented by the General Formula (5) is not particularly limited; however, the number average molecular weight is preferably 1,000 or more, more preferably 1,000 to 100,000, even more preferably 1,000 to 70,000, still more preferably 1,000 to 50,000, and particularly preferably 3,000 to 50,000. When the number average molecular weight of the sum of the polymer blocks α is 1,000 or more, it is preferable because a toner image having excellent fixability can be obtained more easily when used as a toner. Furthermore, when the number average molecular weight of the sum of the polymer blocks α is 100,000 or less, it is preferable because the efficiency of softening and melting is increased. Here, the number average molecular weight of the sum of the polymer blocks α refers, in a case in which the polymer represented by the General Formula (5) includes a single polymer block α, to the number average molecular weight of this polymer block α, and in a case in which the polymer includes a plurality of polymer blocks α, the number average molecular weight of the sum means the sum total of the number average molecular weights of the various polymer blocks α.

The number average molecular weight (number average molecular weight of the sum) of the polymer block β included in the polymer represented by the General Formula (5) is not particularly limited; however, the number average molecular weight is preferably 1,000 or more, more preferably 1,000 to 100,000, even more preferably 1,000 to 70,000, still more preferably 1,000 to 50,000, and particularly preferably 3,000 to 50,000. The number average molecular weight of the sum of the polymer blocks β is 1,000 or more, it is preferable because a toner image having excellent fixability can be obtained more easily when used as a toner. Furthermore, when the number average molecular weight of the sum of the polymer blocks β is 100,000 or less, it is preferable because the efficiency of softening and melting is increased. Here, the number average molecular weight of the sum of the polymer blocks β refers, in a case in which the polymer represented by the General Formula (5) includes a single polymer block β, to the number average molecular weight of this polymer block β, and in a case in which the polymer includes a plurality of polymer blocks β, the number average molecular weight of the sum means the sum total of the number average molecular weights of the various polymer blocks β.

Furthermore, the total number average molecular weight Mn of the polymer represented by the General Formula (5) is preferably 3,500 or more, more preferably 3,500 to 100,000, even more preferably 3,500 to 70,000, still more preferably 3,500 to 50,000, and particularly preferably 5,000 to 50,000. When the total number average molecular weight of the polymer represented by the General Formula (5) is 3,500 or more, it is preferable because a toner image having excellent fixability can be obtained more easily when used as a toner. Furthermore, when the total number average molecular weight is 100,000 or less, it is preferable because the efficiency of softening and melting is increased.

Therefore, according to a preferred embodiment of the present invention, the number average molecular weight of the sum of the polymer blocks α included in the polymer represented by the General Formula (5) is 1,000 or more, the number average molecular weight of the sum of the polymer blocks β is 1,000 or more, and the total number average molecular weight Mn of the polymer represented by the General Formula (5) is 3,500 or more.

With regard to the polymer represented by the General Formula (5), the ratio between the number average molecular weight of the sum of the polymer blocks α and the number average molecular weight of the sum of the polymer blocks β is not particularly limited; however, from the viewpoints of the ease of achieving softening and melting and the image strength, the ratio of the number average molecular weight of the sum of the polymer blocks α:the number average molecular weight of the sum of the polymer blocks β is preferably 1:20 to 20:1, and more preferably 1:15 to 15:1.

The total number average molecular weight of the polymer represented by the General Formula (5), and the number average molecular weights of the sums of the polymer blocks α and β can be measured by gel permeation chromatography (GPC). Specifically, the number average molecular weights can be measured by the method described in the Examples that will be described below.

The method for synthesizing a block copolymer represented by the General Formula (5) is not particularly limited, and any known method such as anionic polymerization, cationic polymerization, or living radical polymerization can be used. Above all, as a convenient synthesis method, a living radical polymerization method such as an atom transfer radical polymerization method (ATRP method), an ARGET-ATRP method, or an RAFT method can be suitably used.

To mention the ATRP method as an example, synthesis can be carried out by a method of employing a monofunctional, bifunctional, trifunctional, or tetrafunctional compound containing a halogen element as an initiator and as a starting material, polymerizing a monomer that becomes the structural unit of the polymer block α or β in the presence of a catalyst, and the like.

In the stage of polymerizing monomers, for example, a monomer that becomes a structural unit of either the polymer block α or the polymer block β (block that becomes a core portion of the block copolymer) is polymerized in the presence of an initiator, a catalyst, and a ligand, and thus a macroinitiator is produced.

Examples of the initiator include butyl 2-bromoisobutyrate, ethyl 2-bromoisobutyrate, ethylene bis(2-bromoisobutyrate), 1,1,1-tris(2-bromoisobutyryloxymethyl) ethane, pentaerythritol tetrakis(2-bromoisobutyrate), α,α'-dibromo-p-xylene, ethyl bromoacetate, 2-bromoisobutyryl bromide, mixtures of these, or the like; however, the examples are not limited to these.

Regarding the catalyst, copper(I) catalysts, iron(II) catalysts, and the like are available, and examples include Cu(I)Cl, Cu(I)Br, Fe(II)Cl, Fe(II)Br, mixtures of these, and the like.

Regarding the ligand, any known ligand can be used; however, one or more kinds selected from the group consisting of 2,2'-bipyridyl, 4,4'-dimethyl-2,2'-bipyridyl, 4,4'-di-t-butyl-2,2'-bipyridyl, 1,1,4,7,10,10-hexamethyltriethylenetetramine, N,N,N',N'',N''-pentamethyldiethylenetriamine, cyclam(1,4,8,11-tetraazacyclotetradecane), 1,4,8,11-tetramethylcyclam(1,4,8,11-tetramethyl-1,4,8,11-tetraazacyclotetradecane), tris [2-(dimethylamino)ethyl]amine, and the like are preferred.

The amounts of use of the catalyst and the ligand are not particularly limited and can be appropriately determined by referring to conventionally known information.

Next, the macroinitiator thus obtained by polymerization as described above is isolated and used as an initiator, and polymerization of a monomer that is not used for the synthesis of the macroinitiator among the monomers that become the structural unit of the polymer block α or β is carried out again in the presence of a catalyst and a ligand. Alternatively, in a stage in which the monomer has been almost entirely consumed in the synthesis of the macroinitiator, a monomer that has not been used for the synthesis of the macroinitiator may be added, without isolating the macroinitiator, and polymerization may be continued. Through these operations, an intended block copolymer can be obtained.

It is preferable that the respective reactions described above are carried out in an inert atmosphere of nitrogen, a noble gas such as argon, or the like. The respective reactions described above can be carried out, for example, at a temperature of 25° C. to 160° C., and preferably 35° C. to 130° C. Furthermore, the respective reactions described above may be carried out without using a solvent or in a solvent such as an organic solvent.

Meanwhile, in a reaction for obtaining a macroinitiator by polymerizing a monomer that becomes the structural unit of either the polymer block α or the polymer block β, and a reaction for obtaining a block copolymer by reacting the macroinitiator with a monomer that becomes the structural unit of the other polymer block, the type or the amount of use of the catalyst or ligand to be used, and the conditions such as the temperature at the time of reaction may be identical or different.

<Fluidization by Light Irradiation and Reversible Non-Fluidization>

The wavelength of the light to be irradiated when the polymer of the present invention is fluidized by light irradiation is preferably in the range of from 280 nm to 480 nm, more preferably in the range of from 300 nm to 420 nm, and even more preferably in the range of from 330 nm to 420 nm. When the wavelength is in the above-described range, crystals are susceptible to destruction (photo-meltability is good), and fixability is improved. Furthermore, in fluidization, fluidization may be promoted by applying heat and pressure in addition to light irradiation. By irradiating with irradiation light having the above-described wavelength, even in a case in which heat or pressure is applied, fluidization can be achieved with further less heat or pressure. Therefore, by introducing the polymer of the present invention into a toner, fixation at the wavelength is enabled, and a toner having excellent fixability and high color reproducibility can be obtained.

Meanwhile, in the wavelength range described above, a portion of visible light is included. Therefore, it is desirable that the polymer of the present invention is not fluidized only by receiving solar light (natural light) or light produced by illuminations such as fluorescent lamps, but is fluidized by employing low cost conditions in which the amount of irradiation and the irradiation time are suppressed as much as possible. From such a viewpoint, regarding the irradiation conditions for the irradiated light when the polymer is fluidized, the amount of irradiation is preferably in the range of from 0.1 J/cm$^2$ to 200 J/cm$^2$, more preferably in the range of from 0.1 J/cm$^2$ to 100 J/cm$^2$, and even more preferably in the range of from 0.1 J/cm$^2$ to 50 J/cm$^2$.

On the other hand, the conditions for non-fluidizing (re-solidifying) the polymer of the present invention preferably involve leaving the polymer to stand at room temperature (in the range of 25° C.±15° C.) (in a natural environment). At this time, it is desirable to leave the compound in the dark; however, the compound may receive visible light such as natural light or fluorescent light. It is more preferable to apply heat in the process of non-fluidizing the polymer. It is also acceptable to apply light.

In the case of non-fluidizing the polymer by heating, the heating temperature is preferably in the range of from 0° C. to 200° C., and more preferably in the range of from 20° C. to 150° C.

[Configuration of Toner]

An embodiment of the present invention is a toner containing the polymer (high-molecular weight compound) of the present invention. By introducing the polymer (high-molecular weight compound) into a toner, a toner that can be fixed by light irradiation, has high color reproducibility, and has excellent fixability (fixing strength), can be obtained. Meanwhile, a toner refers to toner base particles or aggregates of toner particles. Toner particles are preferably particles obtained by adding an external additive to toner base particles; however, toner base particles can also be used directly as toner particles. Meanwhile, according to the present invention, in a case in which it is not particularly necessary to distinguish between the toner base particles, the toner particles, and the toner, simply the term "toner" is used.

The toner of the present embodiment may also contain conventionally known components that are used in toners, such as a binder resin, a colorant, and a release agent, in addition to the polymer (high-molecular weight compound) of the present invention. The content of the polymer (high-molecular weight compound) in the toner is not particularly limited.

The content of the polymer including a structural unit derived from the azomethine derivative according to the first embodiment of the present invention may vary depending on the type of the azomethine derivative or other structural units; however, from the viewpoints of efficient fluidization and image strength, the content is preferably in the range of 5% to 90% by mass with respect to the total amount of the binder resin, colorant, release agent, and the polymer of the present invention, which constitute the toner.

The content of the high-molecular weight compound according to the second embodiment of the present invention in the toner may vary depending on the block structure of the block copolymer and the type of the azomethine derivative or the structural unit that constitutes the polymer block B; however, from the viewpoints of efficient fluidization and image strength, the content is preferably in the range of 5% to 90% by mass with respect to the total amount of the binder resin, colorant, release agent, and the high-molecular weight compound of the present invention, which constitute the toner.

The content of the polymer according to the third embodiment of the present invention in the toner may vary depending on the type of the azomethine structure ($B_1$—$Z_1$=$Z_2$—$B_2$) according to the General Formula (1) or other structural units; however, from the viewpoints of efficient fluidization and image strength, the content is, for example, in the range of 5% to 95% by mass with respect to the total amount of the binder resin, colorant, release agent, and the polymer of the present invention, which constitute the toner.

<Binder Resin>

The toner of the present invention may further contain a binder resin. Regarding the binder resin, any resin that is generally used as a binder resin constituting a toner, the resin being a resin that does not have a structure derived from an azomethine derivative (for the toner that uses the polymer of the third embodiment, a resin that does not include an azomethine structure ($B_1$—$Z_1$=$Z_2$—$B_2$)), can be used without limitations. Regarding the binder resin, for example, a styrene resin, an acrylic resin, a styrene-acrylic resin, a polyester resin, a silicone resin, an olefin resin, an amide resin, an epoxy resin, and the like can be used. These binder resins can be used singly or in combination of two or more kinds thereof.

Among these, from the viewpoint of having low viscosity when melted, and having high sharp-meltability, it is preferable that the binder resin includes at least one selected from the group consisting of a styrene resin, an acrylic resin, a styrene-acrylic resin, and a polyester resin; and it is more preferable that the binder resin includes at least one selected from the group consisting of a styrene-acrylic resin and a polyester resin.

(Styrene-Acrylic Resin)

The styrene-acrylic resin as used in the present invention is a polymer that includes at least a structural unit derived from a styrene monomer and a structural unit derived from a (meth)acrylic acid ester monomer. Here, the styrene monomer includes styrene represented by the structural formula of $CH_2$=CH—$C_6H_5$, as well as a monomer having a structure having a known side chain or functional group in the styrene structure.

Examples of the styrene monomer include those similar to the styrene monomers that can constitute the polymer (high-molecular weight compound) mentioned above.

Furthermore, a (meth)acrylic acid ester monomer is a monomer having a functional group having an ester bond in a side chain Specifically, a vinyl-based ester compound such as an acrylic acid ester monomer represented by $CH_2$=CHCOOR (wherein R represents an alkyl group), as well as a methacrylic acid ester monomer represented by $CH_2$=C($CH_3$)COOR (wherein R represents an alkyl group) are included. Meanwhile, the (meth)acrylic acid in connection with the (meth)acrylic acid ester monomer means acrylic acid and methacrylic acid.

Examples of the (meth)acrylic acid ester monomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

The styrene monomers and (meth)acrylic acid ester monomers may be each used singly or in combination of two or more kinds thereof.

The contents of the structural unit derived from a styrene monomer and the structural unit derived from a (meth) acrylic acid ester monomer in the styrene-acrylic resin are not particularly limited and can be appropriately adjusted from the viewpoint of controlling the softening point or the glass transition temperature of the binder resin. Specifically, the content of the structural unit derived from a styrene monomer is preferably 40% to 95% by mass, and more preferably 50% to 90% by mass, with respect to the total structural units which constitute the styrene-acrylic resin. Furthermore, the content of the structural unit derived from a (meth)acrylic acid ester monomer is preferably 5% to 60% by mass, and more preferably 10% to 50% by mass, with respect to the total structural units which constitute the styrene-acrylic resin.

If necessary, the styrene-acrylic resin may include a structural unit derived from other monomer other than a styrene monomer and (meth)acrylic acid ester monomer. Examples of the other monomer include a vinyl monomer. Examples of the vinyl monomer that can be used in combination when the styrene-acrylic copolymer as used in the present invention is formed will be given below; however, the vinyl monomers that can be used in combination are not limited to those shown below.

(1) Olefins

Ethylene, propylene, isobutylene, and the like.

(2) Vinyl Esters

Vinyl propionate, vinyl acetate, vinyl benzoate, and the like.

(3) Vinyl Ethers

Vinyl methyl ether, vinyl ethyl ether, and the like.

(4) Vinyl Ketones

Vinyl methyl ketone, vinyl ethyl ketone, vinyl hexyl ketone, and the like.

(5) N-Vinyl Compounds

N-vinylcarbazole, N-vinylindole, N-vinylpyrrolidone, and the like.

(6) Others

Vinyl compounds such as vinylnaphthalene and vinylpyridine; acrylic acid or methacrylic acid derivatives such as acrylonitrile, methacrylonitrile, and acrylamide; and the like.

Furthermore, it is possible to produce a resin having a crosslinked structure using a polyfunctional vinyl monomer. In addition, it is also possible to use a vinyl monomer having an ionically dissociative group in a side chain. Specific examples of the ionic dissociation group include, for example, a carboxyl group, a sulfonic acid group, a phosphoric acid group, and the like. Specific examples of these vinyl monomers having ionically dissociative groups will be shown below.

Specific examples of the vinyl monomer having a carboxyl group include, for example, acrylic acid, methacrylic acid, maleic acid, itaconic acid, cinnamic acid, fumaric acid, maleic acid monoalkyl ester, and itaconic acid monoalkyl ester, and the like.

In the case of forming a styrene-acrylic resin, the contents of the styrene monomer and the (meth)acrylic acid ester monomer are not particularly limited and can be appropriately adjusted from the viewpoint of controlling the softening point temperature or the glass transition temperature of the binder resin. Specifically, the content of the styrene monomer is preferably 40% to 95% by mass, and more preferably 50% to 90% by mass, with respect to the total amount of the monomers constituting the styrene-acrylic resin. Furthermore, the content of the (meth)acrylic acid ester monomer is preferably 5% to 60% by mass, and more preferably 10% to 50% by mass, with respect to the total amount of the monomers constituting the styrene-acrylic resin.

The method for forming a styrene-acrylic resin is not particularly limited, and a method of polymerizing monomers using a known oil-soluble or water-soluble polymerization initiator may be mentioned. If necessary, a known chain transfer agent such as n-octylmercaptan may also be used. Regarding an oil-soluble polymerization initiator, for example, an azo-based or diazo-based polymerization initiator or a peroxide-based polymerization initiator as disclosed below is used.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, tris(t-butylperoxy) triazine, and the like.

Furthermore, in the case of forming styrene-acrylic resin particles by an emulsion polymerization method, a water-soluble radical polymerization initiator can be used. Examples of the water-soluble radical polymerization initiator include persulfuric acid salts such as potassium persulfate and ammonium persulfate; azobisaminodipropane acetate, azobiscyanovaleric acid and salts thereof, hydrogen peroxide, and the like.

The polymerization temperature may vary depending on the type of the monomers or polymerization initiators to be used; however, the polymerization temperature is preferably 50° C. to 100° C., and more preferably 55° C. to 90° C. Furthermore, the polymerization time may vary depending on the type of the monomer or polymerization initiator to be used; however, for example, the polymerization time is preferably 2 to 12 hours.

The styrene-acrylic resin particles to be formed by an emulsion polymerization method can be configured to have two or more layers formed from resins of different compositions. Regarding the production method in this case, a multistage polymerization method of adding a polymerization initiator and a polymerizable monomer into a dispersion of resin particles that have been prepared by an emulsion polymerization treatment (first stage polymerization) according to a conventional method, and subjecting this system to a polymerization treatment (second stage and third stage polymerization) can be employed.

(Polyester Resin)

The polyester resin is a polyester resin obtainable by a polycondensation reaction between a divalent or higher-valent carboxylic acid (polyvalent carboxylic acid component) and a dihydric or higher-hydric alcohol (polyhydric alcohol component). Meanwhile, the polyester resin may be amorphous or may be crystalline.

The valences of the polyvalent carboxylic acid component and the polyhydric alcohol component are preferably respectively 2 to 3, and more preferably respectively 2. That is, it is preferable that the polyvalent carboxylic acid component includes a dicarboxylic acid component, and it is preferable that the polyhydric alcohol component includes a dialcohol component.

Examples of the dicarboxylic acid component include saturated aliphatic dicarboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid; unsaturated aliphatic dicarboxylic acids such as methylenesuccinic acid, fumaric acid, maleic acid, 3-hexenedioic acid, 3-octenedioic acid, and dodecenylsuccinic acid; and unsaturated aromatic dicarboxylic acids such as phthalic acid, terephthalic acid, isophthalic acid, t-butylisophthalic acid, tetrachlorophthalic acid, chlorophthalic acid, nitrophthalic acid, p-phenylene-2-acetic acid, 2,6-naphthalenedicarboxylic acid, 4,4'-biphenyldicarboxylic acid, anthracenedicarboxylic acid, and the like, and lower alkyl esters or acid anhydrides of these can also be used. The dicarboxylic acid components may be used singly or as mixtures of two or more kinds thereof.

In addition to those, polyvalent carboxylic acids having a valence of 3 or higher, such as trimellitic acid and pyromellitic acid; anhydrides thereof, alkyl esters having 1 to 3 carbon atoms of the acids, and the like can also be used.

Examples of the diol component include saturated aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosanediol, and neopentyl glycol; unsaturated aliphatic diols such as 2-butene-1,4-diol, 3-butene-1,4-diol, 2-butyene-1,4-diol, 3-butyne-1,4-diol, and 9-octadecene-7,12-diol; aromatic diols such as bisphenols such as bisphenol A and bisphenol F, and alkylene oxide adducts of bisphenols, such as ethylene oxide adducts and propylene oxide adducts of these bisphenols. Furthermore, derivatives of these can also be used. The diol components may be used singly or as mixtures of two or more kinds thereof.

The method for producing a polyester resin is not particularly limited, and a polyester resin can be produced by utilizing a known esterification catalyst and polycondensing (esterifying) the above-mentioned polyvalent carboxylic acid component and the polyhydric alcohol component.

Examples of a catalyst that can be used at the time of producing a polyester resin include alkali metal compounds of sodium, lithium, and the like; compounds containing Group 2 elements such as magnesium and calcium; compounds of metals such as aluminum, zinc, manganese, antimony, titanium, tin, zirconium, and germanium; phosphorous acid compounds; phosphoric acid compounds; amine compounds; and the like. Specifically, examples of tin compounds include dibutyltin oxide, tin octoate, tin dioctoate, salts thereof, and the like. Examples of titanium compounds include a titanium alkoxide such as tetra-normal-butyl titanate (Ti(O-n-Bu)$_4$), tetraisopropyl titanate, tetramethyl titanate, or tetrastearyl titanate; a titanium acylate such as polyhydroxy titanium stearate; a titanium chelate such as titanium tetraacetylacetonate, titanium lactate, or titanium triethanolaminate; and the like. Examples of germanium compounds include germanium dioxide and the like. Furthermore, examples of aluminum compounds include polyaluminum hydroxide, aluminum alkoxide, tributyl aluminate, and the like. These may be used singly or in combination of two or more kinds thereof.

The polymerization temperature is not particularly limited; however, the polymerization temperature is preferably 70° C. to 250° C. Furthermore, the polymerization time is also not particularly limited; however, the polymerization time is preferably 0.5 to 10 hours. During polymerization, the pressure inside the reaction system may be reduced as necessary.

In a case in which the toner of the present invention contains a binder resin in addition to the polymer (high-molecular weight compound) of the present invention, the content ratio between the polymer and the binder resin is not particularly limited.

The glass transition temperature (Tg) of the toner is preferably 25° C. to 100° C., and more preferably 30° C. to 80° C., from the viewpoint of fixability, heat-resistant storability, and the like. In the first embodiment and the third embodiment, the glass transition temperature (Tg) of the toner can be adjusted by means of the molecular weight of the polymer, and in a case in which the polymer includes a structural unit other than the structural unit derived from an azomethine derivative (structural unit containing a group having an azomethine structure), the type, content, and the like of the structural unit. In the second embodiment, the glass transition temperature (Tg) of the toner can be adjusted by means of the content ratio between the polymer block A and the polymer B in the high-molecular weight compound of the General Formula (1), the type of the resin that constitutes the polymer block B, the block copolymer structure, the molecular weight, and the like. Similarly, in a case in which a block copolymer is employed in the third embodiment, the glass transition temperature can also be adjusted by means of the content ratio of the various polymer blocks or the block copolymer structure. In a case in which the toner contains a binder resin, the glass transition temperature can be further adjusted by means of the content ratio between the polymer (high-molecular weight compound) and the binder resin, the type and the molecular weight of the binder resin, and the like.

Meanwhile, the toner of the present invention may be particles having a single layer structure or may be particles having a core-shell structure. The types of the binder resins used in the core particles and the shell portion of the core-shell structure are not particularly limited.

<Colorant>

The toner of the present invention may further contain a colorant, and it is preferable that the toner contain a colorant. Since the polymer (high-molecular weight compound) of the present invention does not undergo noticeable coloration, a toner in which the colorant has high color reproducibility can be obtained. Regarding the colorant, generally known dyes and pigments can be used.

Particularly, it is speculated that the polymer according to the first embodiment of the present invention and the high-molecular weight compound according to the second embodiment are colorless and can induce a reversible fluidization and non-fluidization phenomenon concomitantly with isomerization. Therefore, by introducing a desired colorant into the toner together with the above-described polymer (high-molecular weight compound), a toner that can be fixed by light irradiation and exhibits high color reproducibility of the colorant added can be obtained.

Examples of the colorant for obtaining a black toner include carbon black, a magnetic body, iron-titanium composite oxide black, and the like, and examples of the carbon black include channel black, furnace black, acetylene black, thermal black, and lamp black. Furthermore, examples of the magnetic body include ferrite, magnetite, and the like.

Examples of a colorant for obtaining a yellow toner include dyes such as C.I. Solvent Yellow 19, C.I. Solvent Yellow 44, C.I. Solvent Yellow 77, C.I. Solvent Yellow 79, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, and C.I. Solvent Yellow 162; and pigments such as C.I. Pigment Yellow 14, C.I. Pigment Yellow 17, C.I. Pigment Yellow 74, C.I. Pigment Yellow 93, C.I. Pigment Yellow 94, C.I. Pigment Yellow 138, C.I. Pigment Yellow 155, C.I. Pigment Yellow 180, and C.I. Pigment Yellow 185.

Examples of a colorant for obtaining a magenta toner include dyes such as C.I. Solvent Red 1, C.I. Solvent Red 49, C.I. Solvent Red 52, C.I. Solvent Red 58, C.I. Solvent Red 63, C.I. Solvent Red 111, and C.I. Solvent Red 122; and pigments such as C.I. Pigment Red 5, C.I. Pigment Red 48:1, C.I. Pigment Red 53:1, C.I. Pigment Red 57:1, C.I. Pigment Red 122, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of the colorant for obtaining a cyan toner include dyes such as C.I. Solvent Blue 25, C.I. Solvent Blue 36, C.I. Solvent Blue 60, C.I. Solvent Blue 70, C.I. Solvent Blue 93, and C.I. Solvent Blue 95; and pigments such as C.I. Pigment Blue 1, C.I. Pigment Blue 7, C.I. Pigment Blue 15, C.I. Pigment Blue 15:3, C.I. Pigment Blue 60, C.I. Pigment Blue 62, C.I. Pigment Blue 66, and C.I. Pigment Blue 76.

The colorants for obtaining various color toners can be used singly or in combination of two or more kinds thereof for each color.

The content of the colorant is preferably 0.5% to 20% by mass, and more preferably 2% to 10% by mass, in the toner particles (toner base particles) before the addition of an external additive.

<Release Agent>

The toner according to the present invention may further contain a release agent. By introducing a release agent into the toner, in the case of performing thermal fixing together with light irradiation, a toner having superior fixability and high color reproducibility can be obtained.

The release agent to be used is not particularly limited, and various known waxes can be used. Examples of the wax include polyolefins such as low-molecular weight polypropylene and polyethylene, or oxidized type low-molecular weight polypropylene and polyethylene; paraffin wax, a synthetic ester wax, and the like. Above all, from the viewpoint of enhancing the storage stability of the toner, it is preferable to use paraffin wax.

The content of the release agent is preferably 1% to 30% by mass, and more preferably 3% to 15% by mass, in the toner base particles.

<Charge Control Agent>

The toner according to the present invention may contain a charge control agent. The charge control agent to be used is not particularly limited as long as it is a substance that can give positive or negative charge as a result of frictional charging and is colorless, and various known positive charge type charge control agents and negative charge type charge control agents can be used.

The content of the charge control agent is preferably 0.01% to 30% by mass, and more preferably 0.1% to 10% by mass, in the toner particles (toner base particles) before the addition of an external additive.

<External Additives>

In order to improve the fluidity, chargeability, cleaning properties, and the like of the toner, the toner according to the present invention may be configured by adding external additives such as a fluidizing agent and a cleaning aid, which are so-called post-treatment agents, to the toner base particles.

Examples of the external additives include inorganic particles, such as inorganic oxide particles such as silica particles, alumina particles, and titanium oxide particles; inorganic stearic acid compound particles such as aluminum stearate particles and zinc stearate particles; and inorganic titanic acid compound particles such as strontium titanate particles and zinc titanate particles. If necessary, these inorganic particles may be subjected to hydrophobization treatment. These can be used singly or in combination of two or more kinds thereof.

Among these, regarding the external additives, for example, sol-gel silica particles, silica particles having hydrophobization-treated surface (hydrophobic silica particles), or titanium oxide particles having hydrophobization-treated surface (hydrophobic titanium oxide particles) are preferred, and among these, it is more preferable to use at least two or more kinds of external additives.

The number average primary particle size of the external additive is preferably in the range of 1 to 200 nm, and more preferably 10 to 180 nm.

The amount of addition of these external additives is preferably 0.05% to 5% by mass, and more preferably 0.1% to 3% by mass, in the toner.

With regard to a toner using the polymer according to the third embodiment, the amount of addition of the external additives may be 0.05% to 5% by mass, and particularly 0.1% to 3% by mass, with respect to 100% by mass of the toner base particles.

<Average Particle Size of Toner>

The average particle size of the toner is preferably 4 to 20 µm, and more preferably 5 to 15 µm, as a volume-based median diameter (D50). When the volume-based median diameter (D50) is in the range described above, the transfer efficiency is increased, the half-tone image quality is enhanced, and the image quality of fine lines, dots, and the like is enhanced.

Meanwhile, it is preferable that the average particle size of the toner base particles is also in the range described above.

The volume-based median diameter (D50) of the toner (or toner base particles) can be measured and calculated using a measuring apparatus in which a computer system mounted with a software program for data processing "SOFTWARE V3.51" (manufactured by Beckman Coulter, Inc.) is connected to "COULTER COUNTER 3" (manufactured by Beckman Coulter, Inc.).

Specifically, 0.02 g of a measurement sample (toner or toner base particles) is added to 20 mL of a surfactant solution (a surfactant solution obtained by diluting, for example, a neutral detergent including a surfactant component ten times with pure water for the purpose of dispersing toner particles), subsequently the mixture is mixed thoroughly and evenly, subsequently ultrasonic dispersing is performed for one minute, and thus a toner dispersion (or dispersion of toner base particles) is prepared. This toner dispersion (or dispersion of toner base particles) is introduced into a beaker containing "ISOTON II" (manufactured by Beckman Coulter, Inc.) in a sample stand with a pipette until the indicated concentration of the measuring apparatus reaches 8%.

Here, by adjusting to this concentration range, measured values that are reproducible can be obtained. Then, for the measuring apparatus, the measurement particle count is set to 25,000, and the aperture diameter to 50 µm, and the frequency values for a measurement range of 1 to 30 µm partitioned into 256 segments are calculated. The particle size of 50% from the larger portions of the volume cumulative fraction is designated as the volume-based median diameter (D50).

[Method for Producing Toner]

The method for producing the toner of the present invention is not particularly limited. For example, in a case in which a toner is produced only with the polymer (high-molecular weight compound) of the present invention, a production method including pulverizing the polymer (high-molecular weight compound) described above using an apparatus such as a hammer mill, a feather mill, or a counter jet mill, and then classifying the resultant into a desired particle size using a dry classifier such as a spin air sieve, a CLASSIEL, or a MICROCLASSIFIER, can be used.

In the case of producing a toner further containing a colorant (toner that contains the polymer (high-molecular weight compound) of the present invention and a colorant but does not contain a binder resin), a production method including dissolving the above-described polymer (high-molecular weight compound) and a colorant using a solvent in which the polymer (high-molecular weight compound) and the colorant dissolve together, to obtain a solution, subsequently removing the solvent, and then pulverizing and classifying by methods similar to the method described above, can be used.

Particularly, in the case of producing a toner containing the polymer (high-molecular weight compound) of the present invention and optionally a binder resin and/or a colorant, a production method of utilizing an emulsion aggregation method, by which the control of the particle size and the shape is facilitated, is preferred.

It is preferable that the following steps are included:
(1A) if necessary, a binder resin particle dispersion preparation step of preparing a dispersion of binder resin particles;
(1B) a polymer (high-molecular weight compound) particle dispersion preparation step of preparing a dispersion of particles of the polymer (high-molecular weight compound);
(1C) if necessary, a colorant particle dispersion preparation step of preparing a dispersion of colorant particles;
(2) an association step of adding an aggregating agent into a water-based medium in which the polymer (high-molecular weight compound) particles and optionally binder resin particles and/or colorant particles are present, implementing salting-out, simultaneously performing aggregation and fusion, and thus forming associated particles;

(3) an aging step of forming toner base particles by controlling the shape of the associated particles;

(4) a filtration and washing step of separating the toner base particles by filtration from the water-based medium and removing surfactants and the like from the toner base particles;

(5) a drying step of drying the toner base particles that have been washing-treated; and (6) an external additive addition step of adding external additives to the toner base particles that have been drying-treated.

In the following description, the steps of (1A) to (1C) will be described.

(1A) Binder Resin Particle Dispersion Preparation Step

In the present step, resin particles are formed by conventionally known emulsion polymerization or the like, and these resin particles are aggregated and fused to form binder resin particles. As an example, polymerizable monomers that constitute a binder resin are introduced into a water-based medium and dispersed therein, these polymerizable monomers are polymerized using a polymerization initiator, and a dispersion of binder resin particles is produced.

Furthermore, as a method for obtaining a binder resin particle dispersion, in addition to the above-described method of polymerizing a polymerizable monomer using a polymerization initiator in a water-based medium, for example, a method of performing a dispersing treatment in an aqueous medium without using a solvent, or a method of dissolving a crystalline resin in a solvent such as ethyl acetate to obtain a solution, emulsifying and dispersing this solution in an aqueous medium using a dispersing machine, and then performing a solvent removal treatment, or the like may be used.

At this time, a release agent may be incorporated in advance into the binder resin as necessary. Furthermore, for dispersing, it is also preferable that polymerization is carried out appropriately in the presence of a known surfactant (for example, anionic surfactants such as sodium polyoxyethylene(2) dodecyl ether sulfate, sodium dodecyl sulfate, and dodecyl benzenesulfonic acid).

The volume-based median diameter of the binder resin particles in the dispersion is preferably 50 to 300 nm. The volume-based median diameter of the binder resin particles in the dispersion can be measured by a dynamic light scattering method using a "MICROTRAC UPA-150" (manufactured by Nikkiso Co., Ltd.).

(1B) Polymer (High-Molecular Weight Compound) Particle Dispersion Preparation Step This polymer (high-molecular weight compound) particle dispersion preparation step is a step of preparing a dispersion of particles of the polymer (high-molecular weight compound) by dispersing the polymer (high-molecular weight compound) in a water-based medium into a microparticulate form.

On the occasion of preparing a dispersion of particles of the polymer (high-molecular weight compound), first, an emulsion of the polymer (high-molecular weight compound) is prepared. Regarding the emulsion of the polymer (high-molecular weight compound), for example, a method of dissolving the polymer (high-molecular weight compound) in an organic solvent and then emulsifying the solution thus obtained in a water-based medium may be mentioned.

The method for dissolving the polymer (high-molecular weight compound) in an organic solvent is not particularly limited, and for example, a method of adding the polymer (high-molecular weight compound) to an organic solvent and stirring and mixing the mixture so that the polymer (high-molecular weight compound) dissolves therein, may be mentioned. The amount of addition of the polymer (high-molecular weight compound) is preferably from 5 parts by mass to 100 parts by mass, and more preferably from 10 parts by mass to 50 parts by mass, with respect to 100 parts by mass of the organic solvent.

Next, the solution of the polymer (high-molecular weight compound) thus obtained is mixed with a water-based medium, and the mixture is stirred using a known dispersing machine such as a homogenizer. Thereby, the polymer (high-molecular weight compound) is converted to liquid droplets and is emulsified in the water-based medium, and an emulsion of the polymer (high-molecular weight compound) is prepared.

The amount of addition of the solution of the polymer (high-molecular weight compound) is preferably from 10 parts by mass to 120 parts by mass, and more preferably from 10 parts by mass to 110 parts by mass, with respect to 100 parts by mass of the water-based medium.

The respective temperatures of the solution of the polymer (high-molecular weight compound) and the water-based medium at the time of mixing of the solution of the polymer (high-molecular weight compound) and the water-based medium are in a temperature range below the boiling point of the organic solvent, and preferably from 20° C. to 80° C., and more preferably from 30° C. to 75° C. The temperature of the solution of the polymer (high-molecular weight compound) and the temperature of the water-based medium at the time of mixing of the solution of the polymer (high-molecular weight compound) and the water-based medium may be identical to each other or may be different from each other, and the temperatures are preferably identical to each other.

The stirring conditions for the dispersing machine are such that for example, in a case in which the capacity of the stirring container is 1 to 3 L, the speed of rotation is preferably from 7,000 rpm to 20,000 rpm, and the stirring time is preferably from 10 minutes to 30 minutes.

The dispersion of particles of the polymer (high-molecular weight compound) is prepared by removing the organic solvent from the emulsion of the polymer (high-molecular weight compound). Regarding the method of removing the organic solvent from the emulsion of the polymer (high-molecular weight compound), for example, known methods such as air blowing, heating, pressure reduction, or combination of these, may be mentioned.

For instance, in the emulsion of the polymer (high-molecular weight compound), the organic solvent is removed by heating the emulsion in, for example, an atmosphere of an inert gas such as nitrogen at a temperature of preferably from 25° C. to 90° C., and more preferably from 30° C. to 80° C., for example, until about from 80% by mass to 95% by mass of the initial amount of the organic solvent is removed. Thereby, the organic solvent is removed from the water-based medium, and a dispersion of particles of the polymer (high-molecular weight compound), in which particles of the polymer (high-molecular weight compound) are dispersed in the water-based medium, is prepared.

The mass average particle size of the particles of the polymer (high-molecular weight compound) in the dispersion of the particles of the polymer (high-molecular weight compound) is preferably from 90 nm to 1,200 nm. The mass average particle size can be set to the range described above, by appropriately regulating the viscosity at the time of mixing the polymer (high-molecular weight compound) into the organic solvent, the mixing ratio between the solution of the polymer (high-molecular weight compound) and the water-based medium, the stirring rate of the dispersing machine at the time of preparing the emulsion of the polymer (high-molecular weight compound), and the like. The mass average particle size of the particles of the polymer (high-molecular weight compound) in the dispersion of the particles of the polymer (high-molecular weight compound) can be measured using an electrophoretic light scattering photometer, "ELS-800" (manufactured by Otsuka Electronics Co., Ltd.).

<Organic Solvent>

The organic solvent used in the present step can be used without any particular limitations as long as the organic solvent can dissolve the polymer (high-molecular weight compound). Specifically, examples include esters such as ethyl acetate and butyl acetate; ethers such as diethyl ether, diisopropyl ether, and tetrahydrofuran; ketones such as acetone and methyl ethyl ketone; saturated hydrocarbons such as hexane and heptane; and halogenated hydrocarbons such as dichloromethane, dichloroethane, and carbon tetrachloride.

These organic solvents can be used singly or as mixtures of two or more kinds thereof. Among these organic solvents, ketones and halogenated hydrocarbons are preferred, and methyl ethyl ketone and dichloromethane are more preferred.

<Water-Based Medium>

The water-based medium used in the present step may be water, or a water-based medium containing water as a main component, in which a water-soluble solvent such as an alcohol or a glycol, or optional components such as a surfactant and a dispersant are incorporated, for example. Regarding the water-based medium, preferably a mixture of water and a surfactant is used.

Examples of the surfactant include a cationic surfactant, an anionic surfactant, a nonionic surfactant, and the like. Examples of the cationic surfactant include dodecylammonium chloride, dodecylammonium bromide, dodecyltrimethylammonium bromide, dodecylpyridinium chloride, dodecylpyridinium bromide, hexadecyltrimethylammonium bromide, and the like. Examples of the anionic surfactant include fatty acid soaps such as sodium stearate and sodium dodecanoate, sodium dodecyl benzenesulfonate, sodium dodecyl sulfate, and the like. Furthermore, examples of the nonionic surfactant include polyoxyethylene dodecyl ether, polyoxyethylene hexadecyl ether, polyoxyethylene nonyl phenyl ether, polyoxyethylene dodecyl ether, polyoxyethylene sorbitan monooleate ether, monodecanoyl sucrose, and the like.

These surfactants can be used singly or in combination of two or more kinds thereof. Among the surfactants, preferably an anionic surfactant, and more preferably sodium dodecyl benzenesulfonate is used.

The amount of addition of the surfactant is preferably 0.01 parts by mass or more and 10 parts by mass or less, and more preferably 0.04 parts by mass or more and 1 part by mass or less, with respect to 100 parts by mass of the water-based medium.

(1C) Colorant Particle Dispersion Preparation Step

This colorant particle dispersion preparation step is a step of preparing a dispersion of colorant particles by dispersing a colorant in a microparticulate form in a water-based medium.

Dispersing of the colorant can be carried out by utilizing mechanical energy. The number-based median diameter of the colorant particles in the dispersion is preferably 10 to 300 nm, and more preferably 50 to 200 nm. The number-based median diameter of the colorant particles can be measured using an electrophoretic light scattering photometer "ELS-800" (manufactured by Otsuka Electronics Co., Ltd.).

The steps from the (2) association step to the (6) external additive addition step can be carried out according to various conventionally known methods.

Meanwhile, the aggregating agent used in the (2) association step is not particularly limited; however, an aggregating agent selected from metal salts is suitably used. Examples of the metal salt include monovalent metal salts such as salts of alkali metals such as sodium, potassium, lithium, and the like; divalent metal salts of calcium, magnesium, manganese, copper, and the like; and trivalent meal salts of iron, aluminum, and the like. Specific examples of the metal salts include sodium chloride, potassium chloride, lithium chloride, calcium chloride, magnesium chloride, zinc chloride, copper sulfate, magnesium sulfate, manganese sulfate, and the like, and among these, from the viewpoint that aggregation can be carried out with a smaller amount, it is particularly preferable to use a divalent metal salt. These can be used singly or in combination of two or more kinds thereof.

[Developer]

Regarding the toner according to the present invention, for example, a case of incorporating a magnetic body into the toner and using as a one-component magnetic toner, a case of mixing the toner with a so-called carrier and using as a two-component developer, a case of using a non-magnetic toner alone, and the like, can be considered, and all can be suitably used.

As the magnetic body, for example, magnetite, $\gamma$-hematite, various ferrites, or the like can be used.

As the carrier to be included in a two-component developer, magnetic particles formed from conventionally known materials such as metals such as iron, steel, nickel, cobalt, ferrite, and magnetite; and alloys of those metals and metals such as aluminum and lead, can be used.

The carrier may be a coated carrier obtained by coating the surface of magnetic particles with a coating agent such as a resin, or may be a resin-dispersed type carrier obtained by dispersing a magnetic body powder in a binder resin. The resin for coating is not particularly limited; however, for example, an olefin resin, an acrylic resin, a styrene resin, a styrene-acrylic resin, a silicone resin, a polyester resin, a fluororesin, or the like is used. Furthermore, the resin for constituting the resin-dispersed type carrier particles is not particularly limited, and known resins can be used. For example, an acrylic resin, a styrene-acrylic resin, a polyester resin, a fluororesin, a phenolic resin, and the like can be used.

The volume-based median diameter of the carrier is preferably 20 to 100 µm, and more preferably 25 to 80 µm. The volume-based median diameter of the carrier can be measured representatively using a laser diffraction type particle size distribution analyzer "HELOS" (manufactured by Sympatec GmbH) equipped with a wet dispersing machine.

The mixing amount of the toner is preferably 2% to 10% by mass on the basis of the total mass of the toner and the carrier as 100% by mass.

[Image Forming Method]

The toner of the present invention can be used in various known image forming methods of electrophotography systems. For example, the toner can be used for a monochromatic image forming method or a full-color image forming method. In regard to a full-color image forming method, the toner can be applied to any image forming method such as a four-cycle system image forming method configured to include four kinds of color developing apparatuses respectively related to yellow, magenta, cyan, and black, and one photoreceptor; or a tandem system image forming method in which image forming units each having a color developing apparatus related to each color and a photoreceptor, are mounted for the respective colors.

That is, the image forming method according to an embodiment of the present invention includes: 1) a step of forming a toner image formed from the toner of the present invention on a recording medium; and 2) a step of irradiating the toner image with light and thereby softening the toner image.

As to Step of 1)

In the present step, a toner image formed from the toner of the present invention is formed on a recording medium.

(Recording Medium)

A recording medium is a member for retaining a toner image. Examples of the recording medium include ordinary paper, high quality paper, art paper, coated printing paper such as coated paper, commercially available Japanese paper and postcard paper, resin films for OHP or packaging material, cloth, and the like.

The recording medium may be in a sheet form (sheet-like form) having a predetermined size, or may be in a long form that is wound into a roll form after the toner image is fixed.

Forming of a toner image can be carried out by, as will be described below, for example, transferring a toner image on the photoreceptor onto a recording medium.

As to Step of 2)

In the present step, the toner image thus formed is irradiated with light, and the toner image is softened. Thereby, the toner image can be adhered onto the recording medium.

The wavelength of the light to be radiated is not particularly limited as long as the wavelength is of the extent that can sufficiently soften the toner image by photo-thermal conversion by the polymer (high-molecular weight compound) in the toner, or the like; however, the wavelength is preferably from 280 nm to 480 nm. When the wavelength is in the above-described range, the toner image can be softened more efficiently. Furthermore, from a similar viewpoint, the amount of irradiation with light is preferably 0.1 to 200 J/cm$^2$, more preferably 0.1 to 100 J/cm$^2$, and even more preferably 0.1 to 50 J/cm$^2$.

Irradiation with light can be carried out, as will be described below, for example, using a light source such as a light emitting diode (LED) or a laser light source.

After the step of 2), if necessary, 3) a step of pressing the softened toner image may be further carried out.

As to Step of 3)

In the present step, the softened toner image is pressed.

The pressure at the time of pressing the toner image on the recording medium is not particularly limited; however, the pressure is preferably 0.01 to 5.0 MPa, and more preferably 0.05 to 1.0 MPa. When the pressure is adjusted to 0.01 MPa or higher, since the amount of deformation of the toner image can be increased, the contact area between the toner image and the recording paper S increases, and the fixability of the image can be increased more easily. Furthermore, when the pressure is adjusted to 5.0 MPa or less, the shock noise at the time of pressing can be suppressed.

This pressing step may be carried out before or simultaneously with a step of irradiating the toner image with light and softening the toner image (the step of 2) as described above); however, carrying out the pressing step after performing light irradiation is preferred because the toner image in a state of having been softened in advance can be pressed, and as the result, fixability of the image can be further enhanced.

Furthermore, in the pressing step, the softened toner image may be further heated. That is, the pressing step may be carried out while heating the toner image.

The heating temperature of the toner image (surface temperature of the toner image at the time of heating) is, when the glass transition temperature of the toner is designated as Tg, preferably (Tg+20°) C. to (Tg+100°) C., and more preferably (Tg+25°) C. to (Tg+80°) C. When the surface temperature of the toner image is (Tg+20°) C. or higher, the toner image can be easily deformed by pressing, and when the surface temperature is (Tg+100°) C. or lower, hot offset can be easily suppressed. Meanwhile, hot offset means a phenomenon in which a portion of the toner is transferred onto a pressing member such as a roller in the fixing step, and the toner layer is divided.

Furthermore, 4) a step of heating the toner image in advance may be further carried out as necessary before the step of 2). As such, when 4) a step of heating the toner image in advance can be further carried out before the step of 2), the sensitivity to light of the polymer (high-molecular weight compound) of the present invention can be further increased. Thereby, since the sensitivity to light is not easily impaired even for a high-molecular weight compound, melting or softening of the toner image caused by light irradiation can be easily promoted.

The image forming method of the present invention can be carried out by, for example, using the following image forming apparatus.

FIG. 1 is an outline configuration diagram illustrating an image forming apparatus 100 that is used for the image forming method according to an embodiment of the present invention. However, the image forming apparatus used for the present invention is not limited to the following form and the illustrated example. FIG. 1 illustrates an example of a monochromatic image forming apparatus 100; however, the present invention can also be applied to a color image forming apparatus.

The image forming apparatus 100 is an apparatus for forming an image on recording paper S as a recording medium, the apparatus including an image reading apparatus 71 and an automatic document feeder 72 and performs image forming by means of an image forming unit 10, an irradiation unit 40, and a compression unit 9 on the recording paper S that is conveyed by a paper conveyance system 7.

Furthermore, in the image forming apparatus 100, recording paper S is used as a recording medium; however, the medium that is considered as an object to be subjected to image forming may be anything other than paper.

The document d placed on a copy holder of the automatic document feeder 72 is scanned and exposed to light by means of an optical system of a scanning exposure apparatus of the image reading apparatus 71 and is read by an image sensor CCD. An analog signal that has been photoelectrically converted by the image sensor CCD is subjected to analog processing, A/D conversion, shading compensation, image compression processing, and the like in an image processing unit 20, and then is inputted into an exposure device 3 of the image forming unit 10.

The paper conveyance system 7 includes a plurality of trays 16, a plurality of paper feeders 11, conveyance rollers 12, a conveyance belt 13, and the like. The trays 16 accommodate recording papers S of an appointed sizes, and the recording papers S are supplied by operating the paper feeder 11 of a determined tray 16 according to the command from a control unit 90. The conveyance rollers 12 convey the recording paper S that has been sent from the tray 16 by the paper feeder 11 or the recording paper S that has been brought in from a manual paper feeder 15 to the image forming unit 10.

The image forming unit 10 is configured such that a charging device 2, an exposure device 3, a developing unit 4, a transfer unit 5, and a cleaning unit 8 are disposed in sequence around a photoreceptor 1, along the direction of rotation of the photoreceptor 1.

The photoreceptor 1 as an image carrier is an image carrier having a photoconductive layer formed on a surface and is configured to be capable of rotating in the direction of arrow in FIG. 1 by a driving apparatus that is not illustrated in the diagram. Near the photoreceptor 1, a thermometer/hygrometer 17 that detects temperature and humidity inside the image forming apparatus 100 is provided.

The charging device 2 uniformly applies electric charge to the surface of the photoreceptor 1 and evenly electrostatically charges the surface of the photoreceptor 1. The exposure device 3 includes a beam light source such as a laser diode, and the exposure device 3 irradiates the surface of the electrostatically charged photoreceptor 1 with beam light to thereby cause the electric charge of the irradiated portion to be lost, and forms an electrostatic latent image in accordance with the image data on the photoreceptor 1. The developing unit 4 supplies a toner that is accommodated therein to the photoreceptor 1 and produces a toner image based on the electrostatic latent image on the surface of the photoreceptor 1.

The transfer unit 5 faces the photoreceptor 1, with a recording paper S interposed therebetween, and transfers the toner image onto the recording paper S. The cleaning unit 8 includes a blade 85. The surface of the photoreceptor 1 is cleaned by the blade 85, and the developer remaining on the surface of the photoreceptor 1 is removed.

The recording paper S having the toner image transferred thereon is conveyed to a compression unit 9 by a conveyance belt 13. The compression unit 9 is arbitrarily installed, and the compression unit 9 applies a fixing treatment to the recording paper S having the toner image transferred thereon by applying pressure only or applying heat and pressure by means of pressing members 91 and 92 and thereby fixes an image on the recording paper S. The recording paper S having the image fixed thereon is conveyed to a paper ejection unit 14 by conveyance rollers and is discharged out of the machine from the paper ejection unit 14.

Furthermore, the image forming apparatus 100 includes a paper inverting unit 24, and enables conveying the recording paper S that has been subjected to a heating and fixing treatment to the paper inverting unit 24 right before the paper ejection unit 14, inverting the front and back, and discharging the recording paper S, or conveying the recording paper S that has been subjected to inversion of the front and back, again to the image forming unit 10 and performing image formation on both surfaces of the recording paper S.

<Irradiation Unit>

Figure 2:
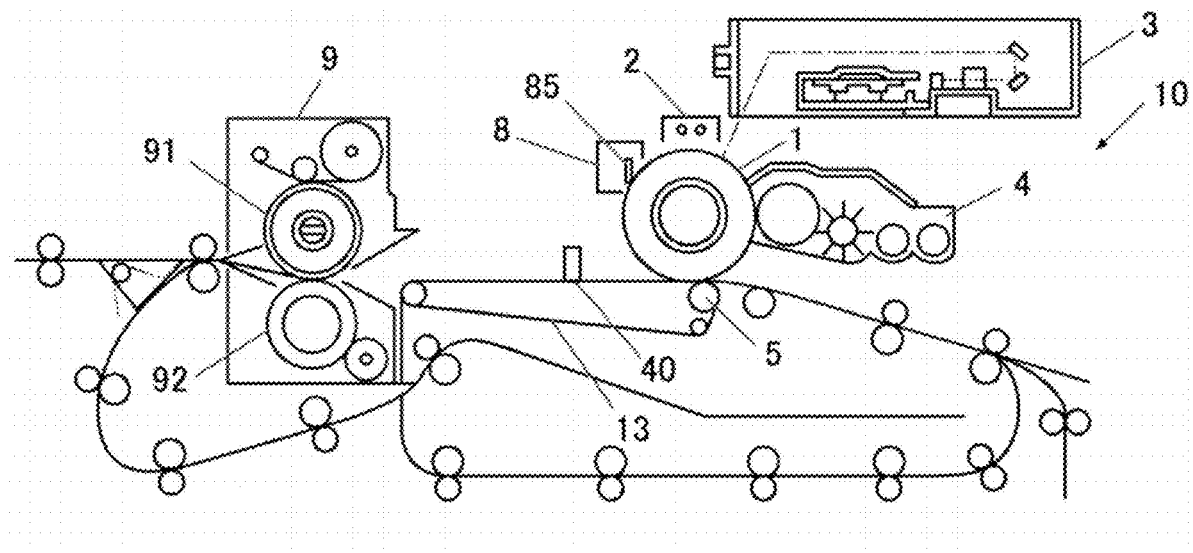
FIG. 2 is a schematic configuration diagram of the irradiation unit in the image forming apparatus.

FIG. 2 is an outline configuration diagram of the irradiation unit 40 in the image forming apparatus 100.

The image forming apparatus 100 according to an embodiment of the present invention includes an irradiation unit 40. The irradiation unit 40 irradiates a toner image formed on the recording paper S with light. Examples of apparatuses that constitute the irradiation unit 40 include a light emitting diode (LED), a laser light source, and the like.

The irradiation unit 40 is to radiate light toward a first surface on the photoreceptor side in the recording paper S that retains a toner image, and is disposed on the photoreceptor side with respect to the recording paper S surface that is nipped between the photoreceptor 1 and the transfer unit (transfer roller) 5.

The irradiation unit 40 is disposed on the downstream side in the direction of paper conveyance with respect to the nipping position between the photoreceptor 1 and the transfer unit 5, and on the upstream side in the direction of paper conveyance with respect to the compression unit 9.

According to the image forming method according to an embodiment of the present invention, the photoreceptor 1 is electrostatically charged by applying uniform electric charge thereto by a charging device 2, subsequently the photoreceptor 1 is scanned with the light flux radiated by the exposure device 3 based on the original image data, and an electrostatic latent image is formed. Next, a developer including the toner of the present invention is supplied onto the photoreceptor 1 by means of the developing unit 4.

When recording paper S is conveyed from the tray 16 to the image forming unit 10 in accordance with the timing at which the toner image supported on the surface of the photoreceptor 1 reaches the position of the transfer unit 5 by rotation of the photoreceptor 1, the toner image on the photoreceptor 1 is transferred onto the recording paper S that is nipped between the transfer unit 5 and the photoreceptor 1 by a transfer bias applied to the transfer unit 5.

Furthermore, the transfer unit 5 also functions as a pressing member, and the transfer unit 5 can transfer the toner image from the photoreceptor 1 onto the recording paper S and can reliably adhere the high-molecular weight compound included in the toner image to the recording paper S.

After the toner image is transferred onto the recording paper S, a blade 85 of the cleaning unit 8 removes any developer remaining on the surface of the photoreceptor 1.

In the process in which the recording paper S having the toner image transferred thereon is conveyed to the compression unit 9 by a conveyance belt 13, the irradiation unit 40 irradiates the toner image transferred onto the recording paper S with light. When light is radiated toward the toner image on the first surface of the recording paper S by the irradiation unit 40, the toner image can be melted more reliably, and the fixability of the toner image to the recording paper S can be enhanced.

When the recording paper S retaining the toner image reaches the compression unit 9 by the conveyance belt 13, the pressing members 91 and 92 compresses the toner image to the first surface of the recording paper S. Since the toner image is softened by light irradiation by the irradiation unit 40 before the toner image is subjected to a fixing treatment by the compression unit 9, energy saving of image compression to the recording paper S can be attempted.

The pressure at the time of pressing the toner image is as described above. Meanwhile, the pressing step may be carried out before or simultaneously with the step of irradiating the toner image with light and thereby softening the toner image, or may be carried out after the step. From the viewpoint that a toner image in a state of being softened in advance can be pressed, and thus the image strength can be easily increased, it is preferable that the pressing step is carried out after light irradiation.

Furthermore, the pressing member 91 can heat the toner image on the recording paper S when the recording paper S passes through between the pressing members 91 and 92. The toner image that has been softened by light irradiation is further softened by this heating, and as a result, the fixability of the toner image to the recording paper S is further enhanced.

The heating temperature of the toner image is as described above. The heating temperature of the toner image (surface temperature of the toner image) can be measured with a non-contact temperature sensor. Specifically, for example, a non-contact temperature sensor may be installed at a position where the recording medium is discharged from the pressing member, and the surface temperature of the toner image on the recording medium may be measured.

The toner image compressed by the pressing members 91 and 92 is solidified and fixed on the recording paper S.

(Photosensitive Adhesive)

Since the polymer (high-molecular weight compound) of the present invention is reversibly fluidized and non-fluidized by being irradiated with light, a photosensitive adhesive (photoresponsive adhesive) that can be utilized repeatedly can be produced using the polymer (high-molecular weight compound) of the present invention. For example, the photosensitive adhesive can be applied to various adhesion technologies as a photosensitive adhesive that is capable of repeated photodesorption in response to changes in the viscosity (coefficient of friction). That is, an embodiment of the present invention is a photosensitive adhesive (photoresponsive adhesive) including the polymer (high-molecular weight compound) of the present invention.

The photosensitive adhesive of the present invention is also suitable for recycling utilization in addition to the use in temporal tacking that can be utilized repeatedly; however, the photosensitive adhesive is not limited to these.

EXAMPLES

Hereinafter, the present invention will be specifically described by way of Examples; however, the present invention is not intended to be limited to these.

First Embodiment

Example 1-1

<Synthesis of Azomethine Derivative Monomer 1-1>

[Chemical Formula 51]

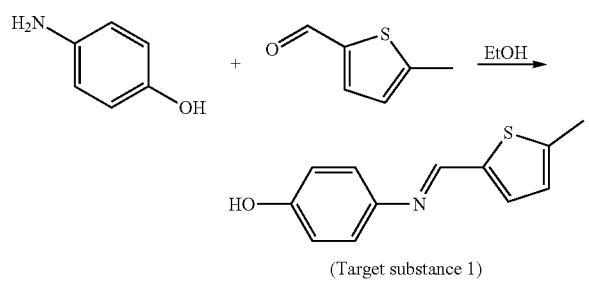

(Target substance 1)

Into a 100-ml four-necked flask, 4-aminophenol (5 g, 0.046 mol), 5-methylthiophene-2-carboxyaldehyde (5.8 g, 0.046 mol), and 100 ml of ethanol were introduced, and the mixture was heated and stirred. The reaction liquid was suction-filtered, and a powder thus obtained was washed with cold ethanol. Furthermore, recrystallization from methanol/ethanol was carried out, and thus target substance 1 was obtained.

[Chemical Formula 52]

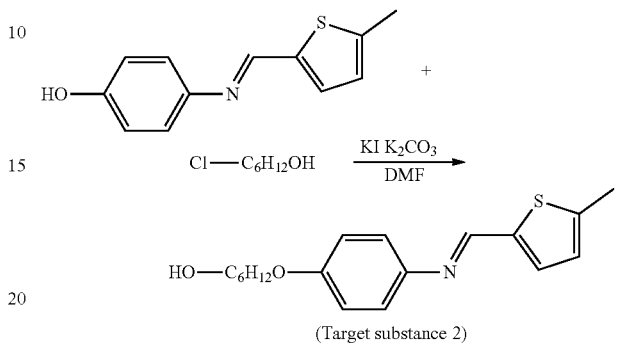

(Target substance 2)

Next, in a 200-ml four-necked flask, the target substance 1 (5 g, 0.023 mol) obtained as described above was dissolved in 25 ml of dimethylformamide (DMF). To this, 4.88 g (0.035 mol) of potassium carbonate was added, and the mixture was stirred while being maintained at 30° C. To this, 10.2 mg (0.06 mmol) of potassium iodide and 6-chloro-1-hexanol (3.54 g, 0.026 mol) were added, and the mixture was caused to react at 110° C. This was cooled to room temperature and added to 650 g of ice, and then the resultant was filtered. Crystals were dispersed in 400 ml of water, stirred overnight, washed, filtered, and dried. Furthermore, recrystallization from ethanol was carried out, and target substance 2 was obtained.

[Chemical Formula 53]

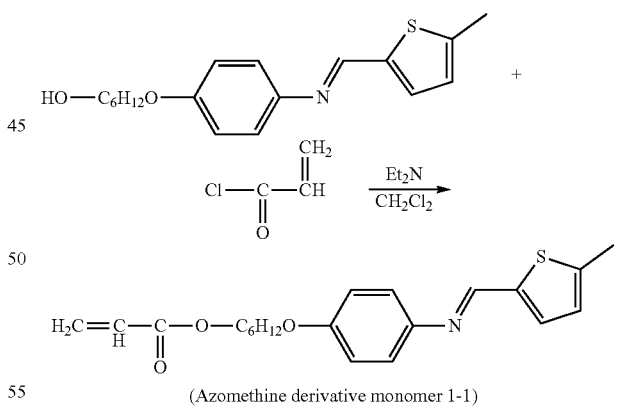

(Azomethine derivative monomer 1-1)

Next, into a 100-ml four-necked flask, the target substance 2 (3 g, 0.001 mol) obtained as described above, 1.34 ml (0.001 mol) of triethylamine, and 30 ml of dichloromethane were introduced. At this time, the raw materials were in a dispersed state. While the internal temperature was maintained at 0° C., a solution obtained by dissolving 1.04 g (0.011 mol) of acrylic acid chloride in 10 ml of dichloromethane was added dropwise while the internal temperature was maintained at 0° C. to 5° C. As the solution was added dropwise, the raw materials were dissolved.

After completion of the dropwise addition, the reaction liquid was returned to room temperature, and stirring was performed. After completion of the reaction, dichloromethane was removed by concentrating, the residue was dissolved in ethyl acetate, the solution was washed with dilute hydrochloric acid, an aqueous solution of sodium hydrogen carbonate, and saturated brine, and an organic layer was dried over magnesium sulfate and then concentrated. Orange-colored crystals thus obtained were purified using a silica gel column (ethyl acetate/heptane=1/5), and azomethine derivative monomer 1-1 was obtained.

<Synthesis of Polymer 1-1>

In a 100-ml four-necked flak, 1.5 g (4.096 mmol) of the azomethine derivative monomer 1-1 obtained as described above, 5 mg (0.023 mmol) of 4-cyanopentanoic acid dithiobenzoate, and 1 mg (0.006 mmol) of AIBN were dissolved in 4 ml of anisole. Then, the atmosphere was changed to an argon gas atmosphere by freezing and degassing, and then polymerization was carried out by raising the temperature to 75° C. and stirring. To a polymer solution thus obtained, 40 ml of methanol was slowly added dropwise, subsequently THF was added thereto, and thereby unreacted azomethine derivative monomer 1-1 was removed. The polymer solution thus separated was dried for 24 hours in a vacuum drying furnace at 40° C., and thereby polymer 1-1 was obtained. The number average molecular weight Mn of the polymer 1-1 thus obtained was measured by a GPC method, and the number average molecular weight was 12,000.

[Chemical Formula 54]

Polymer 1-1

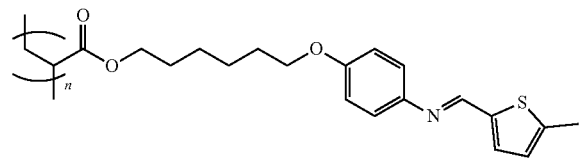

<Preparation of Polymer Particle Dispersion 1-1>

80 parts by mass of dichloromethane and 20 parts by mass of the polymer 1-1 obtained as described above were mixed and stirred while being heated to 50° C., and a solution including polymer 1-1 was obtained. To 100 parts by mass of the solution thus obtained, a mixed liquid of 99.5 parts by mass of distilled water that had been warmed to 50° C. and 0.5 parts by mass of a 20 mass % aqueous solution of sodium dodecyl benzenesulfonate was added. Subsequently, the mixture was emulsified by stirring for 20 minutes at 16,000 rpm using a homogenizer (manufactured by Heidolph Instruments GmbH & CO. KG) equipped with a shaft generator 18F, and thus an emulsion of the polymer 1-1 was obtained.

The emulsion thus obtained was introduced into a separable flask and was heated and stirred for 90 minutes at 40° C. while nitrogen was blown into the gas phase, thus the organic solvent was removed, and thereby polymer particle dispersion 1-1 was obtained. The particle size of the polymer particles in the polymer particle dispersion 1-1 was measured using an electrophoretic light scattering photometer, "ELS-800" (manufactured by Otsuka Electronics Co., Ltd.), and the particle size was 193 nm as a mass average particle size.

<Preparation of Styrene-Acrylic Resin Particle Dispersion>

(First Stage Polymerization)

Into a reaction vessel equipped with a stirring apparatus, a temperature sensor, a cooling tube, and a nitrogen inlet apparatus, a solution obtained by dissolving 8 parts by mass of sodium dodecyl sulfate in 3,000 parts by mass of ion-exchanged water was introduced, and while the solution was stirred at a stirring rate of 230 rpm under a nitrogen gas stream, the internal temperature was increased to 80° C. After the temperature increase, a solution obtained by dissolving 10 parts by mass of potassium persulfate in 200 parts by mass of ion-exchanged water was added thereto, the liquid temperature was adjusted again to 80° C., a polymerizable monomer solution including 480 parts by mass of styrene, 250 parts by mass of n-butyl acrylate, 68.0 parts by mass of methacrylic acid, and 16.0 parts by mass of n-octyl-3-mercaptopropionate, was added dropwise thereto for one hour, and then polymerization was carried out by heating and stirring the mixture for 2 hours at 80° C. Thus, a styrene-acrylic resin particle dispersion (1A) containing styrene-acrylic resin particles (1a) was prepared.

(Second Stage Polymerization)

Into a reaction vessel equipped with a stirring apparatus, a temperature sensor, a cooling tube, and a nitrogen inlet apparatus, a solution obtained by dissolving 7 parts by mass of sodium polyoxyethylene(2) dodecyl ether sulfate in 800 parts by mass of ion-exchanged water was introduced, the solution was heated to 98° C., subsequently 260 parts by mass of the styrene-acrylic resin particle dispersion (1A) obtained as described above, and a polymerizable monomer solution obtained by dissolving 245 parts by mass of styrene, 120 parts by mass of n-butyl acrylate, and 1.5 parts by mass of n-octyl-3-mercaptopropionate at 90° C. were added thereto, the mixture was mixed and dispersed for one hour using a mechanical dispersing machine, "CREARMIX (registered trademark)" (manufactured by M Technique Co., Ltd.) having a circulation path, and thus a dispersion including emulsion particles (oil droplets) was prepared. Next, an initiator solution obtained by dissolving 6 parts by mass of potassium persulfate in 200 parts by mass of ion-exchanged water was added to this dispersion, polymerization was carried out by heating and stirring this system for one hour at 82° C., and a styrene-acrylic resin particle dispersion (1B) including styrene-acrylic resin particles (1b) was prepared.

(Third Stage Polymerization)

To the styrene-acrylic resin particle dispersion (1B) thus obtained, a solution obtained by dissolving 11 parts by mass of potassium persulfate in 400 parts by mass of ion-exchanged water was added, and then under the temperature conditions of 82° C., a polymerizable monomer solution including 435 parts by mass of styrene, 130 parts by mass of n-butyl acrylate, 33 parts by mass of methacrylic acid, and 8 parts by mass of n-octyl-3-mercaptopropionate was added dropwise thereto for one hour. After completion of the dropwise addition, the mixture was heated and stirred over 2 hours to thereby perform polymerization, and then the liquid was cooled to 28° C. Thus, a styrene-acrylic resin particle dispersion 1 containing a styrene-acrylic resin 1 was obtained. Furthermore, the glass transition temperature (Tg) of the styrene-acrylic resin 1 was measured, and the glass transition temperature was 45° C.

(Preparation of Cyan Colorant Particle Dispersion (Cy-1))

90 parts by mass of sodium n-dodecyl sulfate was added to 1,600 parts by mass of ion-exchanged water. While this solution was stirred, 420 parts by mass of copper phthalocyanine (C.I. Pigment Blue 15:3) was slowly added to the solution, subsequently the mixture was subjected to a dispersing treatment using a stirring apparatus, "CLEARMIX"

(manufactured by M Technique Co., Ltd.), and thereby a cyan colorant particle dispersion (Cy-1) was prepared.

The volume-based median diameter of the colorant particles in the cyan colorant particle dispersion (Cy-1) was 110 nm.

<Preparation of Release Agent Dispersion 1>

80 parts by mass of dichloromethane and 20 parts by mass of paraffin wax "HNP-11" (manufactured by Nippon Seiro Co., Ltd.) as a release agent were mixed and stirred while being heated to 50° C., and a solution including a release agent was obtained. To 100 parts by mass of the solution thus obtained, a mixed liquid of 99.5 parts by mass of distilled water that had been warmed to 50° C. and 0.5 parts by mass of a 20 mass % aqueous solution of sodium dodecyl benzenesulfonate was added. Subsequently, the mixture was emulsified by stirring for 20 minutes at 16,000 rpm using a homogenizer (manufactured by Heidolph Instruments GmbH & Co. KG) equipped with a shaft generator 18F, and thus an emulsion of the release agent was obtained.

The emulsion thus obtained was introduced into a separable flask, the emulsion was heated and stirred for 90 minutes at 40° C. while nitrogen was blown into the gas phase, thus the organic solvent was removed, and thereby release agent dispersion 1 was obtained. The particle size of the particles of the release agent in the release agent dispersion 1 was measured using an electrophoretic light scattering photometer, "ELS-800" (manufactured by Otsuka Electronics Co., Ltd.), and the particle size was 125 nm as the mass average particle size.

<Production of Toner 1-1>

456 parts by mass in terms of the solid content of the polymer particle dispersion 1-1 produced as described above, 114 parts by mass in terms of the solid content of the styrene-acrylic resin particle dispersion 1, 52 parts by mass in terms of the solid content of the cyan colorant particle dispersion (Cy-1), 32 parts by mass in terms of the solid content of the release agent dispersion 1, and 900 parts by mass of ion-exchanged water were introduced into a reaction apparatus equipped with a stirring apparatus, a temperature sensor, and a cooling tube. The temperature inside the container was maintained at 30° C., and a 5 mol/liter aqueous solution of sodium hydroxide was added thereto to adjust the pH to 10.

Next, an aqueous solution obtained by dissolving 2 parts by mass of magnesium chloride hexahydrate in 1,000 parts by mass of ion-exchanged water was added dropwise thereto for 10 minutes under stirring, subsequently temperature increase was initiated, this system was heated up to 70° C. for 60 minutes, and a particle growth reaction was continued while the system was maintained at 70° C. In this state, the particle size of associated particles was measured using a "MULTISIZER-3" (manufactured by Beckman Coulter, Inc.), and at the time point when the volume-based median diameter (D50) reached 6.5 μm, an aqueous solution obtained by dissolving 190 parts by mass of sodium chloride in 760 parts by mass of ion-exchanged water was added to terminate particle growth. The mixture was stirred for one hour at 70° C., subsequently temperature increase was further carried out, and the mixture was heated and stirred in a state of 75° C. to thereby implement fusion of the particles. Subsequently, the mixture was cooled to 30° C., and thus a dispersion of toner base particles was obtained.

The dispersion of toner base particles thus obtained was subjected to solid-liquid separation with a centrifuge, and a wet cake of the toner base particles was formed. This wet cake was washed with ion-exchanged water at 35° C. using a centrifuge until the electrical conductivity of the filtrate would reach 5 μS/cm, subsequently the wet cake was transferred into a "FLASH JET DRYER (manufactured by Seishin Enterprise Co., Ltd.)", and toner base particles were produced by drying the wet cake until the moisture amount would reach 0.5% by mass.

To the toner base particles thus obtained, 1% by mass of hydrophobic silica (number average primary particle size: 12 nm) and 0.3% by mass of hydrophobic titania (number average primary particle size: 20 nm) were added, the mixture was mixed using a HENSCHEL MIXER (registered trademark), and thereby toner 1-1 was obtained.

Example 1-2

Polymer 1-2 was obtained by a similar method except that in the <Synthesis of azomethine derivative monomer 1-1> of Example 1-1, 5-methylthiophene-2-carboxyaldehyde was changed to 5-hexylthiophene-2-carboxyaldehyde. Toner 1-2 was obtained by a method similar to Example 1-1, except that polymer 1-2 was used instead of the polymer 1-1.

Example 1-3

Polymer 1-3 was obtained by a similar method except that in the <Synthesis of azomethine derivative monomer 1-1> of Example 1-1, 5-methylthiophene-2-carboxyaldehyde was changed to 5-octylthiophene-2-carboxyaldehyde. Toner 1-3 was obtained by a method similar to Example 1-1, except that polymer 1-3 was used instead of the polymer 1-1.

Example 1-4

Polymer 1-4 was obtained by a similar method except that in the <Synthesis of azomethine derivative monomer 1-1> of Example 1-1, 5-methylthiophene-2-carboxyaldehyde was changed to 5-t-butylthiophene-2-carboxyaldehyde. Toner 1-4 was obtained by a method similar to Example 1-1, except that polymer 1-4 was used instead of the polymer 1-1.

Example 1-5

Polymer 1-5 was obtained by a similar method except that in the <Synthesis of azomethine derivative monomer 1-1> of Example 1-1, 5-methylthiophene-2-carboxyaldehyde was changed to 5-methoxythiophene-2-carboxyaldehyde. Toner 1-5 was obtained by a method similar to Example 1-1, except that polymer 1-5 was used instead of the polymer 1-1.

Example 1-6

Polymer 1-6 was obtained by a similar method except that in the <Synthesis of azomethine derivative monomer 1-1> of Example 1-1, 5-methylthiophene-2-carboxyaldehyde was changed to 5-hexyloxythiophene-2-carboxyaldehyde. Toner 1-6 was obtained by a method similar to Example 1-1, except that polymer 1-6 was used instead of the polymer 1-1.

Example 1-7

Polymer 1-7 was obtained by a similar method except that in the <Synthesis of azomethine derivative monomer 1-1> of Example 1-1, 5-methylthiophene-2-carboxyaldehyde was changed to 5-carboxylic acid methylthiophene-2-carboxyaldehyde. Toner 1-7 was obtained by a method similar to Example 1-1, except that polymer 1-7 was used instead of the polymer 1-1.

Example 1-8

Polymer 1-8 was obtained by a similar method except that in the <Synthesis of azomethine derivative monomer 1-1> of Example 1-1, 5-methylthiophene-2-carboxyaldehyde was changed to 5-carboxylic acid hexylthiophene-2-carboxyaldehyde. Toner 1-8 was obtained by a method similar to Example 1-1, except that polymer 1-8 was used instead of the polymer 1-1.

Example 1-9

Polymer 1-9 was obtained by a similar method except that in the <Synthesis of azomethine derivative monomer 1-1> of Example 1-1, 5-methylthiophene-2-carboxyaldehyde was changed to 5-acetylthiophene-2-carboxyaldehyde. Toner 1-9 was obtained by a method similar to Example 1-1, except that polymer 1-9 was used instead of the polymer 1-1.

Example 1-10

Polymer 1-10 was obtained by a similar method except that in the <Synthesis of azomethine derivative monomer 1-1> of Example 1-1, 5-methylthiophene-2-carboxyaldehyde was changed to 5-hexanoylthiophene-2-carboxyaldehyde. Toner 1-10 was obtained by a method similar to Example 1-1, except that polymer 1-10 was used instead of the polymer 1-1.

Example 1-11

Polymer 1-11 was obtained by a similar method except that in the <Synthesis of azomethine derivative monomer 1-1> of Example 1-1, 5-methylthiophene-2-carboxyaldehyde was changed to 2-thiophenecarboxyaldehyde. Toner 1-11 was obtained by a method similar to Example 1-1, except that polymer 1-11 was used instead of the polymer 1-1.

Example 1-12

Polymer 1-12 was obtained by a similar method except that in the <Synthesis of azomethine derivative monomer 1-1> of Example 1-1, 5-methylthiophene-2-carboxyaldehyde was changed to 5-bromothiophene-2-carboxyaldehyde. Toner 1-12 was obtained by a method similar to Example 1-1, except that polymer 1-12 was used instead of the polymer 1-1.

Example 1-13

Polymer 1-13 was obtained by a similar method except that in the <Synthesis of azomethine derivative monomer 1-1> of Example 1-1, 5-methylthiophene-2-carboxyaldehyde was changed to 5-cyanothiophene-2-carboxyaldehyde. Toner 1-13 was obtained by a method similar to Example 1-1, except that polymer 1-13 was used instead of the polymer 1-1.

Example 1-14

Polymer 1-14 was obtained by a similar method except that in the <Synthesis of azomethine derivative monomer 1-1> of Example 1-1, 5-methylthiophene-2-carboxyaldehyde was changed to 5-nitrothiophene-2-carboxyaldehyde. Toner 1-14 was obtained by a method similar to Example 1-1, except that polymer 1-14 was used instead of the polymer 1-1.

Example 1-15

Polymer 1-15 was obtained by a similar method except that in the <Synthesis of azomethine derivative monomer 1-1> of Example 1-1, 5-methylthiophene-2-carboxyaldehyde was changed to 4-methyl-5-hexylthiophene-2-carboxyaldehyde. Toner 1-15 was obtained by a method similar to Example 1-1, except that polymer 1-15 was used instead of the polymer 1-1.

Example 1-16

Polymer 1-16 was obtained by a similar method except that in the <Synthesis of azomethine derivative monomer 1-1> of Example 1-1, 5-methylthiophene-2-carboxyaldehyde was changed to 3-methyl-5-hexylthiophene-2-carboxyaldehyde. Toner 1-16 was obtained by a method similar to Example 1-1, except that polymer 1-16 was used instead of the polymer 1-1.

Example 1-17

Polymer 1-17 was obtained by a similar method except that in the <Synthesis of azomethine derivative monomer 1-1> of Example 1-1, 5-methylthiophene-2-carboxyaldehyde was changed to 5-hexylthiophene-2-carboxyaldehyde, and 4-aminophenol was changed to 4-amino-m-cresol. Toner 1-17 was obtained by a method similar to Example 1-1, except that polymer 1-17 was used instead of the polymer 1-1.

Example 1-18

Polymer 1-18 was obtained by a similar method except that in the <Synthesis of azomethine derivative monomer 1-1> of Example 1-1, 5-methylthiophene-2-carboxyaldehyde was changed to 5-hexylthiophene-2-carboxyaldehyde, and 4-aminophenol was changed to 4-amino-o-cresol. Toner 1-18 was obtained by a method similar to Example 1-1, except that polymer 1-18 was used instead of the polymer 1-1.

Example 1-19

Polymer 1-19 was obtained by a similar method except that in the <Synthesis of azomethine derivative monomer 1-1> of Example 1-1, 5-methylthiophene-2-carboxyaldehyde was changed to 4-hexylthiophene-2-carboxyaldehyde. Toner 1-19 was obtained by a method similar to Example 1-1, except that polymer 1-19 was used instead of the polymer 1-1.

Example 1-20

Polymer 1-20 was obtained by a similar method except that in the <Synthesis of azomethine derivative monomer 1-1> of Example 1-1, 5-methylthiophene-2-carboxyaldehyde was changed to 5-methylthiophene-3-carboxyaldehyde. Toner 1-20 was obtained by a method similar to Example 1-1, except that polymer 1-20 was used instead of the polymer 1-1.

Example 1-21

Polymer 1-21 was obtained by a similar method except that in the <Synthesis of azomethine derivative monomer 1-1> of Example 1-1, 5-methylthiophene-2-carboxyaldehyde was changed to 5-hexylthiophene-3-carboxyaldehyde. Toner 1-21 was obtained by a method similar to Example 1-1, except that polymer 1-21 was used instead of the polymer 1-1.

Example 1-22

Polymer 1-22 was obtained by a similar method except that in the <Synthesis of azomethine derivative monomer 1-1> of Example 1-1, 4-aminophenol was changed to 4-hydroxybenzaldehyde, and 5-methylthiophene-2-carboxyaldehyde was changed to 2-amino-5-hexylthiophene. Toner 1-22 was obtained by a method similar to Example 1-1, except that polymer 1-22 was used instead of the polymer 1-1.

Example 1-23

Polymer 1-23 was obtained by a similar method except that in the <Synthesis of azomethine derivative monomer 1-1> of Example 1-1, 5-methylthiophene-2-carboxyaldehyde was changed to 5-hexylthiophene-2-carboxyaldehyde, and 6-chloro-1-hexanol was changed to 8-chloro-1-octanol. Toner 1-23 was obtained by a method similar to Example 1-1, except that polymer 1-23 was used instead of the polymer 1-1.

Example 1-24

Polymer 1-24 was obtained by a similar method except that in the <Synthesis of azomethine derivative monomer 1-1> of Example 1-1, 5-methylthiophene-2-carboxyaldehyde was changed to 5-hexylthiophene-2-carboxyaldehyde, 4-aminophenol was changed to 4-(hydroxyhexyl)aniline, and the step of obtaining the target substance 2 was excluded. Toner 1-24 was obtained by a method similar to Example 1-1, except that polymer 1-24 was used instead of the polymer 1-1.

Example 1-25

Polymer 1-25 was obtained by a similar method except that in the <Synthesis of azomethine derivative monomer 1-1> of Example 1-1, 5-methylthiophene-2-carboxyaldehyde was changed to 5-hexylthiophene-2-carboxyaldehyde, and acrylic acid chloride was changed to methacrylic acid chloride. Toner 1-25 was obtained by a method similar to Example 1-1, except that polymer 1-25 was used instead of the polymer 1-1.

Example 1-26

Polymer 1-26 was obtained by a similar method except that in the <Synthesis of azomethine derivative monomer 1-1> of Example 1-1, 4-aminophenol was changed to 3-aminophenol. Toner 1-26 was obtained by a method similar to Example 1-1, except that polymer 1-26 was used instead of the polymer 1-1.

Example 1-27

Polymer 1-27 was obtained by a similar method except that in the <Synthesis of azomethine derivative monomer 1-1> of Example 1-1, 4-aminophenol was changed to 2-aminophenol. Toner 1-27 was obtained by a method similar to Example 1-1, except that polymer 1-27 was used instead of the polymer 1-1.

Example 1-28

Polymer 1-28 was obtained by a similar method except that in the <Synthesis of azomethine derivative monomer 1-1> of Example 1-1, 5-methylthiophene-2-carboxyaldehyde was changed to 5-hydroxythiophene-2-carboxyaldehyde, and 4-aminophenol was changed to p-toluidine. Toner 1-28 was obtained by a method similar to Example 1-1, except that polymer 1-28 was used instead of the polymer 1-1.

Example 1-29

Polymer 1-29 was obtained by a method similar to Example 1-28, except that p-toluidine was changed to 4-hexylaniline Toner 1-29 was obtained by a similar method, except that polymer 1-29 was used instead of the polymer 1-28.

Example 1-30

Polymer 1-30 was obtained by a method similar to Example 1-28, except that p-toluidine was changed to 4-hexyloxyaniline. Toner 1-30 was obtained by a similar method, except that polymer 1-30 was used instead of the polymer 1-28.

Example 1-31

Polymer 1-31 was obtained by a method similar to Example 1-28, except that p-toluidine was changed to aniline. Toner 1-31 was obtained by a similar method, except that polymer 1-31 was used instead of the polymer 1-28.

Example 1-32

Polymer 1-32 was obtained by a method similar to Example 1-28, except that p-toluidine was changed to 3-methyl-4-hexylaniline Toner 1-32 was obtained by a similar method, except that polymer 1-32 was used instead of the polymer 1-28.

Example 1-33

Polymer 1-33 was obtained by a method similar to Example 1-28, except that 5-hydroxythiophene-2-carboxyaldehyde was changed to 5-hydroxythiophene-3-carboxyaldehyde. Toner 1-33 was obtained by a similar method, except that polymer 1-33 was used instead of the polymer 1-28.

Example 1-34

Polymer 1-34 was obtained by a method similar to Example 1-28, except that 5-hydroxythiophene-2-carboxyaldehyde was changed to 5-hydroxymethylthiophene-2-carboxyaldehyde. Toner 1-34 was obtained by a similar method, except that polymer 1-34 was used instead of the polymer 1-28.

Example 1-35

Polymer 1-35 was obtained by a method similar to Example 1-31, except that 5-hydroxythiophene-2-carboxyaldehyde was changed to 4-hydroxythiophene-2-carboxyaldehyde. Toner 1-35 was obtained by a similar method, except that polymer 1-35 was used instead of the polymer 1-31.

Example 1-36

Polymer 1-36 was obtained by a method similar to Example 1-31, except that 5-hydroxythiophene-2-carboxyaldehyde was changed to 4-hydroxythiophene-3-carboxyaldehyde. Toner 1-36 was obtained by a similar method, except that polymer 1-36 was used instead of the polymer 1-31.

Example 1-37

Polymer 1-37 was obtained by a similar method except that in the <Synthesis of azomethine derivative monomer 1-1> of Example 1-1, 5-methylthiophene-2-carboxyaldehyde was changed to 5-methylfuran-2-carboxyaldehyde. Toner 1-37 was obtained by a method similar to Example 1-1, except that polymer 1-37 was used instead of the polymer 1-1.

Example 1-38

Polymer 1-38 was obtained by a similar method except that in the <Synthesis of azomethine derivative monomer 1-1> of Example 1-1, 5-methylthiophene-2-carboxyaldehyde was changed to 5-hexylfuran-2-carboxyaldehyde. Toner 1-38 was obtained by a method similar to Example 1-1, except that polymer 1-38 was used instead of the polymer 1-1.

Example 1-39

Polymer 1-39 was obtained by a similar method except that in the <Synthesis of azomethine derivative monomer 1-1> of Example 1-1, 5-methylthiophene-2-carboxyaldehyde was changed to 2-furancarboxyaldehyde. Toner 1-39 was obtained by a method similar to Example 1-1, except that polymer 1-39 was used instead of the polymer 1-1.

Example 1-40

Polymer 1-40 was obtained by a similar method except that in the <Synthesis of azomethine derivative monomer 1-1> of Example 1-1, 5-methylthiophene-2-carboxyaldehyde was changed to 5-methylfuran-3-carboxyaldehyde. Toner 1-40 was obtained by a method similar to Example 1-1, except that polymer 1-40 was used instead of the polymer 1-1.

Example 1-41

Polymer 1-41 was obtained by a similar method except that in the <Synthesis of azomethine derivative monomer 1-1> of Example 1-1, 5-methylthiophene-2-carboxyaldehyde was changed to pyrrole-3-carboxyaldehyde. Toner 1-41 was obtained by a method similar to Example 1-1, except that polymer 1-41 was used instead of the polymer 1-1.

Example 1-42

Polymer 1-42 was obtained by a similar method except that in the <Synthesis of azomethine derivative monomer 1-1> of Example 1-1, 5-methylthiophene-2-carboxyaldehyde was changed to 3-formyl-1-methylpyrrole. Toner 1-42 was obtained by a method similar to Example 1-1, except that polymer 1-42 was used instead of the polymer 1-1.

Example 1-43

Polymer 1-43 was obtained by a similar method except that in the <Synthesis of azomethine derivative monomer 1-1> of Example 1-1, 5-methylthiophene-2-carboxyaldehyde was changed to 3-formyl-1-hexylpyrrole. Toner 1-43 was obtained by a method similar to Example 1-1, except that polymer 1-43 was used instead of the polymer 1-1.

Example 1-44

Polymer 1-44 was obtained by a similar method except that in the <Synthesis of azomethine derivative monomer 1-1> of Example 1-1, 5-methylthiophene-2-carboxyaldehyde was changed to 3-formyl-1-octylpyrrole. Toner 1-44 was obtained by a method similar to Example 1-1, except that polymer 1-44 was used instead of the polymer 1-1.

Example 1-45

Polymer 1-45 was obtained by a similar method except that in the <Synthesis of azomethine derivative monomer 1-1> of Example 1-1, 5-methylthiophene-2-carboxyaldehyde was changed to 3-formyl-1-acetoxypyrrole. Toner 1-45 was obtained by a method similar to Example 1-1, except that polymer 1-45 was used instead of the polymer 1-1.

Example 1-46

Polymer 1-46 was obtained by a similar method except that in the <Synthesis of azomethine derivative monomer 1-1> of Example 1-1, 5-methylthiophene-2-carboxyaldehyde was changed to 5-methyl-1H-pyrrole-3-carboaldehyde. Toner 1-46 was obtained by a method similar to Example 1-1, except that polymer 1-46 was used instead of the polymer 1-1.

Example 1-47

Polymer 1-47 was obtained by a similar method except that in the <Synthesis of azomethine derivative monomer 1-1> of Example 1-1, 5-methylthiophene-2-carboxyaldehyde was changed to 5-hexyl-1H-pyrrole-3-carboaldehyde. Toner 1-47 was obtained by a method similar to Example 1-1, except that polymer 1-47 was used instead of the polymer 1-1.

Example 1-48

Polymer 1-48 was obtained by a similar method except that in the <Synthesis of azomethine derivative monomer 1-1> of Example 1-1, 5-methylthiophene-2-carboxyaldehyde was changed to 5-octyl-1H-pyrrole-3-carboaldehyde. Toner 1-48 was obtained by a method similar to Example 1-1, except that polymer 1-48 was used instead of the polymer 1-1.

Example 1-49

Polymer 1-49 was obtained by a similar method except that in the <Synthesis of azomethine derivative monomer 1-1> of Example 1-1, 5-methylthiophene-2-carboxyaldehyde was changed to 5-methyl-3-formyl-1-methylpyrrole.

Toner 1-49 was obtained by a method similar to Example 1-1, except that polymer 1-49 was used instead of the polymer 1-1.

Example 1-50

Polymer 1-50 was obtained by a similar method except that in the <Synthesis of azomethine derivative monomer 1-1> of Example 1-1, 5-methylthiophene-2-carboxyaldehyde was changed to 5-hexyl-3-formyl-1-methylpyrrole. Toner 1-50 was obtained by a method similar to Example 1-1, except that polymer 1-50 was used instead of the polymer 1-1.

Example 1-51

Polymer 1-51 was obtained by a similar method except that in the <Synthesis of azomethine derivative monomer 1-1> of Example 1-1, 5-methylthiophene-2-carboxyaldehyde was changed to 5-octyl-3-formyl-1-methylpyrrole. Toner 1-51 was obtained by a method similar to Example 1-1, except that polymer 1-51 was used instead of the polymer 1-1.

Example 1-52

Polymer 1-52 was obtained by a similar method except that in the <Synthesis of azomethine derivative monomer 1-1> of Example 1-1, 5-methylthiophene-2-carboxyaldehyde was changed to 2-formyl-5-methylpyrrole. Toner 1-52 was obtained by a method similar to Example 1-1, except that polymer 1-52 was used instead of the polymer 1-1.

Example 1-53

Polymer 1-53 was obtained by a similar method except that in the <Synthesis of azomethine derivative monomer 1-1> of Example 1-1, 5-methylthiophene-2-carboxyaldehyde was changed to 2-formyl-5-hexylpyrrole. Toner 1-53 was obtained by a method similar to Example 1-1, except that polymer 1-53 was used instead of the polymer 1-1.

Example 1-54

Polymer 1-54 was obtained by a similar method except that in the <Synthesis of azomethine derivative monomer 1-1> of Example 1-1, 5-methylthiophene-2-carboxyaldehyde was changed to 2-formyl-4-methylpyrrole. Toner 1-54 was obtained by a method similar to Example 1-1, except that polymer 1-54 was used instead of the polymer 1-1.

Example 1-55

Polymer 1-55 was obtained by a similar method except that in the <Synthesis of azomethine derivative monomer 1-1> of Example 1-1, 5-methylthiophene-2-carboxyaldehyde was changed to 2-formyl-1-methylpyrrole. Toner 1-55 was obtained by a method similar to Example 1-1, except that polymer 1-55 was used instead of the polymer 1-1.

Example 1-56

Polymer 1-56 was obtained by a method similar to Example 1-28, except that 5-hydroxythiophene-2-carboxyaldehyde was changed to 2-hydroxy-4-formyl-1-methylpyrrole. Toner 1-56 was obtained by a similar method, except that polymer 1-56 was used instead of the polymer 1-28.

Example 1-57

Polymer 1-57 was obtained by a method similar to Example 1-28, except that 5-hydroxythiophene-2-carboxyaldehyde was changed to 3-hydroxy-5-formyl-1-methylpyrrole. Toner 1-57 was obtained by a similar method, except that polymer 1-57 was used instead of the polymer 1-28.

Example 1-58

Polymer 1-58 was obtained by a similar method except that in the <Synthesis of azomethine derivative monomer 1-1> of Example 1-1, 5-methylthiophene-2-carboxyaldehyde was changed to 1-hydroxypyrrole-3-carboaldehyde, and 4-aminophenol was changed to p-toluidine. Toner 1-58 was obtained by a method similar to Example 1-1, except that polymer 1-58 was used instead of the polymer 1-1.

Example 1-59

Polymer 1-59 was obtained by a method similar to Example 1-58, except that p-toluidine was changed to 4-hexylaniline Toner 1-59 was obtained by a similar method, except that polymer 1-59 was used instead of the polymer 1-58.

Example 1-60

Polymer 1-60 was obtained by a method similar to Example 1-58, except that p-toluidine was changed to 4-hexyloxyaniline. Toner 1-60 was obtained by a similar method, except that polymer 1-60 was used instead of the polymer 1-58.

Example 1-61

Polymer 1-61 was obtained by a method similar to Example 1-58, except that p-toluidine was changed to aniline. Toner 1-61 was obtained by a similar method, except that polymer 1-61 was used instead of the polymer 1-58.

Example 1-62

Polymer 1-62 was obtained by a method similar to Example 1-58, except that 1-hydroxypyrrole-3-carboaldehyde was changed to 1-hydroxypyrrole-2-carboaldehyde. Toner 1-62 was obtained by a similar method, except that polymer 1-62 was used instead of the polymer 1-58.

Example 1-63

Polymer 1-63 was obtained by a similar method except that in the <Synthesis of polymer 1-1> of Example 1-1, the amount of the azomethine derivative monomer 1-1 was changed from 1.5 g to 1.2 g, and 0.3 g of n-hexyl acrylate was added. Toner 1-63 was obtained by a method similar to Example 1-1, except that polymer 1-63 was used instead of the polymer 1-1.

Example 1-64

Polymer 1-64 was obtained by a method similar to Example 1-63, except that n-hexyl acrylate was changed to n-butyl methacrylate. Toner 1-64 was obtained by a similar method, except that polymer 1-64 was used instead of the polymer 1-63.

Example 1-65

Polymer 1-65 was obtained by a method similar to Example 1-63, except that n-hexyl acrylate was changed to styrene. Toner 1-65 was obtained by a similar method, except that polymer 1-65 was used instead of the polymer 1-63.

Example 1-66

Polymer 1-66 was obtained by a method similar to Example 1-63, except that n-hexyl acrylate was changed to 1-hexene. Toner 1-66 was obtained by a similar method, except that polymer 1-66 was used instead of the polymer 1-63.

Example 1-67

Polymer 1-67 was obtained by a method similar to Example 1-63, except that the amount of n-hexyl acrylate was changed from 0.3 g to 0.15 g, and 0.15 g of styrene was added. Toner 1-67 was obtained by a similar method, except that polymer 1-67 was used instead of the polymer 1-63.

Example 1-68

Toner 1-68 was obtained by a similar method, except that in the <Production of toner 1-1> of Example 1-1, the amount of addition of the polymer particle dispersion 1-1 was changed from 523 parts by mass to 607 parts by mass in terms of the solid content, and the styrene-acrylic resin particle dispersion 1 was excluded.

Example 1-69

Toner 1-69 was obtained by a similar method, except that in the <Production of toner 1-1> of Example 1-1, the amount of addition of the polymer particle dispersion 1-1 was changed from 523 parts by mass to 303 parts by mass in terms of the solid content, and the amount of addition of the styrene-acrylic resin particle dispersion 1 was changed from 79 parts by mass to 303 parts by mass in terms of the solid content.

Example 1-70

Toner 1-70 was obtained by a similar method, except that in the <Production of toner 1-1> of Example 1-1, the amount of addition of the polymer particle dispersion 1-1 was changed from 523 parts by mass to 79 parts by mass in terms of the solid content, and the amount of addition of the styrene-acrylic resin particle dispersion 1 was changed from 79 parts by mass to 523 parts by mass in terms of the solid content.

Example 1-71

(Preparation of Polyester Resin Particle Dispersion 1 Containing Polyester Resin 1)

Into a four-necked flask having a capacity of 10 liters and equipped with a nitrogen inlet tube, a dehydrating tube, a stirring device, and a thermocouple, 524 parts by mass of a bisphenol A propylene oxide 2-mol adduct, 105 parts by mass of terephthalic acid, 69 parts by mass of fumaric acid, and 2 parts by mass of tin octoate (esterification catalyst) were introduced, and a polycondensation reaction was carried out for 8 hours at a temperature of 230° C. Furthermore, the polycondensation reaction was continued for one hour at 8 kPa, subsequently the liquid was cooled to 160° C., and a polyester resin 1 was obtained. 100 parts by mass of the polyester resin 1 was pulverized with "ROUNDEL MILL Model: RM" (manufactured by Tokuju Corporation) and was mixed with 638 parts by mass of a 0.26 mass % aqueous solution of sodium lauryl sulfate that had been produced in advance. While being stirred, the mixture was ultrasonically dispersed using an ultrasonic homogenizer "US-150T" (manufactured by Nissei Corporation) with V-LEVEL at 300 µA for 30 minutes, and thus a polyester resin particle dispersion 1 was obtained. The particle size of polyester resin particles in the polyester resin particle dispersion 1 was measured according to a dynamic light scattering method using "MICROTRAC UPA-150" (manufactured by Nikkiso Co., Ltd.), and the particle size was 135 nm as a volume-based median diameter. Furthermore, the glass transition temperature (Tg) of this polyester resin 1 was measured, and it was 42° C.

<Production of Toner 1-71>

Toner 1-71 was obtained by a similar method except that in the <Production of toner 1-1> of Example 1-1, the styrene-acrylic resin particle dispersion 1 was changed to the polyester resin dispersion 1 produced as described above.

Comparative Example 1-1

<Comparative Compound>

The following comparative compound 1-1 (number average molecular weight Mn: 2,870) was obtained by the method described in paragraphs 0217 to 0227 of Japanese Patent Application Laid-Open No. 2014-191078.

[Chemical Formula 55]

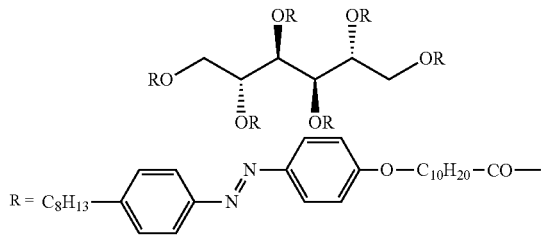

<Preparation of Comparative Compound Dispersion>

A comparative compound dispersion was obtained in the same manner, except that in the <Preparation of polymer particle dispersion 1-1> of Example 1-1, the polymer 1-1 was changed to the comparative compound 1-1.

<Production of Toner 1-72>

Toner 1-72 was obtained by a similar method, except that the polymer particle dispersion 1-1 of Example 1-1 was changed to the comparative compound dispersion produced as described above.

(Number Average Molecular Weight Mn)

The number average molecular weights Mn of the polymers 1-1 to 1-67 and Comparative Example 1-1 were measured by a GPC method. Specifically, apparatus "HLC-8120 GPC" (manufactured by Tosoh Corporation) and columns "TSKguard column+three TSKgel SuperHZ-M in series" (manufactured by Tosoh Corporation) were used, and while the column temperature was maintained at 40° C., tetrahydrofuran (THF) as a carrier solvent was caused to flow at a flow rate of 0.2 mL/min. A measurement sample was dissolved in tetrahydrofuran so as to obtain a concentration of 1 mg/ml. Preparation of the solution was carried out by performing a treatment for 5 minutes at room temperature using an ultrasonic dispersing machine. Next, a sample solution was obtained by treating with a membrane filter having a pore size of 0.2 μm, 10 μL of this sample solution was injected into the apparatus together with the above-mentioned carrier solvent, and detection was made using a refractive index detector (RI detector). The molecular weight distribution of the measurement sample was calculated based on a calibration curve produced using monodisperse standard polystyrene particles. Regarding the polystyrene for measuring the calibration curve, ten items were used.

(Glass Transition Temperature (Tg))

The glass transition temperature (Tg) of the binder resin was measured using DSC7000X manufactured by Hitachi High-Tech Science Corporation. Specifically, about 3 mg of a binder resin was precisely weighed up to two decimal places, and the binder resin was sealed in an aluminum pan and mounted. For a reference, a blank aluminum pan was used. Measurement conditions in which a first temperature increase process of increasing the temperature from 0° C. to 200° C. at a rate of temperature increase of 10° C./min; a cooling process of cooling from 200° C. to 0° C. at a rate of temperature decrease of 10° C./min; and a second temperature increase process of increasing the temperature from 0° C. to 200° C. at a rate of temperature increase of 10° C./min were carried out in this order, were employed. Then, analysis was carried out based on the data in the second temperature increase process. The value of an intersection between an extension line of the baseline before the beginning of a first endothermic peak and a tangent line that shows the maximum gradient from the beginning portion of the first endothermic peak to the peak apex, was designated as the glass transition temperature. Meanwhile, the glass transition temperatures of the polymers and toners produced in the various Examples and Comparative Examples can also be measured by a similar method.

[Production of Developer]

Developer 1-72 was obtained by mixing each of the toners 1-1 to 1-72 produced as described above, with ferrite carrier particles coated with a copolymer resin of cyclohexane methacrylate and methyl methacrylate (monomer mass ratio 1:1) and having a volume average particle size of 30 μm so as to obtain a toner particle concentration of 6% by mass. Mixing was carried out for 30 minutes using a V-type mixer.

[Evaluation: Test for Photoresponsive Adhesion of Polymer]

Figure 3:
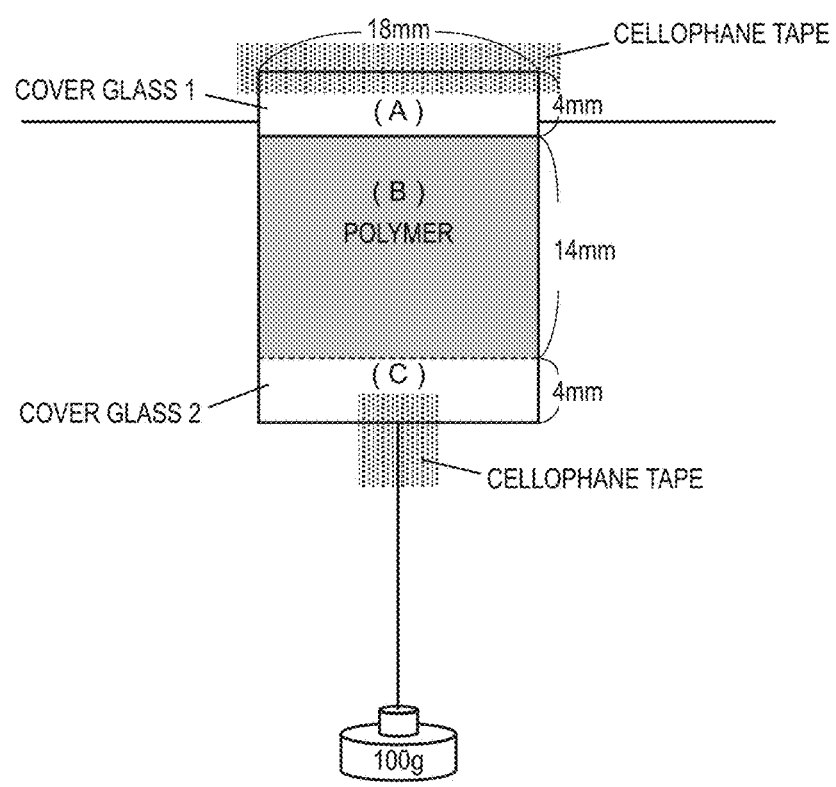
FIG. 3 is a schematic diagram of an apparatus for measuring changes in the adhesiveness concomitant with light irradiation of the polymers/compounds synthesized in Examples and Comparative Examples used in the photoresponsive adhesion test of Examples.

The changes in adhesiveness concomitant with light irradiation of the polymers 1-1 to 1-67 prepared in Examples 1-1 to 1-67 and the comparative compound 1-1 of Comparative Example were evaluated in the following photoresponsive adhesion test using the apparatus illustrated in FIG. 3. As shown in FIG. 3, 2 mg of a polymer was mounted on a cover glass 1 that measured 18 mm on each of four sides, within a radius of 6 mm from the center of the glass, and a cover glass 2 having the same size was covered at a position shifted by about 4 mm in a direction parallel to the cover glass 1 so as to cover the entire polymer. This was heated to melt the sample, and thus the cover glass 1 and the cover glass 2 were adhered. Each of the samples thus obtained was subjected to a non-fluidity→fluidity test as described below and was subsequently subjected to a fluidity→non-fluidity (return) test as described below.

<Non-Fluidity→Fluidity Test>

The part (A) shown in FIG. 3 was fixed to a holder with Cellophane tape, and a vinyl string 30 cm long loaded with a 100-g weight was fixed to the part (C) with Cellophane tape. The part (B) was irradiated with light having a wavelength of 365 nm in an amount of irradiation of 25 J/cm$^2$, it was checked whether the cover glass 2 would come off from the cover glass 1, and the result was judged according to the following evaluation criteria. The polymers 1-1 to 1-67 prepared in Examples 1-1 to 1-67 and the comparative compound 1-1 of Comparative Example were all rated as ○ (the cover glass 2 completely came off from the cover glass 1).

—Evaluation Criteria for Non-Fluidity→Fluidity Test—

○: The cover glass 2 completely came off from the cover glass 1.

Δ: The cover glass 2 was shifted.

X: The cover glass 2 did not move.

<Fluidity→Non-Fluidity (Return) Test>

One hour after the non-fluidity→fluidity test was carried out (for this one hour, left to stand in a natural environment, that is, at room temperature), a cover glass 3 (having the same size as the cover glasses 1 and 2) was mounted so as to cover the sample portion (part (B)) of the cover glass 1 used in the above-described test, it was checked whether the cover glass 1 and the cover glass 3 would adhere, and the result was judged according to the following evaluation criteria. The polymers 1-1 to 1-67 prepared in Examples 1-1 to 1-67 were all rated as ○: did not adhere (non-fluidized), and it was verified that the polymers were reversibly fluidized and non-fluidized. The comparative compound 1-1 was rated as X: adhered (a fluidized state was maintained)

—Evaluation Criteria for Fluidity→Non-Fluidity (Return) Test—

○: Did not adhere (non-fluidized)

Δ: Partially adhered (a fluidized state was maintained in some portion)

X: Adhered (a fluidized state was maintained).

Meanwhile, for the polymers 1-1 to 1-67 prepared in Examples 1-1 to 1-67, which were rated as ○ in the evaluation of the fluidity→non-fluidity (return) test described above, it could be verified that all were re-solidified after the non-fluidity→fluidity test had been carried out.

[Evaluation: Fixability Test]

A fixability test was carried out using the developers 1-1 to 1-72 obtained as described above, in a constant temperature and constant humidity environment (temperature: 20° C., humidity: 50% RH). A developer was disposed between a pair of parallel flat plate (aluminum) electrodes, the developer being installed on one electrode and ordinary paper (basis weight: 64 g/m$^2$) as a recording medium being installed on the other electrode, while the developer was caused to slide by magnetic force, and the toner was developed at a gap between the electrodes of 0.5 mm under the conditions of the DC bias and the AC bias so that the amount of toner attachment would be 5 g/m$^2$. Thus, a toner layer was formed on the surface of the ordinary paper and was fixed with a fixing apparatus, and thus a print was obtained (image formation). A toner image that measured 1 cm on each of four sides of this print was rubbed 10 times while being subjected to a pressure of 40 kPa with "JK WIPER (registered trademark)" (manufactured by Nippon Paper Crecia Co., Ltd.), and the fixing ratio of the image was evaluated. A fixing ratio of 60% or higher was considered acceptable. Meanwhile, the fixing ratio of the image is a value, expressed in percentage, obtained by measuring the reflection densities of the image after printing and the image after rubbing with a fluorescence spectroscopic densitometer, "FD-7" (manufactured by Konica Minolta, Inc.), and dividing the reflection density of the solid image after rubbing by the reflection density of the solid image after printing.

Regarding the fixing apparatus, the following three kinds of fixing apparatuses configured by appropriately modifying the apparatus illustrated in FIG. 2 were used.

No. 1: The compression unit 9 of FIG. 2 is absent, the wavelength of the ultraviolet light irradiated from the irradiation unit 40 is 365 nm (light source: LED light source having an emission wavelength of 365 nm±10 nm), and the amount of irradiation is 13 J/cm$^2$;

No. 2: There is the compression unit 9 of FIG. 2, the temperature of the pressing member 91 is 20° C., and the pressure at the time of pressing is 0.2 MPa. The light source and the amount of irradiation of the irradiation unit 40 are similar to those of No. 1; and No. 3: There is the compression unit 9 of FIG. 2, the temperature of the pressing member 91 is 80° C., and the pressure at the time of pressing is 0.2 MPa. The light source and the amount of irradiation of the irradiation unit 40 are similar to those of No. 1.

[Evaluation of Color Reproducibility]

For the images of Examples and Comparative Examples obtained as described above, the color reproducibility was evaluated by a visual inspection made by ten monitors according to the following evaluation criteria. Specifically, as samples for evaluation and comparison, toners in which the polymer 1-1 in the toner 1-1 of Example 1-1 was all changed to a styrene-acrylic resin were produced. Developers were produced as described above using these toners, developing was carried out similarly to the image formation in the fixability test as described above, and fixation was carried out with the fixing apparatus No. 4 as described below.

Fixing apparatus No. 4: There is the compression unit 9 of FIG. 2, the temperature of the pressing member 91 is 150° C., the pressure at the time of pressing is 0.2 MPa, and light irradiation is not carried out.

The images of the samples for evaluation and comparison and the images obtained in the Examples and Comparative Examples described above were shown in sequence to the ten monitors, and the monitors were questioned about whether the colors of two images were clearly different. The determination results based on the following evaluation criteria for color reproducibility are presented in the following Table 4.

—Evaluation Criteria for Color Reproducibility—

⊙: Two or fewer people answered that the colors were clearly different.

○: Three or four people answered that the colors were clearly different.

Δ: Five to seven people answered that the colors were clearly different.

X: Eight or more people answered that the colors were clearly different.

The configurations of the various toners, the type of the fixing apparatus, and the evaluation results are presented in the following Tables 2 to 4.

TABLE 2

| | | Group having polymerizable group | | | | Azomethine derivative | | | | | |
|---|---|---|---|---|---|---|---|---|---|---|---|
| Polymer | Structure | $A_1$ | $A_2$ Carbon number | $A_3$ Carbon number | Polymerizable group position | X | Y | $Z_1$ | $Z_2$ | $R_1$ | $R_2$ |
| 1-1 | (iii) | H | 6 | — | $R_7$ | S | $R_4$ | CH | N | $CH_3$ | H |
| 1-2 | (iii) | H | 6 | — | $R_7$ | S | $R_4$ | CH | N | $C_6H_{13}$ | H |
| 1-3 | (iii) | H | 6 | — | $R_7$ | S | $R_4$ | CH | N | $C_8H_{17}$ | H |
| 1-4 | (iii) | H | 6 | — | $R_7$ | S | $R_4$ | CH | N | $C(CH_3)_3$ | H |
| 1-5 | (iii) | H | 6 | — | $R_7$ | S | $R_4$ | CH | N | $OCH_3$ | H |
| 1-6 | (iii) | H | 6 | — | $R_7$ | S | $R_4$ | CH | N | $OC_6H_{13}$ | H |
| 1-7 | (iii) | H | 6 | — | $R_7$ | S | $R_4$ | CH | N | $COOCH_3$ | H |
| 1-8 | (iii) | H | 6 | — | $R_7$ | S | $R_4$ | CH | N | $COOC_6H_{13}$ | H |
| 1-9 | (iii) | H | 6 | — | $R_7$ | S | $R_4$ | CH | N | $COCH3$ | H |
| 1-10 | (iii) | H | 6 | — | $R_7$ | S | $R_4$ | CH | N | $COC_6H_{13}$ | H |
| 1-11 | (iii) | H | 6 | — | $R_7$ | S | $R_4$ | CH | N | H | H |
| 1-12 | (iii) | H | 6 | — | $R_7$ | S | $R_4$ | CH | N | Br | H |
| 1-13 | (iii) | H | 6 | — | $R_7$ | S | $R_4$ | CH | N | CN | H |
| 1-14 | (iii) | H | 6 | — | $R_7$ | S | $R_4$ | CH | N | $NO_2$ | H |
| 1-15 | (iii) | H | 6 | — | $R_7$ | S | $R_4$ | CH | N | $C_6H_{13}$ | $CH_3$ |
| 1-16 | (iii) | H | 6 | — | $R_7$ | S | $R_4$ | CH | N | $C_6H_{13}$ | H |
| 1-17 | (iii) | H | 6 | — | $R_7$ | S | $R_4$ | CH | N | $C_6H_{13}$ | H |
| 1-18 | (iii) | H | 6 | — | $R_7$ | S | $R_4$ | CH | N | $C_6H_{13}$ | H |
| 1-19 | (iii) | H | 6 | — | $R_7$ | S | $R_4$ | CH | N | H | $C_6H_{13}$ |
| 1-20 | (iii) | H | 6 | — | $R_7$ | S | $R_3$ | CH | N | $CH_3$ | H |
| 1-21 | (iii) | H | 6 | — | $R_7$ | S | $R_3$ | CH | N | $C_6H_{13}$ | H |
| 1-22 | (iii) | H | 6 | — | $R_7$ | S | $R_4$ | N | CH | $C_6H_{13}$ | H |
| 1-23 | (iii) | H | 8 | — | $R_7$ | S | $R_4$ | CH | N | $C_6H_{13}$ | H |
| 1-24 | (ii) | H | 6 | — | $R_7$ | S | $R_4$ | CH | N | $C_6H_{13}$ | H |
| 1-25 | (iii) | $CH_3$ | 6 | — | $R_7$ | S | $R_4$ | CH | N | $C_6H_{13}$ | H |
| 1-26 | (iii) | H | 6 | — | $R_6$ | S | $R_4$ | CH | N | $CH_3$ | H |
| 1-27 | (iii) | H | 6 | — | $R_5$ | S | $R_4$ | CH | N | $CH_3$ | H |
| 1-28 | (iii) | H | 6 | — | $R_1$ | S | $R_4$ | CH | N | — | H |
| 1-29 | (iii) | H | 6 | — | $R_1$ | S | $R_4$ | CH | N | — | H |
| 1-30 | (iii) | H | 6 | — | $R_1$ | S | $R_4$ | CH | N | — | H |
| 1-31 | (iii) | H | 6 | — | $R_1$ | S | $R_4$ | CH | N | — | H |
| 1-32 | (iii) | H | 6 | — | $R_1$ | S | $R_4$ | CH | N | — | H |
| 1-33 | (iii) | H | 6 | — | $R_1$ | S | $R_3$ | CH | N | — | H |

TABLE 2-continued

| | | | | | | | | | | | | |
|---|---|---|---|---|---|---|---|---|---|---|---|---|
| 1-34 | (iv) | H | 6 | 1 | R$_1$ | S | R$_4$ | CH | N | — | H | |
| 1-35 | (iii) | H | 6 | — | R$_2$ | S | R$_4$ | CH | N | H | — | |
| 1-36 | (iii) | H | 6 | — | R$_2$ | S | R$_3$ | CH | N | H | — | |
| 1-37 | (iii) | H | 6 | — | R$_7$ | O | R$_4$ | CH | N | CH$_3$ | H | |
| 1-38 | (iii) | H | 6 | — | R$_7$ | O | R$_4$ | CH | N | C$_6$H$_{13}$ | H | |
| 1-39 | (iii) | H | 6 | — | R$_7$ | O | R$_4$ | CH | N | H | H | |
| 1-40 | (iii) | H | 6 | — | R$_7$ | O | R$_3$ | CH | N | CH$_3$ | H | |
| 1-41 | (iii) | H | 6 | — | R$_7$ | NR$_{10}$ | R$_3$ | CH | N | H | H | |
| 1-42 | (iii) | H | 6 | — | R$_7$ | NR$_{10}$ | R$_3$ | CH | N | H | H | |
| 1-43 | (iii) | H | 6 | — | R$_7$ | NR$_{10}$ | R$_3$ | CH | N | H | H | |
| 1-44 | (iii) | H | 6 | — | R$_7$ | NR$_{10}$ | R$_3$ | CH | N | H | H | |
| 1-45 | (iii) | H | 6 | — | R$_7$ | NR$_{10}$ | R$_3$ | CH | N | H | H | |
| 1-46 | (iii) | H | 6 | — | R$_7$ | NR$_{10}$ | R$_3$ | CH | N | CH$_3$ | H | |
| 1-47 | (iii) | H | 6 | — | R$_7$ | NR$_{10}$ | R$_3$ | CH | N | C$_6$H$_{13}$ | H | |
| 1-48 | (iii) | H | 6 | — | R$_7$ | NR$_{10}$ | R$_3$ | CH | N | C$_8$H$_{17}$ | H | |
| 1-49 | (iii) | H | 6 | — | R$_7$ | NR$_{10}$ | R$_3$ | CH | N | CH$_3$ | H | |
| 1-50 | (iii) | H | 6 | — | R$_7$ | NR$_{10}$ | R$_3$ | CH | N | C$_6$H$_{13}$ | H | |
| 1-51 | (iii) | H | 6 | — | R$_7$ | NR$_{10}$ | R$_3$ | CH | N | C$_8$H$_{17}$ | H | |
| 1-52 | (iii) | H | 6 | — | R$_7$ | NR$_{10}$ | R$_4$ | CH | N | CH$_3$ | H | |
| 1-53 | (iii) | H | 6 | — | R$_7$ | NR$_{10}$ | R$_4$ | CH | N | C$_6$H$_{13}$ | H | |
| 1-54 | (iii) | H | 6 | — | R$_7$ | NR$_{10}$ | R$_4$ | CH | N | H | CH$_3$ | |
| 1-55 | (iii) | H | 6 | — | R$_7$ | NR$_{10}$ | R$_4$ | CH | N | H | H | |
| 1-56 | (iii) | H | 6 | — | R$_1$ | NR$_{10}$ | R$_3$ | CH | N | — | H | |
| 1-57 | (iii) | H | 6 | — | R$_2$ | NR$_{10}$ | R$_4$ | CH | N | H | — | |
| 1-58 | (iii) | H | 6 | — | R$_{10}$ | NR$_{10}$ | R$_3$ | CH | N | H | H | |
| 1-59 | (iii) | H | 6 | — | R$_{10}$ | NR$_{10}$ | R$_3$ | CH | N | H | H | |
| 1-60 | (iii) | H | 6 | — | R$_{10}$ | NR$_{10}$ | R$_3$ | CH | N | H | H | |
| 1-61 | (iii) | H | 6 | — | R$_{10}$ | NR$_{10}$ | R$_3$ | CH | N | H | H | |
| 1-62 | (iii) | H | 6 | — | R$_{10}$ | NR$_{10}$ | R$_4$ | CH | N | H | H | |
| 1-63 | (iii) | H | 6 | — | R$_7$ | S | R$_4$ | CH | N | CH$_3$ | H | |
| 1-64 | (iii) | H | 6 | — | R$_7$ | S | R$_4$ | CH | N | CH$_3$ | H | |
| 1-65 | (iii) | H | 6 | — | R$_7$ | S | R$_4$ | CH | N | CH$_3$ | H | |
| 1-66 | (iii) | H | 6 | — | R$_7$ | S | R$_4$ | CH | N | CH$_3$ | H | |
| 1-67 | (iii) | H | 6 | — | R$_7$ | S | R$_4$ | CH | N | CH$_3$ | H | |

| Polymer | Azomethine derivative | | | | | | | Other structural unit | Mn |
|---|---|---|---|---|---|---|---|---|---|
| | R$_3$ | R$_4$ | R$_5$ | R$_6$ | R$_7$ | R$_8$ | R$_9$ | R$_{10}$ | | |
| 1-1 | H | — | H | H | — | H | H | — | — | 12000 |
| 1-2 | H | — | H | H | — | H | H | — | — | 18000 |
| 1-3 | H | — | H | H | — | H | H | — | — | 15000 |
| 1-4 | H | — | H | H | — | H | H | — | — | 1000 |
| 1-5 | H | — | H | H | — | H | H | — | — | 28000 |
| 1-6 | H | — | H | H | — | H | H | — | — | 21000 |
| 1-7 | H | — | H | H | — | H | H | — | — | 5000 |
| 1-8 | H | — | H | H | — | H | H | — | — | 4500 |
| 1-9 | H | — | H | H | — | H | H | — | — | 18000 |
| 1-10 | H | — | H | H | — | H | H | — | — | 2500 |
| 1-11 | H | — | H | H | — | H | H | — | — | 5100 |
| 1-12 | H | — | H | H | — | H | H | — | — | 43000 |
| 1-13 | H | — | H | H | — | H | H | — | — | 5200 |
| 1-14 | H | — | H | H | — | H | H | — | — | 3500 |
| 1-15 | H | — | H | H | — | H | H | — | — | 14000 |
| 1-16 | CH$_3$ | — | H | H | — | H | H | — | — | 7000 |
| 1-17 | H | — | CH$_3$ | H | — | H | H | — | — | 17000 |
| 1-18 | H | — | H | CH$_3$ | — | H | H | — | — | 11000 |
| 1-19 | H | — | H | H | — | H | H | — | — | 7300 |
| 1-20 | — | H | H | H | — | H | H | — | — | 16000 |
| 1-21 | — | H | H | H | — | H | H | — | — | 30000 |
| 1-22 | H | — | H | H | — | H | H | — | — | 45000 |
| 1-23 | H | — | H | H | — | H | H | — | — | 7000 |
| 1-24 | H | — | H | H | — | H | H | — | — | 4000 |
| 1-25 | H | — | H | H | — | H | H | — | — | 10000 |
| 1-26 | H | — | H | — | H | H | H | — | — | 5900 |
| 1-27 | H | — | — | H | H | H | H | — | — | 5500 |
| 1-28 | H | — | H | H | CH$_3$ | H | H | — | — | 33000 |
| 1-29 | H | — | H | H | C$_6$H$_{13}$ | H | H | — | — | 15000 |
| 1-30 | H | — | H | H | OC$_6$H$_{13}$ | H | H | — | — | 9000 |
| 1-31 | H | — | H | H | H | H | H | — | — | 7700 |
| 1-32 | H | — | H | CH$_3$ | C$_6$H$_{13}$ | H | H | — | — | 14000 |
| 1-33 | — | H | H | H | CH$_3$ | H | H | — | — | 20000 |
| 1-34 | H | — | H | H | CH$_3$ | H | H | — | — | 28000 |
| 1-35 | H | — | H | H | H | H | H | — | — | 48000 |
| 1-36 | — | H | H | H | H | H | H | — | — | 6300 |
| 1-37 | H | — | H | H | — | H | H | — | — | 13000 |
| 1-38 | H | — | H | H | — | H | H | — | — | 8300 |
| 1-39 | H | — | H | H | — | H | H | — | — | 22000 |
| 1-40 | — | H | H | H | — | H | H | — | — | 52000 |

TABLE 2-continued

| ID | | | | | | | | | | |
|---|---|---|---|---|---|---|---|---|---|---|
| 1-41 | — | H | H | H | — | H | H | H | — | 6400 |
| 1-42 | — | H | H | H | — | H | H | $CH_3$ | — | 11000 |
| 1-43 | — | H | H | H | — | H | H | $C_6H_{13}$ | — | 19000 |
| 1-44 | — | H | H | H | — | H | H | $C_8H_{17}$ | — | 13000 |
| 1-45 | — | H | H | H | — | H | H | $OCOCH_3$ | — | 35000 |
| 1-46 | — | H | H | H | — | H | H | H | — | 5300 |
| 1-47 | — | H | H | H | — | H | H | H | — | 6000 |
| 1-48 | — | H | H | H | — | H | H | H | — | 38000 |
| 1-49 | — | H | H | H | — | H | H | $CH_3$ | — | 27000 |
| 1-50 | — | H | H | H | — | H | H | $CH_3$ | — | 16000 |
| 1-51 | — | H | H | H | — | H | H | $CH_3$ | — | 8500 |
| 1-52 | H | — | H | H | — | H | H | H | — | 18000 |
| 1-53 | H | — | H | H | — | H | H | H | — | 8200 |
| 1-54 | H | — | H | H | — | H | H | H | — | 6700 |
| 1-55 | H | — | H | H | — | H | H | $CH_3$ | — | 5600 |
| 1-56 | — | H | H | H | $CH_3$ | H | H | $CH_3$ | — | 24000 |
| 1-57 | H | — | H | H | $CH_3$ | H | H | $CH_3$ | — | 55000 |
| 1-58 | — | H | H | H | $CH_3$ | H | H | — | — | 9000 |
| 1-59 | — | H | H | H | $C_6H_{13}$ | H | H | — | — | 40000 |
| 1-60 | — | H | H | H | $OC_6H_{13}$ | H | H | — | — | 17000 |
| 1-61 | — | H | H | H | H | H | H | — | — | 12000 |
| 1-62 | H | — | H | H | $CH_3$ | H | H | — | — | 25000 |
| 1-63 | H | — | H | H | — | H | H | — | nHA | 11000 |
| 1-64 | H | — | H | H | — | H | H | — | nBMA | 5800 |
| 1-65 | H | — | H | H | — | H | H | — | St | 3800 |
| 1-66 | H | — | H | H | — | H | H | — | 1HEX | 4800 |
| 1-67 | H | — | H | H | — | H | H | — | St/nHA | 9400 | nHA: n-hexyl acrylate;
nBMA: n-butyl methacrylate;
St: styrene;
1HEX: 1-hexene

TABLE 3

| | | Photoresponsive adhesion test | |
|---|---|---|---|
| | Polymer/compound | Fluidization test | Non-fluidization test |
| Example 1-1 | 1-1 | ○ | ○ |
| Example 1-2 | 1-2 | ○ | ○ |
| Example 1-3 | 1-3 | ○ | ○ |
| Example 1-4 | 1-4 | ○ | ○ |
| Example 1-5 | 1-5 | ○ | ○ |
| Example 1-6 | 1-6 | ○ | ○ |
| Example 1-7 | 1-7 | ○ | ○ |
| Example 1-8 | 1-8 | ○ | ○ |
| Example 1-9 | 1-9 | ○ | ○ |
| Example 1-10 | 1-10 | ○ | ○ |
| Example 1-11 | 1-11 | ○ | ○ |
| Example 1-12 | 1-12 | ○ | ○ |
| Example 1-13 | 1-13 | ○ | ○ |
| Example 1-14 | 1-14 | ○ | ○ |
| Example 1-15 | 1-15 | ○ | ○ |
| Example 1-16 | 1-16 | ○ | ○ |
| Example 1-17 | 1-17 | ○ | ○ |
| Example 1-18 | 1-18 | ○ | ○ |
| Example 1-19 | 1-19 | ○ | ○ |
| Example 1-20 | 1-20 | ○ | ○ |
| Example 1-21 | 1-21 | ○ | ○ |
| Example 1-22 | 1-22 | ○ | ○ |
| Example 1-23 | 1-23 | ○ | ○ |
| Example 1-24 | 1-24 | ○ | ○ |
| Example 1-25 | 1-25 | ○ | ○ |
| Example 1-26 | 1-26 | ○ | ○ |
| Example 1-27 | 1-27 | ○ | ○ |
| Example 1-28 | 1-28 | ○ | ○ |
| Example 1-29 | 1-29 | ○ | ○ |
| Example 1-30 | 1-30 | ○ | ○ |
| Example 1-31 | 1-31 | ○ | ○ |
| Example 1-32 | 1-32 | ○ | ○ |
| Example 1-33 | 1-33 | ○ | ○ |
| Example 1-34 | 1-34 | ○ | ○ |
| Example 1-35 | 1-35 | ○ | ○ |
| Example 1-36 | 1-36 | ○ | ○ |
| Example 1-37 | 1-37 | ○ | ○ |
| Example 1-38 | 1-38 | ○ | ○ |
| Example 1-39 | 1-39 | ○ | ○ |
| Example 1-40 | 1-40 | ○ | ○ |
| Example 1-41 | 1-41 | ○ | ○ |
| Example 1-42 | 1-42 | ○ | ○ |
| Example 1-43 | 1-43 | ○ | ○ |
| Example 1-44 | 1-44 | ○ | ○ |
| Example 1-45 | 1-45 | ○ | ○ |
| Example 1-46 | 1-46 | ○ | ○ |
| Example 1-47 | 1-47 | ○ | ○ |
| Example 1-48 | 1-48 | ○ | ○ |
| Example 1-49 | 1-49 | ○ | ○ |
| Example 1-50 | 1-50 | ○ | ○ |
| Example 1-51 | 1-51 | ○ | ○ |
| Example 1-52 | 1-52 | ○ | ○ |
| Example 1-53 | 1-53 | ○ | ○ |
| Example 1-54 | 1-54 | ○ | ○ |
| Example 1-55 | 1-55 | ○ | ○ |
| Example 1-56 | 1-56 | ○ | ○ |
| Example 1-57 | 1-57 | ○ | ○ |
| Example 1-58 | 1-58 | ○ | ○ |
| Example 1-59 | 1-59 | ○ | ○ |
| Example 1-60 | 1-60 | ○ | ○ |
| Example 1-61 | 1-61 | ○ | ○ |
| Example 1-62 | 1-62 | ○ | ○ |
| Example 1-63 | 1-63 | ○ | ○ |
| Example 1-64 | 1-64 | ○ | ○ |
| Example 1-65 | 1-65 | ○ | ○ |
| Example 1-66 | 1-66 | ○ | ○ |
| Example 1-67 | 1-67 | ○ | ○ |
| Comparative Example 1-1 | Comparative compound 1-1 | ○ | x |

TABLE 4

| | | Toner configuration | | | | | | |
|---|---|---|---|---|---|---|---|---|
| | | Polymer/compound | | | | | | |
| | Toner No. | Polymer No. | Incorporation ratio (mass %) | Binder resin | Colorant | Fixing apparatus No. | Evaluation of fixability (%) | Color reproducibility |
| Example 1-1 | 1-1 | 1-1 | 80 | Styrene-acrylic resin | Cyan | 1 | 90 | ☉ |
| Example 1-2 | 1-2 | 1-2 | 80 | Styrene-acrylic resin | Cyan | 1 | 88 | ☉ |
| Example 1-3 | 1-3 | 1-3 | 80 | Styrene-acrylic resin | Cyan | 1 | 85 | ☉ |
| Example 1-4 | 1-4 | 1-4 | 80 | Styrene-acrylic resin | Cyan | 1 | 63 | ☉ |
| Example 1-5 | 1-5 | 1-5 | 80 | Styrene-acrylic resin | Cyan | 1 | 83 | ☉ |
| Example 1-6 | 1-6 | 1-6 | 80 | Styrene-acrylic resin | Cyan | 1 | 84 | ☉ |
| Example 1-7 | 1-7 | 1-7 | 80 | Styrene-acrylic resin | Cyan | 1 | 81 | ☉ |
| Example 1-8 | 1-8 | 1-8 | 80 | Styrene-acrylic resin | Cyan | 1 | 75 | ☉ |
| Example 1-9 | 1-9 | 1-9 | 80 | Styrene-acrylic resin | Cyan | 1 | 76 | ☉ |
| Example 1-10 | 1-10 | 1-10 | 80 | Styrene-acrylic resin | Cyan | 1 | 65 | ☉ |
| Example 1-11 | 1-11 | 1-11 | 80 | Styrene-acrylic resin | Cyan | 1 | 85 | ☉ |
| Example 1-12 | 1-12 | 1-12 | 80 | Styrene-acrylic resin | Cyan | 1 | 65 | ☉ |
| Example 1-13 | 1-13 | 1-13 | 80 | Styrene-acrylic resin | Cyan | 1 | 77 | ☉ |
| Example 1-14 | 1-14 | 1-14 | 80 | Styrene-acrylic resin | Cyan | 1 | 70 | ☉ |
| Example 1-15 | 1-15 | 1-15 | 80 | Styrene-acrylic resin | Cyan | 1 | 73 | ☉ |
| Example 1-16 | 1-16 | 1-16 | 80 | Styrene-acrylic resin | Cyan | 1 | 71 | ☉ |
| Example 1-17 | 1-17 | 1-17 | 80 | Styrene-acrylic resin | Cyan | 1 | 79 | ☉ |
| Example 1-18 | 1-18 | 1-18 | 80 | Styrene-acrylic resin | Cyan | 1 | 80 | ☉ |
| Example 1-19 | 1-19 | 1-19 | 80 | Styrene-acrylic resin | Cyan | 1 | 78 | ☉ |
| Example 1-20 | 1-20 | 1-20 | 80 | Styrene-acrylic resin | Cyan | 1 | 82 | ☉ |
| Example 1-21 | 1-21 | 1-21 | 80 | Styrene-acrylic resin | Cyan | 1 | 76 | ☉ |
| Example 1-22 | 1-22 | 1-22 | 80 | Styrene-acrylic resin | Cyan | 1 | 73 | ☉ |
| Example 1-23 | 1-23 | 1-23 | 80 | Styrene-acrylic resin | Cyan | 1 | 81 | ☉ |
| Example 1-24 | 1-24 | 1-24 | 80 | Styrene-acrylic resin | Cyan | 1 | 73 | ☉ |
| Example 1-25 | 1-25 | 1-25 | 80 | Styrene-acrylic resin | Cyan | 1 | 69 | ☉ |
| Example 1-26 | 1-26 | 1-26 | 80 | Styrene-acrylic resin | Cyan | 1 | 71 | ☉ |
| Example 1-27 | 1-27 | 1-27 | 80 | Styrene-acrylic resin | Cyan | 1 | 66 | ☉ |
| Example 1-28 | 1-28 | 1-28 | 80 | Styrene-acrylic resin | Cyan | 1 | 75 | ☉ |
| Example 1-29 | 1-29 | 1-29 | 80 | Styrene-acrylic resin | Cyan | 1 | 80 | ☉ |
| Example 1-30 | 1-30 | 1-30 | 80 | Styrene-acrylic resin | Cyan | 1 | 79 | ☉ |
| Example 1-31 | 1-31 | 1-31 | 80 | Styrene-acrylic resin | Cyan | 1 | 83 | ☉ |
| Example 1-32 | 1-32 | 1-32 | 80 | Styrene-acrylic resin | Cyan | 1 | 74 | ☉ |
| Example 1-33 | 1-33 | 1-33 | 80 | Styrene-acrylic resin | Cyan | 1 | 72 | ☉ |
| Example 1-34 | 1-34 | 1-34 | 80 | Styrene-acrylic resin | Cyan | 1 | 68 | ☉ |
| Example 1-35 | 1-35 | 1-35 | 80 | Styrene-acrylic resin | Cyan | 1 | 73 | ☉ |
| Example 1-36 | 1-36 | 1-36 | 80 | Styrene-acrylic resin | Cyan | 1 | 62 | ☉ |
| Example 1-37 | 1-37 | 1-37 | 80 | Styrene-acrylic resin | Cyan | 1 | 74 | ☉ |
| Example 1-38 | 1-38 | 1-38 | 80 | Styrene-acrylic resin | Cyan | 1 | 72 | ☉ |
| Example 1-39 | 1-39 | 1-39 | 80 | Styrene-acrylic resin | Cyan | 1 | 68 | ☉ |
| Example 1-40 | 1-40 | 1-40 | 80 | Styrene-acrylic resin | Cyan | 1 | 75 | ☉ |
| Example 1-41 | 1-41 | 1-41 | 80 | Styrene-acrylic resin | Cyan | 1 | 82 | ☉ |
| Example 1-42 | 1-42 | 1-42 | 80 | Styrene-acrylic resin | Cyan | 1 | 88 | ☉ |
| Example 1-43 | 1-43 | 1-43 | 80 | Styrene-acrylic resin | Cyan | 1 | 86 | ☉ |
| Example 1-44 | 1-44 | 1-44 | 80 | Styrene-acrylic resin | Cyan | 1 | 85 | ☉ |
| Example 1-45 | 1-45 | 1-45 | 80 | Styrene-acrylic resin | Cyan | 1 | 67 | ☉ |
| Example 1-46 | 1-46 | 1-46 | 80 | Styrene-acrylic resin | Cyan | 1 | 80 | ☉ |
| Example 1-47 | 1-47 | 1-47 | 80 | Styrene-acrylic resin | Cyan | 1 | 75 | ☉ |
| Example 1-48 | 1-48 | 1-48 | 80 | Styrene-acrylic resin | Cyan | 1 | 70 | ☉ |
| Example 1-49 | 1-49 | 1-49 | 80 | Styrene-acrylic resin | Cyan | 1 | 72 | ☉ |
| Example 1-50 | 1-50 | 1-50 | 80 | Styrene-acrylic resin | Cyan | 1 | 71 | ☉ |
| Example 1-51 | 1-51 | 1-51 | 80 | Styrene-acrylic resin | Cyan | 1 | 70 | ☉ |
| Example 1-52 | 1-52 | 1-52 | 80 | Styrene-acrylic resin | Cyan | 1 | 78 | ☉ |
| Example 1-53 | 1-53 | 1-53 | 80 | Styrene-acrylic resin | Cyan | 1 | 74 | ☉ |
| Example 1-54 | 1-54 | 1-54 | 80 | Styrene-acrylic resin | Cyan | 1 | 75 | ☉ |
| Example 1-55 | 1-55 | 1-55 | 80 | Styrene-acrylic resin | Cyan | 1 | 72 | ☉ |
| Example 1-56 | 1-56 | 1-56 | 80 | Styrene-acrylic resin | Cyan | 1 | 67 | ☉ |
| Example 1-57 | 1-57 | 1-57 | 80 | Styrene-acrylic resin | Cyan | 1 | 62 | ☉ |
| Example 1-58 | 1-58 | 1-58 | 80 | Styrene-acrylic resin | Cyan | 1 | 84 | ☉ |
| Example 1-59 | 1-59 | 1-59 | 80 | Styrene-acrylic resin | Cyan | 1 | 64 | ☉ |
| Example 1-60 | 1-60 | 1-60 | 80 | Styrene-acrylic resin | Cyan | 1 | 81 | ☉ |
| Example 1-61 | 1-61 | 1-61 | 80 | Styrene-acrylic resin | Cyan | 1 | 83 | ☉ |
| Example 1-62 | 1-62 | 1-62 | 80 | Styrene-acrylic resin | Cyan | 1 | 66 | ☉ |
| Example 1-63 | 1-63 | 1-63 | 80 | Styrene-acrylic resin | Cyan | 1 | 83 | ☉ |
| Example 1-64 | 1-64 | 1-64 | 80 | Styrene-acrylic resin | Cyan | 1 | 78 | ☉ |
| Example 1-65 | 1-65 | 1-65 | 80 | Styrene-acrylic resin | Cyan | 1 | 79 | ☉ |
| Example 1-66 | 1-66 | 1-66 | 80 | Styrene-acrylic resin | Cyan | 1 | 72 | ☉ |
| Example 1-67 | 1-67 | 1-67 | 80 | Styrene-acrylic resin | Cyan | 1 | 82 | ☉ |
| Example 1-68 | 1-68 | 1-1 | 100 | — | Cyan | 1 | 81 | ☉ |
| Example 1-69 | 1-69 | 1-1 | 50 | Styrene-acrylic resin | Cyan | 1 | 84 | ☉ |
| Example 1-70 | 1-70 | 1-1 | 20 | Styrene-acrylic resin | Cyan | 1 | 82 | ☉ |
| Example 1-71 | 1-71 | 1-1 | 80 | Polyester resin | Cyan | 1 | 85 | ☉ |
| Example 1-72 | 1-1 | 1-1 | 80 | Styrene-acrylic resin | Cyan | 2 | 93 | ☉ |

TABLE 4-continued

| | Toner configuration | | | | | | |
|---|---|---|---|---|---|---|---|
| | | Polymer/compound | | | | | |
| | Toner No. | Polymer No. | Incorporation ratio (mass %) | Binder resin | Colorant | Fixing apparatus No. | Evaluation of fixability (%) | Color reproducibility |
| Example 1-73 | 1-1 | 1-1 | 80 | Styrene-acrylic resin | Cyan | 3 | 96 | ⊙ |
| Comparative Example 1-1 | 1-72 | Comparative compound 1-1 | 80 | Styrene-acrylic resin | Cyan | 1 | 65 | X |

As is obvious from Table 3, it was verified that the polymers including structural units derived from azomethine derivatives produced in the various Examples are reversibly fluidized and non-fluidized by being irradiated with light. In contrast, reversible fluidization and non-fluidization was not verified in the comparative compound 1-1 in Comparative Example 1-1.

Furthermore, as shown in Table 4, the toners produced in the various Examples all exhibited high fixability and excellent color reproducibility. In contrast, it was found that the toner of Comparative Example had satisfactory fixability but low color reproducibility. Since the light source for ultraviolet radiation and the conditions for irradiation of ultraviolet radiation used in the fixability test were constant throughout Examples 1-1 to 1-73 and Comparative Example 1-1, it can be said that the toners of Examples are reversibly fluidized and non-fluidized when irradiated with light compared to the toner of Comparative Example, and the effect brought by polymers that do not show noticeable coloration is sufficiently exhibited.

When a comparison of the fixing apparatuses is made, it could be seen that rather than using the fixing apparatus of No. 1, in which the same toner 1-1 was used and irradiated with ultraviolet radiation under the same conditions while no pressing member was used, superior fixability is obtained by using the fixing apparatus of No. 2, by which pressing was performed with a pressing member, and the fixing apparatus of No. 3, by which pressing was performed with a pressing member while heating (comparison of Examples 1-1, 1-72, and 1-73).

As disclosed in the various Examples, it can be seen that as long as a polymer including a particular structure derived from an azomethine derivative is used, reversible fluidization and non-fluidization is achieved by light irradiation, coloration occurs at a lowered level, and a superior fixing ratio of 60% or higher is exhibited in a fixability test for a toner image formed by a toner using this polymer.

Regarding the group having a polymerizable group, satisfactory results were obtained in a case in which any group of (ii), (iii), and (iv) was introduced; however, the fixing ratio of the toner image is further improved particularly when the group of (iii) is used (comparison of Examples 1-2 with 1-24, and comparison of Examples 1-31 with 1-34).

Regarding the group having a polymerizable group, satisfactory results were obtained even in a case in which the group having a polymerizable group was introduced into any one position of $R_1$, $R_2$, $R_5$ to $R_7$, $R_{10}$, and a group that was not selected as the group represented by Y among $R_3$ and $R_4$ in the Chemical Formula (1); however, when the group having a polymerizable group is introduced particularly into one position of $R_7$, $R_{10}$, or any one of $R_1$ to $R_4$, which is not adjacent to the group represented by Y, the fixing ratio of the toner image tends to be further improved (comparison of Examples 1-1, 1-26, and 1-27, and comparison of Examples 1-11, 1-35, and 1-36).

Above all, in the case of the toners of Examples 1-1 to 1-3, 1-5, 1-6, and 1-42 to 1-44, the fixing ratio of the image was particularly satisfactory.

When not only the structural unit derived from an azomethine derivative but also other structural units are used in combination, satisfactory fixing ratios can be similarly obtained.

Furthermore, not only the polymer but also a binder resin can be further incorporated into the toner. It was also verified that even in a case in which a binder resin is further used, a satisfactory fixing ratio is similarly obtained. When the polymer described above is used, even if the content ratio of the binder resin is low, a satisfactory fixing ratio can be obtained.

Second Embodiment

Examples 2-1 to 2-57

Polymer 2-1 was prepared according to the following procedure. Polymers 2-2 to 2-57 were prepared by similar methods, by changing the raw materials. Meanwhile, with regard to the polymers 2-2 to 2-57, the amounts of addition of the various raw materials and the reaction conditions were appropriately adjusted.

[Synthesis of Polymer 2-1]

<Synthesis of Azomethine Derivative Monomer 2-1>

[Chemical Formula 56]

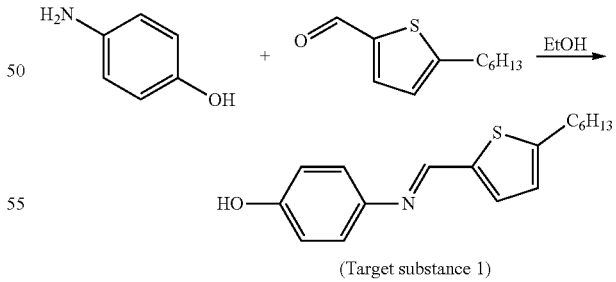

(Target substance 1)

Into a 100-ml four-necked flask, 4-aminophenol (5 g, 0.046 mol), 5-hexylthiophene-2-carboxyaldehyde (5.8 g, 0.046 mol), and 100 ml of ethanol were introduced, and the mixture was heated and stirred. The reaction liquid was suction-filtered, and a powder thus obtained was washed with cold ethanol. Furthermore, recrystallization from methanol/ethanol was carried out, and thus target substance 1 was obtained.

[Chemical Formula 57]

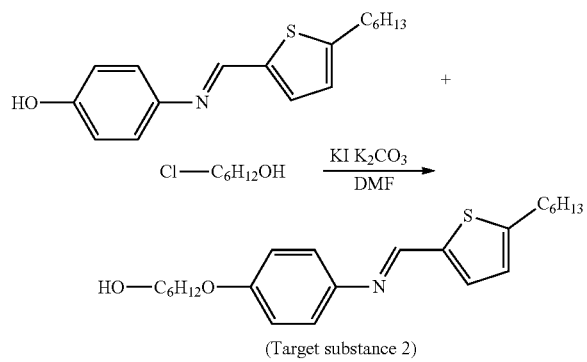

(Target substance 2)

In a 200-ml four-necked flask, the target substance 1 (5 g, 0.023 mol) obtained as described above was dissolved in 25 ml of dimethylformamide (DMF). To this, potassium carbonate (4.88 g, 0.035 mol) was added, and the mixture was stirred while being maintained at 30° C. To this, potassium iodide (10.2 mg, 0.06 mmol) and 6-chloro-1-hexanol (3.54 g, 0.026 mol) were added, and the mixture was reacted at 110° C. This was cooled to room temperature and added to 650 g of ice, and then the resultant was filtered. Crystals were dispersed in 400 ml of water, stirred overnight, washed, filtered, and dried. Furthermore, recrystallization from ethanol was carried out, and target substance 2 was obtained.

[Chemical Formula 58]

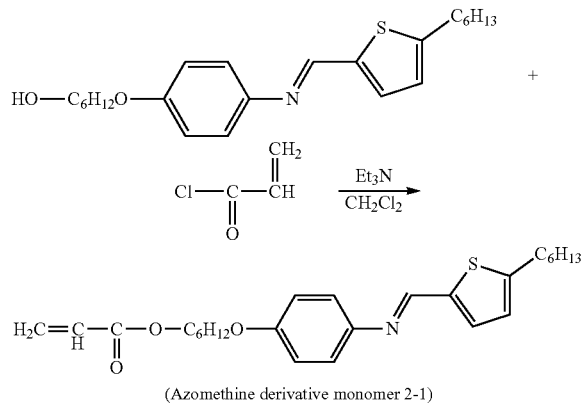

(Azomethine derivative monomer 2-1)

Into a 100-ml four-necked flask, the target substance 2 (3 g, 0.001 mol) obtained as described above, triethylamine (1.34 ml, 0.001 mol), and 30 ml of dichloromethane were introduced. At this time, the raw materials were in a dispersed state. While the internal temperature was maintained at 0° C., a solution obtained by dissolving acrylic acid chloride (1.04 g, 0.011 mol) in 10 ml of dichloromethane was added dropwise thereto while the internal temperature was maintained at 0° C. to 5° C. As the solution was added dropwise, the raw materials were dissolved.

After completion of the dropwise addition, the reaction liquid was returned to room temperature, and stirring was performed. After completion of the reaction, dichloromethane was removed by concentration, the residue was dissolved in ethyl acetate, the solution was washed with dilute hydrochloric acid, an aqueous solution of sodium hydrogen carbonate, and saturated brine, and an organic layer was dried over magnesium sulfate and then concentrated. Orange-colored crystals thus obtained were purified with a silica gel column (ethyl acetate/heptane=1/5), and azomethine derivative monomer 2-1 was obtained.

<Synthesis of Macroinitiator 2-1>

Into a 100-ml pear-shaped flask, 2,2'-bipyridyl (230 mg, 1.47 mmol) was introduced, and in a glove box in a nitrogen atmosphere, Cu(I)Br (95 mg, 0.66 mmol), styrene (15 g, 144 mmol), and ethyl 2-bromoisobutyrate (35 mg, 0.18 mmol) were further added thereto. The flask was tightly sealed. This was heated and stirred in an oil bath at 100° C. Subsequently, tetrahydrofuran was added thereto in an appropriate amount, and the mixture was passed through a neutral alumina column. This was purified by reprecipitation from methanol and centrifugation, and thus macroinitiator 2-1 was obtained. The number average molecular weight (B Mn) of the macroinitiator 2-1 thus obtained was measured by a GPC method, and the number average molecular weight was 4,500.

<Synthesis of Polymer 2-1>

Into a 100-ml pear-shaped flask, the azomethine derivative monomer 2-1 (18 g, 41 mmol) obtained as described above and the macroinitiator 2-1 (47 mg, 0.18 mol) were introduced, and in a glove box in a nitrogen atmosphere, Cu(I)Cl (29 mg, 0.29 mmol), 1,1,4,7,10,10-hexamethyltriethylenetetramine (136 mg, 0.59 mmol), and anisole (4.9 g, 41.1 mmol) as a solvent were further added thereto. The flask was tightly sealed. Then, the mixture was heated and stirred in an oil bath at 80° C. Subsequently, chloroform was added thereto in an appropriate amount, and the mixture was passed through a basic alumina column. This was purified by reprecipitation from methanol and centrifugation, and thus polymer 2-1 was obtained. The total number average molecular weight Mn of the polymer 2-1 thus obtained was measured by a GPC method, and the total number average molecular weight was 5,500.

[Synthesis of Polymer 2-2]

<Synthesis of Macroinitiator 2-2>

Macroinitiator 2-2 was obtained by a similar method except that in the <Synthesis of macroinitiator 2-1>, ethyl 2-bromoisobutyrate was changed to α,α'-dibromo-p-xylene.

<Synthesis of Polymer 2-2>

Polymer 2-2 was obtained by a similar method except that in the <Synthesis of polymer 2-1>, macroinitiator 2-1 was changed to macroinitiator 2-2.

[Synthesis of Polymer 2-3]

<Synthesis of Macroinitiator 2-3>

Macroinitiator 2-3 was obtained by a similar method except that in the <Synthesis of macroinitiator 2-1>, ethyl 2-bromoisobutyrate was changed to ethylene bis(2-bromoisobutyrate), 2,2'-bipyridyl was changed to 1,1,4,7,10,10-hexamethyltriethylenetetramine, styrene was changed to the azomethine derivative monomer 2-1, and anisole was further added thereto.

<Synthesis of Polymer 2-3>

Polymer 2-3 was obtained by a similar method except that in the <Synthesis of polymer 2-1>, the macroinitiator 2-1 was changed to the macroinitiator 2-3, 1,1,4,7,10,10-hexamethyltriethylenetetramine was changed to 2,2'-bipyridyl, the azomethine derivative monomer 2-1 was changed to styrene, and anisole was excluded.

[Synthesis of Polymer 2-4]

<Synthesis of Macroinitiator 2-4>

Macroinitiator 2-4 was obtained by a similar method except that in the <Synthesis of macroinitiator 2-1>, ethyl 2-bromoisobutyrate was changed to 1,1,1-tris(2-bromoisobutyryloxymethyl)ethane.

<Synthesis of Polymer 2-4>

Polymer 2-4 was obtained by a similar method except that in the <Synthesis of polymer 2-1>, the macroinitiator 2-1 was changed to the macroinitiator 2-4.

[Synthesis of Polymer 2-5]

<Synthesis of Macroinitiator 2-5>

Macroinitiator 2-5 was obtained by a similar method except that in the <Synthesis of macroinitiator 2-3>, ethylene bis(2-bromoisobutyrate) was changed to 1,1,1-tris(2-bromoisobutyryloxymethyl)ethane.

<Synthesis of Polymer 2-5>

Polymer 2-5 was obtained by a similar method except that in the <Synthesis of polymer 2-3>, the macroinitiator 2-3 was changed to the macroinitiator 2-5.

[Synthesis of Polymer 2-6]

<Synthesis of Macroinitiator 2-6>

Macroinitiator 2-6 was obtained by a similar method except that in the <Synthesis of macroinitiator 2-1>, ethyl 2-bromoisobutyrate was changed to pentaerythritol tetrakis (2-bromoisobutyrate).

<Synthesis of Polymer 2-6>

Polymer 2-6 was obtained by a similar method except that in the <Synthesis of polymer 2-1>, the macroinitiator 2-1 was changed to the macroinitiator 2-6.

[Synthesis of Polymer 2-7]

<Synthesis of Macroinitiator 2-7>

Macroinitiator 2-7 was obtained by a similar method except that in the <Synthesis of macroinitiator 2-3>, ethylene bis(2-bromoisobutyrate) was changed to pentaerythritol tetrakis(2-bromoisobutyrate).

<Synthesis of Polymer 2-7>

Polymer 2-7 was obtained by a similar method except that in the <Synthesis of polymer 2-3>, the macroinitiator 2-3 was changed to the macroinitiator 2-7.

[Synthesis of Polymer 2-8]

Azomethine derivative monomer 2-2 was obtained by a similar method except that in the <Synthesis of azomethine derivative monomer 2-1> described above, 5-hexylthiophene-2-carboxyaldehyde was changed to 5-methylthiophene-2-carboxyaldehyde.

Polymer 2-8 was obtained by a similar method except that in the <Synthesis of polymer 2-2>, the azomethine derivative monomer 2-1 was changed to the azomethine derivative monomer 2-2.

[Synthesis of Polymer 2-9]

Azomethine derivative monomer 2-3 was obtained by a similar method except that in the <Synthesis of azomethine derivative monomer 2-1> described above, 5-hexylthiophene-2-carboxyaldehyde was changed to 5-decylthiophene-2-carboxyaldehyde.

Polymer 2-9 was obtained by a similar method except that in the <Synthesis of polymer 2-2>, the azomethine derivative monomer 2-1 was changed to the azomethine derivative monomer 2-3.

[Synthesis of Polymer 2-10]

Azomethine derivative monomer 2-4 was obtained by a similar method except that in the <Synthesis of azomethine derivative monomer 2-1> described above, 5-hexylthiophene-2-carboxyaldehyde was changed to 5-hexyloxythiophene-2-carboxyaldehyde.

Polymer 2-10 was obtained by a similar method except that in the <Synthesis of polymer 2-2>, the azomethine derivative monomer 2-1 was changed to the azomethine derivative monomer 2-4.

[Synthesis of Polymer 2-11]

Azomethine derivative monomer 2-5 was obtained by a similar method except that in the <Synthesis of azomethine derivative monomer 2-1> described above, 5-hexylthiophene-2-carboxyaldehyde was changed to 5-carboxylic acid hexylthiophene-2-carboxyaldehyde.

Polymer 2-11 was obtained by a similar method except that in the <Synthesis of polymer 2-2>, the azomethine derivative monomer 2-1 was changed to the azomethine derivative monomer 2-5.

[Synthesis of Polymer 2-12]

Azomethine derivative monomer 2-6 was obtained by a similar method except that in the <Synthesis of azomethine derivative monomer 2-1> described above, 5-hexylthiophene-2-carboxyaldehyde was changed to 5-hexanoylthiophene-2-carboxyaldehyde.

Polymer 2-12 was obtained by a similar method except that in the <Synthesis of polymer 2-2>, the azomethine derivative monomer 2-1 was changed to the azomethine derivative monomer 2-6.

[Synthesis of Polymer 2-13]

Azomethine derivative monomer 2-7 was obtained by a similar method except that in the <Synthesis of azomethine derivative monomer 2-1> described above, 5-hexylthiophene-2-carboxyaldehyde was changed to 2-thiophenecarboxyaldehyde.

Polymer 2-13 was obtained by a similar method except that in the <Synthesis of polymer 2-2>, the azomethine derivative monomer 2-1 was changed to the azomethine derivative monomer 2-7.

[Synthesis of Polymer 2-14]

Azomethine derivative monomer 2-8 was obtained by a similar method except that in the <Synthesis of azomethine derivative monomer 2-1> described above, 5-hexylthiophene-2-carboxyaldehyde was changed to 5-bromothiophene-2-carboxyaldehyde.

Polymer 2-14 was obtained by a similar method except that in the <Synthesis of polymer 2-2>, the azomethine derivative monomer 2-1 was changed to the azomethine derivative monomer 2-8.

[Synthesis of Polymer 2-15]

Azomethine derivative monomer 2-9 was obtained by a similar method except that in the <Synthesis of azomethine derivative monomer 2-1> described above, 5-hexylthiophene-2-carboxyaldehyde was changed to 5-cyanothiophene-2-carboxyaldehyde.

Polymer 2-15 was obtained by a similar method except that in the <Synthesis of polymer 2-2>, the azomethine derivative monomer 2-1 was changed to the azomethine derivative monomer 2-9.

[Synthesis of Polymer 2-16]

Azomethine derivative monomer 2-10 was obtained by a similar method except that in the <Synthesis of azomethine derivative monomer 2-1> described above, 5-hexylthiophene-2-carboxyaldehyde was changed to 5-nitrothiophene-2-carboxyaldehyde.

Polymer 2-16 was obtained by a similar method except that in the <Synthesis of polymer 2-2>, the azomethine derivative monomer 2-1 was changed to the azomethine derivative monomer 2-10.

[Synthesis of Polymer 2-17]

Azomethine derivative monomer 2-11 was obtained by a similar method except that in the <Synthesis of azomethine derivative monomer 2-1> described above, 5-hexylthiophene-2-carboxyaldehyde was changed to 5-carboxythiophene-2-carboxyaldehyde.

Polymer 2-17 was obtained by a similar method except that in the <Synthesis of polymer 2-2>, the azomethine derivative monomer 2-1 was changed to the azomethine derivative monomer 2-11.

[Synthesis of Polymer 2-18]

Azomethine derivative monomer 2-12 was obtained by a similar method except that in the <Synthesis of azomethine derivative monomer 2-1> described above, 5-hexylthiophene-2-carboxyaldehyde was changed to 4-methyl-5-hexylthiophene-2-carboxyaldehyde.

Polymer 2-18 was obtained by a similar method except that in the <Synthesis of polymer 2-2>, the azomethine derivative monomer 2-1 was changed to the azomethine derivative monomer 2-12.

[Synthesis of Polymer 2-19]

Azomethine derivative monomer 2-13 was obtained by a similar method except that in the <Synthesis of azomethine derivative monomer 2-1> described above, 5-hexylthiophene-2-carboxyaldehyde was changed to 3-methyl-5-hexylthiophene-2-carboxyaldehyde.

Polymer 2-19 was obtained by a similar method except that in the <Synthesis of polymer 2-2>, the azomethine derivative monomer 2-1 was changed to the azomethine derivative monomer 2-13.

[Synthesis of Polymer 2-20]

Azomethine derivative monomer 2-14 was obtained by a similar method except that in the <Synthesis of azomethine derivative monomer 2-1> described above, 4-aminophenol was changed to 4-amino-m-cresol.

Polymer 2-20 was obtained by a similar method except that in the <Synthesis of polymer 2-2>, the azomethine derivative monomer 2-1 was changed to the azomethine derivative monomer 2-14.

[Synthesis of Polymer 2-21]

Azomethine derivative monomer 2-15 was obtained by a similar method except that in the <Synthesis of azomethine derivative monomer 2-1> described above, 4-aminophenol was changed to 4-amino-o-cresol.

Polymer 2-21 was obtained by a similar method except that in the <Synthesis of polymer 2-2>, the azomethine derivative monomer 2-1 was changed to the azomethine derivative monomer 2-15.

[Synthesis of Polymer 2-22]

Azomethine derivative monomer 2-16 was obtained by a similar method except that in the <Synthesis of azomethine derivative monomer 2-1> described above, 5-hexylthiophene-2-carboxyaldehyde was changed to 4-hexylthiophene-2-carboxyaldehyde.

Polymer 2-22 was obtained by a similar method except that in the <Synthesis of polymer 2-2>, the azomethine derivative monomer 2-1 was changed to the azomethine derivative monomer 2-16.

[Synthesis of Polymer 2-23]

Azomethine derivative monomer 2-17 was obtained by a similar method except that in the <Synthesis of azomethine derivative monomer 2-1> described above, 5-hexylthiophene-2-carboxyaldehyde was changed to 5-hexylthiophene-3-carboxyaldehyde.

Polymer 2-23 was obtained by a similar method except that in the <Synthesis of polymer 2-2>, the azomethine derivative monomer 2-1 was changed to the azomethine derivative monomer 2-17.

[Synthesis of Polymer 2-24]

Azomethine derivative monomer 2-18 was obtained by a similar method except that in the <Synthesis of azomethine derivative monomer 2-1> described above, 4-aminophenol was changed to 4-hydroxybenzaldehyde, and 5-hexylthiophene-2-carboxyaldehyde was changed to 2-amino-5-hexylthiophene.

Polymer 2-24 was obtained by a similar method except that in the <Synthesis of polymer 2-2>, the azomethine derivative monomer 2-1 was changed to the azomethine derivative monomer 2-18.

[Synthesis of Polymer 2-25]

Azomethine derivative monomer 2-19 was obtained by a similar method except that in the <Synthesis of azomethine derivative monomer 2-1> described above, 6-chloro-1-hexanol was changed to 10-chloro-1-decanol.

Polymer 2-25 was obtained by a similar method except that in the <Synthesis of polymer 2-2>, the azomethine derivative monomer 2-1 was changed to the azomethine derivative monomer 2-19.

[Synthesis of Polymer 2-26]

Azomethine derivative monomer 2-20 was obtained by a similar method except that in the <Synthesis of azomethine derivative monomer 2-1> described above, 4-aminophenol was changed to 4-(hydroxyhexyl)aniline, and the step of obtaining the target substance 2 was excluded.

Polymer 2-26 was obtained by a similar method except that in the <Synthesis of polymer 2-2>, the azomethine derivative monomer 2-1 was changed to the azomethine derivative monomer 2-20.

[Synthesis of Polymer 2-27]

Azomethine derivative monomer 2-21 was obtained by a similar method except that in the <Synthesis of azomethine derivative monomer 2-1> described above, acrylic acid chloride was changed to methacrylic acid chloride.

Polymer 2-27 was obtained by a similar method except that in the <Synthesis of polymer 2-2>, the azomethine derivative monomer 2-1 was changed to the azomethine derivative monomer 2-21.

[Synthesis of Polymer 2-28]

Azomethine derivative monomer 2-22 was obtained by a similar method except that in the <Synthesis of azomethine derivative monomer 2-1> described above, 4-aminophenol was changed to 3-aminophenol.

Polymer 2-28 was obtained by a similar method except that in the <Synthesis of polymer 2-2>, the azomethine derivative monomer 2-1 was changed to the azomethine derivative monomer 2-22.

[Synthesis of Polymer 2-29]

Azomethine derivative monomer 2-23 was obtained by a similar method except that in the <Synthesis of azomethine derivative monomer 2-1> described above, 5-hexylthiophene-2-carboxyaldehyde was changed to 5-hydroxythiophene-2-carboxyaldehyde, and 4-aminophenol was changed to 4-hexylaniline.

Polymer 2-29 was obtained by a similar method except that in the <Synthesis of polymer 2-2>, the azomethine derivative monomer 2-1 was changed to the azomethine derivative monomer 2-23.

[Synthesis of Polymer 2-30]

Azomethine derivative monomer 2-24 was obtained by a similar method except that in the <Synthesis of azomethine derivative monomer 2-1> described above, 5-hexylthiophene-2-carboxyaldehyde was changed to 5-hydroxythiophene-3-carboxyaldehyde, and 4-aminophenol was changed to 4-hexylaniline.

Polymer 2-30 was obtained by a similar method except that in the <Synthesis of polymer 2-2>, the azomethine derivative monomer 2-1 was changed to the azomethine derivative monomer 2-24.

[Synthesis of Polymer 2-31]

Azomethine derivative monomer 2-25 was obtained by a similar method except that in the <Synthesis of azomethine derivative monomer 2-1> described above, 5-hexylthiophene-2-carboxyaldehyde was changed to 5-hydroxymethylthiophene-2-carboxyaldehyde, and 4-aminophenol was changed to 4-hexylaniline.

Polymer 2-31 was obtained by a similar method except that in the <Synthesis of polymer 2-2>, the azomethine derivative monomer 2-1 was changed to the azomethine derivative monomer 2-25.

[Synthesis of Polymer 2-32]

Azomethine derivative monomer 2-26 was obtained by a similar method except that in the <Synthesis of azomethine derivative monomer 2-1> described above, 5-hexylthiophene-2-carboxyaldehyde was changed to 4-hydroxythiophene-2-carboxyaldehyde, and 4-aminophenol was changed to 4-hexylaniline.

Polymer 2-32 was obtained by a similar method except that in the <Synthesis of polymer 2-2>, the azomethine derivative monomer 2-1 was changed to the azomethine derivative monomer 2-26.

[Synthesis of Polymer 2-33]

Azomethine derivative monomer 2-27 was obtained by a similar method except that in the <Synthesis of azomethine derivative monomer 2-1> described above, 5-hexylthiophene-2-carboxyaldehyde was changed to 5-methylfuran-2-carboxyaldehyde.

Polymer 2-33 was obtained by a similar method except that in the <Synthesis of polymer 2-2>, the azomethine derivative monomer 2-1 was changed to the azomethine derivative monomer 2-27.

[Synthesis of Polymer 2-34]

Azomethine derivative monomer 2-28 was obtained by a similar method except that in the <Synthesis of azomethine derivative monomer 2-1> described above, 5-hexylthiophene-2-carboxyaldehyde was changed to 5-hexylfuran-2-carboxyaldehyde.

Polymer 2-34 was obtained by a similar method except that in the <Synthesis of polymer 2-2>, the azomethine derivative monomer 2-1 was changed to the azomethine derivative monomer 2-28.

[Synthesis of Polymer 2-35]

Azomethine derivative monomer 2-29 was obtained by a similar method except that in the <Synthesis of azomethine derivative monomer 2-1> described above, 5-hexylthiophene-2-carboxyaldehyde was changed to 2-furancarboxyaldehyde.

Polymer 2-35 was obtained by a similar method except that in the <Synthesis of polymer 2-2>, the azomethine derivative monomer 2-1 was changed to the azomethine derivative monomer 2-29.

[Synthesis of Polymer 2-36]

Azomethine derivative monomer 2-30 was obtained by a similar method except that in the <Synthesis of azomethine derivative monomer 2-1> described above, 5-hexylthiophene-2-carboxyaldehyde was changed to 5-hexylfuran-3-carboxyaldehyde.

Polymer 2-36 was obtained by a similar method except that in the <Synthesis of polymer 2-2>, the azomethine derivative monomer 2-1 was changed to the azomethine derivative monomer 2-30.

[Synthesis of Polymer 2-37]

Azomethine derivative monomer 2-31 was obtained by a similar method except that in the <Synthesis of azomethine derivative monomer 2-1> described above, 5-hexylthiophene-2-carboxyaldehyde was changed to pyrrole-3-carboxyaldehyde.

Polymer 2-37 was obtained by a similar method except that in the <Synthesis of polymer 2-2>, the azomethine derivative monomer 2-1 was changed to the azomethine derivative monomer 2-31.

[Synthesis of Polymer 2-38]

Azomethine derivative monomer 2-32 was obtained by a similar method except that in the <Synthesis of azomethine derivative monomer 2-1> described above, 5-hexylthiophene-2-carboxyaldehyde was changed to 3-formyl-1-methylpyrrole.

Polymer 2-38 was obtained by a similar method except that in the <Synthesis of polymer 2-2>, the azomethine derivative monomer 2-1 was changed to the azomethine derivative monomer 2-32.

[Synthesis of Polymer 2-39]

Azomethine derivative monomer 2-33 was obtained by a similar method except that in the <Synthesis of azomethine derivative monomer 2-1> described above, 5-hexylthiophene-2-carboxyaldehyde was changed to 3-formyl-1-hexylpyrrole.

Polymer 2-39 was obtained by a similar method except that in the <Synthesis of polymer 2-2>, the azomethine derivative monomer 2-1 was changed to the azomethine derivative monomer 2-33.

[Synthesis of Polymer 2-40]

Azomethine derivative monomer 2-34 was obtained by a similar method except that in the <Synthesis of azomethine derivative monomer 2-1> described above, 5-hexylthiophene-2-carboxyaldehyde was changed to 3-formyl-1-decylpyrrole.

Polymer 2-40 was obtained by a similar method except that in the <Synthesis of polymer 2-2>, the azomethine derivative monomer 2-1 was changed to the azomethine derivative monomer 2-34.

[Synthesis of Polymer 2-41]

Azomethine derivative monomer 2-35 was obtained by a similar method except that in the <Synthesis of azomethine derivative monomer 2-1> described above, 5-hexylthiophene-2-carboxyaldehyde was changed to 3-formyl-1-acetoxypyrrole.

Polymer 2-41 was obtained by a similar method except that in the <Synthesis of polymer 2-2>, the azomethine derivative monomer 2-1 was changed to the azomethine derivative monomer 2-35.

[Synthesis of Polymer 2-42]

Azomethine derivative monomer 2-36 was obtained by a similar method except that in the <Synthesis of azomethine derivative monomer 2-1> described above, 5-hexylthiophene-2-carboxyaldehyde was changed to 5-methyl-1H-pyrrole-3-carboaldehyde.

Polymer 2-42 was obtained by a similar method except that in the <Synthesis of polymer 2-2>, the azomethine derivative monomer 2-1 was changed to the azomethine derivative monomer 2-36.

[Synthesis of Polymer 2-43]

Azomethine derivative monomer 2-37 was obtained by a similar method except that in the <Synthesis of azomethine derivative monomer 2-1> described above, 5-hexylthiophene-2-carboxyaldehyde was changed to 5-hexyl-1H-pyrrole-3-carboaldehyde.

Polymer 2-43 was obtained by a similar method except that in the <Synthesis of polymer 2-2>, the azomethine derivative monomer 2-1 was changed to the azomethine derivative monomer 2-37.

[Synthesis of Polymer 2-44]

Azomethine derivative monomer 2-38 was obtained by a similar method except that in the <Synthesis of azomethine derivative monomer 2-1> described above, 5-hexylthiophene-2-carboxyaldehyde was changed to 5-methyl-3-formyl-1-methylpyrrole.

Polymer 2-44 was obtained by a similar method except that in the <Synthesis of polymer 2-2>, the azomethine derivative monomer 2-1 was changed to the azomethine derivative monomer 2-38.

[Synthesis of Polymer 2-45]

Azomethine derivative monomer 2-39 was obtained by a similar method except that in the <Synthesis of azomethine derivative monomer 2-1> described above, 5-hexylthiophene-2-carboxyaldehyde was changed to 5-hexyl-3-formyl-1-methylpyrrole.

Polymer 2-45 was obtained by a similar method except that in the <Synthesis of polymer 2-2>, the azomethine derivative monomer 2-1 was changed to the azomethine derivative monomer 2-39.

[Synthesis of Polymer 2-46]

Azomethine derivative monomer 2-40 was obtained by a similar method except that in the <Synthesis of azomethine derivative monomer 2-1> described above, 5-hexylthiophene-2-carboxyaldehyde was changed to 2-formyl-5-hexylpyrrole.

Polymer 2-46 was obtained by a similar method except that in the <Synthesis of polymer 2-2>, the azomethine derivative monomer 2-1 was changed to the azomethine derivative monomer 2-40.

[Synthesis of Polymer 2-47]

Azomethine derivative monomer 2-41 was obtained by a similar method except that in the <Synthesis of azomethine derivative monomer 2-1> described above, 5-hexylthiophene-2-carboxyaldehyde was changed to 2-formyl-4-hexylpyrrole.

Polymer 2-47 was obtained by a similar method except that in the <Synthesis of polymer 2-2>, the azomethine derivative monomer 2-1 was changed to the azomethine derivative monomer 2-41.

[Synthesis of Polymer 2-48]

Azomethine derivative monomer 2-42 was obtained by a similar method except that in the <Synthesis of azomethine derivative monomer 2-1> described above, 5-hexylthiophene-2-carboxyaldehyde was changed to 2-formyl-1-methylpyrrole.

Polymer 2-48 was obtained by a similar method except that in the <Synthesis of polymer 2-2>, the azomethine derivative monomer 2-1 was changed to the azomethine derivative monomer 2-42.

[Synthesis of Polymer 2-49]

Azomethine derivative monomer 2-43 was obtained by a similar method except that in the <Synthesis of azomethine derivative monomer 2-1> described above, 5-hexylthiophene-2-carboxyaldehyde was changed to 2-hydroxy-4-formyl-1-methylpyrrole, and 4-aminophenol was changed to 4-hexylaniline.

Polymer 2-49 was obtained by a similar method except that in the <Synthesis of polymer 2-2>, the azomethine derivative monomer 2-1 was changed to the azomethine derivative monomer 2-43.

[Synthesis of Polymer 2-50]

Azomethine derivative monomer 2-44 was obtained by a similar method except that in the <Synthesis of azomethine derivative monomer 2-1> described above, 5-hexylthiophene-2-carboxyaldehyde was changed to 3-hydroxy-5-formyl-1-methylpyrrole, and 4-aminophenol was changed to 4-hexylaniline.

Polymer 2-50 was obtained by a similar method except that in the <Synthesis of polymer 2-2>, the azomethine derivative monomer 2-1 was changed to the azomethine derivative monomer 2-44.

[Synthesis of Polymer 2-51]

Azomethine derivative monomer 2-45 was obtained by a similar method except that in the <Synthesis of azomethine derivative monomer 2-1> described above, 5-hexylthiophene-2-carboxyaldehyde was changed to 1-hydroxypyrrole-3-carboaldehyde, and 4-aminophenol was changed to p-toluidine.

Polymer 2-51 was obtained by a similar method except that in the <Synthesis of polymer 2-2>, the azomethine derivative monomer 2-1 was changed to the azomethine derivative monomer 2-45.

[Synthesis of Polymer 2-52]

Azomethine derivative monomer 2-46 was synthesized by a similar method except that p-toluidine in the synthesis of polymer 2-51 was changed to 4-hexylaniline, and polymer 2-52 was obtained similarly using this azomethine derivative monomer.

[Synthesis of Polymer 2-53]

Azomethine derivative monomer 2-47 was synthesized by a similar method except that p-toluidine in the synthesis of polymer 2-51 was changed to 4-hexyloxyaniline, and polymer 2-53 was obtained similarly using this azomethine derivative monomer.

[Synthesis of Polymer 2-54]

Macroinitiator 2-8 was obtained by a similar method except that in the <Synthesis of macroinitiator 2-2> described above, styrene was changed to n-butyl acrylate.

Polymer 2-54 was obtained by a similar method except that in the <Synthesis of polymer 2-1>, the azomethine derivative monomer 2-1 was changed to the azomethine derivative monomer 2-2, and the macroinitiator 2-1 was changed to the macroinitiator 2-8.

[Synthesis of Polymer 2-55]

Macroinitiator 2-9 was obtained by a similar method except that in the <Synthesis of macroinitiator 2-2> described above, styrene was changed to n-butyl methacrylate.

Polymer 2-55 was obtained by a similar method except that in the <Synthesis of polymer 2-1>, the azomethine derivative monomer 2-1 was changed to the azomethine derivative monomer 2-2, and the macroinitiator 2-1 was changed to the macroinitiator 2-9.

[Synthesis of Polymer 2-56]

Macroinitiator 2-10 was obtained by a similar method except that in the <Synthesis of macroinitiator 2-2> described above, styrene was changed to 3-methyl-1-butene.

Polymer 2-56 was obtained by a similar method except that in the <Synthesis of polymer 2-1>, the azomethine derivative monomer 2-1 was changed to the azomethine derivative monomer 2-2, and the macroinitiator 2-1 was changed to the macroinitiator 2-10.

[Synthesis of Polymer 2-57]

Macroinitiator 2-11 was obtained by a similar method except that in the <Synthesis of macroinitiator 2-2> described above, styrene was changed to a mixture in which the molar ratio of styrene:n-butyl acrylate was 5:5.

Polymer 2-57 was obtained by a similar method except that in the <Synthesis of polymer 2-1>, the azomethine derivative monomer 2-1 was changed to the azomethine derivative monomer 2-2, and the macroinitiator 2-1 was changed to the macroinitiator 2-11.

[Production of Toner 2-1]
<Preparation of Polymer Resin Particle Dispersion 1>

100 parts by mass of the polymer 2-1 prepared as described above was pulverized with "ROUNDEL MILL Model: RM" (manufactured by Tokuju Corporation) and was mixed with 638 parts by mass of a 0.26 mass % aqueous solution of sodium dodecyl sulfate that had been produced in advance, and while being stirred, the mixture was ultrasonically dispersed using an ultrasonic homogenizer, "US-150T" (manufactured by Nissei Corporation) with V-LEVEL at 300 μA for 30 minutes. Thus, polymer resin particle dispersion 1 was obtained.

(Preparation of Cyan Colorant Particle Dispersion (Cy-1))

90 parts by mass of sodium n-dodecyl sulfate was added to 1,600 parts by mass of ion-exchanged water. While this solution was stirred, 420 parts by mass of copper phthalocyanine (C.I. Pigment Blue 15:3) was slowly added to the solution, subsequently the mixture was subjected to a dispersing treatment using a stirring apparatus, "CLEARMIX" (manufactured by M Technique Co., Ltd.), and thereby a cyan colorant particle dispersion (Cy-1) was prepared.

The volume-based median diameter of the colorant particles in the cyan colorant particle dispersion (Cy-1) was 110 nm.

<Production of Toner 2-1>

602 parts by mass in terms of the solid content of the polymer resin particle dispersion 1 produced as described above, 52 parts by mass in terms of the solid content of the cyan colorant particle dispersion (Cy-1), and 900 parts by mass of ion-exchanged water were introduced into a reaction apparatus equipped with a stirring apparatus, a temperature sensor, and a cooling tube. The temperature inside the vessel was maintained at 30° C., a 5 mol/L aqueous solution of sodium hydroxide was added thereto, and thereby the pH was adjusted to 10.

Next, an aqueous solution obtained by dissolving 2 parts by mass of magnesium chloride hexahydrate in 1,000 parts by mass of ion-exchanged water was added dropwise thereto for 10 minutes under stirring, and then temperature increase was initiated, this system was heated to 70° C. over 60 minutes, and while the system was maintained at 70° C. a particle growth reaction was continued. In this state, the particle size of associated particles was measured with a "MULTISIZER-3" (manufactured by Beckman Coulter, Inc.), and at the time point when the volume-based median diameter (D50) reached 6.5 μm, an aqueous solution obtained by dissolving 190 parts by mass of sodium chloride in 760 parts by mass of ion-exchanged water was added thereto so as to terminate particle growth. The mixture was stirred for one hour at 70° C., subsequently temperature increase was further carried out, and the mixture was heated and stirred in a state of 75° C. to thereby implement fusion of the particles. Subsequently, the mixture was cooled to 30° C., and thus a dispersion of toner base particles was obtained.

A dispersion of toner base particles thus obtained was subjected to solid-liquid separation with a centrifuge, and a wet cake of toner base particles was formed. This wet cake was washed with ion-exchanged water at 35° C. in a centrifuge until the electrical conductivity of the filtrate reached 5 μS/cm, subsequently, the wet cake was transferred into "FLASH JET DRYER (manufactured by Seishin Enterprise Co., Ltd.)", and the wet cake was dried until the moisture amount reached 0.5% by mass. Thus, toner base particles were produced.

1% by mass of hydrophobic silica (number average primary particle size: 12 nm) and 0.3% by mass of hydrophobic titania (number average primary particle size: 20 nm) were added to the toner base particles thus obtained, the mixture was mixed using HENSCHEL MIXER (registered trademark), and thereby toner 2-1 was obtained.

[Production of Toners 2-2 to 2-57]

Toners 2-2 to 2-57 were produced by a similar method except that the polymer 2-1 in the production of toner 2-1 as described above was changed to the polymers 2-2 to 2-57, respectively.

Example 2-58

[Production of Toner 2-58]
<Preparation of Styrene-Acrylic Resin Particle Dispersion>

(First Stage Polymerization)

Into a reaction vessel equipped with a stirring apparatus, a temperature sensor, a cooling tube, and a nitrogen inlet apparatus, a solution obtained by dissolving 8 parts by mass of sodium dodecyl sulfate in 3,000 parts by mass of ion-exchanged water was introduced, and while the solution was stirred at a stirring rate of 230 rpm under a nitrogen gas stream, the internal temperature was increased to 80° C. After the temperature increase, a solution obtained by dissolving 10 parts by mass of potassium persulfate in 200 parts by mass of ion-exchanged water was added thereto, the liquid temperature was adjusted again to 80° C., and a polymerizable monomer solution including 480 parts by mass of styrene, 250 parts by mass of n-butyl acrylate, 68.0 parts by mass of methacrylic acid, and 16.0 parts by mass of n-octyl-3-mercaptopropionate, was added dropwise thereto for one hour. The mixture was heated and stirred for 2 hours at 80° C., thereby polymerization was carried out, and thus a styrene-acrylic resin particle dispersion (1A) containing styrene-acrylic resin particles (1a) was prepared.

(Second Stage Polymerization)

Into a reaction vessel equipped with a stirring apparatus, a temperature sensor, a cooling tube, and a nitrogen inlet apparatus, a solution obtained by dissolving 7 parts by mass of sodium polyoxyethylene(2) dodecyl ether sulfate in 800 parts by mass of ion-exchanged water was introduced, the solution was heated to 98° C., and then 260 parts by mass of the styrene-acrylic resin particle dispersion (1A) obtained as described above, and a polymerizable monomer solution obtained by dissolving 245 parts by mass of styrene, 120 parts by mass of n-butyl acrylate, 1.5 parts by mass of n-octyl-3-mercaptopropionate, and 67 parts by mass of paraffin wax "HNP-11" (manufactured by Nippon Seiro Co., Ltd.) as a release agent at 90° C. was added thereto. The mixture was mixed and dispersed for one hour using a mechanical dispersing machine "CREARMIX (registered trademark)" (manufactured by M Technique Co., Ltd.) having a circulation path, and thus a dispersion including emulsion particles (oil droplets) was prepared. Next, an initiator solution obtained by dissolving 6 parts by mass of potassium persulfate in 200 parts by mass of ion-exchanged water was added to this dispersion, polymerization was carried out by heating and stirring this system at 82° C. for one hour, and thus a styrene-acrylic resin particle dispersion (1B) including styrene-acrylic resin particles (1b) was prepared.

(Third Stage Polymerization)

To the styrene-acrylic resin particle dispersion (1B) thus obtained, a solution obtained by dissolving 11 parts by mass of potassium persulfate in 400 parts by mass of ion-exchanged water was added, and then under the temperature conditions of 82° C., a polymerizable monomer solution including 435 parts by mass of styrene, 130 parts by mass of n-butyl acrylate, 33 parts by mass of methacrylic acid, and 8 parts by mass of n-octyl-3-mercaptopropionate was added dropwise thereto for one hour. After completion of the dropwise addition, the mixture was heated and stirred over 2 hours to thereby perform polymerization, and then the liquid was cooled to 28° C. Thus, a styrene-acrylic resin particle dispersion 1 containing a styrene-acrylic resin 1 was obtained. Furthermore, the glass transition temperature (Tg) of the styrene-acrylic resin 1 was measured, and the glass transition temperature was 45° C.

<Production of Toner 2-58>

Polymer resin particle dispersion 2 was prepared by a similar method except that in the [Production of toner 2-1] described above, the polymer 2-1 was changed to the polymer 2-2 produced as described above. Next, toner 2-58 was produced by a similar method except that in the <Production of toner 2-1> described above, 602 parts by mass in terms of the solid content of the polymer resin particle dispersion 1 was changed to 482 parts by mass in terms of the solid content of the polymer resin particle dispersion 2, and 120 parts by mass in terms of the solid content of the styrene-acrylic resin particle dispersion 1 prepared as described above was added.

Example 2-59

[Production of Toner 2-59]

<Preparation of Polyester Resin Particle Dispersion 1>

Into a four-necked flask having a capacity of 10 liters and equipped with a nitrogen inlet tube, a dehydrating tube, a stirring device, and a thermocouple, 524 parts by mass of a bisphenol A propylene oxide 2-mol adduct, 105 parts by mass of terephthalic acid, 69 parts by mass of fumaric acid, and 2 parts by mass of tin octoate (esterification catalyst) were introduced, and a polycondensation reaction was carried out at a temperature of 230° C. for 8 hours. Furthermore, the polycondensation reaction was continued for one hour at 8 kPa, subsequently the liquid was cooled to 160° C., and a polyester resin 1 was obtained. 100 parts by mass of the polyester resin 1 was pulverized with "ROUNDEL MILL Model: RM" (manufactured by Tokuju Corporation) and was mixed with 638 parts by mass of a 0.26 mass % aqueous solution of sodium lauryl sulfate that had been produced in advance. While being stirred, the mixture was ultrasonically dispersed using an ultrasonic homogenizer "US-150T" (manufactured by Nissei Corporation) with V-LEVEL at 300 µA for 30 minutes, and thus polyester resin particle dispersion 1 was obtained. Furthermore, the glass transition temperature (Tg) of the polyester resin 1 was measured, and the glass transition temperature was 42° C.

<Production of Toner 2-59>

Toner 2-59 was produced by a similar method except that in the <Production of toner 2-58> described above, the styrene-acrylic resin particle dispersion 1 was changed to the polyester resin particle dispersion 1 prepared as described above.

Comparative Example 2-1

<Comparative Compound>

The following comparative compound 2-1 (number average molecular weight Mn: 2,870) was obtained by the method described in paragraphs [0217] to [0227] of Japanese Patent Application Laid-Open No. 2014-191078.

[Chemical Formula 59]

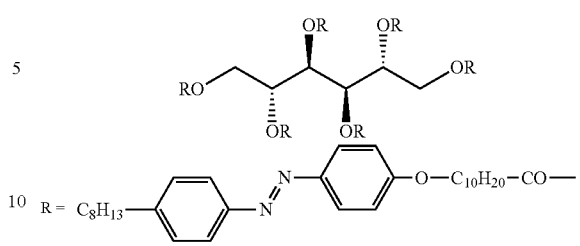

<Preparation of Comparative Compound Dispersion>

A comparative compound dispersion was obtained similarly except that in the <Preparation of polymer resin particle dispersion 1>, the polymer 2-1 was changed to the comparative compound 2-1.

<Production of Toner 2-60>

Toner 2-60 was produced by a procedure similar to the production of toner 2-1 as described above, except that the polymer resin particle dispersion 1 was changed to the comparative compound dispersion produced as described above.

Comparative Example 2-2

Toner 2-61 was produced by a similar method except that in the <Production of toner 2-58>, the polymer resin particle dispersion 2 was changed to the comparative compound dispersion.

The structures and number average molecular weights (total number average molecular weight, the number average molecular weight of the polymer block A, and the number average molecular weight of the polymer block B) of the polymers 2-1 to 2-57 thus obtained are presented in Tables 5 and 6. Meanwhile, in Table 6, the polymer block A includes a structural unit derived from a compound represented by the Chemical Formula (2) described above, and in Table 5, X, Y, Z, and $R_1$ to $R_{10}$ have the same definitions as those in the Chemical Formula (2). Furthermore, the structure of the group having a polymerizable group is similar to the Formulae (i) to (iv), and in the above-described formulae, $A_1$, $A_2$, and $A_3$ are also the same as those in the above-described formulae.

The total number average molecular weights of the polymers 2-1 to 2-57 obtained as described above, the number average molecular weights of the macroinitiators, and the number average molecular weight of the comparative compound 2-1 were measured by the following method. Furthermore, the number average molecular weight of a macroinitiator was considered as the number average molecular weight of the polymer block A or B, and for each block structure, by subtracting (number average molecular weight of macroinitiator×number of blocks) from the total number average molecular weight of the polymer, the number average molecular weight of the sum of the other polymer blocks (number average molecular weight of the other polymer block×number of blocks) was obtained. The results are presented in the following Table 6. In Table 6, Mn represents the total number average molecular weight of the polymer, A Mn represents the number average molecular weight of the sum of polymer blocks A, and B Mn represents the number average molecular weight of the sum of polymer blocks B.

(Number Average Molecular Weight Mn)

The number average molecular weights Mn of the polymers 2-1 to 2-57 and the comparative compound 2-1 were measured by a GPC method. Specifically, apparatus "HLC-8120 GPC" (manufactured by Tosoh Corporation) and columns "TSKguard column+three TSKgel SuperHZ-M in series" (manufactured by Tosoh Corporation) were used, and while the column temperature was maintained at 40° C., tetrahydrofuran (THF) as a carrier solvent was caused to flow at a flow rate of 0.2 mL/min. A measurement sample was dissolved in tetrahydrofuran so as to obtain a concentration of 1 mg/ml. Preparation of the solution was carried out by performing a treatment for 5 minutes at room temperature using an ultrasonic dispersing machine. Next, a sample solution was obtained by treating with a membrane filter having a pore size of 0.2 µm, 10 µL of this sample solution was injected into the apparatus together with the above-mentioned carrier solvent, and detection was made using a refractive index detector (RI detector). The molecular weight distribution of the measurement sample was calculated based on a calibration curve produced using monodisperse standard polystyrene particles. Regarding the polystyrene for measuring the calibration curve, ten items were used.

[Production of Developer]

The toners 2-1 to 2-61 produced as described above were mixed with ferrite carrier particles having a volume average particle size of 30 µm and coated with a copolymer resin of cyclohexane methacrylate and methyl methacrylate (monomer mass ratio 1:1) so as to obtain a toner particle concentration of 6% by mass, and thus developers 2-1 to 2-61 were obtained. Mixing was carried out for 30 minutes using a V-type mixer.

[Evaluation: Test for Photoresponsive Adhesion of Polymer]

The changes in adhesiveness concomitant with light irradiation of the polymers 2-1 to 2-57 prepared in Examples 2-1 to 2-57 and the comparative compound 2-1 of Comparative Example were evaluated in the following photoresponsive adhesion test using the apparatus illustrated in FIG. 3. As shown in FIG. 3, 2 mg of a polymer was mounted on a cover glass 1 that measured 18 mm on each of four sides, within a radius of 6 mm from the center of the glass, and a cover glass 2 having the same size was covered at a position shifted by about 4 mm in a direction parallel to the cover glass 1 so as to cover the entire polymer. This was heated to melt the sample, and thus the cover glass 1 and the cover glass 2 were adhered. Each of the samples thus obtained was subjected to a non-fluidity→fluidity test as described below and was subsequently subjected to a fluidity→non-fluidity (return) test as described below. The results are presented in the following Table 6.

<Non-Fluidity→Fluidity Test>

The part (A) shown in FIG. 3 was fixed to a holder with Cellophane tape, and a vinyl string 30 cm long loaded with a 100-g weight was fixed to the part (C) with Cellophane tape. The part (B) was irradiated with light having a wavelength of 365 nm in an amount of irradiation of 20 J/cm², it was checked whether the cover glass 2 would come off from the cover glass 1, and the result was judged according to the following evaluation criteria.

—Evaluation Criteria for Non-Fluidity→Fluidity Test—
○: The cover glass 2 completely came off from the cover glass 1.
Δ: The cover glass 2 was shifted.
X: The cover glass 2 did not move.

<Fluidity→Non-Fluidity (Return) Test>

One hour after the non-fluidity→fluidity test was carried out (for this one hour, left to stand in a natural environment, that is, at room temperature), a cover glass 3 (having the same size as the cover glasses 1 and 2) was mounted so as to cover the sample portion (part (B)) of the cover glass 1 used in the above-described test, it was checked whether the cover glass 1 and the cover glass 3 would adhere, and the result was judged according to the following evaluation criteria.

—Evaluation Criteria for Fluidity→Non-Fluidity (Return) Test—
○: Did not adhere (non-fluidized)
Δ: Partially adhered (a fluidized state was maintained in some portion)
X: Adhered (a fluidized state was maintained).

Meanwhile, for the polymers 2-1 to 2-57 prepared in Examples 2-1 to 2-57, which were rated as ○ in the evaluation of the fluidity→non-fluidity (return) test described above, it could be verified that all were re-solidified after the non-fluidity→fluidity test had been carried out.

[Evaluation: Fixability Test]

A fixability test was carried out using the developers 2-1 to 2-61 obtained as described above, in a constant temperature and constant humidity environment (temperature: 20° C., humidity: 50% RH). A developer was disposed between a pair of parallel flat plate (aluminum) electrodes, the developer being placed on one electrode and ordinary paper (basis weight: 64 g/m²) as a recording medium being placed on the other electrode, while the developer was caused to slide by magnetic force, and the toner was developed at a gap between the electrodes of 0.5 mm under the conditions the DC bias and the AC bias so that the amount toner attachment would be 4 g/m². Thus, a toner layer was formed on the surface of the ordinary paper and was fixed with a fixing apparatus, and thus a print was obtained (image formation). A toner image that measured 1 cm on each of four sides of this print was rubbed 10 times while being subjected to a pressure of 45 kPa with "JK WIPER (registered trademark)" (manufactured by Nippon Paper Crecia Co., Ltd.), and the fixing ratio of the image was evaluated. A fixing ratio of 65% or higher was considered acceptable. Meanwhile, the fixing ratio of the image is a value, expressed in percentage, obtained by measuring the reflection densities of the image after printing and the image after rubbing with a fluorescence spectroscopic densitometer, "FD-7" (manufactured by Konica Minolta, Inc.), and dividing the reflection density of the solid image after rubbing by the reflection density of the solid image after printing.

Regarding the fixing apparatus, the following three kinds of fixing apparatuses configured by appropriately modifying the apparatus illustrated in FIG. 2 were used.

No. 1: The compression unit 9 of FIG. 2 is absent, the wavelength of the ultraviolet light radiated from the irradiation unit 40 is 365 nm (light source: LED light source having an emission wavelength of 365 nm±10 nm), and the amount of irradiation is 15 J/cm²;

No. 2: There is the compression unit 9 of FIG. 2, the temperature of the pressing member 91 is 20° C., and the pressure at the time of pressing is 0.2 MPa. The light source and the amount of irradiation of the irradiation unit 40 are similar to those of No. 1; and No. 3: There is the compression unit 9 of FIG. 2, the temperature of the pressing member 91 is 80° C., and the pressure at the time of pressing is 0.2 MPa. The light source and the amount of irradiation of the irradiation unit 40 are similar to those of No. 1.

[Evaluation of Color Reproducibility]

For the images of Examples and Comparative Examples obtained as described above, the color reproducibility was evaluated by a visual inspection made by ten monitors according to the following evaluation criteria. Specifically, as samples for evaluation and comparison, toners in which the polymer 2-1 in the toner 2-1 of Example 2-1 was all changed to a styrene-acrylic resin were produced. Developers were produced as described above using these toners, developing was carried out similarly to the image formation in the fixability test as described above, and fixing was carried out with the fixing apparatus No. 4 as described below.

Fixing apparatus No. 4: There is the compression unit 9 of FIG. 2, the temperature of the pressing member 91 is 160° C., the pressure at the time of pressing is 0.2 MPa, and light irradiation is not carried out.

The images of the samples for evaluation and comparison and the images obtained in the Examples and Comparative Examples described above were shown in sequence to the ten monitors, and the monitors were questioned about whether the colors of two images were clearly different. The determination results based on the following evaluation criteria for color reproducibility are presented in the following Table 7.

—Evaluation Criteria for Color Reproducibility—

⊙: Two or fewer people answered that the colors were clearly different.

○: Three or four people answered that the colors were clearly different.

Δ: Five to seven people answered that the colors were clearly different.

X: Eight or more people answered that the colors were clearly different.

The configurations of the various toners, the type of the fixing apparatus, and the evaluation results are presented in the following Tables 5 to 7.

TABLE 5

| Azomethine derivative monomer | Structure | $A_1$ | Group having polymerizable group | | | Azomethine derivative | | | |
|---|---|---|---|---|---|---|---|---|---|
| | | | $A_2$ Carbon number | $A_3$ Carbon number | Polymerizable group position | X | Y | $Z_1$ | $Z_2$ |
| 2-1 | (iii) | H | 6 | — | $R_7$ | S | $R_4$ | CH | N |
| 2-2 | (iii) | H | 6 | — | $R_7$ | S | $R_4$ | CH | N |
| 2-3 | (iii) | H | 6 | — | $R_7$ | S | $R_4$ | CH | N |
| 2-4 | (iii) | H | 6 | — | $R_7$ | S | $R_4$ | CH | N |
| 2-5 | (iii) | H | 6 | — | $R_7$ | S | $R_4$ | CH | N |
| 2-6 | (iii) | H | 6 | — | $R_7$ | S | $R_4$ | CH | N |
| 2-7 | (iii) | H | 6 | — | $R_7$ | S | $R_4$ | CH | N |
| 2-8 | (iii) | H | 6 | — | $R_7$ | S | $R_4$ | CH | N |
| 2-9 | (iii) | H | 6 | — | $R_7$ | S | $R_4$ | CH | N |
| 2-10 | (iii) | H | 6 | — | $R_7$ | S | $R_4$ | CH | N |
| 2-11 | (iii) | H | 6 | — | $R_7$ | S | $R_4$ | CH | N |
| 2-12 | (iii) | H | 6 | — | $R_7$ | S | $R_4$ | CH | N |
| 2-13 | (iii) | H | 6 | — | $R_7$ | S | $R_4$ | CH | N |
| 2-14 | (iii) | H | 6 | — | $R_7$ | S | $R_4$ | CH | N |
| 2-15 | (iii) | H | 6 | — | $R_7$ | S | $R_4$ | CH | N |
| 2-16 | (iii) | H | 6 | — | $R_7$ | S | $R_4$ | CH | N |
| 2-17 | (iii) | H | 6 | — | $R_7$ | S | $R_3$ | CH | N |
| 2-18 | (iii) | H | 6 | — | $R_7$ | S | $R_4$ | N | CH |
| 2-19 | (iii) | H | 10 | — | $R_7$ | S | $R_4$ | CH | N |
| 2-20 | (ii) | H | 6 | — | $R_7$ | S | $R_4$ | CH | N |
| 2-21 | (iii) | $CH_3$ | 6 | — | $R_7$ | S | $R_4$ | CH | N |
| 2-22 | (iii) | H | 6 | — | $R_6$ | S | $R_4$ | CH | N |
| 2-23 | (iii) | H | 6 | — | $R_1$ | S | $R_4$ | CH | N |
| 2-24 | (iii) | H | 6 | — | $R_1$ | S | $R_3$ | CH | N |
| 2-25 | (iv) | H | 6 | 1 | $R_1$ | S | $R_4$ | CH | N |
| 2-26 | (iii) | H | 6 | — | $R_2$ | S | $R_4$ | CH | N |
| 2-27 | (iii) | H | 6 | — | $R_7$ | O | $R_4$ | CH | N |
| 2-28 | (iii) | H | 6 | — | $R_7$ | O | $R_4$ | CH | N |
| 2-29 | (iii) | H | 6 | — | $R_7$ | O | $R_4$ | CH | N |
| 2-30 | (iii) | H | 6 | — | $R_7$ | O | $R_3$ | CH | N |
| 2-31 | (iii) | H | 6 | — | $R_7$ | $NR_{10}$ | $R_3$ | CH | N |
| 2-32 | (iii) | H | 6 | — | $R_7$ | $NR_{10}$ | $R_3$ | CH | N |
| 2-33 | (iii) | H | 6 | — | $R_7$ | $NR_{10}$ | $R_3$ | CH | N |
| 2-34 | (iii) | H | 6 | — | $R_7$ | $NR_{10}$ | $R_3$ | CH | N |
| 2-35 | (iii) | H | 6 | — | $R_7$ | $NR_{10}$ | $R_3$ | CH | N |
| 2-36 | (iii) | H | 6 | — | $R_7$ | $NR_{10}$ | $R_3$ | CH | N |
| 2-37 | (iii) | H | 6 | — | $R_7$ | $NR_{10}$ | $R_3$ | CH | N |
| 2-38 | (iii) | H | 6 | — | $R_7$ | $NR_{10}$ | $R_3$ | CH | N |
| 2-39 | (iii) | H | 6 | — | $R_7$ | $NR_{10}$ | $R_3$ | CH | N |
| 2-40 | (iii) | H | 6 | — | $R_7$ | $NR_{10}$ | $R_4$ | CH | N |
| 2-41 | (iii) | H | 6 | — | $R_7$ | $NR_{10}$ | $R_4$ | CH | N |
| 2-42 | (iii) | H | 6 | — | $R_7$ | $NR_{10}$ | $R_4$ | CH | N |
| 2-43 | (iii) | H | 6 | — | $R_1$ | $NR_{10}$ | $R_3$ | CH | N |
| 2-44 | (iii) | H | 6 | — | $R_2$ | $NR_{10}$ | $R_4$ | CH | N |
| 2-45 | (iii) | H | 6 | — | $R_{10}$ | $NR_{10}$ | $R_3$ | CH | N |
| 2-46 | (iii) | H | 6 | — | $R_{10}$ | $NR_{10}$ | $R_3$ | CH | N |
| 2-47 | (iii) | H | 6 | — | $R_{10}$ | $NR_{10}$ | $R_3$ | CH | N |

TABLE 5-continued

| Azomethine derivative monomer | Azomethine derivative | | | | | | | | | |
|---|---|---|---|---|---|---|---|---|---|---|
| | $R_1$ | $R_2$ | $R_3$ | $R_4$ | $R_5$ | $R_6$ | $R_7$ | $R_8$ | $R_9$ | $R_{10}$ |
| 2-1 | $C_6H_{13}$ | H | H | | H | H | — | H | H | — |
| 2-2 | $CH_3$ | H | H | | H | H | — | H | H | — |
| 2-3 | $C_{10}H_{21}$ | H | H | | H | H | — | H | H | — |
| 2-4 | $OC_6H_{13}$ | H | H | | H | H | — | H | H | — |
| 2-5 | $COOC_6H_{13}$ | H | H | | H | H | — | H | H | — |
| 2-6 | $COC_6H_{13}$ | H | H | | H | H | — | H | H | — |
| 2-7 | H | H | H | | H | H | — | H | H | — |
| 2-8 | Br | H | H | | H | H | — | H | H | — |
| 2-9 | CN | H | H | | H | H | — | H | H | — |
| 2-10 | $NO_2$ | H | H | | H | H | — | H | H | — |
| 2-11 | COOH | H | H | | H | H | — | H | H | — |
| 2-12 | $C_6H_{13}$ | $CH_3$ | H | | H | H | — | H | H | — |
| 2-13 | $C_6H_{13}$ | H | $CH_3$ | | H | H | — | H | H | — |
| 2-14 | $C_6H_{13}$ | H | H | | $CH_3$ | H | — | H | H | — |
| 2-15 | $C_6H_{13}$ | H | H | | H | $CH_3$ | — | H | H | — |
| 2-16 | H | $C_6H_{13}$ | H | — | H | H | — | H | H | — |
| 2-17 | $C_6H_{13}$ | H | — | H | H | H | — | H | H | — |
| 2-18 | $C_6H_{13}$ | H | H | — | H | H | — | H | H | — |
| 2-19 | $C_6H_{13}$ | H | H | — | H | H | — | H | H | — |
| 2-20 | $C_6H_{13}$ | H | H | — | H | H | — | H | H | — |
| 2-21 | $C_6H_{13}$ | H | H | — | H | H | — | H | H | — |
| 2-22 | $C_6H_{13}$ | H | H | — | H | — | H | H | H | — |
| 2-23 | — | H | H | — | H | H | $C_6H_{13}$ | H | H | — |
| 2-24 | — | H | — | H | H | H | $C_6H_{13}$ | H | H | — |
| 2-25 | — | H | H | — | H | H | $C_6H_{13}$ | H | H | — |
| 2-26 | H | — | H | — | H | H | $C_6H_{13}$ | H | H | — |
| 2-27 | $CH_3$ | H | H | — | H | H | — | H | H | — |
| 2-28 | $C_6H_{13}$ | H | H | — | H | H | — | H | H | — |
| 2-29 | H | H | H | — | H | H | — | H | H | — |
| 2-30 | $C_6H_{13}$ | H | — | H | H | H | — | H | H | — |
| 2-31 | H | H | — | H | H | H | — | H | H | H |
| 2-32 | H | H | — | H | H | H | — | H | H | $CH_3$ |
| 2-33 | H | H | — | H | H | H | — | H | H | $C_6H_{13}$ |
| 2-34 | H | H | — | H | H | H | — | H | H | $C_{10}H_{21}$ |
| 2-35 | H | H | — | H | H | H | — | H | H | $OCOCH_3$ |
| 2-36 | $CH_3$ | H | — | H | H | H | — | H | H | H |
| 2-37 | $C_6H_{13}$ | H | — | H | H | H | — | H | H | H |
| 2-38 | $CH_3$ | H | — | H | H | H | — | H | H | $CH_3$ |
| 2-39 | $C_6H_{13}$ | H | — | H | H | H | — | H | H | $CH_3$ |
| 2-40 | $C_6H_{13}$ | H | H | — | H | H | — | H | H | H |
| 2-41 | H | $C_6H_{13}$ | H | — | H | H | — | H | H | H |
| 2-42 | H | H | H | — | H | H | — | H | H | $CH_3$ |
| 2-43 | — | H | H | — | H | H | $C_6H_{13}$ | H | H | $CH_3$ |
| 2-44 | H | — | H | — | H | H | $C_6H_{13}$ | H | H | $CH_3$ |
| 2-45 | H | H | — | H | H | H | $CH_3$ | H | H | — |
| 2-46 | H | H | — | H | H | H | $C_6H_{13}$ | H | H | — |
| 2-47 | H | H | — | H | H | H | $OC_6H_{13}$ | H | H | — |

TABLE 6

| | Polymer/compound | Polymer block A | | | Polymer block B | | Mn | Photoresponsive adhesion test | |
|---|---|---|---|---|---|---|---|---|---|
| | | Block structure | Azomethine derivative monomer | A Mn | Structural unit | B Mn | | Fluidization test | Non-fluidization test |
| Example 2-1 | 2-1 | A-B | 2-1 | 1000 | Styrene | 4500 | 5500 | ○ | ○ |
| Example 2-2 | 2-2 | 2A-B | 2-1 | 5700 | Styrene | 13300 | 19000 | ○ | ○ |
| Example 2-3 | 2-3 | A-2B | 2-1 | 12600 | Styrene | 8400 | 21000 | ○ | ○ |
| Example 2-4 | 2-4 | 3A-B | 2-1 | 2800 | Styrene | 1200 | 4000 | ○ | ○ |
| Example 2-5 | 2-5 | A-3B | 2-1 | 17000 | Styrene | 17000 | 34000 | ○ | ○ |
| Example 2-6 | 2-6 | 4A-B | 2-1 | 3000 | Styrene | 26000 | 29000 | ○ | ○ |
| Example 2-7 | 2-7 | A-4B | 2-1 | 5200 | Styrene | 800 | 6000 | ○ | ○ |
| Example 2-8 | 2-8 | 2A-B | 2-2 | 3300 | Styrene | 9700 | 13000 | ○ | ○ |
| Example 2-9 | 2-9 | 2A-B | 2-3 | 8000 | Styrene | 12000 | 20000 | ○ | ○ |
| Example 2-10 | 2-10 | 2A-B | 2-4 | 5000 | Styrene | 10000 | 15000 | ○ | ○ |
| Example 2-11 | 2-11 | 2A-B | 2-5 | 22400 | Styrene | 9600 | 32000 | ○ | ○ |
| Example 2-12 | 2-12 | 2A-B | 2-6 | 900 | Styrene | 3600 | 4500 | ○ | ○ |
| Example 2-13 | 2-13 | 2A-B | 2-7 | 20000 | Styrene | 20000 | 40000 | ○ | ○ |
| Example 2-14 | 2-14 | 2A-B | 2-8 | 1800 | Styrene | 1200 | 3000 | ○ | ○ |
| Example 2-15 | 2-15 | 2A-B | 2-9 | 20300 | Styrene | 6700 | 27000 | ○ | ○ |

TABLE 6-continued

| | | | Polymer block A | | Polymer block B | | | Photoresponsive adhesion test | |
| --- | --- | --- | --- | --- | --- | --- | --- | --- | --- |
| | Polymer/ compound | Block structure | Azomethine derivative monomer | A Mn | Structural unit | B Mn | Mn | Fluidization test | Non-fluidization test |
| Example 2-16 | 2-16 | 2A-B | 2-10 | 4400 | Styrene | 17600 | 22000 | ○ | ○ |
| Example 2-17 | 2-17 | 2A-B | 2-11 | 33300 | Styrene | 3700 | 37000 | ○ | ○ |
| Example 2-18 | 2-18 | 2A-B | 2-12 | 1000 | Styrene | 9000 | 10000 | ○ | ○ |
| Example 2-19 | 2-19 | 2A-B | 2-13 | 24800 | Styrene | 6200 | 31000 | ○ | ○ |
| Example 2-20 | 2-20 | 2A-B | 2-14 | 5200 | Styrene | 20800 | 26000 | ○ | ○ |
| Example 2-21 | 2-21 | 2A-B | 2-15 | 1200 | Styrene | 2800 | 4000 | ○ | ○ |
| Example 2-22 | 2-22 | 2A-B | 2-16 | 12000 | Styrene | 5000 | 17000 | ○ | ○ |
| Example 2-23 | 2-23 | 2A-B | 2-17 | 5500 | Styrene | 5500 | 11000 | ○ | ○ |
| Example 2-24 | 2-24 | 2A-B | 2-18 | 18000 | Styrene | 12000 | 30000 | ○ | ○ |
| Example 2-25 | 2-25 | 2A-B | 2-19 | 4500 | Styrene | 13500 | 18000 | ○ | ○ |
| Example 2-26 | 2-26 | 2A-B | 2-20 | 4000 | Styrene | 4000 | 8000 | ○ | ○ |
| Example 2-27 | 2-27 | 2A-B | 2-21 | 8400 | Styrene | 5600 | 14000 | ○ | ○ |
| Example 2-28 | 2-28 | 2A-B | 2-22 | 2400 | Styrene | 21600 | 24000 | ○ | ○ |
| Example 2-29 | 2-29 | 2A-B | 2-23 | 2800 | Styrene | 4200 | 7000 | ○ | ○ |
| Example 2-30 | 2-30 | 2A-B | 2-24 | 13200 | Styrene | 19800 | 33000 | ○ | ○ |
| Example 2-31 | 2-31 | 2A-B | 2-25 | 7200 | Styrene | 28800 | 36000 | ○ | ○ |
| Example 2-32 | 2-32 | 2A-B | 2-26 | 3000 | Styrene | 2000 | 5000 | ○ | ○ |
| Example 2-33 | 2-33 | 2A-B | 2-27 | 9200 | Styrene | 13800 | 23000 | ○ | ○ |
| Example 2-34 | 2-34 | 2A-B | 2-28 | 31500 | Styrene | 3500 | 35000 | ○ | ○ |
| Example 2-35 | 2-35 | 2A-B | 2-29 | 11200 | Styrene | 4800 | 16000 | ○ | ○ |
| Example 2-36 | 2-36 | 2A-B | 2-30 | 23800 | Styrene | 1200 | 25000 | ○ | ○ |
| Example 2-37 | 2-37 | 2A-B | 2-31 | 2200 | Styrene | 40800 | 43000 | ○ | ○ |
| Example 2-38 | 2-38 | 2A-B | 2-32 | 4800 | Styrene | 7200 | 12000 | ○ | ○ |
| Example 2-39 | 2-39 | 2A-B | 2-33 | 2300 | Styrene | 8700 | 11000 | ○ | ○ |
| Example 2-40 | 2-40 | 2A-B | 2-34 | 15800 | Styrene | 5200 | 21000 | ○ | ○ |
| Example 2-41 | 2-41 | 2A-B | 2-35 | 8400 | Styrene | 5600 | 14000 | ○ | ○ |
| Example 2-42 | 2-42 | 2A-B | 2-36 | 1500 | Styrene | 3500 | 5000 | ○ | ○ |
| Example 2-43 | 2-43 | 2A-B | 2-37 | 21600 | Styrene | 5400 | 27000 | ○ | ○ |
| Example 2-44 | 2-44 | 2A-B | 2-38 | 3500 | Styrene | 3500 | 7000 | ○ | ○ |
| Example 2-45 | 2-45 | 2A-B | 2-39 | 9600 | Styrene | 6400 | 16000 | ○ | ○ |
| Example 2-46 | 2-46 | 2A-B | 2-40 | 2500 | Styrene | 22500 | 25000 | ○ | ○ |
| Example 2-47 | 2-47 | 2A-B | 2-41 | 9000 | Styrene | 21000 | 30000 | ○ | ○ |
| Example 2-48 | 2-48 | 2A-B | 2-42 | 5500 | Styrene | 5500 | 11000 | ○ | ○ |
| Example 2-49 | 2-49 | 2A-B | 2-43 | 7200 | Styrene | 4800 | 12000 | ○ | ○ |
| Example 2-50 | 2-50 | 2A-B | 2-44 | 11400 | Styrene | 26600 | 38000 | ○ | ○ |
| Example 2-51 | 2-51 | 2A-B | 2-45 | 4000 | Styrene | 16000 | 20000 | ○ | ○ |
| Example 2-52 | 2-52 | 2A-B | 2-46 | 11900 | Styrene | 5100 | 17000 | ○ | ○ |
| Example 2-53 | 2-53 | 2A-B | 2-47 | 3200 | Styrene | 4800 | 8000 | ○ | ○ |
| Example 2-54 | 2-54 | 2A-B | 2-2 | 7200 | n-Butyl acrylate | 10800 | 18000 | ○ | ○ |
| Example 2-55 | 2-55 | 2A-B | 2-2 | 7200 | n-Butyl methacrylate | 16800 | 24000 | ○ | ○ |
| Example 2-56 | 2-56 | 2A-B | 2-2 | 5400 | 3-Methyl-1-butene | 3600 | 9000 | ○ | ○ |
| Example 2-57 | 2-57 | 2A-B | 2-2 | 17600 | Styrene/ n-butyl acrylate | 4400 | 22000 | ○ | ○ |
| Comparative Example 2-1 | Comparative compound 2-1 | — | — | — | — | — | 2870 | ○ | x |

TABLE 7

| | | Toner configuration | | | | |
| --- | --- | --- | --- | --- | --- | --- |
| | | Polymer/compound | Binder resin | Fixing | Fixability | Color |
| | Toner No. | Polymer | Incorporation ratio (mass %) | (Incorporation ratio (mass %)) | apparatus No. | evaluation (%) | reproducibility evaluation |
| Example 2-1A | 2-1 | 2-1 | 100 | — | 1 | 82 | ⊙ |
| Example 2-2A | 2-2 | 2-2 | 100 | — | 1 | 92 | ⊙ |
| Example 2-3A | 2-3 | 2-3 | 100 | — | 1 | 88 | ⊙ |
| Example 2-4A | 2-4 | 2-4 | 100 | — | 1 | 77 | ⊙ |
| Example 2-5A | 2-5 | 2-5 | 100 | — | 1 | 80 | ⊙ |
| Example 2-6A | 2-6 | 2-6 | 100 | — | 1 | 76 | ⊙ |
| Example 2-7A | 2-7 | 2-7 | 100 | — | 1 | 70 | ⊙ |
| Example 2-8A | 2-8 | 2-8 | 100 | — | 1 | 89 | ⊙ |
| Example 2-9A | 2-9 | 2-9 | 100 | — | 1 | 90 | ⊙ |
| Example 2-10A | 2-10 | 2-10 | 100 | — | 1 | 87 | ⊙ |
| Example 2-11A | 2-11 | 2-11 | 100 | — | 1 | 85 | ⊙ |
| Example 2-12A | 2-12 | 2-12 | 100 | — | 1 | 71 | ⊙ |
| Example 2-13A | 2-13 | 2-13 | 100 | — | 1 | 81 | ⊙ |
| Example 2-14A | 2-14 | 2-14 | 100 | — | 1 | 68 | ⊙ |
| Example 2-15A | 2-15 | 2-15 | 100 | — | 1 | 79 | ⊙ |

TABLE 7-continued

| | Toner No. | Polymer/compound Polymer | Incorporation ratio (mass %) | Binder resin (Incorporation ratio (mass %)) | Fixing apparatus No. | Fixability evaluation (%) | Color reproducibility evaluation |
|---|---|---|---|---|---|---|---|
| Example 2-16A | 2-16 | 2-16 | 100 | — | 1 | 82 | ⊙ |
| Example 2-17A | 2-17 | 2-17 | 100 | — | 1 | 81 | ⊙ |
| Example 2-18A | 2-18 | 2-18 | 100 | — | 1 | 74 | ⊙ |
| Example 2-19A | 2-19 | 2-19 | 100 | — | 1 | 76 | ⊙ |
| Example 2-20A | 2-20 | 2-20 | 100 | — | 1 | 74 | ⊙ |
| Example 2-21A | 2-21 | 2-21 | 100 | — | 1 | 72 | ⊙ |
| Example 2-22A | 2-22 | 2-22 | 100 | — | 1 | 89 | ⊙ |
| Example 2-23A | 2-23 | 2-23 | 100 | — | 1 | 87 | ⊙ |
| Example 2-24A | 2-24 | 2-24 | 100 | — | 1 | 80 | ⊙ |
| Example 2-25A | 2-25 | 2-25 | 100 | — | 1 | 91 | ⊙ |
| Example 2-26A | 2-26 | 2-26 | 100 | — | 1 | 79 | ⊙ |
| Example 2-27A | 2-27 | 2-27 | 100 | — | 1 | 83 | ⊙ |
| Example 2-28A | 2-28 | 2-28 | 100 | — | 1 | 83 | ⊙ |
| Example 2-29A | 2-29 | 2-29 | 100 | — | 1 | 75 | ⊙ |
| Example 2-30A | 2-30 | 2-30 | 100 | — | 1 | 76 | ⊙ |
| Example 2-31A | 2-31 | 2-31 | 100 | — | 1 | 74 | ⊙ |
| Example 2-32A | 2-32 | 2-32 | 100 | — | 1 | 71 | ⊙ |
| Example 2-33A | 2-33 | 2-33 | 100 | — | 1 | 86 | ⊙ |
| Example 2-34A | 2-34 | 2-34 | 100 | — | 1 | 84 | ⊙ |
| Example 2-35A | 2-35 | 2-35 | 100 | — | 1 | 84 | ⊙ |
| Example 2-36A | 2-36 | 2-36 | 100 | — | 1 | 85 | ⊙ |
| Example 2-37A | 2-37 | 2-37 | 100 | — | 1 | 82 | ⊙ |
| Example 2-38A | 2-38 | 2-38 | 100 | — | 1 | 89 | ⊙ |
| Example 2-39A | 2-39 | 2-39 | 100 | — | 1 | 88 | ⊙ |
| Example 2-40A | 2-40 | 2-40 | 100 | — | 1 | 90 | ⊙ |
| Example 2-41A | 2-41 | 2-41 | 100 | — | 1 | 87 | ⊙ |
| Example 2-42A | 2-42 | 2-42 | 100 | — | 1 | 86 | ⊙ |
| Example 2-43A | 2-43 | 2-43 | 100 | — | 1 | 87 | ⊙ |
| Example 2-44A | 2-44 | 2-44 | 100 | — | 1 | 77 | ⊙ |
| Example 2-45A | 2-45 | 2-45 | 100 | — | 1 | 79 | ⊙ |
| Example 2-46A | 2-46 | 2-46 | 100 | — | 1 | 87 | ⊙ |
| Example 2-47A | 2-47 | 2-47 | 100 | — | 1 | 86 | ⊙ |
| Example 2-48A | 2-48 | 2-48 | 100 | — | 1 | 80 | ⊙ |
| Example 2-49A | 2-49 | 2-49 | 100 | — | 1 | 76 | ⊙ |
| Example 2-50A | 2-50 | 2-50 | 100 | — | 1 | 75 | ⊙ |
| Example 2-51A | 2-51 | 2-51 | 100 | — | 1 | 77 | ⊙ |
| Example 2-52A | 2-52 | 2-52 | 100 | — | 1 | 76 | ⊙ |
| Example 2-53A | 2-53 | 2-53 | 100 | — | 1 | 73 | ⊙ |
| Example 2-54A | 2-54 | 2-54 | 100 | — | 1 | 90 | ⊙ |
| Example 2-55A | 2-55 | 2-55 | 100 | — | 1 | 88 | ⊙ |
| Example 2-56A | 2-56 | 2-56 | 100 | — | 1 | 86 | ⊙ |
| Example 2-57A | 2-57 | 2-57 | 100 | — | 1 | 87 | ⊙ |
| Example 2-58A | 2-58 | 2-2 | 80 | Styrene-acrylic resin (20) | 1 | 90 | ⊙ |
| Example 2-59A | 2-59 | 2-2 | 80 | Polyester resin (20) | 1 | 89 | ⊙ |
| Example 2-60A | 2-2 | 2-2 | 100 | — | 2 | 94 | ⊙ |
| Example 2-61A | 2-2 | 2-2 | 100 | — | 3 | 96 | ⊙ |
| Comparative Example 2-2 | 2-60 | Comparative compound 2-1 | 100 | — | 1 | 13 | X |
| Comparative Example 2-3 | 2-61 | Comparative compound 2-1 | 80 | Styrene-acrylic resin (20) | 1 | 21 | X |

As is obvious from Table 6, it was verified that the polymers 2-1 to 2-57, which are block copolymers including structural units derived from azomethine derivatives as produced in the various Examples, are reversibly fluidized and non-fluidized when irradiated with light. In contrast, reversible fluidization and non-fluidization was not verified in the comparative compound 2-1 in Comparative Example 2-1.

Furthermore, as shown in Table 7, the toners produced in the various Examples all exhibited high fixability and excellent color reproducibility. In contrast, in Comparative Examples 2-1 and 2-2 in which a toner that did not contain the above-described polymer was used, sufficient fixability cannot be obtained in a case in which a fixing method based on light irradiation is used. Furthermore, it was found that the color reproducibility is low.

When a comparison of fixing apparatuses was made, it was found that when the same toner 2-2 was used and irradiated with ultraviolet radiation under the same conditions, and the fixing apparatus of No. 2 in which pressure was applied with a pressing member, and the fixing apparatus of No. 3 in which pressure was applied while heating with a pressing member, were used rather than the fixing apparatus of No. 1 in which a pressing member was not used, higher fixability can be obtained (comparison of Examples 2-2, 2-60, and 2-61).

As described in the various Examples, it can be seen that the high-molecular weight compound of the present invention, which is a copolymer having a polymer block including a structure derived from a particular azomethine derivative, is reversibly fluidized and non-fluidized when irradiated with light, undergoes less coloration, and exhibits an excellent fixing ratio of 65% or higher in a test for fixability of a toner image based on a toner using this high-molecular weight compound.

Third Embodiment

Example 3-4

<Synthesis of Azomethine Derivative Monomer 3-6>

Into a 100-ml four-necked flask, 4-aminophenol (5 g, 0.046 mol), 5-methylthiophene-2-carboxyaldehyde (5.8 g, 0.046 mol), and 100 ml of ethanol were introduced, and the mixture was heated and stirred. The reaction liquid was suction-filtered, and a powder thus obtained was washed with cold ethanol. Furthermore, recrystallization from methanol/ethanol was carried out, and target substance 1 was obtained.

[Chemical Formula 60]

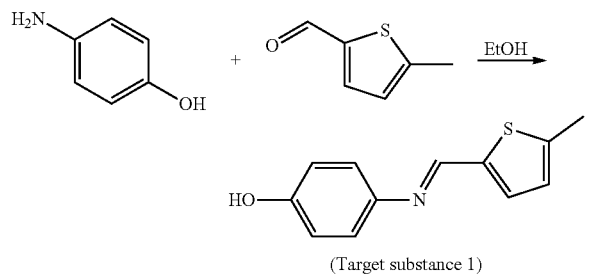

(Target substance 1)

Next, in a 200-ml four-necked flask, the target substance 1 (5 g, 0.023 mol) obtained as described above was dissolved in 25 ml of dimethylformamide (DMF). To this, 4.88 g (0.035 mol) of potassium carbonate was added, and the mixture was stirred while being maintained at 30° C. To this, 10.2 mg (0.06 mmol) of potassium iodide and 6-chloro-1-hexanol (3.54 g, 0.026 mol) were added, and the mixture was reacted at 110° C. This was cooled to room temperature, added to 650 g of ice, and then filtered. Crystals were dispersed in 400 ml of water, stirred overnight, washed, filtered, and dried. Furthermore, recrystallization from ethanol was carried out, and target substance 2 was obtained.

[Chemical Formula 61]

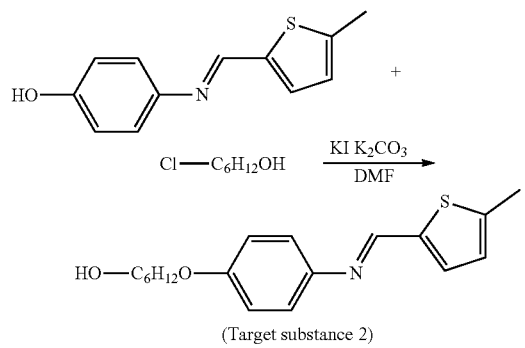

(Target substance 2)

Next, in a 100-ml four-necked flask, target substance 2 (3 g, 0.001 mol) obtained as described above, 1.34 ml (0.001 mol) of triethylamine, and 30 ml of dichloromethane were introduced. At this time, the raw materials were in a dispersed state. While the internal temperature was maintained at 0° C., a solution obtained by dissolving 1.04 g (0.011 mol) of acrylic acid chloride in 10 ml of dichloromethane was added dropwise thereto while the internal temperature was maintained at 0° C. to 5° C. As the solution was added dropwise, the raw materials were dissolved.

After completion of the dropwise addition, the reaction liquid was returned to room temperature, and stirring was carried out. After completion of the reaction, dichloromethane was removed by concentrating, the residue was dissolved in ethyl acetate, the solution was washed with dilute hydrochloric acid, an aqueous solution of sodium hydrogen carbonate, and saturated brine, and an organic layer was dried over magnesium sulfate and then concentrated. Orange-colored crystals thus obtained were purified with a silica gel column (ethyl acetate/heptane=1/5), and azomethine derivative monomer 3-6 having structural unit 3-6 in the following Table 8 was obtained.

[Chemical Formula 62]

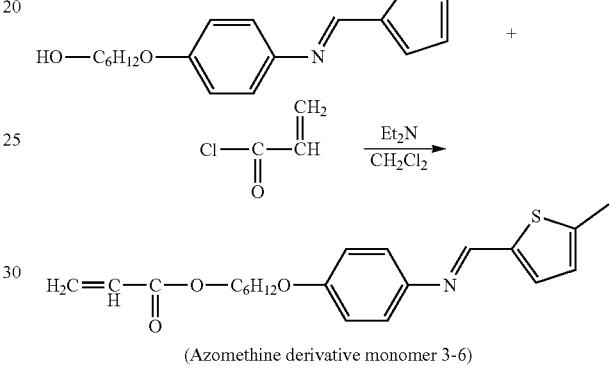

(Azomethine derivative monomer 3-6)

<Synthesis of Polymer 3-4>

In a 100-ml four-necked flask, 1.5 g (4.096 mmol) of the azomethine derivative monomer 3-6 obtained as described above, 5 mg (0.023 mmol) of 4-cyanopentanoic acid dithiobenzoate, and 1 mg (0.006 mmol) of AIBN were dissolved in 4 ml of anisole. The atmosphere was changed to an argon gas atmosphere through freezing and degassing, and then polymerization was carried out by raising the temperature to 75° C. and stirring. To the polymer solution thus obtained, 40 ml of methanol was slowly added dropwise, subsequently THF was added thereto, and unreacted azomethine derivative monomer 3-6 was removed. The polymer solution thus separated was dried for 24 hours in a vacuum drying furnace at 40° C., and polymer 3-4 was obtained. The number average molecular weight Mn of the polymer 3-4 thus obtained was measured by a GPC method, and the number average molecular weight was 7,300.

[Chemical Formula 63]

Polymer 3-4

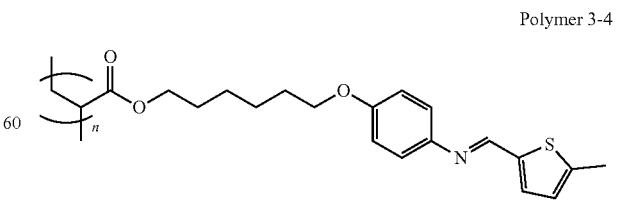

<Preparation of Polymer Particle Dispersion 3-4>

80 parts by mass of dichloromethane and 20 parts by mass of the polymer 3-4 obtained as described above were mixed and stirred while being heated to 50° C., and a solution including polymer 3-4 was obtained. To 100 parts by mass of the solution thus obtained, a mixed liquid of 99.5 parts by mass of distilled water that had been warmed to 50° C. and 0.5 parts by mass of a 20 mass % aqueous solution of sodium dodecyl benzenesulfonate was added. Subsequently, the mixture was emulsified by stirring for 20 minutes at 16,000 rpm using a homogenizer (manufactured by Heidolph Instruments GmbH & CO. KG) equipped with a shaft generator 18F, and thus an emulsion of the polymer 3-4 was obtained.

The emulsion thus obtained was introduced into a separable flask and was heated and stirred for 90 minutes at 40° C. while nitrogen was blown into the gas phase, thus the organic solvent was removed, and thereby polymer particle dispersion 3-4 was obtained. The particle size of the polymer particles in the polymer particle dispersion 3-4 was measured using an electrophoretic light scattering photometer, "ELS-800" (manufactured by Otsuka Electronics Co., Ltd.), and the particle size was 155 nm as a mass average particle size.

(Preparation of Black Colorant Particle Dispersion (Bk-1))

11.5 parts by mass of sodium n-dodecyl sulfate was dissolved in 160 parts by mass of pure water, 25 parts by mass of carbon black "MOGUL L (manufactured by Cabot Corporation)" was slowly added thereto, and subsequently, the mixture was subjected to a dispersing treatment using "CLEARMIX (registered trademark) W MOTION CLM-0.8 (manufactured by M Technique Co., Ltd.)". Thereby, a black colorant particle dispersion (Bk-1) was prepared. The volume-based median diameter of the colorant particles in the black colorant particle dispersion (Bk-1) was 110 nm.

<Production of Toner 3-4>

602 parts by mass in terms of the solid content of the polymer particle dispersion 3-4 produced as described above, 52 parts by mass in terms of the solid content of the black colorant particle dispersion (Bk-1), and 900 parts by mass of ion-exchanged water were introduced into a reaction apparatus equipped with a stirring apparatus, a temperature sensor, and a cooling tube. The temperature inside the vessel was maintained at 30° C., and a 5 mol/liter aqueous solution of sodium hydroxide was added thereto to adjust the pH to 10.

Next, an aqueous solution obtained by dissolving 2 parts by mass of magnesium chloride hexahydrate in 1,000 parts by mass of ion-exchanged water was added dropwise thereto over 10 minutes under stirring, and then temperature increase was initiated. This system was heated to 70° C. for 60 minutes, and while the temperature was maintained at 70° C., a particle growth reaction was continued. In this state, the particle size of associated particles was measured with a "MULTISIZER-3" (manufactured by Beckman Coulter, Inc.), and at the time point when the volume-based median diameter (D50) reached 6.5 µm, an aqueous solution obtained by dissolving 190 parts by mass of sodium chloride in 760 parts by mass of ion-exchanged water was added thereto so as to terminate particle growth. The mixture was stirred for one hour at 70° C., subsequently temperature increase was further carried out, and the mixture was heated and stirred in a state of 75° C. to thereby implement fusion of the particles. Subsequently, the mixture was cooled to 30° C., and thus a dispersion of toner base particles was obtained.

A dispersion of toner base particles thus obtained was subjected to solid-liquid separation with a centrifuge, and a wet cake of toner base particles was formed. This wet cake was washed with ion-exchanged water at 35° C. with a centrifuge until the electrical conductivity of the filtrate reached 5 µS/cm, subsequently, the wet cake was transferred into "FLASH JET DRYER (manufactured by Seishin Enterprise Co., Ltd.)", and the wet cake was dried until the moisture amount reached 0.5% by mass. Thus, toner base particles were produced.

With respect to 100% by mass of the toner base particles thus obtained, 1% by mass of hydrophobic silica (number average primary particle size: 12 nm) and 0.3% by mass of hydrophobic titania (number average primary particle size: 20 nm) were added, the mixture was mixed using HEN-SCHEL MIXER (registered trademark), and thereby toner 3-4 was obtained.

Examples 3-1 to 3-3 and 3-5 to 3-19

Azomethine derivative monomers 3-1, 3-2, 3-3, 3-7, 3-8, 3-10, 3-12, 3-14, 3-15, 3-16, 3-17, 3-19, 3-22, 3-24, 3-28, 3-32, and 3-34 having structural units 3-1, 3-2, 3-3, 3-7, 3-8, 3-10, 3-12, 3-14, 3-15, 3-16, 3-17, 3-19, 3-22, 3-24, 3-28, 3-32, and 3-34, respectively, as shown in the following Table 8 were synthesized using techniques similar to the Example 3-4 and using the respectively corresponding raw materials. Next, polymers 3-1 to 3-3 and 3-5 to 3-19 as shown in the following Table 9 were obtained by similar methods except that in Example 3-4, the above-described azomethine derivative monomers 3-1, 3-2, 3-3, 3-7, 3-8, 3-10, 3-12, 3-14, 3-15, 3-16, 3-17, 3-19, 3-22, 3-24, 3-28, 3-32, and 3-34 were used instead of the azomethine derivative monomer 3-6. Next, toners 3-1 to 3-3 and 3-5 to 3-19 were respectively produced by a method similar to Example 3-4, except that polymers 3-1 to 3-3 and 3-5 to 3-19 were used instead of the polymer 3-4. However, with regard to the preparation of the azomethine derivative monomers 3-1, 3-2, 3-3, 3-7, 3-8, 3-10, 3-12, 3-14, 3-15, 3-16, 3-17, 3-19, 3-22, 3-24, 3-28, 3-32, and 3-34, and the polymers 3-1 to 3-3 and 3-5 to 3-19, the amounts of addition of the various raw materials and the reaction conditions were appropriately adjusted.

Meanwhile, the polymer 3-19 was produced into a polymer having the same structural unit as that of the polymer 3-12 and having a different number average molecular weight, by using raw materials similar to those of the polymer 3-12 and appropriately regulating the polymerization time.

Example 3-20

Polymer 3-20 was obtained in the same manner except that in the synthesis of the polymer 3-12 of Example 3-12, the amount of the azomethine derivative monomer 3-17 was changed from 1.5 g to 1.2 g, and 0.3 g of styrene was added. Toner 3-20 was produced similarly to Example 3-12, except that the polymer 3-20 was used instead of the polymer 3-12.

Example 3-21

Polymer 3-21 was obtained in the same manner except that in the synthesis of the polymer 3-20 of Example 3-20, styrene was changed to ethyl acrylate. Toner 3-21 was produced similarly to Example 3-20, except that the polymer 3-21 was used instead of the polymer 3-20.

Example 3-22

Polymer 3-22 was obtained in the same manner except that in the synthesis of the polymer 3-20 of Example 3-20, styrene was changed to n-butyl methacrylate. Toner 3-22 was produced similarly to Example 3-20, except that the polymer 3-22 was used instead of the polymer 3-20.

Example 3-23

Polymer 3-23 was obtained in the same manner except that in the synthesis of the polymer 3-20 of Example 3-20, the amount of styrene was changed from 0.3 g to 0.15 g, and 0.15 g of methyl acrylate was added. Toner 3-23 was produced similarly to Example 3-20, except that the polymer 3-23 was used instead of the polymer 3-20.

Example 3-24

<Synthesis of macroinitiator 3-24>
Into a 100-ml pear-shaped flask, 2,2'-bipyridyl (230 mg, 1.47 mmol) was introduced, and in a glove box in a nitrogen atmosphere, Cu(I)Br (95 mg, 0.66 mmol), styrene (15 g, 144 mmol), and ethyl 2-bromoisobutyrate (35 mg, 0.18 mmol) were further added thereto. The flask was tightly sealed. This was heated and stirred in an oil bath at 100° C. Subsequently, tetrahydrofuran was added thereto in an appropriate amount, and this was passed through a neutral alumina column. This was purified by performing reprecipitation from methanol and centrifugation, and macroinitiator 3-24 was obtained. The number average molecular weight (13 Mn) of the macroinitiator 3-24 thus obtained was measured by a GPC method, and the number average molecular weight was 1,000.
<Synthesis of Polymer 3-24>
Into a 100-ml pear-shaped flask, the azomethine derivative monomer 3-17 (16 g, 38 mmol) obtained as described above and the macroinitiator 3-24 (0.92 g, 0.18 mmol) were introduced, and in a glove box in a nitrogen atmosphere, Cu(I)Cl (29 mg, 0.29 mmol), 1,1,4,7,10,10-hexamethyltriethylenetetramine (136 mg, 0.59 mmol), and anisole (4.9 g, 41.1 mmol) as a solvent were further added thereto. The flask was tightly sealed. Then, the mixture was heated and stirred in an oil bath at 80° C. Subsequently, chloroform was added thereto in an appropriate amount, and the mixture was passed through a basic alumina column. This was purified by reprecipitation from methanol and centrifugation, and polymer 3-24 was obtained. The total number average molecular weight Mn of the polymer 3-24 thus obtained was measured by a GPC method, and the total number average molecular weight was 5,400. From this, the number average molecular weight (α Mn) of the structural unit containing a group having an azomethine structure (structural unit derived from an azomethine derivative) can be determined as 4,400.

Toner 3-24 was produced similarly to Example 3-1, except that the polymer 3-24 was used instead of the polymer 3-1.

Example 3-25

<Synthesis of Macroinitiator 3-25>
Macroinitiator 3-25 was obtained by a similar method except that in the synthesis of the macroinitiator 3-24, ethyl 2-bromoisobutyrate was changed to α,α-dibromo-p-xylene.
<Synthesis of Polymer 3-25>
Polymer 3-25 was obtained by a similar method except that in the synthesis of the polymer 3-24, the macroinitiator 3-24 was changed to the macroinitiator 3-25.

However, with regard to the preparation of the macroinitiator 3-25 and the macroinitiators 3-26 to 3-35 that will be described below, and the polymer 3-25 and the polymers 3-26 to 3-35 that will be described below, the amounts of addition of the various raw materials and the reaction conditions were appropriately adjusted.

Next, toner 3-25 was produced similarly to Example 3-1 except that the polymer 3-25 was used instead of the polymer 3-1.

Example 3-26

<Synthesis of Macroinitiator 3-26>
Macroinitiator 3-26 was obtained by a similar method except that in the synthesis of the macroinitiator 3-24, ethyl 2-bromoisobutyrate was changed to ethylene bis(2-bromoisobutyrate), 2,2'-bipyridyl was changed to 1,1,4,7,10,10-hexamethyltriethylenetetramine, styrene was changed to the azomethine derivative monomer 3-17, and anisole was further added.
<Synthesis of Polymer 3-26>
Polymer 3-26 was obtained by a similar method except that in the synthesis of the polymer 3-24, the macroinitiator 3-24 was changed to the macroinitiator 3-26, 1,1,4,7,10,10-hexamethyltriethylenetetramine was changed to 2,2'-bipyridyl, the azomethine derivative monomer 3-17 was changed to styrene, and anisole was excluded.

Next, toner 3-26 was produced similarly to Example 3-1, except that the polymer 3-26 was used instead of the polymer 3-1.

Example 3-27

<Synthesis of Macroinitiator 3-27>
Macroinitiator 3-27 was obtained by a similar method except that in the synthesis of the macroinitiator 3-24, ethyl 2-bromoisobutyrate was changed to 1,1,1-tris(2-bromoisobutyryloxymethyl)ethane.
<Synthesis of Polymer 3-27>
Polymer 3-27 was obtained by a similar method except that in the synthesis of the polymer 3-24, the macroinitiator 3-24 was changed to the macroinitiator 3-27.

Next, toner 3-27 was produced similarly to Example 3-1 except that the polymer 3-27 was used instead of the polymer 3-1.

Example 3-28

<Synthesis of Macroinitiator 3-28>
Macroinitiator 3-28 was obtained by a similar method except that in the synthesis of the macroinitiator 3-26, ethylene bis(2-bromoisobutyrate) was changed to 1,1,1-tris(2-bromoisobutyryloxymethyl)ethane.
<Synthesis of Polymer 3-28>
Polymer 3-28 was obtained by a similar method except that in the synthesis of the polymer 3-26, the macroinitiator 3-26 was changed to the macroinitiator 3-28.

Next, toner 3-28 was produced similarly to Example 3-1, except that the polymer 3-28 was used instead of the polymer 3-1.

Example 3-29

<Synthesis of Macroinitiator 3-29>
Macroinitiator 3-29 was obtained by a similar method except that in the synthesis of the macroinitiator 3-24, ethyl 2-bromoisobutyrate was changed to pentaerythritol tetrakis (2-bromoisobutyrate).

<Synthesis of Polymer 3-29>

Polymer 3-29 was obtained by a similar method except that in the synthesis of the polymer 3-24, the macroinitiator 3-24 was changed to the macroinitiator 3-29.

Next, toner 3-29 was produced similarly to Example 3-1, except that the polymer 3-29 was used instead of the polymer 3-1.

Example 3-30

<Synthesis of Macroinitiator 3-30>

Macroinitiator 3-30 was obtained by a similar method except that in the synthesis of the macroinitiator 3-26, ethylene bis(2-bromoisobutyrate) was changed to pentaerythritol tetrakis(2-bromoisobutyrate).

<Synthesis of Polymer 3-30>

Polymer 3-30 was obtained by a similar method except that in the synthesis of the polymer 3-26, the macroinitiator 3-26 was changed to the macroinitiator 3-30.

Next, toner 3-30 was produced similarly to Example 3-1, except that the polymer 3-30 was used instead of the polymer 3-1.

Example 3-31

<Synthesis of Macroinitiator 3-31>

Macroinitiator 3-31 having a structural similar to that of the macroinitiator 3-24 and having a number average molecular weight (13 Mn) of 5,000 was obtained by appropriately regulating the time of heating and stirring in an oil bath at 100° C. in the synthesis of the macroinitiator 3-24.

<Synthesis of Polymer 3-31>

Polymer 3-31 containing a structural unit similar to that of the polymer 3-24 and having a total number average molecular weight Mn of 5,500 was obtained by appropriately regulating the time of heating and stirring in an oil bath at 80° C. in the synthesis of the polymer 3-24. The number average molecular weight ($\alpha$ Mn) of the structural unit containing a group having an azomethine structure (structural unit derived from an azomethine derivative) in the polymer 3-31 was 500.

Next, toner 3-31 was produced similarly to Example 3-1, except that the polymer 3-31 was used instead of the polymer 3-1.

Example 3-32

<Synthesis of Macroinitiator 3-32>

Macroinitiator 3-32 was obtained by a similar method except that in the synthesis of the macroinitiator 3-25, styrene was changed to methyl acrylate.

<Synthesis of Polymer 3-32>

Polymer 3-32 was obtained by a similar method except that in the synthesis of the polymer 3-25, the macroinitiator 3-25 was changed to the macroinitiator 3-32.

Next, toner 3-32 was produced similarly to Example 3-1, except that the polymer 3-32 was used instead of the polymer 3-1.

Example 3-33

<Synthesis of Macroinitiator 3-33>

Macroinitiator 3-33 was obtained by a similar method except that in the synthesis of the macroinitiator 3-25, styrene was changed to n-hexyl methacrylate.

<Synthesis of Polymer 3-33>

Polymer 3-33 was obtained by a similar method except that in the synthesis of the polymer 3-25, the macroinitiator 3-25 was changed to the macroinitiator 3-33.

Next, toner 3-33 was produced similarly to Example 3-1, except that the polymer 3-33 was used instead of the polymer 3-1.

Example 3-34

<Synthesis of Macroinitiator 3-34>

Macroinitiator 3-34 was obtained by a similar method except that in the synthesis of the macroinitiator 3-25, styrene was changed to 3-methyl-1-pentene.

<Synthesis of Polymer 3-34>

Polymer 3-34 was obtained by a similar method except that in the synthesis of the polymer 3-25, the macroinitiator 3-25 was changed to the macroinitiator 3-34.

Next, toner 3-34 was produced similarly to Example 3-1, except that the polymer 3-34 was used instead of the polymer 3-1.

Example 3-35

<Synthesis of Macroinitiator 3-35>

Macroinitiator 3-35 was obtained by a similar method except that in the synthesis of the macroinitiator 3-25, styrene was changed to a mixture in which the molar ratio of styrene:methyl acrylate was 5:5.

<Synthesis of Polymer 3-35>

Polymer 3-35 was obtained by a similar method except that in the synthesis of the polymer 3-25, the macroinitiator 3-25 was changed to the macroinitiator 3-35.

Next, toner 3-35 was produced similarly to Example 3-1, except that the polymer 3-35 was used instead of the polymer 3-1.

Example 3-36

Toner 3-36 was obtained by a similar method except that in the production of the toner 3-12, the amount of the polymer particle dispersion 3-12 was changed from 602 parts by mass to 421 parts by mass in terms of the solid content, and the following styrene-acrylic resin particle dispersion was added in an amount of 181 parts by mass in terms of the solid content.

<Preparation of Styrene-Acrylic Resin Particle Dispersion>

(First Stage Polymerization)

Into a reaction vessel equipped with a stirring apparatus, a temperature sensor, a cooling tube, and a nitrogen inlet apparatus, a solution obtained by dissolving 8 parts by mass of sodium dodecyl sulfate in 3,000 parts by mass of ion-exchanged water was introduced, and while the solution was stirred at a stirring rate of 230 rpm under a nitrogen gas stream, the internal temperature was increased to 80° C. After the temperature increase, a solution obtained by dissolving 10 parts by mass of potassium persulfate in 200 parts by mass of ion-exchanged water was added thereto, the liquid temperature was adjusted again to 80° C., and a polymerizable monomer solution including 480 parts by mass of styrene, 250 parts by mass of n-butyl acrylate, 68.0 parts by mass of methacrylic acid, and 16.0 parts by mass of n-octyl-3-mercaptopropionate, was added dropwise thereto for one hour. Subsequently, polymerization was carried out by heating and stirring the mixture for 2 hours at 80° C., and a styrene-acrylic resin particle dispersion (1A) containing styrene-acrylic resin particles (1a) was prepared.

(Second Stage Polymerization)

Into a reaction vessel equipped with a stirring apparatus, a temperature sensor, a cooling tube, and a nitrogen inlet apparatus, a solution obtained by dissolving 7 parts by mass of sodium polyoxyethylene(2) dodecyl ether sulfate in 800 parts by mass of ion-exchanged water was introduced, and the solution was heated to 98° C. Subsequently, 260 parts by mass of the styrene-acrylic resin particle dispersion (1A) obtained as described above, and a polymerizable monomer solution obtained by dissolving 245 parts by mass of styrene, 120 parts by mass of n-butyl acrylate, 1.5 parts by mass of n-octyl-3-mercaptopropionate, and 67 parts by mass of paraffin wax "HNP-11" (manufactured by Nippon Seiro Co., Ltd.) as a release agent at 90° C. was added thereto, the mixture was mixed and dispersed for one hour using a mechanical dispersing machine "CREARMIX (registered trademark)" (manufactured by M Technique Co., Ltd.) having a circulation path, and a dispersion including emulsion particles (oil droplets) was prepared. Next, to this dispersion, an initiator solution obtained by dissolving 6 parts by mass of potassium persulfate in 200 parts by mass of ion-exchanged water was added, and polymerization was carried out by heating and stirring this system at 82° C. over one hour. Thus, a styrene-acrylic resin particle dispersion (1B) including styrene-acrylic resin particles (1b) was prepared.

(Third Stage Polymerization)

To the styrene-acrylic resin particle dispersion (1B) thus obtained, a solution obtained by dissolving 11 parts by mass of potassium persulfate in 400 parts by mass of ion-exchanged water was added, and then under the temperature conditions of 82° C., a polymerizable monomer solution including 435 parts by mass of styrene, 130 parts by mass of n-butyl acrylate, 33 parts by mass of methacrylic acid, and 8 parts by mass of n-octyl-3-mercaptopropionate was added dropwise for one hour. After completion of the dropwise addition, polymerization was carried out by heating and stirring the system for 2 hours, subsequently the system was cooled to 28° C., and a styrene-acrylic resin particle dispersion containing the styrene-acrylic resin 1 was obtained. Furthermore, the glass transition temperature (Tg) of the styrene-acrylic resin 1 was measured, and the glass transition temperature was 45° C.

Example 3-37

Toner 3-37 was obtained by a similar method except that in the production of the toner 3-12, the amount of the polymer particle dispersion 3-12 was changed from 602 parts by mass to 421 parts by mass in terms of the solid content, and the following polyester resin particle dispersion was added in an amount of 181 parts by mass in terms of the solid content.

(Preparation of Polyester Resin Particle Dispersion Containing Polyester Resin)

Into a four-necked flask having a capacity of 10 liters and equipped with a nitrogen inlet tube, a dehydrating tube, a stirring device, and a thermocouple, 524 parts by mass of a bisphenol A propylene oxide 2-mol adduct, 105 parts by mass of terephthalic acid, 69 parts by mass of fumaric acid, and 2 parts by mass of tin octoate (esterification catalyst) were introduced, and a polycondensation reaction was carried out for 8 hours at a temperature of 230° C. Furthermore, the polycondensation reaction was continued for one hour at 8 kPa, subsequently the liquid was cooled to 160° C., and a polyester resin 1 was obtained. 100 parts by mass of the polyester resin 1 was pulverized with "ROUNDEL MILL Model: RM" (manufactured by Tokuju Corporation) and was mixed with 638 parts by mass of a 0.26 mass % aqueous solution of sodium lauryl sulfate that had been produced in advance. While being stirred, the mixture was ultrasonically dispersed using an ultrasonic homogenizer "US-150T" (manufactured by Nissei Corporation) with V-LEVEL at 300 µA for 30 minutes, and thus a polyester resin particle dispersion was obtained. The particle size of the polyester resin particles in the polyester resin particle dispersion was measured according to a dynamic light scattering method using "MICROTRAC UPA-150" (manufactured by Nikkiso Co., Ltd.), and the particle size was 135 nm as the volume-based median diameter. Furthermore, the glass transition temperature (Tg) of the polyester resin 1 was measured, and the glass transition temperature was 42° C.

Comparative Example 3-1

Azomethine derivative monomer 3-37 of Comparative Example 3-1 having the structural unit 3-37 of Comparative Example 3-1 shown in the following Table 9 was synthesized using corresponding raw materials and using a technique similar to the Example 3-4. Next, a polymer of Comparative example 3-1 was obtained by a similar method except that the azomethine derivative monomer 3-37 was used instead of the azomethine derivative monomer 3-6 in Example 3-4. Next, a toner of Comparative Example 3-1 was produced by a method similar to Example 3-4, except that the polymer of Comparative Example 3-1 was used instead of the polymer 3-4.

Comparative Example 3-2

<Comparative Compound (Azobenzene Derivative)>

The following comparative compound (azobenzene derivative, number average molecular weight Mn: 2,870) was obtained by the method described in paragraphs 0217 to 0227 of Japanese Patent Application Laid-Open No. 2014-191078.

[Chemical Formula 64]

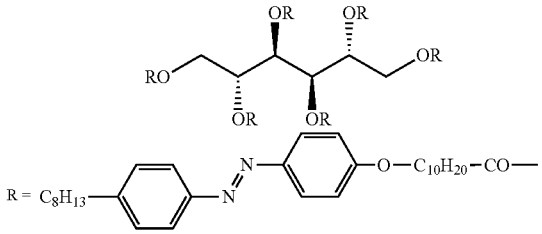

<Preparation of Comparative Compound Dispersion>

A comparative compound dispersion was similarly obtained except that in the <Preparation of polymer particle dispersion 3-4> of Example 3-4, the polymer 3-4 was changed to the comparative compound (azobenzene derivative).

<Production of Toner of Comparative Example 3-2>

A toner of Comparative Example 3-2 was obtained by a similar method except that the polymer particle dispersion 3-4 of Example 3-4 was changed to the comparative compound dispersion produced as described above.

[Theoretical Calculation]

For the polymers of the various Examples and the polymer of Comparative Example 3-1, the activation energy Ea for photoisomerization (energy barrier in an isomerization reaction from a cis-form to a trans-form) of an azomethine derivative in the structural unit was calculated. More particularly, for each of the polymers, the total energy of a transition state and the total energy of the cis-form of a compound in which a hydrogen atom is bonded, instead of an oxygen atom, to the group A having an azomethine structure of the General Formula (1) were calculated, and the difference was designated as the activation energy. Here, the transition state of the compound is represented by the General Formula (3), and the cis-form is represented by the General Formula (4). Meanwhile, the General Formulae (3) and (4) represent the disposition (positions) of $B_1$ and $B_2$ to with respect to the $Z_1=Z_2$ bond, and the positions of the moieties of H, $r_2$-H, and O-$r_2$-H depend on the structure of the group A having an azomethine structure including the structure of $B_1$.

The calculation of the most stable molecular structure (molecular structure of the cis-form) and the total energy of the cis-form of the above-described compound as well as the molecular structure of the transition state and the total energy of the transition state was carried out using Gaussian 16 (Revision B.01, M. J. Frisch, G. W. Trucks, H. B. Schlegel, G. E. Scuseria, M. A. Robb, J. R. Cheeseman, G Scalmani, V Barone, G. A. Petersson, H. Nakatsuji, X. Li, M. Caricato, A. V. Marenich, J. Bloino, B. G. Janesko, R. Gomperts, B. Mennucci, H. P. Hratchian, J V Ortiz, A. F. Izmaylov, J. L. Sonnenberg, D. Williams-Young, F. Ding, F. Lipparini, F. Egidi, J. Goings, B. Peng, A. Petrone, T. Henderson, D. Ranasinghe, V. G. Zakrzewski, J. Gao, N. Rega, G. Zheng, W. Liang, M. Hada, M. Ehara, K. Toyota, R. Fukuda, J. Hasegawa, M. Ishida, T. Nakajima, Y Honda, O. Kitao, H. Nakai, T. Vreven, K. Throssell, J. A. Montgomery, Jr., J. E. Peralta, F. Ogliaro, M. J. Bearpark, J. J. Heyd, E. N. Brothers, K. N. Kudin, V. N. Staroverov, T. A. Keith, R. Kobayashi, J. Normand, K. Raghavachari, A. P. Rendell, J. C. Burant, S. S. Iyengar, J. Tomasi, M. Cossi, J. M. Millam, M. Klene, C. Adamo, R. Cammi, J. W. Ochterski, R. L. Martin, K. Morokuma, O. Farkas, J. B. Foresman, and D. J. Fox, Gaussian, Inc., Wallingford CT, 2016.) software manufactured by Gaussian, Inc. in the USA. As the calculation technique, a density functional method (B3LYP/6-31G(d)) was used. From the calculation value thus obtained, the value of the activation energy Ea was determined according to the Formula (1).

Regarding the molecular structure of the cis-form, the most stable molecular structure of the isomer represented by the General Formula (4), that is, the molecular structure having the lowest total energy, was calculated, and this total energy was designated as the total energy of the cis-form. Regarding the molecular structure of the transition state represented by the General Formula (3), the saddle point of the corresponding molecular structure was calculated, and the total energy obtained at this time was designated as the total energy of the transition state. From the calculation value obtained as such, the value of the activation energy Ea was determined according to the Formula (1).

The structural units constituting the polymers of Examples 3-1 to 3-19 and Comparative Example 3-1, and the activation energy of compounds in which a hydrogen atom is bonded to the structure represented by the General Formula (2), are presented in the following Table 8.

(Number Average Molecular Weight Mn)

The number average molecular weights Mn of the polymers 3-1 to 3-35, the polymer of Comparative Example 3-1, and the comparative compound (azobenzene derivative) were measured by a GPC method. Specifically, apparatus "HLC-8120 GPC" (manufactured by Tosoh Corporation) and columns "TSKguard column+three TSKgel SuperHZ-M in series" (manufactured by Tosoh Corporation) were used, and while the column temperature was maintained at 40° C., tetrahydrofuran (THF) as a carrier solvent was caused to flow at a flow rate of 0.2 mL/min. A measurement sample was dissolved in tetrahydrofuran so as to obtain a concentration of 1 mg/ml. Preparation of the solution was carried out by performing a treatment for 5 minutes at room temperature using an ultrasonic dispersing machine. Next, a sample solution was obtained by treating with a membrane filter having a pore size of 0.2 µm, 10 µL of this sample solution was injected into the apparatus together with the above-mentioned carrier solvent, and detection was made using a refractive index detector (RI detector). The molecular weight distribution of the measurement sample was calculated based on a calibration curve produced using monodisperse standard polystyrene particles. Regarding the polystyrene for measuring the calibration curve, ten items were used.

Meanwhile, for the polymers 3-24 to 3-35, in addition to the total number average molecular weight, the number average molecular weight of the macroinitiator was also measured by the above-described method. Furthermore, the number average molecular weight of the macroinitiator was designated as the number average molecular weight of the polymer block α or β, and for each block structure, by subtracting (number average molecular weight of macroinitiator×number of blocks) from the total number average molecular weight of the polymer, the number average molecular weight of the sum of the other polymer block (number average molecular weight of the other polymer block×number of blocks) was obtained. The results are presented in the following Table 9. In Table 9, Mn represents the total number average molecular weight of the polymer; a Mn represents the number average molecular weight of the sum of the polymer blocks α; and β Mn represents the number average molecular weight of the sum of the polymer blocks β.

(Glass Transition Temperature (Tg))

The glass transition temperature (Tg) of the binder resin was measured with DSC7000X manufactured by Hitachi High-Tech Science Corporation. Specifically, about 3 mg of a binder resin was precisely weighed up to two decimal places, and the binder resin was sealed in an aluminum pan and mounted. For a reference, a blank aluminum pan was used. Measurement conditions in which a first temperature increase process of increasing the temperature from 0° C. to 200° C. at a rate of temperature increase of 10° C./min; a cooling process of cooling from 200° C. to 0° C. at a rate of temperature decrease of 10° C./min; and a second temperature increase process of increasing the temperature from 0° C. to 200° C. at a rate of temperature increase of 10° C./min were carried out in this order, were employed. Then, analysis was carried out based on the data in the second temperature increase process. The value of an intersection between an extension line of the baseline before the beginning of a first endothermic peak and a tangent line that shows the maximum gradient from the beginning portion of the first endothermic peak to the peak apex, was designated as the glass transition temperature. Meanwhile, the glass transition temperatures of the polymers and toners produced in the various Examples and Comparative Examples can also be measured by a similar method.

[Evaluation: Test for Photoresponsive Adhesion of Polymer]

The changes in adhesiveness concomitant with light irradiation of the polymers 3-1 to 3-35 prepared in the various Examples, the polymer of Comparative Example 3-1 synthesized in Comparative Example 3-1, and the azobenzene derivative synthesized in Comparative Example 3-2 were evaluated in the following photoresponsive adhesion test using the apparatus illustrated in FIG. 3. As shown in FIG. 3, 2 mg of a polymer was mounted on a cover glass 1 that measured 18 mm on each of four sides, within a radius of 6 mm from the center of the glass, and a cover glass 2 having the same size was covered at a position shifted by about 4 mm in a direction parallel to the cover glass 1 so as to cover the entire polymer. This was heated to melt the sample, and thus the cover glass 1 and the cover glass 2 were adhered.

Each of the samples thus obtained was subjected to a non-fluidity→fluidity test as described below and was subsequently subjected to a fluidity→non-fluidity test as described below.

<Non-Fluidity→Fluidity Test (Fluidization Test)>

The part (A) shown in FIG. 3 was fixed to a holder with Cellophane tape, and a vinyl string 30 cm long loaded with a 100-g weight was fixed to the part (C) with Cellophane tape. The part (B) was irradiated with light having a wavelength of 365 nm in an amount of irradiation of 30 J/cm$^2$, it was checked whether the cover glass 2 would come off from the cover glass 1, and the result was judged according to the following evaluation criteria. The results thus obtained are presented in the following Table 9.

—Evaluation Criteria for Non-Fluidity→Fluidity Test (Fluidization Test)—

○: The cover glass 2 completely came off from the cover glass 1.

Δ: The cover glass 2 was shifted.

X: The cover glass 2 did not move.

<Fluidity→Non-Fluidity Test (Non-Fluidization Test)>

After completion of the non-fluidity→fluidity test, a sample in which the cover glass 2 completely came off and a sample in which the cover glass 2 was shifted were subjected to the following experiment. Meanwhile, for the sample in which the cover glass 2 was shifted, the cover glasses 1 and 2 were detached with hands Five minutes after the completion of light irradiation of the non-fluidity→fluidity test (for the five minutes, in a natural environment, that is, left to stand at room temperature), a cover glass 3 (having the same size as the cover glasses 1 and 2) was mounted so as to cover the sample portion (part (B)) of the cover glass 1 used in the above-described test, it was checked whether the cover glass 1 and the cover glass 3 would adhere, and the result was judged according to the following evaluation criteria. The results thus obtained are presented in Table 9.

—Evaluation Criteria for Fluidity→Non-Fluidity Test (Non-Fluidization Test)—

○: Did not adhere (non-fluidized)

Δ: Partially adhered (a fluidized state was maintained in some portion)

X: Adhered (a fluidized state was maintained).

Meanwhile, with regard to the polymers 3-1 to 3-35 prepared in Examples 3-1 to 3-31, which were rated as ○ in the evaluation of the fluidity→non-fluidity (return) test described above, it was verified that all were re-solidified after the non-fluidity→fluidity test.

[Evaluation: Fixability Test]

(Production of Developer)

Each of the toners 3-1 to 3-35 produced as described above and the toners of Comparative Examples 3-1 and 3-2 was mixed with ferrite carrier particles having a volume average particle size of 30 μm and coated with a copolymer resin of cyclohexane methacrylate and methyl methacrylate (monomer mass ratio 1:1) so as to obtain a toner particle concentration of 6% by mass, and developers 3-1 to 3-35 and developers of Comparative Examples 3-1 and 3-2 were obtained. Mixing was carried out for 30 minutes using a V-type mixer.

(Fixability Test)

A fixability test was carried out using the developers 3-1 to 3-35 obtained as described above and the developers of Comparative Examples 3-1 and 3-2 obtained as described above, in a constant temperature and constant humidity environment (temperature 20° C., relative humidity 50% RH). A developer was disposed between a pair of parallel flat plate (aluminum) electrodes, the developer being placed on one electrode and ordinary paper (basis weight: 64 g/m$^2$) as a recording medium being placed on the other electrode, while the developer was caused to slide by magnetic force, and the toner was developed at a gap between the electrodes of 0.5 mm under the conditions of the DC bias and the AC bias so that the amount toner attachment would be 6 g/m$^2$. Thus, a toner layer was formed on the surface of the ordinary paper and was fixed with a fixing apparatus, and thus a print was obtained (image formation). A toner image that measured 1 cm on each of four sides of this print was rubbed 11 times while being subjected to a pressure of 50 kPa with "JK WIPER (registered trademark)" (manufactured by Nippon Paper Crecia Co., Ltd.), and the fixing ratio of the image was evaluated. A fixing ratio of 60% or higher was considered acceptable. Meanwhile, the fixing ratio of an image is a value, expressed in percentage, obtained by measuring the reflection densities of the image after printing and the image after rubbing with a fluorescence spectroscopic densitometer, "FD-7" (manufactured by Konica Minolta, Inc.), and dividing the reflection density of the solid image after rubbing by the reflection density of the solid image after printing.

Regarding the fixing apparatus, the following three kinds of fixing apparatuses configured by appropriately modifying the apparatus illustrated in FIG. 2 were used:

No. 1: The compression unit 9 of FIG. 2 is absent, the wavelength of the ultraviolet light radiated from the irradiation unit 40 is 365 nm (light source: LED light source having an emission wavelength of 365 nm±10 nm), and the amount of irradiation is 11 J/cm$^2$;

No. 2: There is the compression unit 9 of FIG. 2, the temperature of the pressing member 91 is 20° C., and the pressure at the time of pressing is 0.2 MPa. The light source and the amount of irradiation of the irradiation unit 40 are similar to those of No. 1; and No. 3: There is the compression unit 9 of FIG. 2, the temperature of the pressing member 91 is 80° C., and the pressure at the time of pressing is 0.2 MPa. The light source and the amount of irradiation of the irradiation unit 40 are similar to those of No. 1.

[Evaluation of Color Reproducibility]

For the images of Examples and Comparative Examples obtained as described above, the color reproducibility was evaluated by a visual inspection made by ten monitors according to the following evaluation criteria. Specifically, as samples for evaluation and comparison, toners in which the polymer 3-12 in the toner 3-32 of Example 3-32 was all changed to a styrene-acrylic resin were produced. Developers were produced as described above using these toners, developing was carried out similarly to the image formation in the fixability test as described above, and fixing was carried out with the fixing apparatus No. 4 as described below:

Fixing apparatus No. 4: There is the compression unit 9 of FIG. 2, the temperature of the pressing member 91 is 150° C., the pressure at the time of pressing is 0.2 MPa, and light irradiation is not carried out.

The images of the samples for evaluation and comparison and the images obtained in the Examples and Comparative Examples described above were shown in sequence to the ten monitors, and the monitors were questioned about whether the colors of two images were clearly different. The determination results based on the following evaluation criteria for color reproducibility are presented in the following Table 10.

—Evaluation Criteria for Color Reproducibility—

⊙: Two or fewer people answered that the colors were clearly different.

○: Three or four people answered that the colors were clearly different.

Δ: Five to seven people answered that the colors were clearly different.

X: Eight or more people answered that the colors were clearly different.

TABLE 9

(Structural unit included in polymer)

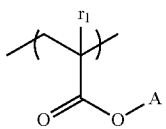

(Structure of group A having azomethine structure)

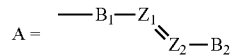

(2-a)

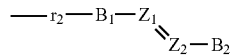

(2-b)

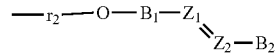

(2-c)

(Structure of B₁—Z₁=Z₂—B₂)

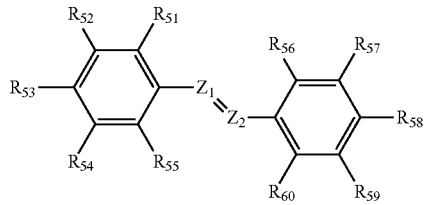

| Polymer No. | Structural unit No. | $r_1$ | A | $r_2$ Carbon number | Position of substitution for $B_1$ | $Z_1$ | $Z_2$ | $R_{51}$ | $R_{52}$ | $R_{53}$ | $R_{54}$ | $R_{55}$ | $R_{56}$ | $R_{57}$ | $R_{58}$ | $R_{59}$ | $R_{60}$ | Ea (kJ/mol) |
|---|---|---|---|---|---|---|---|---|---|---|---|---|---|---|---|---|---|---|
| 3-1 | 3-1 | H | (2-c) | 6 | $R_{53}$ | N | CH | H | H | — | H | H | H | H | $OC_6H_{13}$ | H | H | 62.83 |
| 3-2 | 3-2 | H | (2-c) | 6 | $R_{53}$ | N | CH | H | H | — | H | H | H | $CH_3$ | $OC_6H_{13}$ | H | H | 63.08 |
| 3-3 | 3-3 | H | (2-c) | 6 | $R_{53}$ | N | CH | H | H | — | H | H | H | H | $N(C_2H_5)_2$ | H | H | 71.21 |
| Comparative Example 3-1 | 3-37 (Comparative Example 3-1) | H | (2-a) | — | $R_{53}$ | N | CH | H | H | — | H | H | H | H | H | H | H | 56.93 |

(Structure of B₁—Z₁=Z₂—B₂)

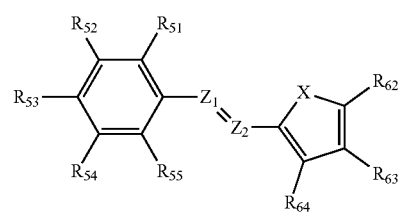

| Polymer No. | Structural unit No. | $r_1$ | A | $r_2$ Carbon number | Position of substitution for $B_1$ | $Z_1$ | $Z_2$ | $R_{51}$ | $R_{52}$ | $R_{53}$ | $R_{54}$ | $R_{55}$ | X | $R_{61}$ | $R_{62}$ | $R_{63}$ | $R_{64}$ | Ea (kJ/mol) |
|---|---|---|---|---|---|---|---|---|---|---|---|---|---|---|---|---|---|---|
| 3-4 | 3-6 | H | (2-c) | 6 | $R_{53}$ | N | CH | H | H | — | H | H | S | — | $CH_3$ | H | H | 68.99 |
| 3-5 | 3-7 | H | (2-c) | 6 | $R_{53}$ | N | CH | H | H | — | H | H | S | — | $OCH_3$ | H | H | 69.28 |
| 3-6 | 3-8 | H | (2-c) | 6 | $R_{53}$ | N | CH | H | H | — | H | H | S | — | $N(CH_3)_2$ | H | H | 70.10 |
| 3-7 | 3-10 | H | (2-c) | 6 | $R_{53}$ | N | CH | H | H | — | H | H | $NR_{61}$ | $CH_3$ | H | H | H | 72.39 |
| 3-8 | 3-12 | H | (2-c) | 2 | $R_{53}$ | N | CH | H | H | — | H | H | $NR_{61}$ | H | $CH_3$ | H | H | 72.33 |
| 3-9 | 3-14 | H | (2-c) | 6 | $R_{52}$ | N | CH | H | — | H | H | H | S | — | $CH_3$ | H | H | 64.71 |

TABLE 9-continued (Structure of B$_1$—Z$_1$=Z$_2$—B$_2$)

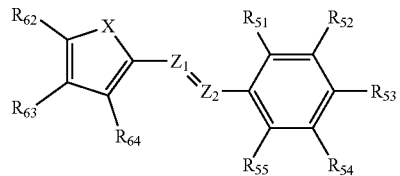

| Polymer No. | Structural unit No. | r$_1$ | A | r$_2$ Carbon number | Position of substitution for B$_1$ | Z$_1$ | Z$_2$ | B$_1$ | | | | | B$_2$ | | | | | Ea (kJ/ mol) |
|---|---|---|---|---|---|---|---|---|---|---|---|---|---|---|---|---|---|---|
| | | | | | | | | X | R$_{61}$ | R$_{62}$ | R$_{63}$ | R$_{64}$ | R$_{51}$ | R$_{52}$ | R$_{53}$ | R$_{54}$ | R$_{55}$ | |
| 3-10 | 3-15 | H | (2-b) | 1 | R$_{62}$ | CH | N | S | — | — | H | H | H | H | OC$_6$H$_{13}$ | H | H | 68.99 |
| 3-11 | 3-16 | H | (2-b) | 2 | R$_{61}$ | CH | N | NR$_{61}$ | — | H | H | H | H | H | OC$_6$H$_{13}$ | H | H | 71.13 |

(Structure of B$_1$—Z$_1$=Z$_2$—B$_2$)

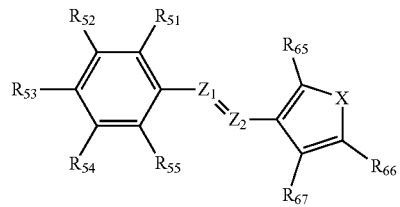

| Polymer No. | Structural unit No. | r$_1$ | A | r$_2$ Carbon number | Position of substitution for B$_1$ | Z$_1$ | Z$_2$ | B$_1$ | | | | | B$_2$ | | | | | Ea (kJ/ mol) |
|---|---|---|---|---|---|---|---|---|---|---|---|---|---|---|---|---|---|---|
| | | | | | | | | R$_{51}$ | R$_{52}$ | R$_{53}$ | R$_{54}$ | R$_{55}$ | X | R$_{61}$ | R$_{65}$ | R$_{66}$ | R$_{67}$ | |
| 3-12, 3-19 | 3-17 | H | (2-c) | 6 | R$_{53}$ | N | CH | H | H | — | H | H | NR$_{61}$ | C$_6$H$_{13}$ | H | H | H | 71.22 |
| 3-13 | 3-19 | CH$_3$ | (2-c) | 2 | R$_{53}$ | N | CH | H | H | — | H | H | NR$_{61}$ | CH$_3$ | H | H | H | 71.16 |

(Structure of B$_1$—Z$_1$=Z$_2$—B$_2$)

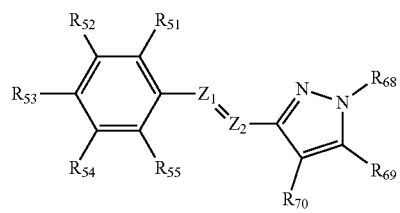

| Polymer No. | Structural unit No. | r$_1$ | A | r$_2$ Carbon number | Position of substitution for B$_1$ | Z$_1$ | Z$_2$ | B$_1$ | | | | | B$_2$ | | | Ea (kJ/ mol) |
|---|---|---|---|---|---|---|---|---|---|---|---|---|---|---|---|---|
| | | | | | | | | R$_{51}$ | R$_{52}$ | R$_{53}$ | R$_{54}$ | R$_{55}$ | R$_{68}$ | R$_{69}$ | R$_{70}$ | |
| 3-14 | 3-22 | CH$_3$ | (2-b) | 6 | R$_{53}$ | N | CH | H | H | — | H | H | H | H | H | 67.58 |

TABLE 9-continued (Structure of B$_1$—Z$_1$=Z$_2$—B$_2$)

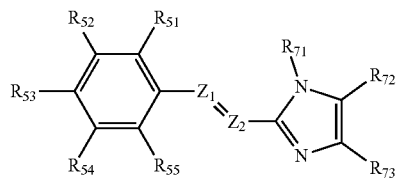

| Polymer No. | Structural unit No. | r$_1$ | A | r$_2$ Carbon number | Position of substitution for B$_1$ | Z$_1$ | Z$_2$ | B$_1$ | | | | | B$_2$ | | | Ea (kJ/mol) |
|---|---|---|---|---|---|---|---|---|---|---|---|---|---|---|---|---|
| | | | | | | | | R$_{51}$ | R$_{52}$ | R$_{53}$ | R$_{54}$ | R$_{55}$ | R$_{71}$ | R$_{72}$ | R$_{73}$ | |
| 3-15 | 3-24 | H | (2-c) | 8 | R$_{53}$ | N | CH | H | H | — | H | H | H | H | H | 71.95 |

(Structure of B$_1$—Z$_1$=Z$_2$—B$_2$)

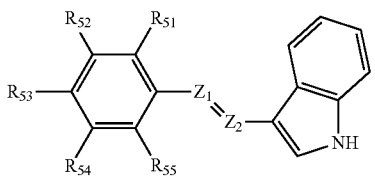

| Polymer No. | Structural unit No. | r$_1$ | A | r$_2$ Carbon number | Position of substitution for B$_1$ | Z$_1$ | Z$_2$ | B$_1$ | | | | | B$_2$ | (kJ/mol) |
|---|---|---|---|---|---|---|---|---|---|---|---|---|---|---|
| | | | | | | | | R$_{51}$ | R$_{52}$ | R$_{53}$ | R$_{54}$ | R$_{55}$ | | |
| 3-16 | 3-28 | H | (2-c) | 6 | R$_{53}$ | N | CH | H | CH$_3$ | — | H | H | 3 | 74.61 |

(Structure of B$_1$—Z$_1$=Z$_2$—B$_2$)

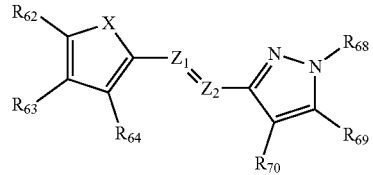

| Polymer No. | Structural unit No. | r$_1$ | A | r$_2$ Carbon number | Position of substitution for B$_1$ | Z$_1$ | Z$_2$ | B$_1$ | | | | | B$_2$ | | | Ea (kJ/mol) |
|---|---|---|---|---|---|---|---|---|---|---|---|---|---|---|---|---|
| | | | | | | | | X | R$_{61}$ | R$_{62}$ | R$_{63}$ | R$_{64}$ | R$_{68}$ | R$_{69}$ | R$_{70}$ | |
| 3-17 | 3-32 | H | (2-b) | 2 | R$_{61}$ | CH | N | R$_{61}$ | — | H | H | H | CH$_3$ | H | H | 74.70 |

(Structure of B$_1$—Z$_1$=Z$_2$—B$_2$)

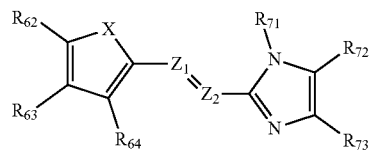

| Polymer No. | Structural unit No. | r$_1$ | A | r$_2$ Carbon number | Position of substitution for B$_1$ | Z$_1$ | Z$_2$ | B$_1$ | | | | | B$_2$ | | | Ea (kJ/mol) |
|---|---|---|---|---|---|---|---|---|---|---|---|---|---|---|---|---|
| | | | | | | | | X | R$_{61}$ | R$_{62}$ | R$_{63}$ | R$_{64}$ | R$_{71}$ | R$_{72}$ | R$_{73}$ | |
| 3-18 | 3-34 | H | (2-b) | 2 | R$_{62}$ | CH | N | S | — | — | H | H | OC$_4$H$_9$ | H | H | 76.64 |

TABLE 9

| Polymer/compound No. | Polymer structure | Structural unit α of General Formula (1) Structural unit No. | α Mn | Other structural unit 2 Structural unit | β Mn | Mn | Photoresponsive adhesion test Fluidization | Non-fluidization |
|---|---|---|---|---|---|---|---|---|
| 3-1 | Homopolymer | 3-1 | — | — | — | 40000 | ○ | ○ |
| 3-2 | Homopolymer | 3-2 | — | — | — | 17000 | ○ | ○ |
| 3-3 | Homopolymer | 3-3 | — | — | — | 11000 | ○ | ○ |
| 3-4 | Homopolymer | 3-6 | — | — | — | 7300 | ○ | ○ |
| 3-5 | Homopolymer | 3-7 | — | — | — | 5600 | ○ | ○ |
| 3-6 | Homopolymer | 3-8 | — | — | — | 9000 | ○ | ○ |
| 3-7 | Homopolymer | 3-10 | — | — | — | 28000 | ○ | ○ |
| 3-8 | Homopolymer | 3-12 | — | — | — | 19000 | ○ | ○ |
| 3-9 | Homopolymer | 3-14 | — | — | — | 43000 | ○ | ○ |
| 3-10 | Homopolymer | 3-15 | — | — | — | 30000 | ○ | ○ |
| 3-11 | Homopolymer | 3-16 | — | — | — | 50000 | ○ | ○ |
| 3-12 | Homopolymer | 3-17 | — | — | — | 14000 | ○ | ○ |
| 3-13 | Homopolymer | 3-19 | — | — | — | 4500 | ○ | ○ |
| 3-14 | Homopolymer | 3-22 | — | — | — | 9500 | ○ | ○ |
| 3-15 | Homopolymer | 3-24 | — | — | — | 12000 | ○ | ○ |
| 3-16 | Homopolymer | 3-28 | — | — | — | 15000 | ○ | ○ |
| 3-17 | Homopolymer | 3-32 | — | — | — | 6100 | ○ | ○ |
| 3-18 | Homopolymer | 3-34 | — | — | — | 8300 | ○ | ○ |
| 3-19 | Homopolymer | 3-17 | — | — | — | 1000 | ○ | ○ |
| 3-20 | Random copolymer | 3-17 | — | St | — | 8300 | ○ | ○ |
| 3-21 | Random copolymer | 3-17 | — | EA | — | 6600 | ○ | ○ |
| 3-22 | Random copolymer | 3-17 | — | nBMA | — | 10000 | ○ | ○ |
| 3-23 | Random copolymer | 3-17 | — | St/MA | — | 8100 | ○ | ○ |
| 3-24 | Block copolymer α-β | 3-17 | 4400 | St | 1000 | 5400 | ○ | ○ |
| 3-25 | Block copolymer 2α-β | 3-17 | 4000 | St | 2200 | 6200 | ○ | ○ |
| 3-26 | Block copolymer α-2β | 3-17 | 4000 | St | 3700 | 7700 | ○ | ○ |
| 3-27 | Block copolymer 3α-β | 3-17 | 2300 | St | 2300 | 4600 | ○ | ○ |
| 3-28 | Block copolymer α-3β | 3-17 | 8000 | St | 13000 | 21000 | ○ | ○ |
| 3-29 | Block copolymer 4α-β | 3-17 | 1200 | St | 4700 | 5900 | ○ | ○ |
| 3-30 | Block copolymer α-4β | 3-17 | 3100 | St | 4800 | 7900 | ○ | ○ |
| 3-31 | Block copolymer α-β | 3-17 | 500 | St | 5000 | 5500 | ○ | ○ |
| 3-32 | Block copolymer 2α-β | 3-17 | 5000 | MA | 4300 | 9300 | ○ | ○ |
| 3-33 | Block copolymer 2α-β | 3-17 | 11000 | nHMA | 20000 | 31000 | ○ | ○ |
| 3-34 | Block copolymer 2α-β | 3-17 | 1000 | 3MPe | 5400 | 6400 | ○ | ○ |
| 3-35 | Block copolymer 2α-β | 3-17 | 10000 | St/MA | 15000 | 25000 | ○ | ○ |
| 3-36 | Homopolymer | 3-37 | — | — | — | 7600 | x | x |
| 3-37 | Azobenzene derivative (comparative compound) | | | | | 2870 | ○ | x |

St: styrene;
EA: ethyl acrylate;
nBMA: n-butyl methacrylate;
MA: methyl acrylate;
nHMA: n-hexyl methacrylate;
3MPe: 3-methyl-1-pentene

TABLE 10

| Example No. | Toner No. | Polymer Polymer No. | Polymer Ratio (mass %) | Binder resin Type | Binder resin Ratio (mass %) | Fixing apparatus No. | Fixability (%) | Color reproducibility |
|---|---|---|---|---|---|---|---|---|
| 3-1 | 3-1 | 3-1 | 100 | — | — | 1 | 68 | ⊙ |
| 3-2 | 3-2 | 3-2 | 100 | — | — | 1 | 69 | ⊙ |
| 3-3 | 3-3 | 3-3 | 100 | — | — | 1 | 65 | ⊙ |
| 3-4 | 3-4 | 3-4 | 100 | — | — | 1 | 87 | ⊙ |
| 3-5 | 3-5 | 3-5 | 100 | — | — | 1 | 87 | ⊙ |
| 3-6 | 3-6 | 3-6 | 100 | — | — | 1 | 84 | ⊙ |
| 3-7 | 3-7 | 3-7 | 100 | — | — | 1 | 84 | ⊙ |
| 3-8 | 3-8 | 3-8 | 100 | — | — | 1 | 87 | ⊙ |
| 3-9 | 3-9 | 3-9 | 100 | — | — | 1 | 65 | ⊙ |
| 3-10 | 3-10 | 3-10 | 100 | — | — | 1 | 80 | ⊙ |
| 3-11 | 3-11 | 3-11 | 100 | — | — | 1 | 67 | ⊙ |
| 3-12 | 3-12 | 3-12 | 100 | — | — | 1 | 88 | ⊙ |
| 3-13 | 3-13 | 3-13 | 100 | — | — | 1 | 87 | ⊙ |
| 3-14 | 3-14 | 3-14 | 100 | — | — | 1 | 77 | ⊙ |
| 3-15 | 3-15 | 3-15 | 100 | — | — | 1 | 75 | ⊙ |
| 3-16 | 3-16 | 3-16 | 100 | — | — | 1 | 70 | ⊙ |
| 3-17 | 3-17 | 3-17 | 100 | — | — | 1 | 65 | ⊙ |

TABLE 10-continued

| Example No. | Toner No. | Polymer No. | Polymer Ratio (mass %) | Binder resin Type | Ratio (mass %) | Fixing apparatus No. | Fixability (%) | Color reproducibility |
|---|---|---|---|---|---|---|---|---|
| 3-18 | 3-18 | 3-18 | 100 | — | — | 1 | 74 | ⊙ |
| 3-19 | 3-19 | 3-19 | 100 | — | — | 1 | 67 | ⊙ |
| 3-20 | 3-20 | 3-20 | 100 | — | — | 1 | 85 | ⊙ |
| 3-21 | 3-21 | 3-21 | 100 | — | — | 1 | 82 | ⊙ |
| 3-22 | 3-22 | 3-22 | 100 | — | — | 1 | 81 | ⊙ |
| 3-23 | 3-23 | 3-23 | 100 | — | — | 1 | 84 | ⊙ |
| 3-24 | 3-24 | 3-24 | 100 | — | — | 1 | 89 | ⊙ |
| 3-25 | 3-25 | 3-25 | 100 | — | — | 1 | 90 | ⊙ |
| 3-26 | 3-26 | 3-26 | 100 | — | — | 1 | 89 | ⊙ |
| 3-27 | 3-27 | 3-27 | 100 | — | — | 1 | 86 | ⊙ |
| 3-28 | 3-28 | 3-28 | 100 | — | — | 1 | 87 | ⊙ |
| 3-29 | 3-29 | 3-29 | 100 | — | — | 1 | 88 | ⊙ |
| 3-30 | 3-30 | 3-30 | 100 | — | — | 1 | 86 | ⊙ |
| 3-31 | 3-31 | 3-31 | 100 | — | — | 1 | 63 | ⊙ |
| 3-32 | 3-32 | 3-32 | 100 | — | — | 1 | 89 | ⊙ |
| 3-33 | 3-33 | 3-33 | 100 | — | — | 1 | 87 | ⊙ |
| 3-34 | 3-34 | 3-34 | 100 | — | — | 1 | 88 | ⊙ |
| 3-35 | 3-35 | 3-35 | 100 | — | — | 1 | 89 | ⊙ |
| 3-36 | 3-36 | 3-12 | 70 | Styrene-acrylic resin | 30 | 1 | 86 | ⊙ |
| 3-37 | 3-37 | 3-12 | 70 | Polyester resin | 30 | 1 | 85 | ⊙ |
| 3-38 | 3-12 | 3-12 | 100 | — | — | 2 | 91 | ⊙ |
| 3-39 | 3-12 | 3-12 | 100 | — | — | 3 | 92 | ⊙ |
| Comparative Example 3-1 | 3-38 | 3-36 | 100 | — | — | 1 | 52 | ⊙ |
| Comparative Example 3-2 | | | | Azobenzene derivative (comparative compound) | | 1 | 32 | X |

As is obvious from Table 9, it was verified that the polymers of various Examples, which included structural units represented by the General Formula (1), and in which the activation energy Ea for an isomerization reaction from a cis-form to a trans-form of a compound having a hydrogen atom bonded to the structure represented by the General Formula (2) was 60 kJ/mol or higher, were fluidized when irradiated with light and were reversibly non-fluidized. In contrast, in the polymer produced in Comparative Example 3-1, the activation energy Ea for an isomerization reaction from a cis-form to a trans-form of the compound corresponding to the azomethine structure is lower than 60 kJ/mol. It was understood that in such a polymer, fluidization caused by light irradiation and non-fluidization do not occur. Furthermore, in the comparative compound (azobenzene derivative) according to Comparative Example 3-2, reversible non-fluidization after fluidization was not verified.

Furthermore, as shown in Table 10, the toners that used the polymers produced in the various Examples could all perform fixing when irradiated with light and exhibited high fixability and excellent color reproducibility. On the other hand, the toner that used the polymer produced in Comparative Example 3-1 exhibited insufficient fixability. Furthermore, it was found that the toner that used the comparative compound (azobenzene derivative) in Comparative Example 3-2 had low fixability and low color reproducibility. Since the light source of ultraviolet radiation used for the fixability test and the irradiation conditions for ultraviolet radiation were constant, the toners of the various Examples were fluidized when irradiated with light and were reversibly non-fluidized compared to the toners of Comparative Examples 3-1 and 3-2, and it can be said that the effects provided by polymers that did not undergo noticeable coloration were sufficiently exhibited.

When a comparison of fixing apparatuses was made, it was found that when the same toner 3-12 was used and irradiated with ultraviolet radiation under the same conditions, and the fixing apparatus of No. 2 in which pressure was applied with a pressing member, and the fixing apparatus of No. 3 in which pressure was applied while heating with a pressing member, were used rather than the fixing apparatus of No. 1 in which a pressing member was not used, higher fixability can be obtained (comparison of Examples 3-12, 3-38, and 3-39).

As shown in the various Examples, it can be seen that polymers which include a structural unit represented by General Formula (1) that includes a group having an azomethine structure, and in which the activation energy Ea for an isomerization reaction from a cis-form to a trans-form of a compound having a hydrogen atom bonded to the azomethine structure is 60 kJ/mol or higher, are all fluidized when irradiated with light and are reversibly non-fluidized, undergo less coloration, and exhibit an excellent fixing ratio of 60% or higher in a fixability test for toner images based on toners that used these polymers.

From a comparison of fixability of the toners of the various Examples, when the structural unit of the General Formula (1) has an aromatic heterocyclic group at either $B_1$ or $B_2$, fixability tends to higher than in the case in which both are aromatic hydrocarbon groups. Furthermore, from a comparison of Examples 3-4 to 3-9, in a case in which $B_1$ is a phenylene group, and $B_2$ is an aromatic heterocyclic group, as in the case of Examples 3-4 to 3-8, when $B_1$ is bonded to a polymerizable group at the para-position with respect to $Z_1$, fixability tends to increase further. From a comparison of Examples 3-10 and 3-11, in a case in which $B_1$ is a divalent aromatic heterocyclic group, and $B_2$ is a monovalent aromatic heterocyclic group, when $B_1$ is bonded to a polymerizable group at positions that are not adjacent to the bonding positions to $Z_1$ as in the case of Example 3-10, fixability tends to increase further.

Even when a structural unit containing a group having an azomethine structure as well as other structural unit are used in combination, fluidization caused by light irradiation and reversible non-fluidization are similarly obtained. Furthermore, when the polymer is used in a toner, a satisfactory fixing ratio is obtained. At this time, it was found that irrespective of using a random copolymer or a block copolymer, excellent performance is obtained. Particularly, it was found that a block copolymer exhibited superior fixability.

Furthermore, it was found that from a comparison between Example 3-12 and Example 3-19, although polymers having the same structural units are used, the polymer of Example 3-12 having a number average molecular weight of 3,500 or more gives superior fixability of the toner.

In the case of a block copolymer, from a comparison between Example 3-24 and Example 3-31, even when polymers having the same structural units are used, the polymer of Example 3-24 in which the number average molecular weight of the polymer block α including a structural unit represented by the General Formula (1) is 1,000 or more, and the number average molecular weight of the polymer block β that does not contain an azomethine structure is 1,000 or more, gives superior fixability of the toner.

Furthermore, not only a polymer but also a binder resin can be further incorporated into the toner. Even in a case in which a binder resin is further used, it was verified that a satisfactory fixing ratio and satisfactory color reproducibility are similarly obtained. By using the polymer described above, even if the content ratio of the binder resin is low, a satisfactory fixing ratio can be obtained.

Above all, in the toners of Examples 3-4, 3-5, 3-8, 3-12, and 3-13 that used the polymers having the structural units 3-6, 3-7, 3-12, 3-17, and 3-19 indicated in Table 8, respectively, particularly the fixing ratios of the images were satisfactory. Furthermore, the toners of Examples 3-24 to 3-26 having a block copolymer including the structural unit 3-17 also exhibited an excellent fixing ratio.

Although embodiments of the present invention have been described and illustrated in detail, it is clearly understood that the same is by way of illustration and example only and not limitation, the scope of the present invention should be interpreted by terms of the appended claims.

What is claimed is:

1. A photoresponsive polymer comprising a structural unit represented by the following General Formula (1), the photoresponsive polymer being fluidized by being irradiated with light and reversibly non-fluidized:

General Formula (1)

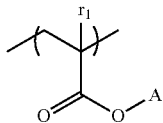

wherein in the General Formula (1), $r_1$ represents a hydrogen atom or a methyl group;

A represents a group having an azomethine structure represented by the following General Formula (2):

General Formula (2)

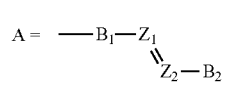
(2-a)

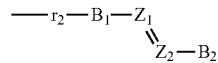
(2-b)

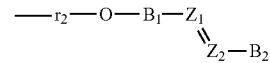
(2-c)

in the General Formula (2), $Z_1$ and $Z_2$ each independently represent N or CH, while $Z_1 \neq Z_2$;

each $B_1$ independently represents a substituted or unsubstituted divalent aromatic hydrocarbon group or a substituted or unsubstituted divalent aromatic heterocyclic group;

each $B_2$ independently represents a substituted or unsubstituted monovalent aromatic hydrocarbon group or a substituted or unsubstituted monovalent aromatic heterocyclic group;

each $r_2$ independently represents an alkylene group having 1 to 18 carbon atoms; and an activation energy Ea represented by the following Formula (1) of a compound in which a hydrogen atom is bonded, instead of an oxygen atom, to A in the General Formula (1) is 60 kJ/mol or more:

Ea (kJ/mol)=(Total energy of TS (kJ/mol))−(Total energy of cis-form (kJ/mol))    Formula (1):

wherein in the Formula (1), TS represents a transition state represented by General Formula (3); and the cis-form represents an isomer represented by General Formula (4):

General Formula (3)

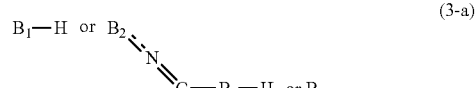
(3-a)

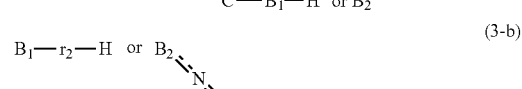
(3-b)

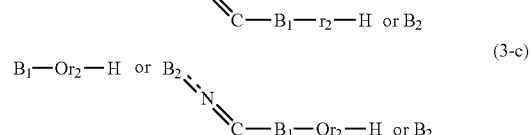
(3-c)

General Formula (4)

(4-a)

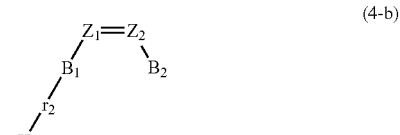
(4-b)

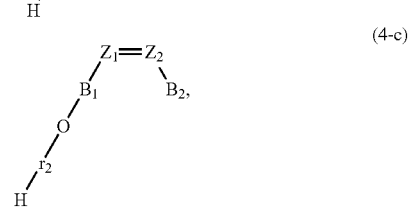
(4-c)

wherein the polymer is represented by the following General Formula (5):

General Formula (5)

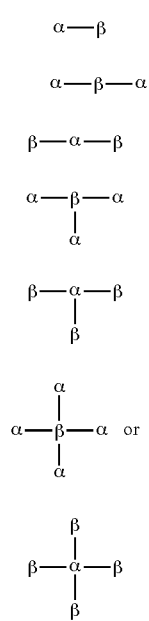

(α-β)
(2α-β)
(α-2β)
(3α-β)
(α-3β)
(4α-β)

or (α-4β)

wherein in the General Formula (5), α represents a polymer block including a structural unit represented by the General Formula (1); and β represents a polymer block that does not include an azomethine structure ($B_1$—$Z_1$=$Z_2$—$B_2$) in the General Formula (1).

2. The polymer according to claim 1, wherein each $B_1$ independently represents a substituted or unsubstituted phenylene group or a substituted or unsubstituted divalent aromatic heterocyclic group; and each $B_2$ independently represents a substituted or unsubstituted phenyl group or a substituted or unsubstituted monovalent aromatic heterocyclic group.

3. The polymer according to claim 2, wherein each Bi independently represents a phenylene group that is bonded to an oxygen atom (in the case of (2-a) or (2-c)) or $r_2$ (in the case of (2-b)) at a para-position with respect to $Z_1$; and each $B_2$ independently represents a phenyl group that is unsubstituted or has a substituent selected among an alkyl group having 1 to 18 carbon atoms, an alkoxy group having 1 to 18 carbon atoms, and a dialkylamino group having 2 to 10 carbon atoms at a para-position with respect to $Z_2$.

4. The polymer according to claim 3, wherein at least one of $B_1$ and $B_2$ does not have substitution at two ortho-positions and two meta-positions with respect to $Z_1$ or $Z_2$, or is substituted with a group selected among a halogen atom, an alkyl group having 1 to 4 carbon atoms, an alkoxy group having 1 to 4 carbon atoms, and a dialkylamino group having 2 to 10 carbon atoms.

5. A photoresponsive polymer comprising a structural unit represented by the following General Formula (1), the photoresponsive polymer being fluidized by being irradiated with light and reversibly non-fluidized:

General Formula (1)

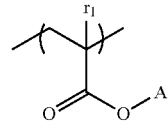

wherein in the General Formula (1), $r_1$ represents a hydrogen atom or a methyl group;
A represents a group having an azomethine structure represented by the following General Formula (2):

General Formula (2)

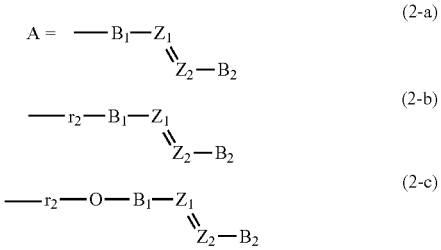

(2-a)
(2-b)
(2-c)

in the General Formula (2), $Z_1$ and $Z_2$ each independently represent N or CH, while $Z_1 \neq Z_2$;
each $B_1$ independently represents a substituted or unsubstituted divalent aromatic hydrocarbon group or a substituted or unsubstituted divalent aromatic heterocyclic group;
each $r_2$ independently represents an alkylene group having 1 to 18 carbon atoms; and
an activation energy Ea represented by the following Formula (1) of a compound in which a hydrogen atom is bonded, instead of an oxygen atom, to A in the General Formula (1) is 60 kJ/mol or more:

Ea (kJ/mol)=(Total energy of TS (kJ/mol))−(Total energy of cis-form (kJ/mol))     Formula (1):

wherein in the Formula (1), TS represents a transition state represented by General Formula (3); and the cis-form represents an isomer represented by General Formula (4):

General Formula (3)

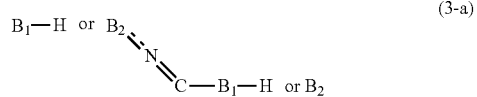

(3-a)

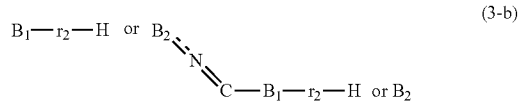

(3-b)

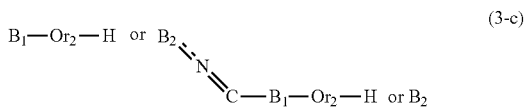

(3-c)

General Formula (4)

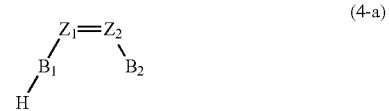

(4-a)

-continued (4-b)
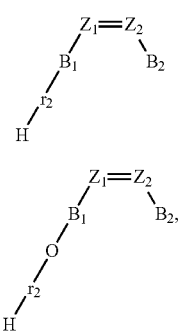

(4-c)

wherein each $B_1$ independently represents a phenylene group that is bonded to an oxygen atom (in the case of (2-a) or (2-c)) or $r_2$ (in the case of (2-b)) at the para-position with respect to $Z_1$; and each $B_2$ independently represents an aromatic heterocyclic group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

6. The polymer according to claim 2, wherein each Bi independently represents a substituted or unsubstituted divalent aromatic heterocyclic group and is bonded to an oxygen atom (in the case of (2-a) or (2-c)) or $r_2$ (in the case of (2-b)) at a position that is not adjacent to the bonding position to $Z_1$; and each $B_2$ independently represents a phenyl group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

7. A photoresponsive polymer comprising a structural unit represented by the following General Formula (1), the photoresponsive polymer being fluidized by being irradiated with light and reversibly non-fluidized:

General Formula (1)

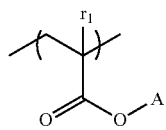

wherein in the General Formula (1), $r_1$ represents a hydrogen atom or a methyl group;

A represents a group having an azomethine structure represented by the following General Formula (2):

General Formula (2)

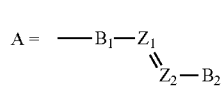
(2-a)

-continued

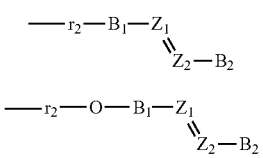
(2-b)

(2-c)

in the General Formula (2), $Z_1$ and $Z_2$ each independently represent N or CH, while $Z_1 \neq Z_2$;

each $B_1$ independently represents a substituted or unsubstituted divalent aromatic hydrocarbon group or a substituted or unsubstituted divalent aromatic heterocyclic group;

each $r_2$ independently represents an alkylene group having 1 to 18 carbon atoms; and an activation energy Ea represented by the following Formula (1) of a compound in which a hydrogen atom is bonded, instead of an oxygen atom, to A in the General Formula (1) is 60 kJ/mol or more:

Ea (kJ/mol)=(Total energy of TS (kJ/mol))−(Total energy of cis-form (kJ/mol))   Formula (1):

wherein in the Formula (1), TS represents a transition state represented by General Formula (3); and the cis-form represents an isomer represented by General Formula (4):

General Formula (3)

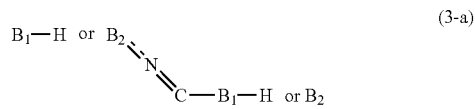
(3-a)

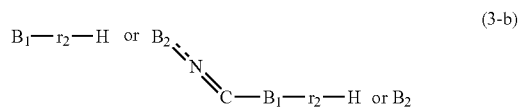
(3-b)

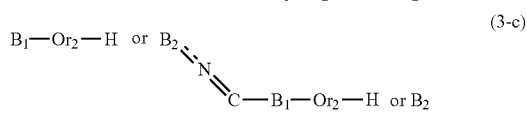
(3-c)

General Formula (4)

(4-a)

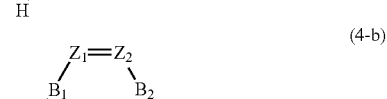
(4-b)

(4-c)

wherein each $B_1$ independently represents a substituted or unsubstituted divalent aromatic heterocyclic group and is bonded to an oxygen atom (in the case of (2-a) or (2-c)) or $r_2$ (in the case of (2-b)) at a position that is not adjacent to the bonding position to $Z_1$; and each $B_2$ independently represents an aromatic heterocyclic group that is unsubstituted or is substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

8. The polymer according to claim 5, wherein the number average molecular weight Mn is 3,500 or more.

9. The polymer according to claim 5, further comprising other structural unit having a vinyl-based polymerizable group.

10. The polymer according to claim 9, wherein the polymer comprises, as the other structural unit, a structural unit derived from a styrene derivative, an acrylic acid derivative, a methacrylic acid derivative, or an olefin derivative.

11. The polymer according to claim 1, wherein the number average molecular weight of the sum of polymer blocks α included in the polymer represented by the General Formula (5) is 1,000 or more, the number average molecular weight of the sum of polymer blocks β is 1,000 or more, and the total number average molecular weight of the polymer represented by the General Formula (5) is 3,500 or more.

12. The polymer according to claim 1, wherein the polymer block β is a polymer block including at least one of structural units derived from a styrene derivative, a (meth)acrylic acid derivative, and an olefin derivative.

13. The polymer according to claim 5, wherein a wavelength of the light is from 280 nm to 480 nm.

14. A toner comprising the polymer set forth in claim 5.

15. The toner according to claim 14, further comprising a binder resin.

16. The toner according to claim 14, wherein the binder resin includes at least one selected from the group consisting of a styrene-acrylic resin and a polyester resin.

17. An image forming method, comprising a step of forming a toner image formed from the toner set forth in claim 15 on a recording medium; and a step of irradiating the toner image with light and thereby softening the toner image.

18. The image forming method according to claim 17, wherein a wavelength of the light is from 280 nm to 480 nm.

19. The image forming method according to claim 17, further comprising a step of pressing the toner image.

20. The image forming method according to claim 19, wherein in the step of pressing, the toner image is further heated.

21. A photoresponsive adhesive comprising the polymer set forth in claim 5.

* * * * *